US012454531B2

(12) United States Patent
Velaparthi et al.

(10) Patent No.: US 12,454,531 B2
(45) Date of Patent: Oct. 28, 2025

(54) SUBSTITUTED PIPERAZINE DERIVATIVES USEFUL AS T CELL ACTIVATORS

(71) Applicant: BRISTOL-MYERS SQUIBB COMPANY, Princeton, NJ (US)

(72) Inventors: Upender Velaparthi, Princeton Junction, NJ (US); Chetan Padmakar Darne, Ewing, NJ (US); Richard E. Olson, Cambridge, MA (US); Jayakumar Sankara Warrier, Bangalore (IN)

(73) Assignee: Bristol-Myers Squibb Company, Princeton, NJ (US)

( * ) Notice: Subject to any disclaimer, the term of this patent is extended or adjusted under 35 U.S.C. 154(b) by 580 days.

(21) Appl. No.: 17/785,749

(22) PCT Filed: Dec. 22, 2020

(86) PCT No.: PCT/US2020/066504
§ 371 (c)(1),
(2) Date: Jun. 15, 2022

(87) PCT Pub. No.: WO2021/133749
PCT Pub. Date: Jul. 1, 2021

(65) Prior Publication Data
US 2023/0118629 A1  Apr. 20, 2023

(30) Foreign Application Priority Data
Dec. 23, 2019 (IN) .............................. 201911053559

(51) Int. Cl.
*C07D 471/04* (2006.01)
*A61P 35/00* (2006.01)
*C07D 519/00* (2006.01)

(52) U.S. Cl.
CPC ............ *C07D 471/04* (2013.01); *A61P 35/00* (2018.01); *C07D 519/00* (2013.01)

(58) Field of Classification Search
CPC ...... C07D 471/04; C07D 519/00; A61P 35/00
See application file for complete search history.

(56) References Cited

U.S. PATENT DOCUMENTS

| 4,324,893 | A | 4/1982 | Scotese et al. |
| 7,084,141 | B2 | 8/2006 | Gaeta et al. |
| 7,173,036 | B2 | 2/2007 | Sircar et al. |
| 7,220,856 | B2 | 5/2007 | Dunning et al. |
| 7,279,481 | B2 | 10/2007 | Falchi et al. |
| 7,361,760 | B2 | 4/2008 | Sircar et al. |
| 9,050,334 | B2 | 6/2015 | Gaweco et al. |
| 9,133,164 | B2 | 9/2015 | Gaweco et al. |
| 10,532,042 | B2 | 1/2020 | Lanman et al. |
| 10,669,272 | B2 | 6/2020 | Velaparthi et al. |
| 11,866,430 | B2 * | 1/2024 | Chupak ................... A61P 35/00 |
| 2005/0124604 | A1 | 6/2005 | Sircar et al. |
| 2005/0266510 | A1 | 12/2005 | Gajewski |
| 2011/0281908 | A1 | 11/2011 | Sun et al. |
| 2015/0224142 | A1 | 8/2015 | Albelda et al. |
| 2018/0334454 | A1 | 11/2018 | Argen |
| 2020/0115384 | A1 | 4/2020 | Wu et al. |
| 2021/0061802 | A1 | 3/2021 | Velaparthi et al. |

FOREIGN PATENT DOCUMENTS

| JP | S6461468 | 3/1989 |
| WO | 2004056824 A2 | 7/2004 |
| WO | 2004074218 A2 | 9/2004 |
| WO | 2004087880 A2 | 10/2004 |

(Continued)

OTHER PUBLICATIONS

Gao, J., Mfuh, A., Amako, Y. and Woo, C.M., 2018. Small molecule interactome mapping by photoaffinity labeling reveals binding site hotspots for the NSAIDs. Journal of the American Chemical Society, 140(12), pp. 4259-4268. (Year: 2018).*
Abdel-Magid, "Cancer Immunotherapy through the Inhibition of Diacylglycerol Kinases Alpha and Zeta", ACS Med. Chem. Lett. 2020, 11,1083-1085.
Avila-Flores, A. et al., "Predominant Contribution of DGKζ over DGKα in the Control of PKC/PDK-1-Regulated Functions in T Cells", Immunology and Cell Biology (2017) 95: 549-563.
Barraza et al., "Discovery of Anthranilamides as a Novel Class of Inhyibitors of Neurotropic Alphavirus Replication", Bloorg. Med. Chem 23 (2015) 1569-1587.

(Continued)

*Primary Examiner* — James H Alstrum-Acevedo
*Assistant Examiner* — Carolyn L. Ladd
(74) *Attorney, Agent, or Firm* — Gary Greenblatt

(57) ABSTRACT

Disclosed are compounds of Formula (I): or a salt thereof, wherein: $R_1$, $R_2$, $R_4$, $R_5$, $R_6$, and m are defined herein. Also disclosed are methods of using such compounds to inhibit the activity of one or both of diacylglycerol kinase alpha (DGKα) and diacylglycerol kinase zeta (DGKζ), and pharmaceutical compositions comprising such compounds. These compounds are useful in the treatment of viral infections and proliferatve disorders, such as cancer.

13 Claims, No Drawings
Specification includes a Sequence Listing.

(56) References Cited

FOREIGN PATENT DOCUMENTS

| | | | |
|---|---|---|---|
| WO | 2005009967 A2 | 2/2005 | |
| WO | 2005021546 A1 | 3/2005 | |
| WO | 2007109251 A2 | 9/2007 | |
| WO | 2007114239 A1 | 11/2007 | |
| WO | 2007132948 A1 | 11/2007 | |
| WO | 2007136125 A1 | 11/2007 | |
| WO | 2010042489 A2 | 4/2010 | |
| WO | 2010088408 A2 | 8/2010 | |
| WO | 2012009649 A1 | 1/2012 | |
| WO | 2012142498 A2 | 10/2012 | |
| WO | 2013118071 A1 | 8/2013 | |
| WO | 16096631 A1 | 6/2016 | |
| WO | 2016164675 A1 | 10/2016 | |
| WO | 2017106607 A1 | 6/2017 | |
| WO | 2017177037 A1 | 10/2017 | |
| WO | 2018119183 A2 | 6/2018 | |
| WO | 2018134685 A2 | 7/2018 | |
| WO | 2019005883 A1 | 1/2019 | |
| WO | 19213516 A1 | 11/2019 | |
| WO | 2020006016 A1 | 1/2020 | |
| WO | 2020006018 A1 | 1/2020 | |
| WO | 2020071550 A1 | 4/2020 | |
| WO | 2021105115 A1 | 6/2021 | |
| WO | 2021105116 | 6/2021 | |
| WO | 2021105117 A1 | 6/2021 | |

OTHER PUBLICATIONS

Boroda et al., "Dual Activites of Ritanserin and R59022 as DGKα inhibitors and Serotonin Receptor Antagonists" Biochemical Pharmacology 123 (2017) 29-39.

Chen et al., "Diacylglycerol Kinases in T Cell Tolerance and Effector Function", Frontiers in Cell and Development Biology vol. 4 pp. 1-13, (2016).

Dagia et al., "A fluorinated Analog of ISO-1 blocks the Recognition and Biological Function of MIF and is Orally Efficacious in a Murine Model of Colitis" Eur. J. Pharmacology 607 (2009) 201-212.

Database Registry Chemical Abstracts Service: Database RN 2249638-34-2 (Entered STN Nov. 19, 2018).

Facciabene, et al. "T-Regulartory Cells: Key Players in Tumor Immune Escape and Angiogenesis" Cancer Res. 72(9) 2162-2171 (2012).

Franks et al., "The Ligand Binding Landscape of Dlacylglycerol Kinases" Cell Chem Bio 24, 870-880 (2017).

Ganesan et al., "Comprehensive in vitro Characterization of PD-L1 Small Molecule Inhibitors", Scientific Reports 9, Article No. 12392 (2019).

International Preliminary Report on Patentability for PCT Application PCT/US2020/066504, mailed Jun. 28, 2022.

Jiang et al., "Selectivity of the Diacylglycerol Kinase Inhibitor 3-2,3-dihydro-2-thioxo-4(1H)quinazolinone (R59949) among Diacylglycerol Kinase Subtypes", Biochemochemical Pharmacology 59, 763-772, 2000.

Jing et al., "T Cells Deficient In Diacylglycerol Kinase ζ are Resistance to PD-1 Inhibition and Help Create Persistent Host Immunity to Leukemia" Cancer Res 77(20) 5676-5686 (2017).

Krishna et al., "Regulation of Lipid Signaling by Diacylglycerol Kinases During T Cell Development and Function" Front Immunolog. (2013) 4: Article 178.

Liu et al., "A Novel Diacylglycerol Kinase α-Selective Inhibitor CU-3, Induces Cancer Cell Apoptosis and Enhances Immune Response" J. Lipid Res. 57, 368-379 (2016).

McCloud et al., "Deconstructing Lipid Kinase Inhibitors By Chemical Proteomics" Biochem. 2018, 57, 231-236.

McLean et al., "Fragment Screening of Inhibitors for MIF Tautomerase Reveals a Cryptic Surface Binding Site" Bio. Med. Chem. Lett. 20 (2010) 1821-1824.

Mellman et al. "Cancer Immunotherapy Comes of Age" Nature 480 480-489 (2011).

Merida et al., "Redundant and Specialized Roles for Diacylglycerol Kinases α and ζ in the Control of T cell Functions" Science Signaling 8 (374), re6 (2015).

Merida I., Arranz-Nicolás J., et al., "Diacylglycerol Kinase Malfunction in Human Disease and the Search for Specific Inhibitors", Handbook of Experimental Pharmacology. Springer, Berlin, Heidelberg (2019). First Online: Jun. 22, 2019.

Mizoguchi et al., "Alterations in Signal Transduction Molecules in T Lumphocytes from Tumor-Bearing Mice" (1992) Science 258:1795-98.

Noessner, "DGK-α: A Checkpoint in Cancer-Mediated Immuno-Inhibition and Target for Immunotherapy" Front Cell Dev Bio 2017 5, Article 16.

Olenchock et al., "Disruption of the Diacylglycerol Metabolism Impairs the Induction of T cell Anergy", Nature Immunology 7(11) 1174-1181 (2006).

Prinz et al., "High DGK-α and Disabled MAPK Pathways Cause Dysfunction of Human Tumor-Infiltrating CD8+ T Cells that Is Reversible by Pharmacologic Intervention", J Immunology 188(12) 5990-6000 (2012).

Purow, B. "Molecular Pathways: Targeting Diacylglycerol Kinase Aplha in Cancer" Clin. Cancer Res. 21(22) 5008-5012 (2015).

Riese et al., "Decreased Diacylglycerol Metabolism Enhances ERK Activation and Augments DC8+ T Cell Functional Responses", J Bio Chem 286(7) 5254-5265 (2011).

Riese et al., "Diacylglycerol Kinases (DGKs): Novel Targets for Improving T Cell Activity in Cancer" Frontiers Cell Dev Bio (2016) 4, Article 108.

Santilli et al., "2-Oxo-1,8-naphthyridine-3-carboxylic Acid Derivaties with Potent Gastric Antisecretory Properties" J. Med. Chem. 1987, 30, 2270-2277.

Sjoblom et al. "The Consensus Coding Sequences of Human Breast and Colorectal Cancers" Science 314 268-274 (2006).

Tominaga et al., "Studies on Positive Inotropic Agents. I. Synthesis of 3,4-Dihydro-6-[4-(3,4-dimethoxybenzoyl)-1-pierazinyl]-2(1H)-quinolinone and Related Compounds", Chem. Pharm. Bull. 32(6) 2100-2110 (1984).

Topalian et al., "Targetomg the PD-1/B7-H1 (PD-L1) Pathway to Activate Anti-tumor Immunity", Curr. Opin. Immunol. 2012, 24:207-212.

Velnati et al., "Identification of a Novel DGKα Inhibitor for XLP-1 Therapy by Virtual Screening", Eur J Med Chem 164 (2019) 378-390.

Wesley et al., "Diacylglycerol Kinase ζ (DGKζ) and Casitas b-Lineage Proto-Oncogene b-Deficient Mice Have Similar Functional Outcomes in T Cells but DGK ζ-Deficient Mice have Increased T Cell Activatin and Tumor Clearance" ImmunoHorizons 2018 2 94) 107-118.

Zha Y et al., "T Cell Anergy is Reversed by Active Ras and is Regulated by Diacylglycerol Kinase-α" Nature Immunology, (2006) 7(11) 1166-1173; Erratum 7(12) 1343.

* cited by examiner

SUBSTITUTED PIPERAZINE DERIVATIVES USEFUL AS T CELL ACTIVATORS

CROSS REFERENCE

This application is a 371 application of International Application No. PCT/US2020/066504 filed on Dec. 22, 2020, which claims the benefit of Indian Provisional Application No. 201911053559, filed Dec. 23, 2019, the content of each is hereby fully incorporated by reference in its entirety for all purposes.

DESCRIPTION

The present invention generally relates to substituted compounds that activate T cells, promote T cell proliferation, and/or exhibit antitumor activity. Provided herein are substituted compounds, compositions comprising such compounds, and methods of their use. The invention further pertains to pharmaceutical compositions comprising at least one compound according to the invention that are useful for the treatment of proliferative disorders, such as cancer, and viral infections.

BACKGROUND OF THE INVENTION

Human cancers harbor numerous genetic and epigenetic alterations, generating neoantigens potentially recognizable by the immune system (Sjoblom et al. (2006) *Science* 314:268-74). The adaptive immune system, comprised of T and B lymphocytes, has powerful anti-cancer potential, with a broad capacity and exquisite specificity to respond to diverse tumor antigens. Further, the immune system demonstrates considerable plasticity and a memory component. The successful harnessing of all these attributes of the adaptive immune system would make immunotherapy unique among all cancer treatment modalities. However, although an endogenous immune response to cancer is observed in preclinical models and patients, this response is ineffective, and established cancers are viewed as "self" and tolerated by the immune system. Contributing to this state of tolerance, tumors may exploit several distinct mechanisms to actively subvert anti-tumor immunity. These mechanisms include dysfunctional T-cell signaling (Mizoguchi et al., (1992) *Science* 258:1795-98), suppressive regulatory cells (Facciabene et al., (2012) *Cancer Res.* 72:2162-71), and the co-opting of endogenous "immune checkpoints", which serve to down-modulate the intensity of adaptive immune responses and protect normal tissues from collateral damage, by tumors to evade immune destruction (Topalian et al., (2012) *Curr. Opin. Immunol.* 24:1-6; Mellman et al. (2011) *Nature* 480:480-489).

Diacylglycerol kinases (DGKs) are lipid kinases that mediate the conversion of diacylglycerol to phosphatidic acid thereby terminating T cell functions propagated through the TCR signaling pathway. Thus, DGKs serve as intracellular checkpoints and inhibition of DGKs are expected to enhance T cell signaling pathways and T cell activation. Supporting evidence include knock-out mouse models of either DGKα or DGKζ which show a hyper-responsive T cell phenotype and improved anti-tumor immune activity (Riese M. J. et al., *Journal of Biological Chemistry*, (2011) 7: 5254-5265; Zha Y et al., *Nature Immunology*, (2006) 12:1343; Olenchock B. A. et al., (2006) 11: 1174-81). Furthermore tumor infiltrating lymphocytes isolated from human renal cell carcinoma patients were observed to over-express DGKα which resulted in inhibited T cell function (Prinz, P. U. et al., *J Immunology* (2012) 12:5990-6000). Thus, DGKα and DGKζ are viewed as targets for cancer immunotherapy (Riese M. J. et al., *Front Cell Dev Biol.* (2016) 4: 108; Chen, S. S. et al., *Front Cell Dev Biol.* (2016) 4: 130; Avila-Flores, A. et al., *Immunology and Cell Biology* (2017) 95: 549-563; Noessner, E., *Front Cell Dev Biol.* (2017) 5: 16; Krishna, S., et al., *Front Immunology* (2013) 4:178; Jing, W. et al., *Cancer Research* (2017) 77: 5676-5686).

There remains a need for compounds useful as inhibitors of one or both of DGKα and DGKζ. Additionally, there remains a need for compounds useful as inhibitors of one or both of DGKα and DGKζ that have selectivity over other diacylglycerol kinases, protein kinases, and/or other lipid kinases.

Accordingly, an agent that is safe and effective in restoring T cell activation, lowering antigen threshold, enhancing antitumor functionality, and/or overcoming the suppressive effects of one or more endogenous immune checkpoints, such as PD-1, LAG-3 and TGFβ, would be an important addition for the treatment of patients with proliferative disorders, such as cancer, as well as viral infections.

SUMMARY OF THE INVENTION

Applicants have found compounds that have activity as inhibitors of one or both of DGKα and DGKζ. Further, applicants have found compounds that have activity as inhibitors of one or both of DGKα and DGKζ and have selectivity over other diacylglycerol kinases, protein kinases, and/or other lipid kinases. These compounds are provided to be useful as pharmaceuticals with desirable stability, bioavailability, therapeutic index, and toxicity values that are important to their drugability.

The present invention provides substituted compounds of Formula (I), which are useful as inhibitors of DGKα, DGKζ, or both DGKα and DGKζ, including salts and prodrugs thereof.

The present invention also provides pharmaceutical compositions comprising a compound of Formula (I) and/or a pharmaceutically acceptable salt thereof; and a pharmaceutically acceptable carrier.

The present invention also provides a method of treating a disease or disorder associated with the activity of DGKα, DGKζ, or both DGKα and DGKζ, the method comprising administering to a mammalian patient a compound of Formula (I) and/or a pharmaceutically acceptable salt thereof.

The present invention also provides processes and intermediates for making the compounds of Formula (I) and/or salts thereof.

The present invention also provides a compound of Formula (I) and/or a pharmaceutically acceptable salt thereof, for use in therapy.

The present invention also provides the use of the compounds of Formula (I) and/or pharmaceutically acceptable salts thereof, for the manufacture of a medicament for the treatment of proliferative disorders, such as cancer and viral infections.

The compounds of Formula (I) and compositions comprising the compounds of Formula (I) may be used in treating, preventing, or curing viral infections and various proliferative disorders, such as cancer. Pharmaceutical compositions comprising these compounds are useful in treating, preventing, or slowing the progression of diseases or disorders in a variety of therapeutic areas, such as viral infections and cancer.

These and other features of the invention will be set forth in expanded form as the disclosure continues.

DETAILED DESCRIPTION

The first aspect of the present invention provides at least one compound of Formula (I):

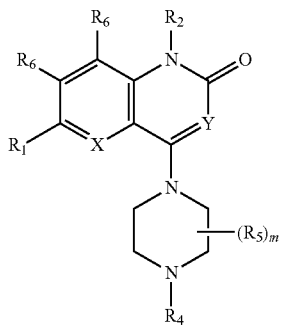

or a salt thereof, wherein:

X is $CR_6$ or N;

Y is $CR_3$ or N;

$R_1$ is H, F, Cl, Br, —CN, $C_{1-3}$ alkyl substituted with zero to 4 $R_{1a}$, $C_{3-4}$ cycloalkyl substituted with zero to 4 $R_{1a}$, $C_{1-3}$ alkoxy substituted with zero to 4 $R_{1a}$, —C(O)$NR_aR_a$, —$NR_aR_a$, —$S(O)_nR_f$, or —$P(O)R_fR_f$;

each $R_{1a}$ is independently F, Cl, —CN, —OH, —$OCH_3$, or —$NR_aR_a$;

each $R_a$ is independently H or $C_{1-3}$ alkyl;

$R_2$ is H, $C_{1-3}$ alkyl substituted with zero to 4 $R_{2a}$, $C_{2-3}$ alkenyl substituted with zero to 4 $R_{2a}$, or $C_{3-4}$ cycloalkyl substituted with zero to 4 $R_{2a}$;

each $R_{2a}$ is independently F, Cl, —CN, —OH, —O($C_{1-2}$ alkyl), $C_{3-4}$ cycloalkyl, $C_{3-4}$ alkenyl, or $C_{3-4}$ alkynyl;

$R_3$ is H, F, Cl, Br, —CN, $C_{1-3}$ alkyl, $C_{1-2}$ fluoroalkyl, $C_{3-4}$ cycloalkyl, $C_{3-4}$ fluorocycloalkyl, —$NO_2$, or pyridinyl substituted with zero to 2 $R_{3a}$;

each $R_{3a}$ is halo, —CN, $C_{1-3}$ alkyl, or $C_{1-3}$ alkoxy;

$R_4$ is —$CR_{4a}R_{4c}$-L-$R_{4b}$;

L is $L_1$ or —$(CH_2)_{1-3}L_1$—;

$L_1$ is —C(O)—, —C(O)O—, —C(O)$NR_d$—, —C(O)$NR_dO$—, —C(O)$NR_dS(O)_2$—, —$NR_d$—, —$NR_dC(O)$—, —$NR_dC(O)O$—, —$NR_dC(O)NR_d$—, —$S(O)_2$—, —$S(O)_2NR_d$—, —$NR_dS(O)_2$—, or —P(O)$R_e$—;

$R_{4a}$ is:
  (i) H or $C_{1-6}$ alkyl substituted with zero to 4 substituents independently selected from F, Cl, —CN, —OH, —$OCH_3$, —$SCH_3$, $C_{1-3}$ fluoroalkoxy, —$NR_aR_a$, —$S(O)_2R_f$, or —$NR_aS(O)_2R_f$; or
  (ii) $C_{3-6}$ cycloalkyl, $C_{5-14}$ heterocyclyl, $C_{6-10}$ aryl, or $C_{5-14}$ heteroaryl, each substituted with zero to 4 $R_b$;

each $R_b$ is independently F, Cl, Br, —CN, —OH, $C_{1-6}$ alkyl, $C_{1-3}$ fluoroalkyl, $C_{1-4}$ hydroxyalkyl, —$(CH_2)_{1-2}$O($C_{1-3}$ alkyl), $C_{1-4}$ alkoxy, —O($C_{1-4}$ hydroxyalkyl), —O($CH$)$_{1-3}$O($C_{1-3}$ alkyl), $C_{1-3}$ fluoroalkoxy, —O($CH$)$_{1-3}NR_cR_c$, —$OCH_2CH=CH_2$, —$OCH_2C \equiv CH$, —C(O)($C_{1-4}$ alkyl), —C(O)OH, —C(O)O($C_{1-4}$ alkyl), —C(O)$NH_2$, —C(O)NH($C_{1-4}$ alkyl), —C(O)N($C_{1-4}$ alkyl)$_2$, —$NR_cR_c$, —$NR_aS(O)_2$($C_{1-3}$ alkyl), —$NR_aC(O)$($C_{1-3}$ alkyl), —$NR_aC(O)O$($C_{1-4}$ alkyl), —P(O)($C_{1-3}$ alkyl)$_2$, —$S(O)_2$($C_{1-3}$ alkyl), —O($CH_2$)$_{1-2}$($C_{3-6}$ cycloalkyl), —O($CH_2$)$_{1-2}$(morpholinyl), $C_{3-6}$ cycloalkyl, cyanocyclopropyl, methylazetidinyl, acetylazetidinyl, triazolyl, tetrahydropyranyl, morpholinyl, thiophenyl, methylpiperidinyl, or —$CR_cR_c$(phenyl);

$R_{4b}$ is:
  (i) H, —CN, $C_{1-6}$ alkyl substituted with zero to 4 substituents independently selected from F, Cl, —CN, —OH, —$OCH_3$, —$SCH_3$, $C_{1-3}$ fluoroalkoxy, —$NR_aR_a$, —$S(O)_2R_f$, $C_{3-6}$ cycloalkyl, $C_{3-6}$ hydroxycycloalkyl, —$NR_aS(O)_2R_f$,

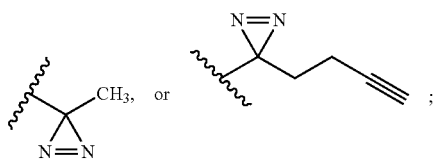

or (ii) $C_{3-6}$ cycloalkyl, $C_{5-14}$ heterocyclyl, $C_{6-10}$ aryl, or $C_{5-14}$ heteroaryl, each substituted with zero to 4 $R_b$;

provided that at least one of $R_{4a}$ and $R_{4b}$ is $C_{3-6}$ cycloalkyl, $C_{5-14}$ heterocyclyl, $C_{6-10}$ aryl, or $C_{5-14}$ heteroaryl, each substituted with zero to 4 $R_b$; and provided that when L is —$CH_2NR_d$—, then $R_{4b}$ is not H or unsubstituted $C_{1-6}$ alkyl;

$R_{4c}$ is H or $C_{1-6}$ alkyl;

each $R_e$ is independently H or $C_{1-2}$ alkyl;

each $R_d$ is independently H or $C_{1-6}$ alkyl;

$R_e$ is $C_{1-6}$ alkyl;

each $R_f$ is independently $C_{3-4}$ cycloalkyl or $C_{1-3}$ alkyl substituted with zero to 4 $R_{1a}$;

each $R_5$ is independently F, Cl, —CN, —OH, $C_{1-6}$ alkyl substituted with zero to 4 $R_g$, $C_{1-3}$ alkoxy substituted with zero to 4 $R_g$, $C_{2-4}$ alkenyl substituted with zero to 4 $R_g$, $C_{2-4}$ alkynyl substituted with zero to 4 $R_g$, $C_{3-4}$ cycloalkyl substituted with zero to 4 $R_g$, phenyl substituted with zero to 4 $R_g$, oxadiazolyl substituted with zero to 3 $R_g$, pyridinyl substituted with zero to 4 $R_g$, —$(CH_2)_{1-2}$(heterocyclyl substituted with zero to 4 $R_g$), —$(CH_2)_{1-2}NR_cC(O)$($C_{1-4}$ alkyl), —$(CH_2)_{1-2}NR_cC(O)O$($C_{1-4}$ alkyl), —$(CH_2)_{1-2}NR_cS(O)_2$($C_{1-4}$ alkyl), —C(O)($C_{1-4}$ alkyl), —C(O)OH, —C(O)O($C_{1-4}$ alkyl), —C(O)O($C_{3-4}$ cycloalkyl), —C(O)$NR_aR_a$, or —C(O)$NR_a$($C_{3-4}$ cycloalkyl), or two $R_5$ attached to the same carbon atom form =O;

each $R_g$ is independently F, Cl, —CN, —OH, $C_{1-3}$ alkoxy, $C_{1-3}$ fluoroalkoxy, —O($CH_2$)$_{1-2}$O($C_{1-2}$ alkyl), $C_{3-5}$ cycloalkyl, or —$NR_eR_e$;

each $R_6$ is H, F, Cl, —CN, —$CH_3$, —$CH_2F$, —$CHF_2$, —$CF_3$, or —$OCH_3$;

m is zero, 1, 2, or 3; and n is zero, 1, or 2.

The second aspect of the present invention provides at least one compound of Formula (I):

(I)

[Chemical structure of Formula (I) showing a bicyclic ring system with substituents R₆, R₂, R₆, R₁, X, Y, O, and a piperazine ring with (R₅)ₘ and R₄]

or a salt thereof, wherein:

X is CR₆ or N;

Y is CR₃ or N;

R₁ is H, F, Cl, Br, —CN, C₁₋₃ alkyl substituted with zero to 4 R₁ₐ, C₃₋₄ cycloalkyl substituted with zero to 4 R₁ₐ, C₁₋₃ alkoxy substituted with zero to 4 R₁ₐ, —C(O)NRₐRₐ, —NRₐRₐ, —S(O)ₙRf, or —P(O)RfRf;

each R₁ₐ is independently F, Cl, —CN, —OH, —OCH₃, or —NRₐRₐ;

each Rₐ is independently H or C₁₋₃ alkyl;

R₂ is H, C₁₋₃ alkyl substituted with zero to 4 R₂ₐ, C₂₋₃ alkenyl substituted with zero to 4 R₂ₐ, or C₃₋₄ cycloalkyl substituted with zero to 4 R₂ₐ;

each R₂ₐ is independently F, Cl, —CN, —OH, —O(C₁₋₂ alkyl), C₃₋₄ cycloalkyl, C₃₋₄ alkenyl, or C₃₋₄ alkynyl;

R₃ is H, F, Cl, Br, —CN, C₁₋₃ alkyl, C₁₋₂ fluoroalkyl, C₃₋₄ cycloalkyl, C₃₋₄ fluorocycloalkyl, —NO₂, or pyridinyl substituted with zero to 2 R₃ₐ;

each R₃ₐ is halo, —CN, C₁₋₃ alkyl, or C₁₋₃ alkoxy;

R₄ is —CR₄ₐR₄c-L-R₄b;

L is L₁ or —CH₂L₁—;

L₁ is —C(O)—, —C(O)O—, —C(O)NRd—, —NRdC(O)—, —NRdC(O)NRd—, —S(O)₂—, —S(O)₂NRd—, —NRdS(O)₂—, or —P(O)Rₑ—;

R₄ₐ is:
(i) H or C₁₋₆ alkyl substituted with zero to 4 substituents independently selected from F, Cl, —CN, —OH, —OCH₃, —SCH₃, C₁₋₃ fluoroalkyl, —NRₐRₐ, —S(O)₂Rf, or —NRₐS(O)₂Rf; or
(ii) C₃₋₆ cycloalkyl, C₅₋₁₄ heterocyclyl, C₆₋₁₀ aryl, or C₅₋₁₄ heteroaryl, each substituted with zero to 4 Rb;

each Rb is independently F, Cl, Br, —CN, —OH, C₁₋₆ alkyl, C₁₋₃ fluoroalkyl, C₁₋₄ hydroxyalkyl, —(CH₂)₁₋₂O(C₁₋₃ alkyl), C₁₋₄ alkoxy, —O(C₁₋₄ hydroxyalkyl), —O(CH)₁₋₃O(C₁₋₃ alkyl), C₁₋₃ fluoroalkoxy, —O(CH)₁₋₃NRcRc, —OCH₂CH=CH₂, —OCH₂C≡CH, —C(O)(C₁₋₄ alkyl), —C(O)OH, —C(O)O(C₁₋₄ alkyl), —C(O)NH₂, —C(O)NH(C₁₋₄ alkyl), —C(O)N(C₁₋₄ alkyl)₂, —NRcRc, —NRcS(O)₂(C₁₋₃ alkyl), —NRcC(O)(C₁₋₃ alkyl), —NRcC(O)O(C₁₋₄ alkyl), —P(O)(C₁₋₃ alkyl)₂, —S(O)₂(C₁₋₃ alkyl), —O(CH₂)₁₋₂(C₃₋₆ cycloalkyl), —O(CH₂)₁₋₂(morpholinyl), C₃₋₆ cycloalkyl, cyanocyclopropyl, methylazetidinyl, acetylazetidinyl, triazolyl, tetrahydropyranyl, morpholinyl, thiophenyl, methylpiperidinyl, or —CRcRc(phenyl);

R₄b is:
(i) H, C₁₋₆ alkyl substituted with zero to 4 substituents independently selected from F, Cl, —CN, —OH, —OCH₃, —SCH₃, C₁₋₃ fluoroalkoxy, —NRₐRₐ, —S(O)₂Rf, —NRₐS(O)₂Rf;

[Chemical structures showing CH₃-substituted diazirine group, or diazirine with alkyne substituent]

or
(ii) C₃₋₆ cycloalkyl, C₅₋₁₄ heterocyclyl, C₆₋₁₀ aryl, or C₅₋₁₄ heteroaryl, each substituted with zero to 4 Rb;

provided that at least one of R₄ₐ and R₄b is C₃₋₆ cycloalkyl, C₅₋₁₄ heterocyclyl, C₆₋₁₀ aryl, or C₅₋₁₄ heteroaryl, each substituted with zero to 4 Rb;

R₄c is H or C₁₋₆ alkyl;

each Rc is independently H or C₁₋₂ alkyl;

each Rd is independently H or C₁₋₆ alkyl;

Rₑ is C₁₋₆ alkyl;

each Rf is independently C₃₋₄ cycloalkyl or C₁₋₃ alkyl substituted with zero to 4 R₁ₐ;

each R₅ is independently F, Cl, —CN, —OH, C₁₋₆ alkyl substituted with zero to 4 Rg, C₁₋₃ alkoxy substituted with zero to 4 Rg, C₂₋₄ alkenyl substituted with zero to 4 Rg, C₂₋₄ alkynyl substituted with zero to 4 Rg, C₃₋₄ cycloalkyl substituted with zero to 4 Rg, phenyl substituted with zero to 4 Rg, oxadiazolyl substituted with zero to 3 Rg, pyridinyl substituted with zero to 4 Rg, —(CH₂)₁₋₂(heterocyclyl substituted with zero to 4 Rg), —(CH₂)₁₋₂NRcC(O)(C₁₋₄ alkyl), —(CH₂)₁₋₂NRcC(O)O(C₁₋₄ alkyl), —(CH₂)₁₋₂NRcS(O)₂(C₁₋₄ alkyl), —C(O)(C₁₋₄ alkyl), —C(O)OH, —C(O)O(C₁₋₄ alkyl), —C(O)O(C₃₋₄ cycloalkyl), —C(O)NRₐRₐ, or —C(O)NRₐ(C₃₋₄ cycloalkyl), or two R₅ attached to the same carbon atom form =O;

each Rg is independently F, Cl, —CN, —OH, C₁₋₃ alkoxy, C₁₋₃ fluoroalkoxy, —O(CH₂)₁₋₂O(C₁₋₂ alkyl), C₃₋₅ cycloalkyl, or —NRcRc;

each R₆ is H, F, Cl, —CN, —CH₃, —CH₂F, —CHF₂, —CF₃, or —OCH₃;

m is zero, 1, 2, or 3; and n is zero, 1, or 2.

The third aspect of the present invention provides at least one compound of Formula (I):

(I)

[Chemical structure of Formula (I) repeated]

or a salt thereof, wherein:

X is CR₆ or N;

Y is CR₃ or N;

R₁ is H, F, Cl, Br, —CN, C₁₋₃ alkyl substituted with zero to 4 R₁ₐ, C₃₋₄ cycloalkyl substituted with zero to 4 R₁ₐ, $C_{1-3}$ alkoxy substituted with zero to 4 $R_{1a}$, —C(O)NR$_a$R$_a$, —NR$_a$R$_a$, —S(O)$_n$R$_f$, or —P(O)R$_f$R$_f$;

each $R_{1a}$ is independently F, Cl, —CN, —OH, —OCH$_3$, or —NR$_a$R$_a$;

each $R_a$ is independently H or $C_{1-3}$ alkyl;

$R_2$ is H, $C_{1-3}$ alkyl substituted with zero to 4 $R_{2a}$, $C_{2-3}$ alkenyl substituted with zero to 4 $R_{2a}$, or $C_{3-4}$ cycloalkyl substituted with zero to 4 $R_{2a}$;

each $R_{2a}$ is independently F, Cl, —CN, —OH, —O($C_{1-2}$ alkyl), $C_{3-4}$ cycloalkyl, $C_{3-4}$ alkenyl, or $C_{3-4}$ alkynyl;

$R_3$ is H, F, Cl, Br, —CN, $C_{1-3}$ alkyl, $C_{1-2}$ fluoroalkyl, $C_{3-4}$ cycloalkyl, $C_{3-4}$ fluorocycloalkyl, —NO$_2$, or pyridinyl substituted with zero to 2 $R_{3a}$;

each $R_{3a}$ is halo, —CN, $C_{1-3}$ alkyl, or $C_{1-3}$ alkoxy;

$R_4$ is —CR$_{4a}$R$_{4c}$-L-R$_{4b}$;

L is L$_1$ or —(CH$_2$)$_{1-3}$L$_1$-;

L$_1$ is —C(O)—, —C(O)O—, —C(O)NR$_d$—, —C(O)NR$_d$O—, —C(O)NR$_d$S(O)$_2$—, —NR$_d$—, —NR$_d$C(O)—, —NR$_d$C(O)O—, —NR$_d$C(O)NR$_d$—, —O—, —S(O)$_2$—, —S(O)$_2$NR$_d$—, —NR$_d$S(O)$_2$—, or —P(O)R$_e$—;

$R_{4a}$ is:
(i) H or $C_{1-6}$ alkyl substituted with zero to 4 substituents independently selected from F, Cl, —CN, —OH, —OCH$_3$, —SCH$_3$, $C_{1-3}$ fluoroalkoxy, —NR$_a$R$_a$, —S(O)$_2$R$_f$, or —NR$_a$S(O)$_2$R$_f$; or
(ii) $C_{3-6}$ cycloalkyl, $C_{5-14}$ heterocyclyl, $C_{6-10}$ aryl, or $C_{5-14}$ heteroaryl, each substituted with zero to 4 $R_b$;

each $R_b$ is independently F, Cl, Br, —CN, —OH, $C_{1-6}$ alkyl, $C_{1-3}$ fluoroalkyl, $C_{1-4}$ hydroxyalkyl, —(CH$_2$)$_{1-2}$O($C_{1-3}$ alkyl), $C_{1-4}$ alkoxy, —O($C_{1-4}$ hydroxyalkyl), —O(CH)$_{1-3}$O($C_{1-4}$ alkyl), $C_{1-3}$ fluoroalkoxy, —O(CH)$_{1-3}$NR$_c$R$_c$, —OCH$_2$CH=CH$_2$, —OCH$_2$C≡CH, —C(O)($C_{1-4}$ alkyl), —C(O)OH, —C(O)O($C_{1-4}$ alkyl), —C(O)NH$_2$, —C(O)NH($C_{1-4}$ alkyl), —C(O)N($C_{1-4}$ alkyl)$_2$, —NR$_c$R$_c$, —NR$_a$S(O)$_2$($C_{1-3}$ alkyl), —NR$_a$C(O)($C_{1-3}$ alkyl), —NR$_a$C(O)O($C_{1-4}$ alkyl), —P(O)($C_{1-3}$ alkyl)$_2$, —S(O)$_2$($C_{1-3}$ alkyl), —O(CH$_2$)$_{1-2}$($C_{3-6}$ cycloalkyl), —O(CH$_2$)$_{1-2}$(morpholinyl), $C_{3-6}$ cycloalkyl, cyanocyclopropyl, methylazetidinyl, acetylazetidinyl, triazolyl, tetrahydropyranyl, morpholinyl, thiophenyl, methylpiperidinyl, or —CR$_c$R$_c$(phenyl);

$R_{4b}$ is:
(i) —CH$_2$CH$_2$OCH$_2$CH$_2$OCH$_2$CH$_2$NH$_2$;
(ii) —CH$_2$CH$_2$OCH$_2$CH$_2$OCH$_2$CH$_2$NH$_2$C(O)OC(CH$_3$)$_3$; or
(iii)

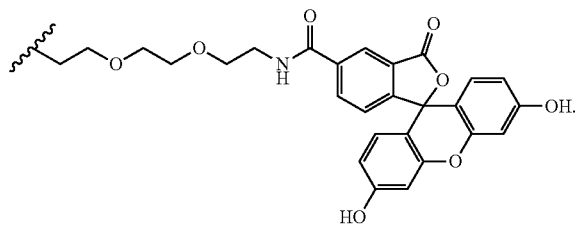 [SMILES: *CCOCCOCCNC(=O)c1ccc2c(c1)C(=O)OC21c2ccc(O)cc2Oc2cc(O)ccc21]

$R_{4c}$ is H or $C_{1-6}$ alkyl;

each $R_c$ is independently H or $C_{1-2}$ alkyl;

each $R_d$ is independently H or $C_{1-6}$ alkyl;

$R_e$ is $C_{1-6}$ alkyl;

each $R_f$ is independently $C_{3-4}$ cycloalkyl or $C_{1-3}$ alkyl substituted with zero to 4 $R_{1a}$;

each $R_5$ is independently F, Cl, —CN, —OH, $C_{1-6}$ alkyl substituted with zero to 4 $R_g$, $C_{1-3}$ alkoxy substituted with zero to 4 $R_g$, $C_{2-4}$ alkenyl substituted with zero to 4 $R_g$, $C_{2-4}$ alkynyl substituted with zero to 4 $R_g$, $C_{3-4}$ cycloalkyl substituted with zero to 4 $R_g$, phenyl substituted with zero to 4 $R_g$, oxadiazolyl substituted with zero to 3 $R_g$, pyridinyl substituted with zero to 4 $R_g$, —(CH$_2$)$_{1-2}$(heterocyclyl substituted with zero to 4 $R_g$), —(CH$_2$)$_{1-2}$NR$_c$C(O)($C_{1-4}$ alkyl), —(CH$_2$)$_{1-2}$NR$_c$C(O)O($C_{1-4}$ alkyl), —(CH$_2$)$_{1-2}$NR$_c$S(O)$_2$($C_{1-4}$ alkyl), —C(O)($C_{1-4}$ alkyl), —C(O)OH, —C(O)O($C_{1-4}$ alkyl), —C(O)O($C_{3-4}$ cycloalkyl), —C(O)NR$_a$R$_a$, or —C(O)NR$_a$($C_{3-4}$ cycloalkyl), or two $R_5$ attached to the same carbon atom form =O;

each $R_g$ is independently F, Cl, —CN, —OH, $C_{1-3}$ alkoxy, $C_{1-3}$ fluoroalkoxy, —O(CH$_2$)$_{1-2}$O($C_{1-2}$ alkyl), $C_{3-5}$ cycloalkyl, or —NR$_c$R$_c$;

each $R_6$ is H, F, Cl, —CN, —CH$_3$, —CH$_2$F, —CHF$_2$, —CF$_3$, or —OCH$_3$;

m is zero, 1, 2, or 3; and n is zero, 1, or 2. The compounds of the third aspect are useful as fluorescence probes in assays such as the DGK assays employed to measure activity of DGK inhibitors.

The fourth aspect of the present invention provides at least one compound of Formula (I):

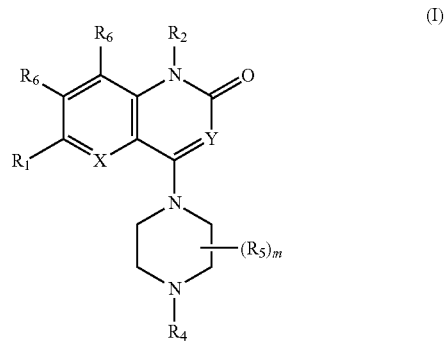

(I)

or a salt thereof, wherein:

X is CR$_6$ or N;

Y is CR$_3$ or N;

$R_1$ is H, F, Cl, Br, —CN, $C_{1-3}$ alkyl substituted with zero to 4 $R_{1a}$, $C_{3-4}$ cycloalkyl substituted with zero to 4 $R_{1a}$, $C_{1-3}$ alkoxy substituted with zero to 4 $R_{1a}$, —C(O)NR$_a$R$_a$, —NR$_a$R$_a$, —S(O)$_n$R$_f$, or —P(O)R$_f$R$_f$;

each $R_{1a}$ is independently F, Cl, —CN, —OH, —OCH$_3$, or —NR$_a$R$_a$;

each $R_a$ is independently H or $C_{1-3}$ alkyl;

$R_2$ is H, $C_{1-3}$ alkyl substituted with zero to 4 $R_{2a}$, $C_{2-3}$ alkenyl substituted with zero to 4 $R_{2a}$, or $C_{3-4}$ cycloalkyl substituted with zero to 4 $R_{2a}$;

each $R_{2a}$ is independently F, Cl, —CN, —OH, —O($C_{1-2}$ alkyl), $C_{3-4}$ cycloalkyl, $C_{3-4}$ alkenyl, or $C_{3-4}$ alkynyl;

$R_3$ is H, F, Cl, Br, —CN, $C_{1-3}$ alkyl, $C_{1-2}$ fluoroalkyl, $C_{3-4}$ cycloalkyl, $C_{3-4}$ fluorocycloalkyl, —NO$_2$, or pyridinyl substituted with zero to 2 $R_{3a}$;

each $R_{3a}$ is halo, —CN, $C_{1-3}$ alkyl, or $C_{1-3}$ alkoxy;

$R_4$ is —CR$_{4a}$R$_{4c}$-L-R$_{4b}$;

L is L$_1$ or —CH$_2$L$_1$-;

L$_1$ is —C(O)—, —C(O)O—, —C(O)NR$_d$—, —NR$_d$C(O)—, —NR$_d$C(O)NR$_d$—, —S(O)$_2$—, —S(O)$_2$NR$_d$—, —NR$_a$S(O)$_2$—, or —P(O)R$_d$—;

$R_{4a}$ is:
(i) H or $C_{1-6}$ alkyl substituted with zero to 4 substituents independently selected from F, Cl, —CN, —OH, —OCH$_3$, —SCH$_3$, $C_{1-3}$ fluoroalkoxy, —NR$_a$R$_a$, —S(O)$_2$R$_f$, or —NR$_a$S(O)$_2$R$_f$; or
(ii) $C_{3-6}$ cycloalkyl, $C_{5-14}$ heterocyclyl, $C_{6-10}$ aryl, or $C_{5-14}$ heteroaryl, each substituted with zero to 4 $R_b$;

each $R_b$ is independently F, Cl, Br, —CN, —OH, $C_{1-6}$ alkyl, $C_{1-3}$ fluoroalkyl, $C_{1-4}$ hydroxyalkyl, —(CH$_2$)$_{1-2}$O(C$_{1-3}$ alkyl), $C_{1-4}$ alkoxy, —O(C$_{1-4}$ hydroxyalkyl), —O(CH)$_{1-3}$O(C$_{1-3}$ alkyl), $C_{1-3}$ fluoroalkoxy, —O(CH)$_{1-3}$NR$_c$R$_c$, —OCH$_2$CH=CH$_2$, —OCH$_2$C≡CH, —C(O)(C$_{1-4}$ alkyl), —C(O)OH, —C(O)O(C$_{1-4}$ alkyl), —C(O)NH$_2$, —C(O)NH(C$_{1-4}$ alkyl), —C(O)N(C$_{1-4}$ alkyl)$_2$, —NR$_c$R$_c$, —NR$_a$S(O)$_2$(C$_{1-3}$ alkyl), —NR$_a$C(O)(C$_{1-3}$ alkyl), —NR$_a$C(O)O(C$_{1-4}$ alkyl), —P(O)(C$_{1-3}$ alkyl)$_2$, —S(O)$_2$(C$_{1-3}$ alkyl), —O(CH$_2$)$_{1-2}$(C$_{3-6}$ cycloalkyl), —O(CH$_2$)$_{1-2}$(morpholinyl), $C_{3-6}$ cycloalkyl, cyanocyclopropyl, methylazetidinyl, acetylazetidinyl, triazolyl, tetrahydropyranyl, morpholinyl, thiophenyl, methylpiperidinyl, or —CR$_c$R$_c$(phenyl);

$R_{4b}$ is:
(i) —CH$_2$CH$_2$OCH$_2$CH$_2$OCH$_2$CH$_2$NH$_2$;
(ii) —CH$_2$CH$_2$OCH$_2$CH$_2$OCH$_2$CH$_2$NH$_2$C(O)OC(CH$_3$)$_3$; or
(iii)

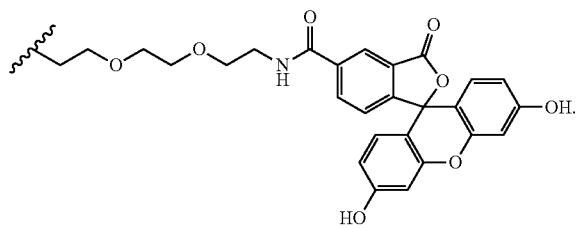 [SMILES: *CCOCCOCCNC(=O)c1ccc2c(c1)C(=O)OC21c2ccc(O)cc2Oc2cc(O)ccc21]

$R_{4c}$ is H or $C_{1-6}$ alkyl;
each $R_c$ is independently H or $C_{1-2}$ alkyl;
each $R_d$ is independently H or $C_{1-6}$ alkyl;
$R_e$ is $C_{1-6}$ alkyl;
each $R_f$ is independently $C_{3-4}$ cycloalkyl or $C_{1-3}$ alkyl substituted with zero to 4 $R_{1a}$;
each $R_5$ is independently F, Cl, —CN, —OH, $C_{1-6}$ alkyl substituted with zero to 4 $R_g$, $C_{1-3}$ alkoxy substituted with zero to 4 $R_g$, $C_{2-4}$ alkenyl substituted with zero to 4 $R_g$, $C_{2-4}$ alkynyl substituted with zero to 4 $R_g$, $C_{3-4}$ cycloalkyl substituted with zero to 4 $R_g$, phenyl substituted with zero to 4 $R_g$, oxadiazolyl substituted with zero to 3 $R_g$, pyridinyl substituted with zero to 4 $R_g$, —(CH$_2$)$_{1-2}$(heterocyclyl substituted with zero to 4 $R_g$), —(CH$_2$)$_{1-2}$NR$_c$C(O)(C$_{1-4}$ alkyl), —(CH$_2$)$_{1-2}$NR$_c$C(O)O(C$_{1-4}$ alkyl), —(CH$_2$)$_{1-2}$NR$_c$S(O)$_2$(C$_{1-4}$ alkyl), —C(O)(C$_{1-4}$ alkyl), —C(O)OH, —C(O)O(C$_{1-4}$ alkyl), —C(O)O(C$_{3-4}$ cycloalkyl), —C(O)NR$_a$R$_a$, or —C(O)NR$_a$(C$_{3-4}$ cycloalkyl), or two $R_5$ attached to the same carbon atom form =O;

each $R_g$ is independently F, Cl, —CN, —OH, $C_{1-3}$ alkoxy, $C_{1-3}$ fluoroalkoxy, —O(CH$_2$)$_{1-2}$O(C$_{1-2}$ alkyl), $C_{3-5}$ cycloalkyl, or —NR$_c$R$_c$;
each $R_6$ is H, F, Cl, —CN, —CH$_3$, —CH$_2$F, —CHF$_2$, —CF$_3$, or —OCH$_3$;

m is zero, 1, 2, or 3; and
n is zero, 1, or 2. The compounds of the fourth aspect are useful as fluorescence probes in assays such as the DGK assays employed to measure activity of DGK inhibitors.

In one embodiment, a compound of Formula (I) or a salt thereof is provided wherein: $R_1$ is H, F, Cl, Br, —CN, $C_{1-3}$ alkyl substituted with zero to 4 $R_{1a}$, cyclopropyl substituted with zero to 3 $R_{1a}$, $C_{1-3}$ alkoxy substituted with zero to 3 $R_{1a}$, —C(O)NR$_a$R$_a$, —NR$_a$R$_a$, —S(O)$_n$CH$_3$, or —P(O)(CH$_3$)$_2$; each $R_{1a}$ is independently F, Cl, or —CN; $R_2$ is H, $C_{1-2}$ alkyl substituted with zero to 2 $R_{2a}$, or $C_{2-3}$ alkenyl substituted with zero to 2 $R_{2a}$; each $R_{2a}$ is independently F, Cl, —CN, —OH, —O(C$_{1-2}$ alkyl), cyclopropyl, $C_{3-4}$ alkenyl, or $C_{3-4}$ alkynyl; $R_3$ is H, F, Cl, Br, —CN, $C_{1-2}$ alkyl, $C_{1-2}$ fluoroalkyl, $C_{3-4}$ cycloalkyl, —NO$_2$, or pyridinyl substituted with zero to 2 $R_{3a}$; each $R_{3a}$ is F, Cl, Br, —CN, $C_{1-3}$ alkyl, or $C_{1-2}$ alkoxy; $R_{4a}$ is: (i) H or $C_{1-4}$ alkyl substituted with zero to 4 substituents independently selected from F, Cl, —CN, —OH, —OCH$_3$, —SCH$_3$, $C_{1-2}$ fluoroalkoxy, or —NR$_a$R$_a$; or (ii) $C_{3-6}$ cycloalkyl, $C_{5-10}$ heterocyclyl, phenyl, or $C_{5-10}$ heteroaryl, each substituted with zero to 4 $R_b$; each $R_b$ is independently F, Cl, Br, —CN, —OH, $C_{1-4}$ alkyl, $C_{1-2}$ fluoroalkyl, $C_{1-3}$ hydroxyalkyl, —(CH$_2$)$_{1-2}$O(C$_{1-3}$ alkyl), $C_{1-3}$ alkoxy, —O(C$_{1-3}$ hydroxyalkyl), —O(CH)$_{1-3}$O(C$_{1-3}$ alkyl), $C_{1-2}$ fluoroalkoxy, —O(CH)$_{1-2}$NR$_c$R$_c$, —OCH$_2$CH=CH$_2$, —OCH$_2$C≡CH, —C(O)(C$_{1-3}$ alkyl), —C(O)OH, —C(O)O(C$_{1-3}$ alkyl), —C(O)NH$_2$, —C(O)NH(C$_{1-3}$ alkyl), —C(O)N(C$_{1-3}$ alkyl)$_2$, —NR$_c$R$_c$, —NR$_a$S(O)$_2$(C$_{1-2}$ alkyl), —NR$_a$C(O)(C$_{1-2}$ alkyl), —NR$_a$C(O)O(C$_{1-3}$ alkyl), —P(O)(C$_{1-2}$ alkyl)$_2$, —S(O)$_2$(C$_{1-2}$ alkyl), —O(CH$_2$)$_{1-2}$(C$_{3-6}$ cycloalkyl), —O(CH$_2$)$_{1-2}$(morpholinyl), $C_{3-6}$ cycloalkyl, or —CR$_c$R$_c$(phenyl); $R_{4b}$ is: (i) H, —CN, or $C_{1-4}$ alkyl substituted with zero to 4 substituents independently selected from F, Cl, —CN, —OH, —OCH$_3$, —SCH$_3$, $C_{1-3}$ fluoroalkoxy, —NR$_a$R$_a$, —S(O)$_2$(C$_{1-3}$ alkyl), cyclopropyl, hydroxycyclopropyl,

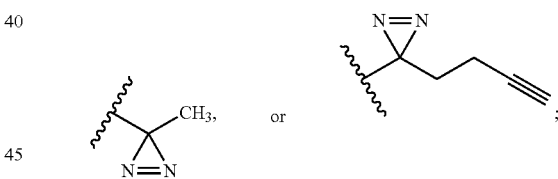

or (ii) $C_{3-6}$ cycloalkyl, $C_{5-10}$ heterocyclyl, phenyl, naphthalenyl, or $C_{5-10}$ heteroaryl, each substituted with zero to 3 $R_b$; $R_{4c}$ is H or $C_{1-3}$ alkyl; each $R_d$ is independently H or $C_{1-4}$ alkyl; R is $C_{1-4}$ alkyl; each $R_5$ is independently F, —CN, —OH, $C_{1-5}$ alkyl substituted with zero to 4 $R_g$, $C_{1-2}$ alkoxy substituted with zero to 3 $R_g$, $C_{2-3}$ alkenyl substituted with zero to 4 $R_g$, $C_{2-3}$ alkynyl substituted with zero to 4 $R_g$, $C_{3-4}$ cycloalkyl substituted with zero to 4 $R_g$, phenyl substituted with zero to 3 $R_g$, oxadiazolyl substituted with zero to 3 $R_g$, pyridinyl substituted with zero to 3 $R_g$, —(CH$_2$)$_{1-2}$(heterocyclyl substituted with zero to 4 $R_g$), —(CH$_2$)$_{1-2}$NR$_c$C(O)(C$_{1-4}$ alkyl), —(CH$_2$)$_{1-2}$NR$_c$C(O)O(C$_{1-4}$ alkyl), —(CH$_2$)$_{1-2}$NR$_c$S(O)$_2$(C$_{1-4}$ alkyl), —C(O)(C$_{1-4}$ alkyl), —C(O)OH, —C(O)O(C$_{1-4}$ alkyl), —C(O)O(C$_{3-4}$ cycloalkyl), —C(O)NR$_a$R$_a$, or —C(O)NR$_a$(C$_{3-4}$ cycloalkyl), or two $R_5$ attached to the same carbon atom form =O; each $R_6$ is H, F, Cl, —CN, or —CH$_3$; and m is zero, 1, 2, or 3.

In one embodiment, a compound of Formula (I) or a salt thereof is provided wherein: $R_1$ is H, F, Cl, Br, —CN, $C_{1-3}$ alkyl substituted with zero to 4 $R_{1a}$, cyclopropyl substituted with zero to 3 $R_{1a}$, $C_{1-3}$ alkoxy substituted with zero to 3 $R_{1a}$, —C(O)$NR_aR_a$, —$NR_aR_a$, —S(O)$_n$CH$_3$, or —P(O)(CH$_3$)$_2$; each $R_{1a}$ is independently F, Cl, or —CN; $R_2$ is H, $C_{1-2}$ alkyl substituted with zero to 2 $R_{2a}$, or $C_{2-3}$ alkenyl substituted with zero to 2 $R_{2a}$; each $R_{2a}$ is independently F, Cl, —CN, —OH, —O($C_{1-2}$ alkyl), cyclopropyl, $C_{3-4}$ alkenyl, or $C_{3-4}$ alkynyl; $R_3$ is H, F, Cl, Br, —CN, $C_{1-2}$ alkyl, $C_{1-2}$ fluoroalkyl, $C_{3-4}$ cycloalkyl, —NO$_2$, or pyridinyl substituted with zero to 2 $R_{3a}$; each $R_{3a}$ is F, Cl, Br, —CN, $C_{1-3}$ alkyl, or $C_{1-2}$ alkoxy; $L_1$ is —C(O)—, —C(O)O—, —C(O)$NR_d$—, —$NR_dC(O)$—, —S(O)$_2NR_d$—, —$NR_dS(O)_2$—, or —P(O)$R_e$—; $R_{4a}$ is: (i) H or $C_{1-4}$ alkyl substituted with zero to 4 substituents independently selected from F, Cl, —CN, —OH, —OCH$_3$, —SCH$_3$, $C_{1-2}$ fluoroalkoxy, or —$NR_aR_a$; or (ii) $C_{3-6}$ cycloalkyl, $C_{5-10}$ heterocyclyl, phenyl, or $C_{5-10}$ heteroaryl, each substituted with zero to 4 $R_b$; each $R_b$ is independently F, Cl, Br, —CN, —OH, $C_{1-4}$ alkyl, $C_{1-2}$ fluoroalkyl, $C_{1-3}$ hydroxyalkyl, —(CH$_2$)$_{1-2}$O($C_{1-3}$ alkyl), $C_{1-3}$ alkoxy, —O($C_{1-3}$ hydroxyalkyl), —O(CH)$_{1-3}$O($C_{1-3}$ alkyl), $C_{1-2}$ fluoroalkoxy, —O(CH)$_{1-2}NR_aR_c$, —OCH$_2$CH=CH$_2$, —OCH$_2$C≡CH, —C(O)($C_{1-3}$ alkyl), —C(O)OH, —C(O)O($C_{1-3}$ alkyl), —C(O)NH$_2$, —C(O)NH($C_{1-3}$ alkyl), —C(O)N($C_{1-3}$ alkyl)$_2$, —$NR_aR_c$, —$NR_aS(O)_2$($C_{1-2}$ alkyl), —$NR_aC(O)$($C_{1-2}$ alkyl), —$NR_aC(O)O$($C_{1-3}$ alkyl), —P(O)($C_{1-2}$ alkyl)$_2$, —S(O)$_2$($C_{1-2}$ alkyl), —O(CH$_2$)$_{1-2}$($C_{3-6}$ cycloalkyl), —O(CH$_2$)$_{1-2}$(morpholinyl), $C_{3-6}$ cycloalkyl, or —$CR_cR_c$(phenyl); $R_{4b}$ is: (i) H, $C_{1-4}$ alkyl substituted with zero to 4 substituents independently selected from F, Cl, —CN, —OH, —OCH$_3$, —SCH$_3$, $C_{1-3}$ fluoroalkoxy, and —$NR_aR_a$;

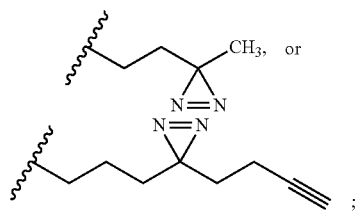

or (ii) $C_{3-6}$ cycloalkyl, $C_{5-10}$ heterocyclyl, phenyl, naphthalenyl, or $C_{5-10}$ heteroaryl, each substituted with zero to 3 $R_b$; $R_{4c}$ is H or $C_{1-3}$ alkyl; each $R_d$ is independently H or $C_{1-4}$ alkyl; $R_e$ is $C_{1-4}$ alkyl; each $R_5$ is independently F, —CN, —OH, $C_{1-5}$ alkyl substituted with zero to 4 $R_g$, $C_{1-2}$ alkoxy substituted with zero to 3 $R_g$, $C_{2-3}$ alkenyl substituted with zero to 4 $R_g$, $C_{2-3}$ alkynyl substituted with zero to 4 $R_g$, $C_{3-4}$ cycloalkyl substituted with zero to 4 $R_g$, phenyl substituted with zero to 3 $R_g$, oxadiazolyl substituted with zero to 3 $R_g$, pyridinyl substituted with zero to 3 $R_g$, —(CH$_2$)$_{1-2}$(heterocyclyl substituted with zero to 4 $R_g$), —(CH$_2$)$_{1-2}NR_cC(O)$($C_{1-4}$ alkyl), —(CH$_2$)$_{1-2}NR_cC(O)O$($C_{1-4}$ alkyl), —(CH$_2$)$_{1-2}NR_cS(O)_2$($C_{1-4}$ alkyl), —C(O)($C_{1-4}$ alkyl), —C(O)OH, —C(O)O($C_{1-4}$ alkyl), —C(O)O($C_{3-4}$ cycloalkyl), —C(O)$NR_aR_a$, or —C(O)$NR_d$($C_{3-4}$ cycloalkyl), or two $R_5$ attached to the same carbon atom form =O; each $R_6$ is H, F, Cl, —CN, or —CH$_3$; and m is zero, 1, 2, or 3.

In one embodiment, a compound of Formula (I) or a salt thereof is provided wherein: X is N; $R_1$ is —CN; $R_2$ is —CH$_3$; $R_3$ is H; L is —C(O)—, —C(O)O—, —C(O)NH—, —C(O)N(CH$_3$)—, —CH$_2$C(O)O—, —CH$_2$C(O)NH—, —CH$_2$C(O)N(CH$_3$)—, or —P(O)(CH$_3$)—; $R_{4a}$ is: (i) —CH$_3$; or (ii) phenyl or pyridinyl, each substituted with zero to 2 substituents independently selected from F, —CH$_3$, —CF$_3$, and —OCH$_3$; $R_{4b}$ is: (i) H, $C_{1-4}$ alkyl —CH$_2$CF$_3$, —CH$_2$H$_2$OH, —CH$_2$CH$_2$OCH$_3$,

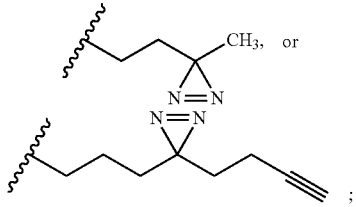

or (ii) cyclopropyl, cyclopentyl, morpholinyl, pyrrolyl, methylpyrazolyl, isoxazolyl, piperidinyl, or methylpiperazinyl; $R_{4c}$ is H; each $R_5$ is independently H, —CH$_3$ or —CH$_2$CH$_3$; and m is zero, 1, or 2.

In one embodiment, a compound of Formula (I) or a salt thereof is provided wherein: X is N; Y is N; $R_1$ is —CN; $R_2$ is —CH$_3$; $R_3$ is H; L is —C(O)—, —C(O)O—, —C(O)$NR_d$—, —C(O)NHO—, —C(O)NHS(O)$_2$—, —CH$_2$C(O)—, —CH$_2NR_d$—, —CH$_2$NHC(O)—, —CH$_2$NHC(O)O—, —CH$_2$NHS(O)$_2$—, —CH$_2$C(O)O—, —CH$_2$C(O)$NR_d$—, —CH$_2$CH$_2$NHC(O)O—, or —CH$_2$CH$_2$NHS(O)$_2$—; $R_{4a}$ is: phenyl substituted with —CF$_3$ or —OCH$_3$; $R_{4b}$ is: (i) H, —CN, $C_{1-4}$ alkyl, —CH$_2$CN, —CH$_2$CF$_3$, —CH$_2$CH$_2$CN, —CH$_2$CH$_2$CF$_3$, —CH$_2$CH$_2$OCH$_3$, —CH$_2$CH$_2$S(O)$_2$CH$_3$, —CH$_2$C(CH$_3$)$_2$OH, —CH$_2$(cyclopropyl), —CH$_2$(hydroxycyclopropyl), or

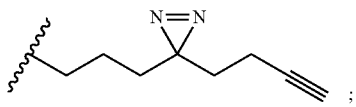 [SMILES: *CCCC1(CCC#C)N=N1]

or (ii) azetidinyl, cyclopropyl, morpholinyl, piperidinyl, pyrrolidinyl, dioxidothiomorpholinyl, or azaspiro[2.5]octanyl, each substituted with zero to 2 $R_b$; each $R_b$ is independently F, —OH, —CH$_3$, —CH$_2$OH, —C(CH$_3$)$_2$OH, —CH$_2$OCH$_3$, —OCH$_3$, or —S(O)$_2$CH$_3$; $R_{4c}$ is H; each $R_5$ is independently H, —CH$_3$ or —CH$_2$CH$_3$; and m is zero, 1, or 2.

In one embodiment, a compound of Formula (I) or a salt thereof is provided wherein $R_1$ is H, F, Cl, Br, —CN, $C_{1-3}$ alkyl substituted with zero to 4 $R_{1a}$, cyclopropyl substituted with zero to 3 $R_{1a}$, $C_{1-3}$ alkoxy substituted with zero to 3 $R_{1a}$, —C(O)$NR_aR_a$, —$NR_aR_a$, —S(O)$_n$CH$_3$, or —P(O)(CH$_3$)$_2$. Included in this embodiment are compounds in which $R_1$ is H, F, Cl, Br, —CN, —CH$_3$, —CHF$_2$, —CF$_3$, cyclopropyl, or —OCH$_3$. Also included in this embodiment are compounds in which $R_1$ is —CN.

In one embodiment, a compound of Formula (I) or a salt thereof is provided wherein $R_2$ is H, $C_{1-2}$ alkyl substituted with zero to 2 $R_{2a}$, or $C_{2-3}$ alkenyl substituted with zero to 2 $R_{2a}$. Included in this embodiment are compounds in which $R_2$ is H, —CH$_3$, —CH$_2$CN, or —CH$_2$CH$_2$F. Also included in this embodiment are compounds in which $R_2$ is —CH$_3$.

In one embodiment, a compound of Formula (I) or a salt thereof is provided wherein $R_3$ is H, F, Cl, Br, —CN, $C_{1-2}$ alkyl, $C_{1-2}$ fluoroalkyl, $C_{3-4}$ cycloalkyl, —NO$_2$, or pyridinyl substituted with zero to 2 $R_{3a}$. Included in this embodiment are compounds in which $R_3$ is H, F, Cl, —CN, —CH$_3$, —CHF$_2$, —CF$_3$, cyclopropyl, or —NO$_2$. Also included in this embodiment are compounds in which $R_3$ is H.

In one embodiment, a compound of Formula (I) or a salt thereof is provided wherein $R_1$ is H, F, Cl, Br, —CN, —CH$_3$, —CHF$_2$, —CF$_3$, cyclopropyl, or —OCH$_3$; H, —CH$_3$, —CH$_2$CN, or —CH$_2$CH$_2$F; and $R_3$ is H, F, Cl, —CN, —CH$_3$, —CHF$_2$, —CF$_3$, cyclopropyl, or —NO$_2$. Included in this embodiment are compounds in which $R_1$ is —CN; $R_2$ is —CH$_3$; and $R_3$ is H.

In one embodiment, a compound of Formula (I) or a salt thereof is provided wherein L is $L_1$.

In one embodiment, a compound of Formula (I) or a salt thereof is provided wherein L is —CH$_2$L$_1$-. Included in this embodiment are compounds in which L is —CD$_2$L$_1$-.

In one embodiment, a compound of Formula (I) or a salt thereof is provided wherein $L_1$ is —C(O)—, —C(O)O—, —C(O)NR$_d$—, —C(O)NR$_d$O—, —C(O)NR$_d$S(O)$_2$—, —NR$_d$—, —NR$_d$C(O)—, —NR$_d$C(O)O—, —NR$_d$C(O)NR$_d$—, —C(O)NR$_d$O—, —S(O)$_2$—, —S(O)$_2$NR$_d$—, —NR$_d$S(O)$_2$—, or —P(O)R$_e$—. Included in this embodiment are compounds in which $L_1$ is —C(O)—, —C(O)O—, —C(O)NR$_d$—, —C(O)NHO—, —C(O)NHS(O)$_2$—, —NR$_d$—, —NHC(O)—, —NHC(O)O—, —NHS(O)$_2$—, or —P(O)(CH$_3$)—; provided that when L is —CH$_2$NR$_d$—, then $R_{4b}$ is not H or unsubstituted $C_{1-6}$ alkyl. Also included in this embodiment are compounds in which $L_1$ is —C(O)—, —C(O)O—, —C(O)ND-, —C(O)NDO—, —C(O)NDS(O)$_2$—, —ND-, —NDC(O)—, —NDC(O)O—, —NDS(O)$_2$—, or —P(O)(CH$_3$)—.

In one embodiment, a compound of Formula (I) or a salt thereof is provided wherein $L_1$ is —C(O)—, —C(O)O—, —C(O)NR$_d$—, —NR$_d$C(O)—, —S(O)$_2$NR$_d$—, —NR$_d$S(O)$_2$—, or —P(O)R$_e$—. Included in this embodiment are compounds in which $L_1$ is —C(O)—, —C(O)O—, —C(O)NH—, —C(O)N(CH$_3$)—, —CH$_2$C(O)O—, —CH$_2$C(O)NH—, —CH$_2$C(O)N(CH$_3$)—, or —P(O)(CH$_3$)—. Also included in this embodiment are compounds in which L is —C(O)—, —C(O)O—, —C(O)ND-, —C(O)N(CD$_3$)-, —CD$_2$C(O)O—, —CH$_2$C(O)ND-, —CH$_2$C(O)N(CD$_3$)-, or —P(O)(CD$_3$)-.

In one embodiment, a compound of Formula (I) or a salt thereof is provided wherein $L_1$ is —C(O)— or —C(O)O—.

In one embodiment, a compound of Formula (I) or a salt thereof is provided wherein $L_1$ is —C(O)NR$_{4d}$—, —NR$_{4d}$C(O)—, or —NR$_{4d}$C(O)NR$_{4d}$—. Included in this embodiment are compounds in which each $R_{4d}$ is independently H, D, —CH$_3$, or —CD$_3$.

In one embodiment, a compound of Formula (I) or a salt thereof is provided wherein $L_1$ is —C(O)NR$_d$O— or —C(O)NR$_d$S(O)$_2$—. Included in this embodiment are compounds in which each $R_{4d}$ is independently H, D, —CH$_3$, or —CD$_3$.

In one embodiment, a compound of Formula (I) or a salt thereof is provided wherein $L_1$ is —NR$_d$—, —NR$_d$C(O)—, —NR$_d$C(O)O—, or —NR$_d$C(O)NR$_d$—; provided that when L is —CH$_2$NR$_d$—, then $R_{4b}$ is not H or unsubstituted $C_{1-6}$ alkyl.

In one embodiment, a compound of Formula (I) or a salt thereof is provided wherein $L_1$ is —S(O)$_2$—, —S(O)$_2$NR$_{4d}$—, or —NR$_{4d}$S(O)$_2$—. Included in this embodiment are compounds in which each $R_{4d}$ is independently H, D, —CH$_3$, or —CD$_3$.

In one embodiment, a compound of Formula (I) or a salt thereof is provided wherein $L_1$ is —P(O)R$_{4c}$—. Included in this embodiment are compounds in which each $R_{4d}$ is independently H, D, —CH$_3$, or —CD$_3$.

In one embodiment, a compound of Formula (I) or a salt thereof is provided wherein $R_{4a}$ is: (i) H or $C_{1-4}$ alkyl substituted with zero to 4 substituents independently selected from F, Cl, —CN, —OH, —OCH$_3$, —SCH$_3$, $C_{1-2}$ fluoroalkoxy, or —NR$_a$R$_a$; or (ii) $C_{3-6}$ cycloalkyl, $C_{5-10}$ heterocyclyl, phenyl, or $C_{5-10}$ heteroaryl, each substituted with zero to 4 $R_b$. Included in this embodiment are compounds in which $R_{4a}$ is: (i) —CH$_3$; or (ii) phenyl or pyridinyl, each substituted with zero to 2 substituents independently selected from F, —CH$_3$, —CF$_3$, and —OCH$_3$. Also, included in this embodiment are compounds in which (i) —CH$_3$; or (ii) phenyl or pyridinyl, each substituted with zero to 2 substituents independently selected from F, —CH$_3$, —CF$_3$, and —OCH$_3$.

In one embodiment, a compound of Formula (I) or a salt thereof is provided wherein $R_{4a}$ is H or $C_{1-6}$ alkyl substituted with zero to 4 substituents independently selected from F, Cl, —CN, —OH, —OCH$_3$, —SCH$_3$, $C_{1-3}$ fluoroalkoxy, —NR$_a$R$_a$, —S(O)$_2$R$_f$, or —NR$_a$S(O)$_2$R$_f$. Included in this embodiment are compounds in which $R_{4a}$ is H or $C_{1-4}$ alkyl substituted with zero to 4 substituents independently selected from F, Cl, —CN, —OH, —OCH$_3$, —SCH$_3$, $C_{1-2}$ fluoroalkoxy, or —NR$_a$R$_a$. Also included in this embodiment are compounds in which $R_{4a}$ is —CH$_3$.

In one embodiment, a compound of Formula (I) or a salt thereof is provided wherein $R_{4a}$ is $C_{3-6}$ cycloalkyl, $C_{5-14}$ heterocyclyl, $C_{6-10}$ aryl, or $C_{5-14}$ heteroaryl, each substituted with zero to 4 $R_b$. Included in this embodiment are compounds in which $R_{4a}$ is $C_{3-6}$ cycloalkyl, $C_{5-10}$ heterocyclyl, phenyl, naphthalenyl, or $C_{5-10}$ heteroaryl, each substituted with zero to 3 $R_b$. Also included in this embodiment are compounds in which $R_{4a}$ is phenyl or pyridinyl, each substituted with zero to 2 substituents independently selected from F, —CH$_3$, —CF$_3$, and —OCH$_3$.

In one embodiment, a compound of Formula (I) or a salt thereof is provided wherein $R_{4b}$ is: (i) H, —CN, or $C_{1-4}$ alkyl substituted with zero to 4 substituents independently selected from F, Cl, —CN, —OH, —OCH$_3$, —SCH$_3$, $C_{1-3}$ fluoroalkoxy, —NR$_a$R$_a$, —S(O)$_2$(C$_{1-3}$ alkyl), cyclopropyl, or hydroxycyclopropyl,

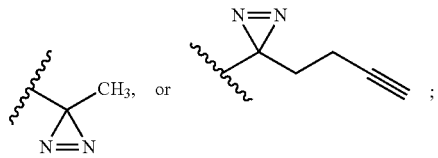

or (ii) $C_{3-6}$ cycloalkyl, $C_{5-10}$ heterocyclyl, phenyl, naphthalenyl, or $C_{5-10}$ heteroaryl, each substituted with zero to 3 $R_b$.

In one embodiment, a compound of Formula (I) or a salt thereof is provided wherein $R_{4b}$ is: (i) H, $C_{1-4}$ alkyl substituted with zero to 4 substituents independently selected from F, Cl, —CN, —OH, —OCH$_3$, —SCH$_3$, $C_{1-3}$ fluoroalkoxy, and —NR$_a$R$_a$;

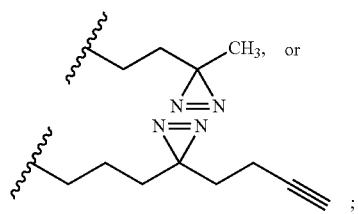

or (ii) $C_{3-6}$ cycloalkyl, $C_{5-10}$ heterocyclyl, phenyl, naphthalenyl, or $C_{5-10}$ heteroaryl, each substituted with zero to 3 $R_b$.

Included in this embodiment are compounds in which $R_{4b}$ is: (i) H, $C_{1-4}$ alkyl —$CH_2CF_3$, —$CH_2H_2OH$, —$CH_2CH_2OCH_3$,

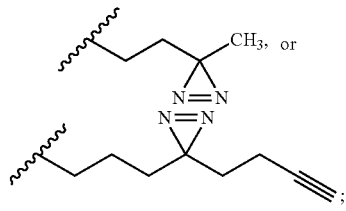

or (ii) cyclopropyl, cyclopentyl, morpholinyl, pyrrolyl, methylpyrazolyl, isoxazolyl, piperidinyl, or methylpiperazinyl.

In one embodiment, a compound of Formula (I) or a salt thereof is provided wherein $R_{4b}$ is H, $C_{1-6}$ alkyl substituted with zero to 4 substituents independently selected from F, Cl, —CN, —OH, —$OCH_3$, —$SCH_3$, $C_{1-3}$ fluoroalkoxy, —$NR_aR_a$, —$S(O)_2R_f$, —$NR_aS(O)_2R_f$,

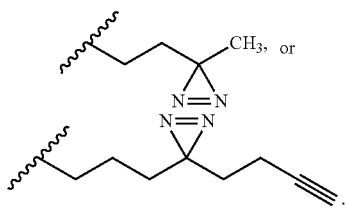

Included in this embodiment are compounds in which $R_{4b}$ is H, $C_{1-4}$ alkyl substituted with zero to 4 substituents independently selected from F, Cl, —CN, —OH, —$OCH_3$, —$SCH_3$, $C_{1-3}$ fluoroalkoxy, and —$NR_aR_a$;

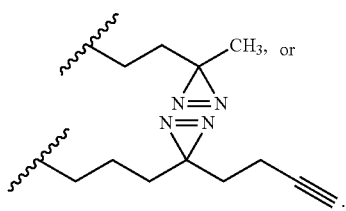

Also, included in this embodiment are compounds in which $R_{4b}$ is: (i) H, $C_{1-4}$ alkyl —$CH_2CF_3$, —$CH_2H_2OH$, —$CH_2CH_2OCH_3$,

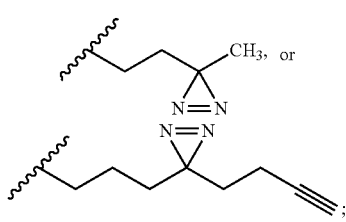

or (ii) cyclopropyl, cyclopentyl, morpholinyl, pyrrolyl, methylpyrazolyl, isoxazolyl, piperidinyl, or methylpiperazinyl.

In one embodiment, a compound of Formula (I) or a salt thereof is provided wherein $R_{4b}$ is (i) H, —CN, $C_{1-4}$ alkyl, —$CH_2CN$, —$CH_2CHF_2$, —$CH_2CF_3$, —$CH_2CH_2OH$, —$CH_2CH_2CN$, —$CH_2CH_2CF_3$, —$CH_2CH_2OCH_3$, —$CH_2CH_2S(O)_2CH_3$, —$CH_2C(CH_3)_2OH$, $CH_3$—$CH_2$(cyclopropyl), —$CH_2$(hydroxycyclopropyl),

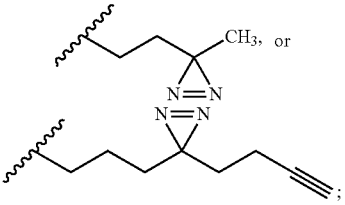

or (ii) azetidinyl, cyclopropyl, cyclopentyl, morpholinyl, pyrazolyl, isoxazolyl, piperidinyl, piperazinyl, pyrazolyl, pyrrolidinyl, dioxidothiomorpholinyl, or azaspiro[2.5]octanyl, each substituted with zero to 2 $R_b$. Included in this embodiment are compounds in which each $R_b$ is independently F, —OH, —$CH_3$, —$CH_2OH$, —$C(CH_3)_2OH$, —$CH_2OCH_3$, —$OCH_3$, or —$S(O)_2CH_3$.

In one embodiment, a compound of Formula (I) or a salt thereof is provided wherein $R_{4b}$ is (i) H, —CN, $C_{1-4}$ alkyl, —$CH_2CN$, —$CH_2CHF_2$, —$CH_2CF_3$, —$CH_2CH_2OH$, —$CH_2CH_2CN$, —$CH_2CH_2CF_3$, —$CH_2CH_2OCH_3$, —$CH_2CH_2S(O)_2CH_3$, —$CH_2C(CH_3)_2OH$, —$CH_2$(cyclopropyl), —$CH_2$(hydroxycyclopropyl),

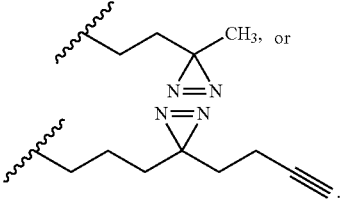

In one embodiment, a compound of Formula (I) or a salt thereof is provided wherein $R_{4b}$ is azetidinyl, cyclopropyl, cyclopentyl, morpholinyl, pyrazolyl, isoxazolyl, piperidinyl, piperazinyl, pyrazolyl, pyrrolidinyl, dioxidothiomorpholinyl, or azaspiro[2.5]octanyl, each substituted with zero to 2 $R_b$. Included in this embodiment are compounds in which each $R_b$ is independently F, —OH, —$CH_3$, —$CH_2OH$, —$C(CH_3)_2OH$, —$CH_2OCH_3$, —$OCH_3$, or —$S(O)_2CH_3$.

In one embodiment, a compound of Formula (I) or a salt thereof is provided wherein $R_{4b}$ is H, $C_{1-6}$ alkyl substituted with zero to 4 substituents independently selected from F, Cl, —CN, —OH, —$OCH_3$, —$SCH_3$, $C_{1-3}$ fluoroalkoxy, —$NR_aR_a$, —$S(O)_2R_f$, or —$NR_aS(O)_2R_f$. Included in this embodiment are compounds in which $R_{4b}$ is H, $C_{1-4}$ alkyl substituted with zero to 4 substituents independently selected from F, Cl, —CN, —OH, —$OCH_3$, —$SCH_3$, $C_{1-3}$ fluoroalkoxy, and —$NR_aR_a$. Also, included in this embodiment are compounds in which $R_{4b}$ is H, $C_{1-4}$ alkyl —$CH_2CF_3$, —$CH_2H_2OH$, or —$CH_2CH_2OCH_3$.

In one embodiment, a compound of Formula (I) or a salt thereof is provided wherein $R_{4b}$ is

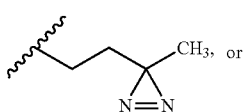

-continued

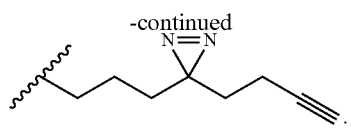

In one embodiment, a compound of Formula (I) or a salt thereof is provided wherein $R_{4b}$ is $C_{3-6}$ cycloalkyl, $C_{5-14}$ heterocyclyl, $C_{6-10}$ aryl, or $C_{5-14}$ heteroaryl, each substituted with zero to 4 $R_b$. Included in this embodiment are compounds in which $R_{4b}$ is $C_{3-6}$ cycloalkyl, $C_{5-10}$ heterocyclyl, phenyl, naphthalenyl, or $C_{5-10}$ heteroaryl, each substituted with zero to 3 $R_b$. Also, included in this embodiment are compounds in which $R_{4b}$ is cyclopropyl, cyclopentyl, morpholinyl, pyrrolyl, methylpyrazolyl, isoxazolyl, piperidinyl, or methylpiperazinyl.

In one embodiment, a compound of Formula (I) or a salt thereof is provided wherein $R_{4c}$ is H or $C_{1-3}$ alkyl. Included in this embodiment are compounds in which $R_{4c}$ is H. Also included in this embodiment are compounds in which $R_{4c}$ is D.

In one embodiment, a compound of Formula (I) or a salt thereof is provided wherein $R_{4a}$ is: (i) —$CH_3$; or (ii) phenyl or pyridinyl, each substituted with zero to 2 substituents independently selected from F, —$CH_3$, —$CF_3$, and —$OCH_3$; $R_{4b}$ is: (i) H, $C_{1-4}$ alkyl —$CH_2CF_3$, —$CH_2H_2OH$, —$CH_2CH_2OCH_3$,

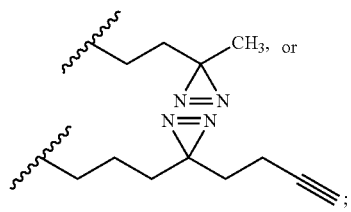

or (ii) cyclopropyl, cyclopentyl, morpholinyl, pyrrolyl, methylpyrazolyl, isoxazolyl, piperidinyl, or methylpiperazinyl; and $R_{4c}$ is H.

In one embodiment, a compound of Formula (I) or a salt thereof is provided wherein m is 1, 2, or 3; and each $R_5$ is independently F, —CN, —OH, $C_{1-5}$ alkyl substituted with zero to 4 $R_g$, $C_{1-2}$ alkoxy substituted with zero to 3 $R_g$, $C_{2-3}$ alkenyl substituted with zero to 4 $R_g$, $C_{2-3}$ alkynyl substituted with zero to 4 $R_g$, $C_{3-4}$ cycloalkyl substituted with zero to 4 $R_g$, phenyl substituted with zero to 3 $R_g$, oxadiazolyl substituted with zero to 3 $R_g$, pyridinyl substituted with zero to 3 $R_g$, —$(CH_2)_{1-2}$(heterocyclyl substituted with zero to 4 $R_g$), —$(CH_2)_{1-2}NR_cC(O)(C_{1-4}$ alkyl), —$(CH_2)_{1-2}NR_cC(O)O(C_{1-4}$ alkyl), —$(CH_2)_{1-2}NR_cS(O)_2(C_{1-4}$ alkyl), —$C(O)(C_{1-4}$ alkyl), —$C(O)OH$, —$C(O)O(C_{1-4}$ alkyl), —$C(O)O(C_{3-4}$ cycloalkyl), —$C(O)NR_aR_a$, or —$C(O)NR_a(C_{3-4}$ cycloalkyl), or two $R_5$ attached to the same carbon atom form =O. Included in this embodiment are compounds in which each $R_5$ is independently F, —CN, —OH, $C_{1-2}$ alkyl substituted with zero to 3 $R_g$, $C_{1-2}$ alkoxy substituted with zero to 3 $R_g$, $C_{3-4}$ cycloalkyl substituted with zero to 2 $R_g$, —$C(O)(C_{1-4}$ alkyl), —$C(O)OH$, —$C(O)O(C_{1-2}$ alkyl), or —$C(O)NR_aR_a$, or two $R_5$ attached to the same carbon atom form =O. Also included in this embodiment are compounds in which each $R_5$ is —$CH_3$, or two $R_5$ attached to the same carbon atom form =O.

In one embodiment, a compound of Formula (I) or a salt thereof is provided wherein m is 2 and the two $R_5$ are attached to the same carbon atom to form =O.

In one embodiment, a compound of Formula (I) or a salt thereof is provided wherein m is zero.

In one embodiment, a compound of Formula (I) or a salt thereof is provided wherein m is 1, 2, or 3. Included in this embodiment are compounds in which m is 1 or 2. Also included in this embodiment are compounds in which m is 1.

In one embodiment, a compound of Formula (I) or a salt thereof is provided wherein m is 2 or 3. Included in this embodiment are compounds in which m is 2.

In one embodiment, a compound of Formula (I) or a salt thereof is provided wherein m is 3.

In one embodiment, a compound of Formula (I) or a salt thereof is provided having the structure of Formula (II):

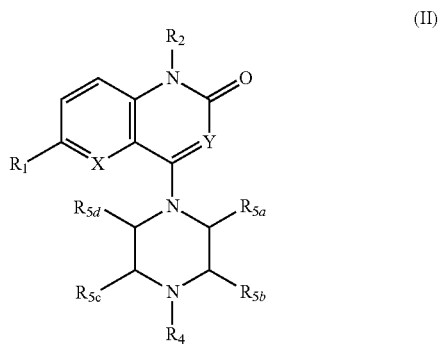

(II)

wherein one, two, or three of $R_{5a}$, $R_{5b}$, $R_{5c}$, and $R_{5d}$ are each $R_5$ and the remainder of $R_{5a}$, $R_{5b}$, $R_{5c}$, and $R_{5d}$ are each hydrogen. Included in this embodiment are compounds in which each $R_5$ is independently —CN, —$CH_3$, —$CH_2CH_3$, —$CH(CH_3)_2$, —$CHC(CH_3)_2$, —$CH_2F$, —$C(CH_3)_2F$, —$CF(CH_3)CH(CH_3)_2$, —$CH_2OH$, —$C(CH_3)_2OH$, —$C(CH_3)(OH)CH(CH_3)_2$, —$CH_2OCH_3$, —$C(O)C(CH_3)_2$, —$C(O)OH$, —$C(O)OCH_3$, —$C(O)OC(CH_3)_2$, —$C(O)NH_2$, —$C(O)NH(cyclopropyl)$, —$C(O)O(cyclopropyl)$, cyclopropyl, phenyl, methyloxadiazolyl, or methylpyridinyl.

In one embodiment, a compound of Formula (I) or a salt thereof is provided having the structure of Formula (III):

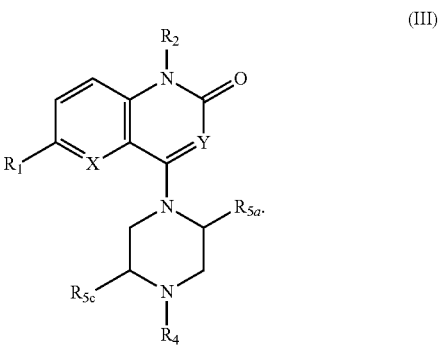

(III)

In one embodiment, a compound of Formula (III) or a salt thereof is provided wherein $R_{5a}$ is —$CH_3$ and $R_{5c}$ is —$CH_3$.

In one embodiment, a compound of Formula (III) or a salt thereof is provided wherein $R_{5a}$ is —$CH_3$ and $R_{5c}$ is —$CH_2CH_3$.

In one embodiment, a compound of Formula (III) or a salt thereof is provided wherein $R_{5a}$ is —$CH_2CH_3$ and $R_{5c}$ is —$CH_3$.

In one embodiment, a compound of Formula (III) or a salt thereof is provided wherein $R_{5a}$ is —CH$_2$CH$_3$ and $R_{5c}$ is —CH$_2$CH$_3$.

In one embodiment, a compound of Formula (III) or a salt thereof is provided wherein $R_{5a}$ is —CH$_3$ and $R_{5c}$ is —CH$_2$OH.

In one embodiment, a compound of Formula (III) or a salt thereof is provided wherein $R_{5a}$ is —CH$_3$ and $R_{5c}$ is —CH$_2$OCH$_3$.

In one embodiment, a compound of Formula (I) or a salt thereof is provided having the structure:

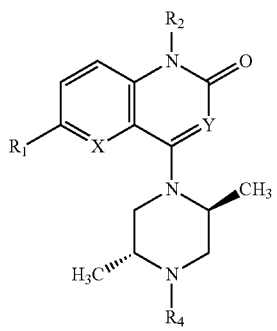

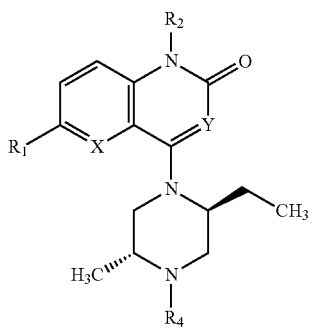

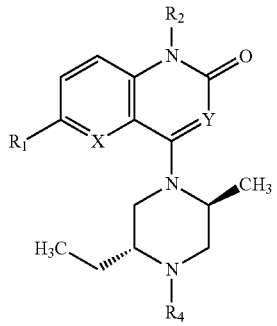

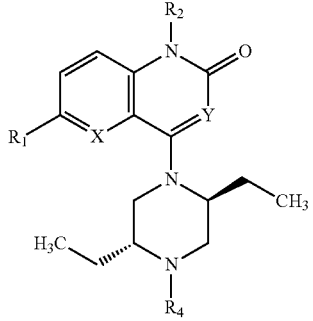

-continued

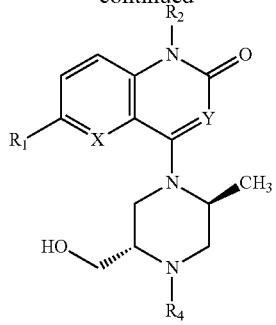

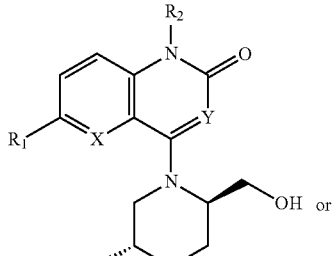

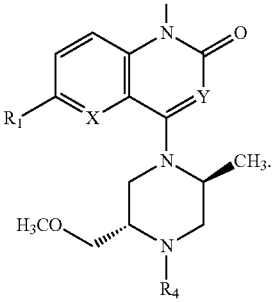

In one embodiment, a compound of Formula (I) or a salt thereof is provided wherein said compound is: isopropyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (1-2); methyl 2-((2R,5S)-4-(6-cyano-1-methyl-2-oxo-1,2-dihydro-1,5-naphthyridin-4-yl)-2,5-dimethylpiperazin-1-yl)-2-(5-fluoropyridin-2-yl)acetate (3-4); 2-((2R,5S)-4-(6-cyano-1-methyl-2-oxo-1,2-dihydro-1,5-naphthyridin-4-yl)-2,5-dimethylpiperazin-1-yl)-N-(2,2-difluoroethyl)-2-(4-fluorophenyl)acetamide (5-6); methyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (7-8); 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetic acid (9-10); (8-((2S,5R)-4-(1-(4-fluorophenyl)-2-oxo-2-(piperidin-1-yl)ethyl)-2,5-dimethylpiperazin-1-yl)-5-methyl-6-oxo-5,6-dihydro-1,5-naphthyridine-2-carbonitrile (11-12); 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetamide (13-14); 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)-N-(1-methyl-1H-pyrazol-3-yl)acetamide (15-16); 8-((2S,5R)-4-(1-(4-fluorophenyl)-2-morpholino-2-oxoethyl)-2,5-dimethylpiperazin-1-yl)-5-methyl-6-oxo-5,6-dihydro-1,5-naphthyridine-2-carbonitrile (17-18); 8-((2S,5R)-4-(1-(4-fluorophenyl)-2-(4-methylpiperazin-1-yl)-2-oxoethyl)-2,5- dimethylpiperazin-1-yl)-5-methyl-6-oxo-5,6-dihydro-1,5-naphthyridine-2-carbonitrile (19-20); 8-((2S,5R)-4-(1-(4-fluorophenyl)-2-oxo-2-(pyrrolidin-1-yl)ethyl)-2,5-dimethylpiperazin-1-yl)-5-methyl-6-oxo-5,6-dihydro-1,5-naphthyridine-2-carbonitrile (21-22); 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)-N,N-dimethylacetamide (23-24); 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)-N-methylacetamide (25-26); 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)-N-(2-hydroxyethyl)acetamide (27-28); 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)-N-(isoxazol-3-yl)acetamide (29-30); Methyl 3-((2R,5S)-4-(6-cyano-1-methyl-2-oxo-1,2-dihydro-1,5-naphthyridin-4-yl)-2,5-dimethylpiperazin-1-yl)-3-(4-fluorophenyl)propanoate (31-32); N-(tert-butyl)-3-((2R,5S)-4-(6-cyano-1-methyl-2-oxo-1,2-dihydro-1,5-naphthyridin-4-yl)-2,5-dimethylpiperazin-1-yl)-3-(4-fluorophenyl)propanamide (33-34); 3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)-N-(propan-2-yl)propanamide (35); 3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)-N-(propan-2-yl)propanamide (36); 3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)propanamide (37); 3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)propanamide (38); 3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)-N-methylpropanamide (39); 3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)-N-methylpropanamide (40); 3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)-N-methyl-N-(propan-2-yl)propanamide (41); 3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)-N-methyl-N-(propan-2-yl)propanamide (42); 2-((2R,5S)-4-(6-cyano-1-methyl-2-oxo-1,2-dihydro-1,5-naphthyridin-4-yl)-2,5-dimethylpiperazin-1-yl)-N-cyclopentylpropanamide (43-44); 2-((2R,5S)-4-(6-cyano-1-methyl-2-oxo-1,2-dihydro-1,5-naphthyridin-4-yl)-2,5-dimethylpiperazin-1-yl)-N-(1-methyl-1H-pyrazol-4-yl)propanamide (45); 2-((2R,5S)-4-(6-cyano-1-methyl-2-oxo-1,2-dihydro-1,5-naphthyridin-4-yl)-2,5-dimethylpiperazin-1-yl)-N-(1-methyl-1H-pyrazol-4-yl)propanamide (46); 2-((2R,5S)-4-(6-cyano-1-methyl-2-oxo-1,2-dihydro-1,5-naphthyridin-4-yl)-2,5-dimethylpiperazin-1-yl)-N-cyclopropylpropanamide (47); 2-((2R,5S)-4-(6-cyano-1-methyl-2-oxo-1,2-dihydro-1,5-naphthyridin-4-yl)-2,5-dimethylpiperazin-1-yl)-N-cyclopropylpropanamide (48); 8-((2S,5R)-4-((dimethylphosphoryl)(4-fluorophenyl)methyl)-2,5-dimethylpiperazin-1-yl)-5-methyl-6-oxo-5,6-dihydro-1,5-naphthyridine-2-carbonitrile (49-50); 3-(3-(but-3-yn-1-yl)-3H-diazirin-3-yl)propyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (57); or 2-(3-methyl-3H-diazirin-3-yl)ethyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (62).

In one embodiment, a compound of Formula (I) or a salt thereof is provided wherein said compound is: ethyl 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetate (51); 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetic acid (52); 4-((2S,5R)-2,5-diethyl-4-(2-morpholino-2-oxo-1-(4-(trifluoromethyl)phenyl)ethyl) piperazin-1-yl)-1-methyl-2-oxo-1,2-dihydropyrido[3,2-d]pyrimidine-6-carbonitrile (53-54); 2-((2R,5S)-4-(6-cyano-1-methyl-2-oxo-1,2-dihydropyrido[3,2-d]pyrimidin-4-yl)-2,5-diethylpiperazin-1-yl)-N-(2-methoxyethyl)-2-(4-(trifluoromethyl)phenyl)acetamide (55-56); Methyl 2-((2R,5S)-4-(6-cyano-1-methyl-2-oxo-1,2-dihydropyrido[3,2-d]pyrimidin-4-yl)-2,5-dimethylpiperazin-1-yl)-2-(4-methoxyphenyl)acetate (58); 2-((2R,5S)-4-(6-cyano-1-methyl-2-oxo-1,2-dihydropyrido[3,2-d]pyrimidin-4-yl)-2,5-dimethylpiperazin-1-yl)-2-(4-methoxyphenyl)acetic acid (59); 3-(3-(but-3-yn-1-yl)-3H-diazirin-3-yl)propyl 2-((2R,5S)-4-(6-cyano-1-methyl-2-oxo-1,2-dihydropyrido[3,2-d]pyrimidin-4-yl)-2,5-dimethylpiperazin-1-yl)-2-(4-methoxyphenyl)acetate (60-61); ethyl 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetate (69-70); 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetic acid (71-72); 2-((2R,5S)-4-(6-Cyano-1-methyl-2-oxo-1,2-dihydropyrido[3,2-d]pyrimidin-4-yl)-2,5-diethylpiperazin-1-yl)-N-((1-hydroxycyclopropyl)methyl)-2-(4-(trifluoromethyl)phenyl)acetamide (73-74); 4-((2S,5R)-2,5-diethyl-4-(2-morpholino-2-oxo-1-(4-(trifluoromethyl)phenyl)ethyl)piperazin-1-yl)-6-(12-methyl)-1-methylpyrido[3,2-d]pyrimidin-2(1H)-one (75-76); 2-((2R,5S)-4-(6-cyano-1-methyl-2-oxo-1,2-dihydropyrido[3,2-d]pyrimidin-4-yl)-2,5-diethylpiperazin-1-yl)-N-(2-methoxyethyl)-2-(4-(trifluoromethyl)phenyl)acetamide (77-78); 2-((2R,5S)-4-(6-cyano-1-methyl-2-oxo-1,2-dihydropyrido[3,2-d]pyrimidin-4-yl)-2,5-diethylpiperazin-1-yl)-N-(2-hydroxy-2-methylpropyl)-2-(4-(trifluoromethyl)phenyl) acetamide (79-80); 4-((2S,5R)-2,5-diethyl-4-(2-(3-hydroxy-3-methylazetidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (81-82); 4-((2S,5R)-2,5-diethyl-4-(2-oxo-2-(6-azaspiro[2.5]octan-6-yl)-1-(4-(trifluoromethyl)phenyl)ethyl)piperazin-1-yl)-1-methyl-2-oxo-1,2-dihydropyrido[3,2-d]pyrimidine-6-carbonitrile (83-84); 2-((2R,5S)-4-(6-cyano-1-methyl-2-oxo-1,2-dihydropyrido[3,2-d]pyrimidin-4-yl)-2,5-diethylpiperazin-1-yl)-N-(cyclopropylmethyl)-N-methyl-2-(4-(trifluoromethyl)phenyl)acetamide (85-86); 4-((2S,5R)-2,5-diethyl-4-(2-(3-(hydroxymethyl)azetidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (87-88); 4-((2S,5R)-2,5-diethyl-4-(2-(3-(2-hydroxypropan-2-yl)azetidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (89-90); 4-((2S,5R)-2,5-diethyl-4-(2-(3-(methylsulfonyl)azetidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (91-92); 4-((2S,5R)-2,5-diethyl-4-(2-(4-(methylsulfonyl)piperidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (93-94); 4-((2S,5R)-2,5-diethyl-4-(2-(3,3-difluoroazetidin-1-yl)-2-oxo-1-(4-(trifluoromethyl)phenyl)

ethyl)-2,5-diethylpiperazin-1-yl)-1-methyl-2-oxo-1,2-dihydropyrido[3,2-d]pyrimidine-6-carbonitrile (95-96); 4-((2S,5R)-4-(2-(1,1-dioxidothiomorpholino)-2-oxo-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile (97-98); 4-((2S,5R)-2,5-diethyl-4-(2-(3-methoxy-3-methylazetidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (99-100); 4-((2S,5R)-2,5-diethyl-4-(2-((S)-3-hydroxypyrrolidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (101-102); 4-((2S,5R)-2,5-diethyl-4-(2-((S)-2-(hydroxymethyl)pyrrolidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (103-104); 4-((2S,5R)-2,5-diethyl-4-(2-((R)-2-(hydroxymethyl)pyrrolidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (105-106); 4-((2S,5R)-2,5-diethyl-4-(2-((R)-3-hydroxypyrrolidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (107-108); 4-((2S,5R)-2,5-diethyl-4-(2-((S)-2-(methoxymethyl)pyrrolidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (109-110); 2-((2R,5S)-4-(6-cyano-1-methyl-2-oxo-1,2-dihydropyrido[3,2-d]pyrimidin-4-yl)-2,5-diethylpiperazin-1-yl)-N-isopropyl-N-methyl-2-(4-(trifluoromethyl)phenyl)acetamide (111-112); 2-((2R,5S)-4-(6-cyano-1-methyl-2-oxo-1,2-dihydropyrido[3,2-d]pyrimidin-4-yl)-2,5-diethylpiperazin-1-yl)-N-isopropyl-2-(4-(trifluoromethyl)phenyl)acetamide (113-114); 2-((2R,5S)-4-(6-cyano-1-methyl-2-oxo-1,2-dihydropyrido[3,2-d]pyrimidin-4-yl)-2,5-diethylpiperazin-1-yl)-N-(2-methoxyethyl)-N-methyl-2-(4-(trifluoromethyl)phenyl)acetamide (115-116); 2-((2R,5S)-4-(6-cyano-1-methyl-2-oxo-1,2-dihydropyrido[3,2-d]pyrimidin-4-yl)-2,5-diethylpiperazin-1-yl)-N-methoxy-2-(4-(trifluoromethyl)phenyl)acetamide (117-118); N-cyano-2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetamide (119-120); 2-((2R,5S)-4-(6-cyano-1-methyl-2-oxo-1,2-dihydropyrido[3,2-d]pyrimidin-4-yl)-2,5-diethylpiperazin-1-yl)-N-(cyanomethyl)-2-(4-(trifluoromethyl)phenyl)acetamide (121-122); 2-((2R,5S)-4-(6-cyano-1-methyl-2-oxo-1,2-dihydropyrido[3,2-d]pyrimidin-4-yl)-2,5-diethylpiperazin-1-yl)-N-(2,2,2-trifluoroethyl)-2-(4-(trifluoromethyl)phenyl)acetamide (123-124); 2-((2R,5S)-4-(6-cyano-1-methyl-2-oxo-1,2-dihydropyrido[3,2-d]pyrimidin-4-yl)-2,5-diethylpiperazin-1-yl)-N-(2-cyanoethyl)-2-(4-(trifluoromethyl)phenyl)acetamide (125-126); 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)-N-(3,3,3-trifluoropropyl)acetamide (127-128); 2-((2R,5S)-4-(6-cyano-1-methyl-2-oxo-1,2-dihydropyrido[3,2-d]pyrimidin-4-yl)-2,5-diethylpiperazin-1-yl)-N-(2-(methylsulfonyl)ethyl)-2-(4-(trifluoromethyl)phenyl)acetamide (129-130); 2-((2R,5S)-4-(6-cyano-1-methyl-2-oxo-1,2-dihydropyrido[3,2-d]pyrimidin-4-yl)-2,5-diethylpiperazin-1-yl)-N-methoxy-2-(4-(trifluoromethyl)phenyl)acetamide (131-132); ethyl 2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetate (133); 2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetic acid (134); 2-((2R,5S)-4-(6-Cyano-1-methyl-2-oxo-1,2-dihydropyrido[3,2-d]pyrimidin-4-yl)-2-ethyl-5-methylpiperazin-1-yl)-N-methoxy-2-(4-(trifluoromethyl)phenyl)acetamide (135-136); 2-((2R,5S)-4-(6-cyano-1-methyl-2-oxo-1,2-dihydropyrido[3,2-d]pyrimidin-4-yl)-2-ethyl-5-methylpiperazin-1-yl)-N-(cyanomethyl)-2-(4-(trifluoromethyl)phenyl)acetamide (137-138); 2-((2R,5S)-4-(6-cyano-1-methyl-2-oxo-1,2-dihydropyrido[3,2-d]pyrimidin-4-yl)-2-ethyl-5-methylpiperazin-1-yl)-N-(2,2,2-trifluoroethyl)-2-(4-(trifluoromethyl)phenyl)acetamide (139-140); 2-((2R,5S)-4-(6-cyano-1-methyl-2-oxo-1,2-dihydropyrido[3,2-d]pyrimidin-4-yl)-2-ethyl-5-methylpiperazin-1-yl)-N-(2-cyanoethyl)-2-(4-(trifluoromethyl)phenyl)acetamide (141-142); 2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)-N-(3,3,3-trifluoropropyl)acetamide (143-144); 2-((2R,5S)-4-(6-cyano-1-methyl-2-oxo-1,2-dihydropyrido[3,2-d]pyrimidin-4-yl)-2-ethyl-5-methylpiperazin-1-yl)-N-(2-(methylsulfonyl)ethyl)-2-(4-(trifluoromethyl)phenyl)acetamide (145-146); N-cyano-2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetamide (147-148); 2-((2R,5S)-4-(6-cyano-1-methyl-2-oxo-1,2-dihydropyrido[3,2-d]pyrimidin-4-yl)-2-ethyl-5-methylpiperazin-1-yl)-N-(methylsulfonyl)-2-(4-(trifluoromethyl)phenyl)acetamide (149-150); 2-((2R,5S)-4-(6-cyano-1-methyl-2-oxo-1,2-dihydropyrido[3,2-d]pyrimidin-4-yl)-2-ethyl-5-methylpiperazin-1-yl)-N-(cyclopropylsulfonyl)-2-(4-(trifluoromethyl)phenyl)acetamide (151-152); methyl 3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propanoate (153); methyl 3-((2R,5S)-4-(6-cyano-1-methyl-2-oxo-1,2-dihydropyrido[3,2-d]pyrimidin-4-yl)-2,5-diethylpiperazin-1-yl)-3-(4-(trifluoromethyl)phenyl)propanoate (154-155); 3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propanoic acid (156); 3-((2R,5S)-4-(6-cyano-1-methyl-2-oxo-1,2-dihydropyrido[3,2-d]pyrimidin-4-yl)-2,5-diethylpiperazin-1-yl)-3-(4-(trifluoromethyl)phenyl)propanoic acid (157-158); 4-((2S,5R)-2,5-diethyl-4-(3-oxo-3-(6-azaspiro[2.5]octan-6-yl)-1-(4-(trifluoromethyl)phenyl)propyl)piperazin-1-yl)-1-methyl-2-oxo-1,2-dihydropyrido[3,2-d]pyrimidine-6-carbonitrile (159-160); 3-((2R,5S)-4-(6-cyano-1-methyl-2-oxo-1,2-dihydropyrido[3,2-d]pyrimidin-4-yl)-2,5-diethylpiperazin-1-yl)-N-methyl-N-(1-methylpiperidin-4-yl)-3-(4-(trifluoromethyl)phenyl)propanamide (161-162); 3-((2R,5S)-4-(6-cyano-1-methyl-2-oxo-1,2-dihydropyrido[3,2-d]pyrimidin-4-yl)-2,5-diethylpiperazin-1-yl)-N-(2-methoxyethyl)-N-methyl-3-(4-(trifluoromethyl)phenyl) propanamide (163-164); 4-((2S,5R)-2,5-diethyl-4-(3-((R)-2-(methoxymethyl) pyrrolidin-1-yl)-3-oxo-1-(4-(trifluoromethyl)phenyl)propyl)piperazin-1-yl)-1-methyl-2-oxo-1,2-dihydropyrido[3,2-d]pyrimidine-6-carbonitrile (165-166); methyl (3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propyl) carbamate (167); 3-((2R,5S)-4-(6-cyano-1-methyl-2-oxo-1,2-dihydropyrido[3,2-d]pyrimidin-4-yl)-2,5-diethylpiperazin-1-yl)-3-(4-(trifluoromethyl)phenyl) propanoic acid (168-169); N-(3-((2R,5S)-4-(6-cyano-1-methyl-2-oxo-1,2-dihydropyrido[3,2-d]pyrimidin-4-yl)-2,5-diethylpiperazin-1-yl)-3-(4-(trifluoromethyl)phenyl)propyl)methanesulfonamide (170-171); 4-((2S,5R)-4-(2-

((cyanomethyl)(methyl)amino)-1-(4-(trifluoromethyl) phenyl)ethyl)-5-ethyl-2-methylpiperazin-1-yl)-1-methyl-2-oxo-1,2-dihydropyrido[3,2-d]pyrimidine-6-carbonitrile (172-173); 4-((2S,5R)-4-(2-((cyanomethyl)amino)-1-(4-(trifluoromethyl)phenyl)ethyl)-5-ethyl-2-methylpiperazin-1-yl)-1-methyl-2-oxo-1,2-dihydropyrido[3,2-d]pyrimidine-6-carbonitrile (174-175); 4-((2S,5R)-5-ethyl-2-methyl-4-(2-((2,2,2-trifluoroethyl)amino)-1-(4-(trifluoromethyl)phenyl) ethyl)piperazin-1-yl)-1-methyl-2-oxo-1,2-dihydropyrido[3,2-d]pyrimidine-6-carbonitrile (176-177); 4-((2S,5R)-4-(2-((2-cyanoethyl)amino)-1-(4-(trifluoromethyl)phenyl)ethyl)-5-ethyl-2-methylpiperazin-1-yl)-1-methyl-2-oxo-1,2-dihydropyrido[3,2-d]pyrimidine-6-carbonitrile (178-179); 4-((2S,5R)-5-ethyl-2-methyl-4-(1-(4-(trifluoromethyl)phenyl)-2-((3,3,3-trifluoropropyl)amino)ethyl)piperazin-1-yl)-1-methyl-2-oxo-1,2-dihydropyrido[3,2-d]pyrimidine-6-carbonitrile (180-181); 4-((2S,5R)-4-(2-((cyanomethyl)(methyl)amino)-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile (182-183); 4-((2S,5R)-4-(2-((cyanomethyl)(methyl)amino)-1-(4-(trifluoromethyl) phenyl)ethyl)-2,5-diethylpiperazin-1-yl)-1-methyl-2-oxo-1,2-dihydropyrido[3,2-d]pyrimidine-6-carbonitrile (184-185); 4-((2S,5R)-2,5-diethyl-4-(2-((2,2,2-trifluoroethyl)amino)-1-(4-(trifluoromethyl)phenyl)ethyl)piperazin-1-yl)-1-methyl-2-oxo-1,2-dihydropyrido[3,2-d]pyrimidine-6-carbonitrile (186-187); 4-((2S,5R)-4-(2-((2-cyanoethyl)amino)-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile (188-189); 4-((2S,5R)-2,5-diethyl-4-(1-(4-(trifluoromethyl)phenyl)-2-((3,3,3-trifluoropropyl)amino) ethyl)piperazin-1-yl)-1-methyl-2-oxo-1,2-dihydropyrido[3,2-d]pyrimidine-6-carbonitrile (190-191); N-(2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl)acetamide (192-193); N-(2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl)isobutyramide (194-195); methyl (2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl)carbamate (196-197); isopropyl (2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl) carbamate (198-199); N-(2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl) methanesulfonamide (200-201); N-(2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl) ethyl)acetamide (202-203); N-(2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)ethyl) isobutyramide (204-205); ethyl (2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)ethyl) carbamate (206-207); isopropyl (2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)ethyl) carbamate (208-209); or N-(2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)ethyl) methanesulfonamide (210-211).

In one embodiment, a compound of Formula (I) or a salt thereof is provided wherein said compound is: tert-butyl (2-(2-(2-(2-((2R,5S)-4-(6-cyano-1-methyl-2-oxo-1,2-dihydro-1,5-naphthyridin-4-yl)-2,5-dimethylpiperazin-1-yl)-2-(4-fluorophenyl) acetamido)ethoxy)ethoxy)ethyl)carbamate (63); N-(2-(2-(2-aminoethoxy)ethoxy)ethyl)-2-((2R,5S)-4-(6-cyano-1-methyl-2-oxo-1,2-dihydro-1,5-naphthyridin-4-yl)-2,5-dimethylpiperazin-1-yl)-2-(4-fluorophenyl) acetamide, TFA (64); N-(2-(2-(2-(2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetamido) ethoxy)ethoxy)ethyl)-3',6'-dihydroxy-3-oxo-3H-spiro [isobenzofuran-1,9'-xanthene]-5-carboxamide (65); 2,2-dimethyl-4-oxo-3,8,11-trioxa-5-azatridecan-13-yl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (66); 2-(2-(2-aminoethoxy)ethoxy) ethyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate, TFA (67); or 2-(2-(2-(3',6'-dihydroxy-3-oxo-3H-spiro[isobenzofuran-1,9'-xanthene]-5-carboxamido) ethoxy)ethoxy)ethyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (68).

The present invention may be embodied in other specific forms without departing from the spirit or essential attributes thereof. This invention encompasses all combinations of the aspects and/or embodiments of the invention noted herein. It is understood that any and all embodiments of the present invention may be taken in conjunction with any other embodiment or embodiments to describe additional embodiments. It is also to be understood that each individual element of the embodiments is meant to be combined with any and all other elements from any embodiment to describe an additional embodiment.

Definitions

The features and advantages of the invention may be more readily understood by those of ordinary skill in the art upon reading the following detailed description. It is to be appreciated that certain features of the invention that are, for clarity reasons, described above and below in the context of separate embodiments, may also be combined to form a single embodiment. Conversely, various features of the invention that are, for brevity reasons, described in the context of a single embodiment, may also be combined so as to form sub-combinations thereof. Embodiments identified herein as exemplary or preferred are intended to be illustrative and not limiting.

Unless specifically stated otherwise herein, references made in the singular may also include the plural. For example, "a" and "an" may refer to either one, or one or more.

As used herein, the phrase "compounds and/or salts thereof" refers to at least one compound, at least one salt of the compounds, or a combination thereof. For example, compounds of Formula (I) and/or salts thereof includes a compound of Formula (I); two compounds of Formula (I); a salt of a compound of Formula (I); a compound of Formula (I) and one or more salts of the compound of Formula (I); and two or more salts of a compound of Formula (I).

Unless otherwise indicated, any atom with unsatisfied valences is assumed to have hydrogen atoms sufficient to satisfy the valences.

The definitions set forth herein take precedence over definitions set forth in any patent, patent application, and/or patent application publication incorporated herein by reference.

Listed below are definitions of various terms used to describe the present invention. These definitions apply to the terms as they are used throughout the specification (unless they are otherwise limited in specific instances) either individually or as part of a larger group.

Throughout the specification, groups and substituents thereof may be chosen by one skilled in the field to provide stable moieties and compounds.

In accordance with a convention used in the art,

is used in structural formulas herein to depict the bond that is the point of attachment of the moiety or substituent to the core or backbone structure.

The terms "halo" and "halogen," as used herein, refer to F, Cl, Br, and I.

The term "cyano" refers to the group —CN.

The term "amino" refers to the group —NH$_2$.

The term "oxo" refers to the group =O.

The term "alkyl" as used herein, refers to both branched and straight-chain saturated aliphatic hydrocarbon groups containing, for example, from 1 to 12 carbon atoms, from 1 to 6 carbon atoms, and from 1 to 4 carbon atoms. Examples of alkyl groups include, but are not limited to, methyl (Me), ethyl (Et), propyl (e.g., n-propyl and i-propyl), butyl (e.g., n-butyl, i-butyl, sec-butyl, and t-butyl), and pentyl (e.g., n-pentyl, isopentyl, neopentyl), n-hexyl, 2-methylpentyl, 2-ethylbutyl, 3-methylpentyl, and 4-methylpentyl. When numbers appear in a subscript after the symbol "C", the subscript defines with more specificity the number of carbon atoms that a particular group may contain. For example, "$C_{1-4}$ alkyl" denotes straight and branched chain alkyl groups with one to four carbon atoms.

The term "fluoroalkyl" as used herein is intended to include both branched and straight-chain saturated aliphatic hydrocarbon groups substituted with one or more fluorine atoms. For example, "$C_{1-4}$ fluoroalkyl" is intended to include $C_1$, $C_2$, $C_3$, and $C_4$ alkyl groups substituted with one or more fluorine atoms. Representative examples of fluoroalkyl groups include, but are not limited to, —CF$_3$ and —CH$_2$CF$_3$.

The term "hydroxyalkyl" includes both branched and straight-chain saturated alkyl groups substituted with one or more hydroxyl groups. For example, "hydroxyalkyl" includes —CH$_2$OH, —CH$_2$CH$_2$OH, and $C_{1-4}$ hydroxyalkyl.

The term "alkenyl" refers to a straight or branched chain hydrocarbon radical containing from 2 to 12 carbon atoms and at least one carbon-carbon double bond. Exemplary such groups include ethenyl or allyl. For example, "$C_{2-6}$ alkenyl" denotes straight and branched chain alkenyl groups with two to six carbon atoms.

The term "alkynyl" refers to a straight or branched chain hydrocarbon radical containing from 2 to 12 carbon atoms and at least one carbon to carbon triple bond. Exemplary such groups include ethynyl. For example, "$C_{2-6}$ alkynyl" denotes straight and branched chain alkynyl groups with two to six carbon atoms.

The term "cycloalkyl," as used herein, refers to a group derived from a non-aromatic monocyclic or polycyclic hydrocarbon molecule by removal of one hydrogen atom from a saturated ring carbon atom. Representative examples of cycloalkyl groups include, but are not limited to, cyclopropyl, cyclopentyl, and cyclohexyl. When numbers appear in a subscript after the symbol "C", the subscript defines with more specificity the number of carbon atoms that a particular cycloalkyl group may contain. For example, "$C_{3-6}$ cycloalkyl" denotes cycloalkyl groups with three to six carbon atoms.

The term "fluorocycloalkyl" as used herein is intended to include a cycloalkyl group substituted with one or more fluorine atoms.

The term "alkoxy," as used herein, refers to an alkyl group attached to the parent molecular moiety through an oxygen atom, for example, methoxy group (—OCH$_3$). For example, "$C_{1-3}$ alkoxy" denotes alkoxy groups with one to three carbon atoms.

The terms "fluoroalkoxy" and "—O(fluoroalkyl)" represent a fluoroalkyl group as defined above attached through an oxygen linkage (—O—). For example, "$C_{1-4}$ fluoroalkoxy" is intended to include $C_1$, $C_2$, $C_3$, and $C_4$ fluoroalkoxy groups.

The terms "carbocyclo", "carbocyclic" or "carbocyclyl" may be used interchangeably and refer to cyclic groups having at least one saturated or partially saturated non-aromatic ring wherein all atoms of all rings are carbon. The carbocyclyl ring may be unsubstituted or may contain one or more substituents as valence allows. Thus, the term includes nonaromatic rings such as for example, cycloalkyl, cycloalkenyl, and cycloalkynyl rings. Exemplary bicyclic carbocyclyl groups include, indanyl, indenyl, dihydronaphthalenyl, tetrahydronaphthenyl, hexahydronaphthalenyl, octahydronaphthalenyl, decahydronaphthalenyl, bicycloheptanyl, bicyclooctanyl, and bicyclononanyl.

The term "aryl" as used herein, refers to a group of atoms derived from a molecule containing aromatic ring(s) by removing one hydrogen that is bonded to the aromatic ring(s). Representative examples of aryl groups include, but are not limited to, phenyl and naphthyl. The aryl ring may be unsubstituted or may contain one or more substituents as valence allows.

The term "benzyl," as used herein, refers to a methyl group in which one of the hydrogen atoms is replaced by a phenyl group. The phenyl ring may be unsubstituted or may contain one or more substituents as valence allows.

The term "heteroatom" refers to oxygen (O), sulfur (S), and nitrogen (N).

The terms "heterocyclo", "heterocyclic", or "heterocyclyl" may be used interchangeably and refer to cyclic groups having at least one saturated or partially saturated non-aromatic ring and wherein one or more of the rings have at least one heteroatom (O, S or N), said heteroatom containing ring preferably having 1 to 3 heteroatoms independently selected from O, S, and/or N. The ring of such a group containing a heteroatom can contain one or two oxygen or sulfur atoms and/or from one to four nitrogen atoms provided that the total number of heteroatoms in each ring is four or less, and further provided that the ring contains at least one carbon atom. The nitrogen and sulfur atoms may optionally be oxidized and the nitrogen atoms may optionally be quaternized. The heterocyclo group may be attached at any available nitrogen or carbon atom. The heterocyclo ring may be unsubstituted or may contain one or more substituents as valence allows.

Exemplary monocyclic heterocyclyl groups include pyrrolidinyl, imidazolinyl, oxazolidinyl, isoxazolinyl, thiazolidinyl, isothiazolidinyl, tetrahydrofuranyl, piperidinyl, piperazinyl, 2-oxopiperazinyl, 2-oxopiperidinyl, 2-oxopyrrolodinyl, 2-oxoazepinyl, azepinyl, 4-piperidonyl, tetrahydropyranyl, morpholinyl, thiamorpholinyl, thiamorpholinyl sulfoxide, thiamorpholinyl sulfone, 1,3-dioxolane, tetrahydro-1,1-dioxothienyl, dihydroisoindolyl, and tetrahydroquinolinyl The term "heteroaryl" refers to substituted and unsubstituted aromatic 5- or 6-membered monocyclic groups and 9- or 10-membered bicyclic groups that have at least one heteroatom (O, S or N) in at least one of the rings, said heteroatom-containing ring preferably having 1, 2, or 3 heteroatoms independently selected from 0, S, and/or N. Each ring of the heteroaryl group containing a heteroatom can contain one or two oxygen or sulfur atoms and/or from one to four nitrogen atoms provided that the total number of heteroatoms in each ring is four or less and each ring has at least one carbon atom. The fused rings completing the bicyclic group are aromatic and may contain only carbon atoms. The nitrogen and sulfur atoms may optionally be oxidized and the nitrogen atoms may optionally be quaternized. Bicyclic heteroaryl groups must include only aromatic rings. The heteroaryl group may be attached at any available nitrogen or carbon atom of any ring. The heteroaryl ring system may be unsubstituted or may contain one or more substituents.

Exemplary monocyclic heteroaryl groups include pyrrolyl, pyrazolyl, pyrazolinyl, imidazolyl, oxazolyl, isoxazolyl, thiazolyl, thiadiazolyl, isothiazolyl, furanyl, thiophenyl, oxadiazolyl, pyridinyl, pyrazinyl, pyrimidinyl, pyridazinyl, and triazinyl.

Exemplary bicyclic heteroaryl groups include indolyl, benzothiazolyl, benzodioxolyl, benzoxazolyl, benzothienyl, quinolinyl, tetrahydroisoquinolinyl, isoquinolinyl, benzimidazolyl, benzopyranyl, indolizinyl, benzofuranyl, chromonyl, coumarinyl, benzopyranyl, cinnolinyl, quinoxalinyl, indazolyl, and pyrrolopyridyl.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The compounds of Formula (I) can form salts which are also within the scope of this invention. Unless otherwise indicated, reference to an inventive compound is understood to include reference to one or more salts thereof. The term "salt(s)" denotes acidic and/or basic salts formed with inorganic and/or organic acids and bases. In addition, the term "salt(s) may include zwitterions (inner salts), e.g., when a compound of Formula (I) contains both a basic moiety, such as an amine or a pyridine or imidazole ring, and an acidic moiety, such as a carboxylic acid. Pharmaceutically acceptable (i.e., non-toxic, physiologically acceptable) salts are preferred, such as, for example, acceptable metal and amine salts in which the cation does not contribute significantly to the toxicity or biological activity of the salt. However, other salts may be useful, e.g., in isolation or purification steps which may be employed during preparation, and thus, are contemplated within the scope of the invention. Salts of the compounds of the formula (I) may be formed, for example, by reacting a compound of the Formula (I) with an amount of acid or base, such as an equivalent amount, in a medium such as one in which the salt precipitates or in an aqueous medium followed by lyophilization.

Exemplary acid addition salts include acetates (such as those formed with acetic acid or trihaloacetic acid, for example, trifluoroacetic acid), adipates, alginates, ascorbates, aspartates, benzoates, benzenesulfonates, bisulfates, borates, butyrates, citrates, camphorates, camphorsulfonates, cyclopentanepropionates, digluconates, dodecylsulfates, ethanesulfonates, fumarates, glucoheptanoates, glycerophosphates, hemisulfates, heptanoates, hexanoates, hydrochlorides (formed with hydrochloric acid), hydrobromides (formed with hydrogen bromide), hydroiodides, maleates (formed with maleic acid), 2-hydroxyethanesulfonates, lactates, methanesulfonates (formed with methanesulfonic acid), 2-naphthalenesulfonates, nicotinates, nitrates, oxalates, pectinates, persulfates, 3-phenylpropionates, phosphates, picrates, pivalates, propionates, salicylates, succinates, sulfates (such as those formed with sulfuric acid), sulfonates (such as those mentioned herein), tartrates, thiocyanates, toluenesulfonates such as tosylates, undecanoates, and the like.

Exemplary basic salts include ammonium salts, alkali metal salts such as sodium, lithium, and potassium salts; alkaline earth metal salts such as calcium and magnesium salts; barium, zinc, and aluminum salts; salts with organic bases (for example, organic amines) such as trialkylamines such as triethylamine, procaine, dibenzylamine, N-benzyl-β-phenethylamine, 1-ephenamine, N,N'-dibenzylethylenediamine, dehydroabietylamine, N-ethylpiperidine, benzylamine, dicyclohexylamine or similar pharmaceutically acceptable amines and salts with amino acids such as arginine, lysine and the like. Basic nitrogen-containing groups may be quaternized with agents such as lower alkyl halides (e.g., methyl, ethyl, propyl, and butyl chlorides, bromides and iodides), dialkyl sulfates (e.g., dimethyl, diethyl, dibutyl, and diamyl sulfates), long chain halides (e.g., decyl, lauryl, myristyl and stearyl chlorides, bromides and iodides), aralkyl halides (e.g., benzyl and phenethyl bromides), and others. Preferred salts include monohydrochloride, hydrogensulfate, methanesulfonate, phosphate or nitrate salts.

The compounds of Formula (I) can be provided as amorphous solids or crystalline solids. Lyophilization can be employed to provide the compounds of Formula (I) as a solid.

It should further be understood that solvates (e.g., hydrates) of the Compounds of Formula (I) are also within the scope of the present invention. The term "solvate" means a physical association of a compound of Formula (I) with one or more solvent molecules, whether organic or inorganic. This physical association includes hydrogen bonding. In certain instances the solvate will be capable of isolation, for example when one or more solvent molecules are incorporated in the crystal lattice of the crystalline solid. "Solvate" encompasses both solution-phase and isolable solvates. Exemplary solvates include hydrates, ethanolates, methanolates, isopropanolates, acetonitrile solvates, and ethyl acetate solvates. Methods of solvation are known in the art.

Various forms of prodrugs are known in the art and are described in Rautio, J. et al., *Nature Review Drug Discovery*, 17, 559-587 (2018).

In addition, compounds of Formula (I), subsequent to their preparation, can be isolated and purified to obtain a composition containing an amount by weight equal to or greater than 99% of a compound of Formula (I) ("substantially pure"), which is then used or formulated as described herein. Such "substantially pure" compounds of Formula (I) are also contemplated herein as part of the present invention.

"Stable compound" and "stable structure" are meant to indicate a compound that is sufficiently robust to survive isolation to a useful degree of purity from a reaction mixture, and formulation into an efficacious therapeutic agent. The present invention is intended to embody stable compounds.

"Therapeutically effective amount" is intended to include an amount of a compound of the present invention alone or an amount of the combination of compounds claimed or an amount of a compound of the present invention in combination with other active ingredients effective to act as an inhibitor of DGKα and/or DGKζ, or effective to treat or prevent viral infections and proliferative disorders, such as cancer.

As used herein, "treating" or "treatment" cover the treatment of a disease-state in a mammal, particularly in a human, and include: (a) preventing the disease-state from occurring in a mammal, in particular, when such mammal is predisposed to the disease-state but has not yet been diagnosed as having it; (b) inhibiting the disease-state, i.e., arresting its development; and/or (c) relieving the disease-state, i.e., causing regression of the disease state.

The compounds of the present invention are intended to include all isotopes of atoms occurring in the present compounds. Isotopes include those atoms having the same atomic number but different mass numbers. By way of general example and without limitation, isotopes of hydrogen include deuterium (D) and tritium (T). Isotopes of carbon include $^{13}C$ and $^{14}C$. Isotopically-labeled compounds of the invention can generally be prepared by conventional techniques known to those skilled in the art or by processes analogous to those described herein, using an appropriate isotopically-labeled reagent in place of the non-labeled reagent otherwise employed.

Compounds in accordance with Formula (I) and/or pharmaceutically acceptable salts thereof can be administered by any means suitable for the condition to be treated, which can depend on the need for site-specific treatment or quantity of Formula (I) compound to be delivered.

Also embraced within this invention is a class of pharmaceutical compositions comprising a compound of Formula (I) and/or pharmaceutically acceptable salts thereof; and one or more non-toxic, pharmaceutically-acceptable carriers and/or diluents and/or adjuvants (collectively referred to herein as "carrier" materials) and, if desired, other active ingredients. The compounds of Formula (I) may be administered by any suitable route, preferably in the form of a pharmaceutical composition adapted to such a route, and in a dose effective for the treatment intended. The compounds and compositions of the present invention may, for example, be administered orally, mucosally, or parentally including intravascularly, intravenously, intraperitoneally, subcutaneously, intramuscularly, and intrasternally in dosage unit formulations containing conventional pharmaceutically acceptable carriers, adjuvants, and vehicles. For example, the pharmaceutical carrier may contain a mixture of mannitol or lactose and microcrystalline cellulose. The mixture may contain additional components such as a lubricating agent, e.g. magnesium stearate and a disintegrating agent such as crospovidone. The carrier mixture may be filled into a gelatin capsule or compressed as a tablet. The pharmaceutical composition may be administered as an oral dosage form or an infusion, for example.

For oral administration, the pharmaceutical composition may be in the form of, for example, a tablet, capsule, liquid capsule, suspension, or liquid. The pharmaceutical composition is preferably made in the form of a dosage unit containing a particular amount of the active ingredient. For example, the pharmaceutical composition may be provided as a tablet or capsule comprising an amount of active ingredient in the range of from about 0.1 to 1000 mg, preferably from about 0.25 to 250 mg, and more preferably from about 0.5 to 100 mg. A suitable daily dose for a human or other mammal may vary widely depending on the condition of the patient and other factors, but, can be determined using routine methods.

Any pharmaceutical composition contemplated herein can, for example, be delivered orally via any acceptable and suitable oral preparations. Exemplary oral preparations, include, but are not limited to, for example, tablets, troches, lozenges, aqueous and oily suspensions, dispersible powders or granules, emulsions, hard and soft capsules, liquid capsules, syrups, and elixirs. Pharmaceutical compositions intended for oral administration can be prepared according to any methods known in the art for manufacturing pharmaceutical compositions intended for oral administration. In order to provide pharmaceutically palatable preparations, a pharmaceutical composition in accordance with the invention can contain at least one agent selected from sweetening agents, flavoring agents, coloring agents, demulcents, antioxidants, and preserving agents.

A tablet can, for example, be prepared by admixing at least one compound of Formula (I) and/or at least one pharmaceutically acceptable salt thereof with at least one non-toxic pharmaceutically acceptable excipient suitable for the manufacture of tablets. Exemplary excipients include, but are not limited to, for example, inert diluents, such as, for example, calcium carbonate, sodium carbonate, lactose, calcium phosphate, and sodium phosphate; granulating and disintegrating agents, such as, for example, microcrystalline cellulose, sodium crosscarmellose, corn starch, and alginic acid; binding agents, such as, for example, starch, gelatin, polyvinyl-pyrrolidone, and acacia; and lubricating agents, such as, for example, magnesium stearate, stearic acid, and talc. Additionally, a tablet can either be uncoated, or coated by known techniques to either mask the bad taste of an unpleasant tasting drug, or delay disintegration and absorption of the active ingredient in the gastrointestinal tract thereby sustaining the effects of the active ingredient for a longer period. Exemplary water soluble taste masking materials, include, but are not limited to, hydroxypropyl-methylcellulose and hydroxypropyl-cellulose. Exemplary time delay materials, include, but are not limited to, ethyl cellulose and cellulose acetate butyrate.

Hard gelatin capsules can, for example, be prepared by mixing at least one compound of Formula (I) and/or at least one salt thereof with at least one inert solid diluent, such as, for example, calcium carbonate; calcium phosphate; and kaolin.

Soft gelatin capsules can, for example, be prepared by mixing at least one compound of Formula (I) and/or at least one pharmaceutically acceptable salt thereof with at least one water soluble carrier, such as, for example, polyethylene glycol; and at least one oil medium, such as, for example, peanut oil, liquid paraffin, and olive oil.

An aqueous suspension can be prepared, for example, by admixing at least one compound of Formula (I) and/or at least one pharmaceutically acceptable salt thereof with at least one excipient suitable for the manufacture of an aqueous suspension. Exemplary excipients suitable for the manufacture of an aqueous suspension, include, but are not limited to, for example, suspending agents, such as, for example, sodium carboxymethylcellulose, methylcellulose, hydroxypropylmethyl-cellulose, sodium alginate, alginic acid, polyvinyl-pyrrolidone, gum tragacanth, and gum acacia; dispersing or wetting agents, such as, for example, a naturally-occurring phosphatide, e.g., lecithin; condensation products of alkylene oxide with fatty acids, such as, for example, polyoxyethylene stearate; condensation products of ethylene oxide with long chain aliphatic alcohols, such as, for example heptadecaethylene-oxycetanol; condensation products of ethylene oxide with partial esters derived from fatty acids and hexitol, such as, for example, polyoxyethylene sorbitol monooleate; and condensation products of ethylene oxide with partial esters derived from fatty acids and hexitol anhydrides, such as, for example, polyethylene sorbitan monooleate. An aqueous suspension can also contain at least one preservative, such as, for example, ethyl and n-propyl p-hydroxybenzoate; at least one coloring agent; at least one flavoring agent; and/or at least one sweetening agent, including but not limited to, for example, sucrose, saccharin, and aspartame.

Oily suspensions can, for example, be prepared by suspending at least one compound of Formula (I) and/or at least one pharmaceutically acceptable salt thereof in either a vegetable oil, such as, for example, arachis oil; olive oil; sesame oil; and coconut oil; or in mineral oil, such as, for example, liquid paraffin. An oily suspension can also contain at least one thickening agent, such as, for example, beeswax; hard paraffin; and cetyl alcohol. In order to provide a palatable oily suspension, at least one of the sweetening agents already described hereinabove, and/or at least one flavoring agent can be added to the oily suspension. An oily suspension can further contain at least one preservative, including, but not limited to, for example, an anti-oxidant, such as, for example, butylated hydroxyanisol, and alpha-tocopherol.

Dispersible powders and granules can, for example, be prepared by admixing at least one compound of Formula (I) and/or at least one pharmaceutically acceptable salt thereof with at least one dispersing and/or wetting agent; at least one suspending agent; and/or at least one preservative. Suitable dispersing agents, wetting agents, and suspending agents are as already described above. Exemplary preservatives include, but are not limited to, for example, anti-oxidants, e.g., ascorbic acid. In addition, dispersible powders and granules can also contain at least one excipient, including, but not limited to, for example, sweetening agents; flavoring agents; and coloring agents.

An emulsion of at least one compound of Formula (I) and/or at least one pharmaceutically acceptable salt thereof can, for example, be prepared as an oil-in-water emulsion. The oily phase of the emulsions comprising compounds of Formula (I) may be constituted from known ingredients in a known manner. The oil phase can be provided by, but is not limited to, for example, a vegetable oil, such as, for example, olive oil and arachis oil; a mineral oil, such as, for example, liquid paraffin; and mixtures thereof. While the phase may comprise merely an emulsifier, it may comprise a mixture of at least one emulsifier with a fat or an oil or with both a fat and an oil. Suitable emulsifying agents include, but are not limited to, for example, naturally-occurring phosphatides, e.g., soy bean lecithin; esters or partial esters derived from fatty acids and hexitol anhydrides, such as, for example, sorbitan monooleate; and condensation products of partial esters with ethylene oxide, such as, for example, polyoxyethylene sorbitan monooleate. Preferably, a hydrophilic emulsifier is included together with a lipophilic emulsifier which acts as a stabilizer. It is also preferred to include both an oil and a fat. Together, the emulsifier(s) with or without stabilizer(s) make-up the so-called emulsifying wax, and the wax together with the oil and fat make up the so-called emulsifying ointment base which forms the oily dispersed phase of the cream formulations. An emulsion can also contain a sweetening agent, a flavoring agent, a preservative, and/or an antioxidant. Emulsifiers and emulsion stabilizers suitable for use in the formulation of the present invention include Tween 60, Span 80, cetostearyl alcohol, myristyl alcohol, glyceryl monostearate, sodium lauryl sulfate, glyceryl distearate alone or with a wax, or other materials well known in the art.

The compounds of Formula (I) and/or at least one pharmaceutically acceptable salt thereof can, for example, also be delivered intravenously, subcutaneously, and/or intramuscularly via any pharmaceutically acceptable and suitable injectable form. Exemplary injectable forms include, but are not limited to, for example, sterile aqueous solutions comprising acceptable vehicles and solvents, such as, for example, water, Ringer's solution, and isotonic sodium chloride solution; sterile oil-in-water microemulsions; and aqueous or oleaginous suspensions.

Formulations for parenteral administration may be in the form of aqueous or non-aqueous isotonic sterile injection solutions or suspensions. These solutions and suspensions may be prepared from sterile powders or granules using one or more of the carriers or diluents mentioned for use in the formulations for oral administration or by using other suitable dispersing or wetting agents and suspending agents. The compounds may be dissolved in water, polyethylene glycol, propylene glycol, ethanol, corn oil, cottonseed oil, peanut oil, sesame oil, benzyl alcohol, sodium chloride, tragacanth gum, and/or various buffers. Other adjuvants and modes of administration are well and widely known in the pharmaceutical art. The active ingredient may also be administered by injection as a composition with suitable carriers including saline, dextrose, or water, or with cyclodextrin (i.e. Captisol), cosolvent solubilization (i.e. propylene glycol) or micellar solubilization (i.e. Tween 80).

The sterile injectable preparation may also be a sterile injectable solution or suspension in a non-toxic parenterally acceptable diluent or solvent, for example as a solution in 1,3-butanediol. Among the acceptable vehicles and solvents that may be employed are water, Ringer's solution, and isotonic sodium chloride solution. In addition, sterile, fixed oils are conventionally employed as a solvent or suspending medium. For this purpose any bland fixed oil may be employed, including synthetic mono- or diglycerides. In addition, fatty acids such as oleic acid find use in the preparation of injectables.

A sterile injectable oil-in-water microemulsion can, for example, be prepared by 1) dissolving at least one compound of Formula (I) in an oily phase, such as, for example, a mixture of soybean oil and lecithin; 2) combining the Formula (I) containing oil phase with a water and glycerol mixture; and 3) processing the combination to form a microemulsion.

A sterile aqueous or oleaginous suspension can be prepared in accordance with methods already known in the art. For example, a sterile aqueous solution or suspension can be prepared with a non-toxic parenterally-acceptable diluent or solvent, such as, for example, 1,3-butane diol; and a sterile oleaginous suspension can be prepared with a sterile non-toxic acceptable solvent or suspending medium, such as, for example, sterile fixed oils, e.g., synthetic mono- or diglycerides; and fatty acids, such as, for example, oleic acid.

Pharmaceutically acceptable carriers, adjuvants, and vehicles that may be used in the pharmaceutical compositions of this invention include, but are not limited to, ion exchangers, alumina, aluminum stearate, lecithin, self-emulsifying drug delivery systems (SEDDS) such as d-alpha-tocopherol polyethyleneglycol 1000 succinate, surfactants used in pharmaceutical dosage forms such as Tweens, polyethoxylated castor oil such as CREMOPHOR surfactant (BASF), or other similar polymeric delivery matrices, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol and wool fat. Cyclodextrins such as alpha-, beta-, and gamma-cyclodextrin, or chemically modified derivatives such as hydroxyalkylcyclodextrins, including 2- and 3-hydroxypropyl-cyclodextrins, or other solubilized derivatives may also be advantageously used to enhance delivery of compounds of the formulae described herein.

The pharmaceutically active compounds of this invention can be processed in accordance with conventional methods of pharmacy to produce medicinal agents for administration to patients, including humans and other mammals. The pharmaceutical compositions may be subjected to conventional pharmaceutical operations such as sterilization and/or may contain conventional adjuvants, such as preservatives, stabilizers, wetting agents, emulsifiers, buffers etc. Tablets and pills can additionally be prepared with enteric coatings. Such compositions may also comprise adjuvants, such as wetting, sweetening, flavoring, and perfuming agents.

The amounts of compounds that are administered and the dosage regimen for treating a disease condition with the compounds and/or compositions of this invention depends on a variety of factors, including the age, weight, sex, the medical condition of the subject, the type of disease, the severity of the disease, the route and frequency of administration, and the particular compound employed. Thus, the dosage regimen may vary widely, but can be determined routinely using standard methods. A daily dose of about 0.001 to 100 mg/kg body weight, preferably between about 0.0025 and about 50 mg/kg body weight and most preferably between about 0.005 to 10 mg/kg body weight, may be appropriate. The daily dose can be administered in one to four doses per day. Other dosing schedules include one dose per week and one dose per two day cycle.

For therapeutic purposes, the active compounds of this invention are ordinarily combined with one or more adjuvants appropriate to the indicated route of administration. If administered orally, the compounds may be admixed with lactose, sucrose, starch powder, cellulose esters of alkanoic acids, cellulose alkyl esters, talc, stearic acid, magnesium stearate, magnesium oxide, sodium and calcium salts of phosphoric and sulfuric acids, gelatin, acacia gum, sodium alginate, polyvinylpyrrolidone, and/or polyvinyl alcohol, and then tableted or encapsulated for convenient administration. Such capsules or tablets may contain a controlled-release formulation as may be provided in a dispersion of active compound in hydroxypropylmethyl cellulose.

Pharmaceutical compositions of this invention comprise at least one compound of Formula (I) and/or at least one pharmaceutically acceptable salt thereof, and optionally an additional agent selected from any pharmaceutically acceptable carrier, adjuvant, and vehicle. Alternate compositions of this invention comprise a compound of the Formula (I) described herein, or a prodrug thereof, and a pharmaceutically acceptable carrier, adjuvant, or vehicle.

Utility

The compounds of Formula (I) are useful for the treatment of cancer.

In another embodiment, the present invention provides a combined preparation of a compound of Formula (I), and/or a pharmaceutically acceptable salt thereof, a stereoisomer thereof or a tautomer thereof, and additional therapeutic agent(s) for simultaneous, separate or sequential use in the treatment and/or prophylaxis of multiple diseases or disorders associated with DGK target inhibition in T cells.

In another aspect, the invention provides a method of treating a patient suffering from or susceptible to a medical condition that is associated with DGK target inhibition in T cells. A number of medical conditions can be treated. The method comprises administering to the patient a therapeutically effective amount of a composition comprising a compound of Formula (I) and/or a pharmaceutically acceptable salt thereof, a stereoisomer thereof or a tautomer thereof. For example, the compounds described herein may be used to treat or prevent viral infections and proliferative diseases such as cancer.

The compounds for Formula (I) and pharmaceutical compositions comprising at least one compound of Formula (I) are useful in treating or preventing any disease or conditions that are associated with DGK target inhibition in T cells. These include viral and other infections (e.g., skin infections, GI infection, urinary tract infections, genito-urinary infections, systemic infections), and proliferative diseases (e.g., cancer). The compounds of Formula (I) and pharmaceutical compositions comprising in at least one compound of Formula (I) may be administered to animals, preferably mammals (e.g., domesticated animals, cats, dogs, mice, rats), and more preferably humans. Any method of administration may be used to deliver the compound or pharmaceutical composition to the patient. In certain embodiments, the compound of Formula (I) or pharmaceutical composition comprising at least compound of Formula (I) is administered orally. In other embodiments, the Formula (I) or pharmaceutical composition comprising at least compound of Formula (I) is administered parenterally.

The compounds of Formula (I) can inhibit activity of the diacylglycerol kinase alpha and zeta (DGKα/ζ). For example, the compounds of Formula (I) can be used to inhibit activity of DGKα and DGKζ in a cell or in an individual in need of modulation of DGKα and DGKζ by administering an inhibiting amount of a compound of Formula (I) or a salt thereof.

The present invention further provides methods of treating diseases associated with activity or expression, including abnormal activity and/or overexpression, of DGKα and DGKζ in an individual (e.g., patient) by administering to the individual in need of such treatment a therapeutically effective amount or dose of a compound of Formula (I) or a pharmaceutical composition thereof. Example diseases can include any disease, disorder or condition that is directly or indirectly linked to expression or activity of DGKα and DGKζ enzyme, such as over expression or abnormal activity. A DGKα and DGKζ-associated disease can also include any disease, disorder or condition that can be prevented, ameliorated, or cured by modulating DGKα and DGKζ enzyme activity. Examples of DGKα and DGKζ associated diseases include cancer and viral infections such as HIV infection, hepatitis B, and hepatitis C.

In one aspect, the compound(s) of Formula (I) are sequentially administered prior to administration of the immuno-oncology agent. In another aspect, compound(s) of Formula (I) are administered concurrently with the immuno-oncology agent. In yet another aspect, compound(s) of Formula (I) are sequentially administered after administration of the immuno-oncology agent.

In another aspect, compounds of Formula (I) may be co-formulated with an immuno-oncology agent.

Immuno-oncology agents include, for example, a small molecule drug, antibody, or other biologic or small molecule. Examples of biologic immuno-oncology agents include, but are not limited to, cancer vaccines, antibodies, and cytokines. In one aspect, the antibody is a monoclonal antibody. In another aspect, the monoclonal antibody is humanized or human.

In one aspect, the immuno-oncology agent is (i) an agonist of a stimulatory (including a co-stimulatory) receptor or (ii) an antagonist of an inhibitory (including a co-inhibitory) signal on T cells, both of which result in amplifying antigen-specific T cell responses (often referred to as immune checkpoint regulators).

Certain of the stimulatory and inhibitory molecules are members of the immunoglobulin super family (IgSF). One important family of membrane-bound ligands that bind to co-stimulatory or co-inhibitory receptors is the B7 family, which includes B7-1, B7-2, B7-H1 (PD-L1), B7-DC (PD-L2), B7-H2 (ICOS-L), B7-H3, B7-H4, B7-H5 (VISTA), and B7-H6. Another family of membrane bound ligands that bind to co-stimulatory or co-inhibitory receptors is the TNF family of molecules that bind to cognate TNF receptor family members, which includes CD40 and CD40L, OX-40, OX-40L, CD70, CD27L, CD30, CD30L, 4-1BBL, CD137 (4-1BB), TRAIL/Apo2-L, TRAILR1/DR4, TRAILR2/DR5, TRAILR3, TRAILR4, OPG, RANK, RANKL, TWEAKR/Fn14, TWEAK, BAFFR, EDAR, XEDAR, TACI, APRIL, BCMA, LTβR, LIGHT, DcR3, HVEM, VEGI/TL1A, TRAMP/DR3, EDAR, EDA1, XEDAR, EDA2, TNFR1, Lymphotoxin α/TNFβ, TNFR2, TNFα, LTβR, Lymphotoxin α 1β2, FAS, FASL, RELT, DR6, TROY, NGFR.

In one aspect, T cell responses can be stimulated by a combination of a compound of Formula (I) and one or more of (i) an antagonist of a protein that inhibits T cell activation (e.g., immune checkpoint inhibitors) such as CTLA-4, PD-1, PD-L1, PD-L2, LAG-3, TIM-3, Galectin 9, CEACAM-1, BTLA, CD69, Galectin-1, TIGIT, CD113, GPR56, VISTA, 2B4, CD48, GARP, PD1H, LAIR1, TIM-1, and TIM-4, and (ii) an agonist of a protein that stimulates T cell activation such as B7-1, B7-2, CD28, 4-1BB (CD137), 4-1BBL, ICOS, ICOS-L, OX40, OX40L, GITR, GITRL, CD70, CD27, CD40, DR3 and CD28H.

Other agents that can be combined with compounds of Formula (I) for the treatment of cancer include antagonists of inhibitory receptors on NK cells or agonists of activating receptors on NK cells. For example, compounds of Formula (I) can be combined with antagonists of KIR, such as lirilumab.

Yet other agents for combination therapies include agents that inhibit or deplete macrophages or monocytes, including but not limited to CSF-1R antagonists such as CSF-1R antagonist antibodies including RG7155 (WO11/70024, WO11/107553, WO11/131407, WO13/87699, WO13/119716, WO13/132044) or FPA-008 (WO11/140249; WO13169264; WO14/036357).

In another aspect, compounds of Formula (I) can be used with one or more of agonistic agents that ligate positive costimulatory receptors, blocking agents that attenuate signaling through inhibitory receptors, antagonists, and one or more agents that increase systemically the frequency of anti-tumor T cells, agents that overcome distinct immune suppressive pathways within the tumor microenvironment (e.g., block inhibitory receptor engagement (e.g., PD-L1/PD-1 interactions), deplete or inhibit Tregs (e.g., using an anti-CD25 monoclonal antibody (e.g., daclizumab) or by ex vivo anti-CD25 bead depletion), inhibit metabolic enzymes such as IDO, or reverse/prevent T cell anergy or exhaustion) and agents that trigger innate immune activation and/or inflammation at tumor sites.

In one aspect, the immuno-oncology agent is a CTLA-4 antagonist, such as an antagonistic CTLA-4 antibody. Suitable CTLA-4 antibodies include, for example, YERVOY (ipilimumab) or tremelimumab.

In another aspect, the immuno-oncology agent is a PD-1 antagonist, such as an antagonistic PD-1 antibody. Suitable PD-1 antibodies include, for example, OPDIVO (nivolumab), KEYTRUDA (pembrolizumab), or MEDI-0680 (AMP-514; WO2012/145493). The immuno-oncology agent may also include pidilizumab (CT-011), though its specificity for PD-1 binding has been questioned. Another approach to target the PD-1 receptor is the recombinant protein composed of the extracellular domain of PD-L2 (B7-DC) fused to the Fc portion of IgG1, called AMP-224

In another aspect, the immuno-oncology agent is a PD-L1 antagonist, such as an antagonistic PD-L1 antibody. Suitable PD-L1 antibodies include, for example, MPDL3280A (RG7446; WO2010/077634), durvalumab (MEDI4736), BMS-936559 (WO2007/005874), and MSB0010718C (WO2013/79174).

In another aspect, the immuno-oncology agent is a LAG-3 antagonist, such as an antagonistic LAG-3 antibody. Suitable LAG3 antibodies include, for example, BMS-986016 (WO10/19570, WO14/08218), or IMP-731 or IMP-321 (WO08/132601, WO09/44273).

In another aspect, the immuno-oncology agent is a CD137 (4-1BB) agonist, such as an agonistic CD137 antibody. Suitable CD137 antibodies include, for example, urelumab and PF-05082566 (WO12/32433).

In another aspect, the immuno-oncology agent is a GITR agonist, such as an agonistic GITR antibody. Suitable GITR antibodies include, for example, BMS-986153, BMS-986156, TRX-518 (WO06/105021, WO09/009116) and MK-4166 (WO11/028683). In another aspect, the immuno-oncology agent is an IDO antagonist. Suitable IDO antagonists include, for example, INCB-024360 (WO2006/122150, WO07/75598, WO08/36653, WO08/36642), indoximod, BMS-986205, or NLG-919 (WO09/73620, WO09/1156652, WO 11/56652, WO12/142237).

In another aspect, the immuno-oncology agent is an OX40 agonist, such as an agonistic OX40 antibody. Suitable OX40 antibodies include, for example, MEDI-6383 or MEDI-6469.

In another aspect, the immuno-oncology agent is an OX40L antagonist, such as an antagonistic OX40 antibody. Suitable OX40L antagonists include, for example, RG-7888 (WO06/029879).

In another aspect, the immuno-oncology agent is a CD40 agonist, such as an agonistic CD40 antibody. In yet another embodiment, the immuno-oncology agent is a CD40 antagonist, such as an antagonistic CD40 antibody. Suitable CD40 antibodies include, for example, lucatumumab or dacetuzumab.

In another aspect, the immuno-oncology agent is a CD27 agonist, such as an agonistic CD27 antibody. Suitable CD27 antibodies include, for example, varlilumab.

In another aspect, the immuno-oncology agent is MGA271 (to B7H3) (WO11/109400).

The combination therapy is intended to embrace administration of these therapeutic agents in a sequential manner, that is, wherein each therapeutic agent is administered at a different time, as well as administration of these therapeutic agents, or at least two of the therapeutic agents, in a substantially simultaneous manner. Substantially simultaneous administration can be accomplished, for example, by administering to the subject a single dosage form having a fixed ratio of each therapeutic agent or in multiple, single dosage forms for each of the therapeutic agents. Sequential or substantially simultaneous administration of each therapeutic agent can be effected by any appropriate route including, but not limited to, oral routes, intravenous routes, intramuscular routes, and direct absorption through mucous membrane tissues. The therapeutic agents can be administered by the same route or by different routes. For example, a first therapeutic agent of the combination selected may be administered by intravenous injection while the other therapeutic agents of the combination may be administered orally. Alternatively, for example, all therapeutic agents may be administered orally or all therapeutic agents may be administered by intravenous injection. Combination therapy also can embrace the administration of the therapeutic agents as described above in further combination with other biologically active ingredients and non-drug therapies (e.g., surgery or radiation treatment.) Where the combination therapy further comprises a non-drug treatment, the non-drug treatment may be conducted at any suitable time so long as a beneficial effect from the co-action of the combination of the therapeutic agents and non-drug treatment is achieved. For example, in appropriate cases, the beneficial effect is still achieved when the non-drug treatment is temporally removed from the administration of the therapeutic agents, perhaps by days or even weeks.

As used herein, the term "cell" is meant to refer to a cell that is in vitro, ex vivo or in vivo. In some embodiments, an ex vivo cell can be part of a tissue sample excised from an organism such as a mammal. In some embodiments, an in vitro cell can be a cell in a cell culture. In some embodiments, an in vivo cell is a cell living in an organism such as a mammal.

As used herein, the term "contacting" refers to the bringing together of indicated moieties in an in vitro system or an in vivo system. For example, "contacting" the DGKα and DGKζ enzyme with a compound of Formula (I) includes the administration of a compound of the present invention to an individual or patient, such as a human, having DGKα and DGKζ, as well as, for example, introducing a compound of Formula (I) into a sample containing a cellular or purified preparation containing DGKα and DGKζ enzyme.

The term "DGKα and DGKζ inhibitor" refers to an agent capable of inhibiting the activity of diacylglycerol kinase alpha and/or diacylglycerol kinase zeta (DGKα and DGKζ) in T cells resulting in T cell stimulation. The DGKα and DGKζ inhibitor may be a reversible or irreversible DGKα and DGKζ inhibitor. "A reversible DGKα and DGKζ inhibitor" is a compound that reversibly inhibits DGKα and DGKζ enzyme activity either at the catalytic site or at a non-catalytic site and "an irreversible DGKα and DGKζ inhibitor" is a compound that irreversibly destroys DGKα and DGKζ enzyme activity by forming a covalent bond with the enzyme.

Types of cancers that may be treated with the compound of Formula (I) include, but are not limited to, brain cancers, skin cancers, bladder cancers, ovarian cancers, breast cancers, gastric cancers, pancreatic cancers, prostate cancers, colon cancers, blood cancers, lung cancers and bone cancers. Examples of such cancer types include neuroblastoma, intestine carcinoma such as rectum carcinoma, colon carcinoma, familiar adenomatous polyposis carcinoma and hereditary non-polyposis colorectal cancer, esophageal carcinoma, labial carcinoma, larynx carcinoma, hypopharynx carcinoma, tongue carcinoma, salivary gland carcinoma, gastric carcinoma, adenocarcinoma, medullary thyroid carcinoma, papillary thyroid carcinoma, renal carcinoma, kidney parenchymal carcinoma, ovarian carcinoma, cervix carcinoma, uterine corpus carcinoma, endometrium carcinoma, chorion carcinoma, pancreatic carcinoma, prostate carcinoma, testis carcinoma, breast carcinoma, urinary carcinoma, melanoma, brain tumors such as glioblastoma, astrocytoma, meningioma, medulloblastoma and peripheral neuroectodermal tumors, Hodgkin lymphoma, non-Hodgkin lymphoma, Burkitt lymphoma, acute lymphatic leukemia (ALL), chronic lymphatic leukemia (CLL), acute myeloid leukemia (AML), chronic myeloid leukemia (CML), adult T-cell leukemia lymphoma, diffuse large B-cell lymphoma (DLBCL), hepatocellular carcinoma, gall bladder carcinoma, bronchial carcinoma, small cell lung carcinoma, non-small cell lung carcinoma, multiple myeloma, basalioma, teratoma, retinoblastoma, choroid melanoma, seminoma, rhabdomyosarcoma, craniopharyngioma, osteosarcoma, chondrosarcoma, myosarcoma, liposarcoma, fibrosarcoma, Ewing sarcoma and plasmocytoma.

One or more additional pharmaceutical agents or treatment methods such as, for example, anti-viral agents, chemotherapeutics or other anti-cancer agents, immune enhancers, immunosuppressants, radiation, anti-tumor and anti-viral vaccines, cytokine therapy (e.g., IL2 and GM-CSF), and/or tyrosine kinase inhibitors can be optionally used in combination with the compounds of Formula (I) for treatment of DGKα and DGKζ associated diseases, disorders or conditions. The agents can be combined with the present compounds in a single dosage form, or the agents can be administered simultaneously or sequentially as separate dosage forms.

Suitable chemotherapeutic or other anti-cancer agents include, for example, alkylating agents (including, without limitation, nitrogen mustards, ethylenimine derivatives, alkyl sulfonates, nitrosoureas and triazenes) such as uracil mustard, chlormethine, cyclophosphamide (CYTOXAN®), ifosfamide, melphalan, chlorambucil, pipobroman, triethylene-melamine, triethylenethiophosphoramine, busulfan, carmustine, lomustine, streptozocin, dacarbazine, and temozolomide.

In the treatment of melanoma, suitable agents for use in combination with the compounds of Formula (I) include: dacarbazine (DTIC), optionally, along with other chemotherapy drugs such as carmustine (BCNU) and cisplatin; the "Dartmouth regimen", which consists of DTIC, BCNU, cisplatin and tamoxifen; a combination of cisplatin, vinblastine, and DTIC, temozolomide or YERVOY™. Compounds of Formula (I) may also be combined with immunotherapy drugs, including cytokines such as interferon alpha, interleukin 2, and tumor necrosis factor (TNF) in the treatment of melanoma.

Compounds of Formula (I) may also be used in combination with vaccine therapy in the treatment of melanoma. Antimelanoma vaccines are, in some ways, similar to the anti-virus vaccines which are used to prevent diseases caused by viruses such as polio, measles, and mumps. Weakened melanoma cells or parts of melanoma cells called antigens may be injected into a patient to stimulate the body's immune system to destroy melanoma cells.

Melanomas that are confined to the arms or legs may also be treated with a combination of agents including one or more compounds of Formula (I), using a hyperthermic isolated limb perfusion technique. This treatment protocol temporarily separates the circulation of the involved limb from the rest of the body and injects high doses of chemotherapy into the artery feeding the limb, thus providing high doses to the area of the tumor without exposing internal organs to these doses that might otherwise cause severe side effects. Usually the fluid is warmed to 38.9° C. to 40° C. Melphalan is the drug most often used in this chemotherapy procedure. This can be given with another agent called tumor necrosis factor (TNF).

Suitable chemotherapeutic or other anti-cancer agents include, for example, antimetabolites (including, without limitation, folic acid antagonists, pyrimidine analogs, purine analogs and adenosine deaminase inhibitors) such as methotrexate, 5-fluorouracil, floxuridine, cytarabine, 6-mercaptopurine, 6-thioguanine, fludarabine phosphate, pentostatine, and gemcitabine.

Suitable chemotherapeutic or other anti-cancer agents further include, for example, certain natural products and their derivatives (for example, vinca alkaloids, antitumor antibiotics, enzymes, lymphokines and epipodophyllotoxins) such as vinblastine, vincristine, vindesine, bleomycin, dactinomycin, daunorubicin, doxorubicin, epirubicin, idarubicin, ara-C, paclitaxel (Taxol), mithramycin, deoxycoformycin, mitomycin-C, L-asparaginase, interferons (especially IFN-a), etoposide, and teniposide.

Other cytotoxic agents include navelbene, CPT-11, anastrazole, letrazole, capecitabine, reloxafine, and droloxafine.

Also suitable are cytotoxic agents such as epidophyllotoxin; an antineoplastic enzyme; a topoisomerase inhibitor; procarbazine; mitoxantrone; platinum coordination complexes such as cisplatin and carboplatin; biological response modifiers; growth inhibitors; antihormonal therapeutic agents; leucovorin; tegafur; and haematopoietic growth factors.

Other anti-cancer agent(s) include antibody therapeutics such as trastuzumab (HERCEPTIN®), antibodies to costimulatory molecules such as CTLA-4, 4-1BB and PD-1, or antibodies to cytokines (IL-1O or TGF-β).

Other anti-cancer agents also include those that block immune cell migration such as antagonists to chemokine receptors, including CCR2 and CCR4.

Other anti-cancer agents also include those that augment the immune system such as adjuvants or adoptive T cell transfer.

Anti-cancer vaccines include dendritic cells, synthetic peptides, DNA vaccines and recombinant viruses.

The pharmaceutical composition of the invention may optionally include at least one signal transduction inhibitor (STI). A "signal transduction inhibitor" is an agent that selectively inhibits one or more vital steps in signaling pathways, in the normal function of cancer cells, thereby leading to apoptosis. Suitable STIs include, but are not limited to: (i) bcr/abl kinase inhibitors such as, for example, STI 571 (GLEEVEC®); (ii) epidermal growth factor (EGF) receptor inhibitors such as, for example, kinase inhibitors (IRESSA®, SSI-774) and antibodies (Imclone: C225 [Goldstein et al., *Clin. Cancer Res.*, 1:1311-1318 (1995)], and Abgenix: ABX-EGF); (iii) her-2/neu receptor inhibitors such as farnesyl transferase inhibitors (FTI) such as, for example, L-744,832 (Kohl et al., *Nat. Med.*, 1(8):792-797 (1995)); (iv) inhibitors of Akt family kinases or the Akt pathway, such as, for example, rapamycin (see, for example, Sekulic et al., *Cancer Res.*, 60:3504-3513 (2000)); (v) cell cycle kinase inhibitors such as, for example, flavopiridol and UCN-01 (see, for example, Sausville, *Curr. Med. Chem. Anti-Canc. Agents*, 3:47-56 (2003)); and (vi) phosphatidyl inositol kinase inhibitors such as, for example, LY294002 (see, for example, Vlahos et al., *J. Biol. Chem.*, 269:5241-5248 (1994)). Alternatively, at least one STI and at least one compound of Formula (I) may be in separate pharmaceutical compositions. In a specific embodiment of the present invention, at least one compound of Formula (I) and at least one STI may be administered to the patient concurrently or sequentially. In other words, at least one compound of Formula (I) may be administered first, at least one STI may be administered first, or at least one compound of Formula (I) and at least one STI may be administered at the same time. Additionally, when more than one compound of Formula (I) and/or STI is used, the compounds may be administered in any order.

The present invention further provides a pharmaceutical composition for the treatment of a chronic viral infection in a patient comprising at least one compound of Formula (I), optionally, at least one chemotherapeutic drug, and, optionally, at least one antiviral agent, in a pharmaceutically acceptable carrier.

Also provided is a method for treating a chronic viral infection in a patient by administering an effective amount of the above pharmaceutical composition.

In a specific embodiment of the present invention, at least one compound of Formula (I) and at least one chemotherapeutic agent are administered to the patient concurrently or sequentially. In other words, at least one compound of Formula (I) may be administered first, at least one chemotherapeutic agent may be administered first, or at least one compound of Formula (I) and the at least one STI may be administered at the same time. Additionally, when more than one compound of Formula (I) and/or chemotherapeutic agent is used, the compounds may be administered in any order. Similarly, any antiviral agent or STI may also be administered at any point in comparison to the administration of the compound of Formula (I).

Chronic viral infections that may be treated using the present combinatorial treatment include, but are not limited to, diseases caused by: hepatitis C virus (HCV), human papilloma virus (HPV), cytomegalovirus (CMV), herpes simplex virus (HSV), Epstein-Barr virus (EBV), varicella zoster virus, coxsackie virus, human immunodeficiency virus (HIV). Notably, parasitic infections (e.g., malaria) may also be treated by the above methods wherein compounds known to treat the parasitic conditions are optionally added in place of the antiviral agents.

Suitable antiviral agents contemplated for use in combination with the compound of Formula (I) can comprise nucleoside and nucleotide reverse transcriptase inhibitors (NRTIs), non-nucleoside reverse transcriptase inhibitors (NNRTIs), protease inhibitors and other antiviral drugs.

Examples of suitable NRTIs include zidovudine (AZT); didanosine (ddI); zalcitabine (ddC); stavudine (d4T); lamivudine (3TC); abacavir (1592U89); adefovir dipivoxil [bis(POM)-PMEA]; lobucavir; BCH-I0652; emitricitabine [(−)-FTC]; beta-L-FD4 (also called beta-L-D4C and named beta-L-2',3'-dideoxy-5-fluoro-cytidene); DAPD, ((−)-beta-D-2,6-diamino-purine dioxolane); and lodenosine (FddA). Typical suitable NNRTIs include nevirapine (BI-RG-587); delaviradine (BHAP, U-90152); efavirenz (DMP-266); PNU-142721; AG-1549; MKC-442 (1-(ethoxy-methyl)-5-(1-methylethyl)-6-(phenylmethyl)-(2,4(1H,3H)-pyrimidinedione); and (+)-calanolide A (NSC-675451) and B. Typical suitable protease inhibitors include saquinavir (Ro 31-8959); ritonavir (ABT-538); indinavir (MK-639); nelfnavir (AG-1343); amprenavir (141W94); lasinavir; DMP-450; BMS-2322623; ABT-378; and AG-1549. Other antiviral agents include hydroxyurea, ribavirin, IL-2, IL-12, pentafuside and Yissum Project No. 11607.

The present invention also includes pharmaceutical kits useful, for example, in the treatment or prevention of DGKα and DGKζ-associated diseases or disorders, and other diseases referred to herein which include one or more containers containing a pharmaceutical composition comprising a therapeutically effective amount of a compound of Formula (I). Such kits can further include, if desired, one or more of various conventional pharmaceutical kit components, such as, for example, containers with one or more pharmaceutically acceptable carriers, additional containers, as will be readily apparent to those skilled in the art. Instructions, either as inserts or as labels, indicating quantities of the components to be administered, guidelines for administration, and/or guidelines for mixing the components, can also be included in the kit.

The combination therapy is intended to embrace administration of these therapeutic agents in a sequential manner, that is, wherein each therapeutic agent is administered at a different time, as well as administration of these therapeutic agents, or at least two of the therapeutic agents, in a substantially simultaneous manner. Substantially simultaneous administration can be accomplished, for example, by administering to the subject a single dosage form having a fixed ratio of each therapeutic agent or in multiple, single dosage forms for each of the therapeutic agents. Sequential or substantially simultaneous administration of each therapeutic agent can be effected by any appropriate route including, but not limited to, oral routes, intravenous routes, intramuscular routes, and direct absorption through mucous membrane tissues. The therapeutic agents can be administered by the same route or by different routes. For example, a first therapeutic agent of the combination selected may be administered by intravenous injection while the other therapeutic agents of the combination may be administered orally. Alternatively, for example, all therapeutic agents may be administered orally or all therapeutic agents may be administered by intravenous injection. Combination therapy also can embrace the administration of the therapeutic agents as described above in further combination with other biologically active ingredients and non-drug therapies (e.g., surgery or radiation treatment). Where the combination therapy further comprises a non-drug treatment, the non-drug treatment may be conducted at any suitable time so long as a beneficial effect from the co-action of the combination of the therapeutic agents and non-drug treatment is achieved. For example, in appropriate cases, the beneficial effect is still achieved when the non-drug treatment is temporally removed from the administration of the therapeutic agents, perhaps by days or even weeks.

The invention also provides pharmaceutically acceptable compositions which comprise a therapeutically effective amount of one or more of the compounds of Formula (I), formulated together with one or more pharmaceutically acceptable carriers (additives) and/or diluents, and optionally, one or more additional therapeutic agents described above.

The compounds of this invention can be administered for any of the uses described herein by any suitable means, for example, orally, such as tablets, capsules (each of which includes sustained release or timed release formulations), pills, powders, granules, elixirs, tinctures, suspensions (including nanosuspensions, microsuspensions, spray-dried dispersions), syrups, and emulsions; sublingually; bucally; parenterally, such as by subcutaneous, intravenous, intramuscular, or intrasternal injection, or infusion techniques (e.g., as sterile injectable aqueous or non-aqueous solutions or suspensions); nasally, including administration to the nasal membranes, such as by inhalation spray; topically, such as in the form of a cream or ointment; or rectally such as in the form of suppositories. They can be administered alone, but generally will be administered with a pharmaceutical carrier selected on the basis of the chosen route of administration and standard pharmaceutical practice.

The phrase "pharmaceutically acceptable carrier" as used herein means a pharmaceutically acceptable material, composition or vehicle, such as a liquid or solid filler, diluent, excipient, manufacturing aid (e.g., lubricant, talc magnesium, calcium or zinc stearate, or steric acid), or solvent encapsulating material, involved in carrying or transporting the subject compound from one organ, or portion of the body, to another organ, or portion of the body. Each carrier must be "acceptable" in the sense of being compatible with the other ingredients of the formulation, including, i.e., adjuvant, excipient or vehicle, such as diluents, preserving agents, fillers, flow regulating agents, disintegrating agents, wetting agents, emulsifying agents, suspending agents, sweetening agents, flavoring agents, perfuming agents, antibacterial agents, antifungal agents, lubricating agents and dispensing agents, depending on the nature of the mode of administration and dosage forms; and not injurious to the patient.

The term "pharmaceutical composition" means a composition comprising a compound of the invention in combination with at least one additional pharmaceutically acceptable carrier.

Pharmaceutically acceptable carriers are formulated according to a number of factors well within the purview of those of ordinary skill in the art. These include, without limitation: the type and nature of the active agent being formulated; the subject to which the agent-containing composition is to be administered; the intended route of administration of the composition; and the therapeutic indication being targeted. Pharmaceutically acceptable carriers include both aqueous and non-aqueous liquid media, as well as a variety of solid and semi-solid dosage forms. Such carriers can include a number of different ingredients and additives in addition to the active agent, such additional ingredients being included in the formulation for a variety of reasons, e.g., stabilization of the active agent, binders, etc., well known to those of ordinary skill in the art. Descriptions of suitable pharmaceutically acceptable carriers, and factors involved in their selection, are found in a variety of readily available sources such as, for example, Allen, L. V. Jr. et al. *Remington: The Science and Practice of Pharmacy* (2 Volumes), 22nd Edition (2012), Pharmaceutical Press.

The dosage regimen for the compounds of the present invention will, of course, vary depending upon known factors, such as the pharmacodynamic characteristics of the particular agent and its mode and route of administration; the species, age, sex, health, medical condition, and weight of the recipient; the nature and extent of the symptoms; the kind of concurrent treatment; the frequency of treatment; the route of administration, the renal and hepatic function of the patient, and the effect desired.

By way of general guidance, the daily oral dosage of each active ingredient, when used for the indicated effects, will range between about 0.001 to about 5000 mg per day, preferably between about 0.01 to about 1000 mg per day, and most preferably between about 0.1 to about 250 mg per day. Intravenously, the most preferred doses will range from about 0.01 to about 10 mg/kg/minute during a constant rate infusion. Compounds of this invention may be administered in a single daily dose, or the total daily dosage may be administered in divided doses of two, three, or four times daily.

The compounds are typically administered in admixture with suitable pharmaceutical diluents, excipients, or carriers (collectively referred to herein as pharmaceutical carriers) suitably selected with respect to the intended form of administration, e.g., oral tablets, capsules, elixirs, and syrups, and consistent with conventional pharmaceutical practices.

Dosage forms (pharmaceutical compositions) suitable for administration may contain from about 1 milligram to about 2000 milligrams of active ingredient per dosage unit. In these pharmaceutical compositions the active ingredient will ordinarily be present in an amount of about 0.1-95% by weight based on the total weight of the composition.

A typical capsule for oral administration contains at least one of the compounds of the present invention (250 mg), lactose (75 mg), and magnesium stearate (15 mg). The mixture is passed through a 60 mesh sieve and packed into a No. L gelatin capsule.

A typical injectable preparation is produced by aseptically placing at least one of the compounds of the present invention (250 mg) into a vial, aseptically freeze-drying and sealing. For use, the contents of the vial are mixed with 2 mL of physiological saline, to produce an injectable preparation.

The present invention includes within its scope pharmaceutical compositions comprising, as an active ingredient, a therapeutically effective amount of at least one of the compounds of the present invention, alone or in combination with a pharmaceutical carrier. Optionally, compounds of the present invention can be used alone, in combination with other compounds of the invention, or in combination with one or more other therapeutic agent(s), e.g., an anticancer agent or other pharmaceutically active material.

Regardless of the route of administration selected, the compounds of the present invention, which may be used in a suitable hydrated form, and/or the pharmaceutical compositions of the present invention, are formulated into pharmaceutically acceptable dosage forms by conventional methods known to those of skill in the art.

Actual dosage levels of the active ingredients in the pharmaceutical compositions of this invention may be varied so as to obtain an amount of the active ingredient which is effective to achieve the therapeutic response for a particular patient, composition, and mode of administration, without being toxic to the patient.

The selected dosage level will depend upon a variety of factors including the activity of the particular compound of the present invention employed, or the ester, salt or amide thereof, the route of administration, the time of administration, the rate of excretion or metabolism of the particular compound being employed, the rate and extent of absorption, the duration of the treatment, other drugs, compounds and/or materials used in combination with the particular compound employed, the age, sex, weight, condition, general health and prior medical history of the patient being treated, and like factors well known in the medical arts.

A physician or veterinarian having ordinary skill in the art can readily determine and prescribe the effective amount of the pharmaceutical composition required. For example, the physician or veterinarian could start doses of the compounds of the invention employed in the pharmaceutical composition at levels lower than that required in order to achieve the therapeutic effect and gradually increase the dosage until the effect is achieved.

In general, a suitable daily dose of a compound of the invention will be that amount of the compound which is the lowest dose effective to produce a therapeutic effect. Such an effective dose will generally depend upon the factors described above. Generally, oral, intravenous, intracerebroventricular and subcutaneous doses of the compounds of this invention for a patient will range from about 0.01 to about 50 mg per kilogram of body weight per day.

If desired, the effective daily dose of the active compound may be administered as two, three, four, five, six or more sub-doses administered separately at appropriate intervals throughout the day, optionally, in unit dosage forms. In certain aspects of the invention, dosing is one administration per day.

While it is possible for a compound of the present invention to be administered alone, it is preferable to administer the compound as a pharmaceutical formulation (composition).

The above other therapeutic agents, when employed in combination with the compounds of the present invention, may be used, for example, in those amounts indicated in the Physicians' Desk Reference (PDR) or as otherwise determined by one of ordinary skill in the art. In the methods of the present invention, such other therapeutic agent(s) may be administered prior to, simultaneously with, or following the administration of the inventive compounds.

Methods of Preparation

The compounds of the present invention may be synthesized by many methods available to those skilled in the art of organic chemistry. General synthetic schemes for preparing compounds of the present invention are described below. These schemes are illustrative and are not meant to limit the possible techniques one skilled in the art may use to prepare the compounds disclosed herein. Different methods to prepare the compounds of the present invention will be evident to those skilled in the art. Examples of compounds of the present invention prepared by methods described in the general schemes are given in the Examples section set out hereinafter. Preparation of homochiral examples may be carried out by techniques known to one skilled in the art. For example, homochiral compounds may be prepared by separation of racemic products or diastereomers by chiral phase preparative HPLC. Alternatively, the example compounds may be prepared by methods known to give enantiomerically or diastereomerically enriched products.

The reactions and techniques described in this section are performed in solvents appropriate to the reagents and materials employed and are suitable for the transformations being effected. Also, in the description of the synthetic methods given below, it is to be understood that all proposed reaction conditions, including choice of solvent, reaction atmosphere, reaction temperature, duration of the experiment and work up procedures, are chosen to be the conditions standard for that reaction, which should be readily recognized by one skilled in the art. It is understood by one skilled in the art of organic synthesis that the functionality present on various portions of the molecule must be compatible with the reagents and reactions proposed. Such restrictions to the substituents that are compatible with the reaction conditions will be readily apparent to one skilled in the art, with alternatives required when incompatible substituents are present. This will sometimes require a judgment to modify the order of the synthetic steps or to select one particular process scheme over another in order to obtain a compound of the invention. It will also be recognized that another major consideration in the planning of any synthetic route in this field is the judicious choice of a protecting group used for protection of reactive functional groups present in the compounds described in this invention. An authoritative account describing the many alternatives to the trained practitioner is Wuts and Greene, *Greene's Protective Groups in Organic Synthesis*, Fourth Edition, Wiley and Sons (2007).

EXAMPLES

The following examples illustrate the particular and preferred embodiments of the present invention and do not limit the scope of the present invention. Chemical abbreviations and symbols as well as scientific abbreviations and symbols have their usual and customary meanings unless otherwise specified. Additional abbreviations employed in the Examples and elsewhere in this application are defined above. Common intermediates are generally useful for the preparation of more than one Example and are identified sequentially (e.g., Intermediate 1, Intermediate 2, etc.) and are abbreviated as Int. 1 or I1, Int. 2 or I2, etc. Compounds of the Examples are identified by the example and step in which they were prepared (e.g., "1-A" denotes the Example 1, step A), or by the example only where the compound is the title compound of the example (for example, "1" denotes the title compound of Example 1). In some instances alternate preparations of intermediates or examples are described. Frequently chemists skilled in the art of synthesis may devise alternative preparations which may be desirable based on one or more considerations such as shorter reaction time, less expensive starting materials, ease of operation or isolation, improved yield, amenable to catalysis, avoidance of toxic reagents, accessibility of specialized instrumentation, and decreased number of linear steps, etc. The intent of describing alternative preparations is to further enable the preparation of the examples of this invention. In some instances some functional groups in the outlined examples and claims may be replaced by well-known bioisosteric replacements known in the art, for example, replacement of a carboxylic acid group with a tetrazole or a phosphate moiety. $^1$H NMR data collected in deuterated dimethyl sulfoxide used water suppression in the data processing. The reported spectra are uncorrected for the effects of water suppression. Protons adjacent to the water suppression frequency of 3.35 ppm exhibit diminished signal intensity.

Abbreviations

Ac acetyl
anhyd. anhydrous
aq. aqueous
BOP benzotriazol-1-yloxytris-(dimethylamino)-phosphonium hexafluorophosphate
Bu butyl
DCM dichloromethane
DEA diethylamine
DIEA or DIPEA diisopropylethylamine
DMF dimethylformamide
DMSO dimethyl sulfoxide
dppf 1,1'-bis(diphenylphosphino)ferrocene
Et ethyl
EtOAc ethyl acetate
EtOH ethanol
h, hours or hrs hour(s)
HCl hydrochloric acid
HPLC high pressure liquid chromatography
LC liquid chromatography
LCMS liquid chromatography-mass spectrometry
M molar
mM millimolar
Me methyl
MeOH methanol
Mesyl-Cl methanesulfonyl chloride
MHz megahertz mins minute(s)
$M^{+1}$ $(M+H)^+$
MS mass spectrometry
n or N normal
NH$_4$OAc ammonium acetate
nM nanomolar
NMP N-methylpyrrolidinone
Pd$_2$(dba)$_3$ tris-(dibenzylideneacetone)dipalladium
pet ether petroleum ether
Ph phenyl
POCl$_3$ phosphorous oxychloride
rt or Ret time retention time
sat. saturated
TEA triethylamine
TFA trifluoroacetic acid
THF tetrahydrofuran Analytical LC-MS/HPLC retention time reported for each example and intermediate used one of the following general analytical LC-MS/HPLC conditions:

Method A: Column: XBridge BEH XP C18 (2.1×50 mm), 2.5 µm; Mobile phase A: 10 mM ammonium acetate:acetonitrile (95:5), Mobile phase B: 10 mM ammonium acetate:acetonitrile (5:95), Gradient=0-100% B over 3 minutes; Temperature: 50° C.; Flow rate: 1.1 mL/min; Detection: UV at 220 nm.

Method B: Column Waters Acquity UPLC BEH C18, 2.1×50 mm, 1.7 µm particles; Mobile Phase A: 5:95 acetonitrile:water with 10 mM NH$_4$OAc; Mobile Phase B: 95:5 acetonitrile:water with 10 mM NH$_4$OAc; Temperature: 50° C.; Gradient: 0-100% B over 3 minutes, then a 0.75 minute hold at 100% B; Flow: 1.0 mL/min; Detection: UV at 220 nm.

Method C: Column: Waters Acquity UPLC BEH C18, 2.1×50 mm, 1.7 µm particles; Mobile Phase A: 5:95 acetonitrile:water with 0.1% TFA; Mobile Phase B: 95:5 acetonitrile:water with 0.1% TFA; Temperature: 50° C.; Gradient: 0-100% B over 3 minutes, then a 0.75 minute hold at 100% B; Flow: 1.0 mL/min; Detection: UV at 220 nm.

Method D: Column: Waters XBridge C18, 2.1 mm×50 mm, 1.7 µm particles; Mobile Phase A: 5:95 acetonitrile:water with 10 mM NH$_4$OAc; Mobile Phase B: 95:5 acetonitrile:water with 10 mM NH$_4$OAc; Temperature: 50° C.; Gradient: 0% B to 100% B over 3 min, then a 0.50 min hold at 100% B; Flow: 1 mL/min; Detection: UV at 220 nm.

Method E: Column: Waters XBridge C18, 2.1 mm×50 mm, 1.7 µm particles; Mobile Phase A: 5:95 acetonitrile:water with 0.1% TFA; Mobile Phase B: 95:5 acetonitrile:water with 0.1% TFA; Temperature: 50° C.; Gradient: 0% B to 100% B over 3 min, then a 0.50 min hold at 100% B; Flow: 1 mL/min; Detection: UV at 220 nm.

Intermediate 2 tert-butyl (2S,5R)-4-(1-(4-fluorophenyl)-2-isopropoxy-2-oxoethyl)-2,5-dimethylpiperazine-1-carboxylate

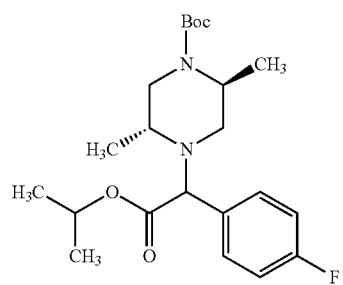
(I-2)

To a stirred solution of 2-((2R,5S)-4-(tert-butoxycarbonyl)-2,5-dimethylpiperazin-1-yl)-2-(4-fluorophenyl)acetic acid (500 mg, 1.36 mmol) in DMF (10 mL) were added K$_2$CO$_3$ (566 mg, 4.09 mmol) and 2-iodopropane (0.82 mL, 8.19 mmol). The reaction mixture was stirred at room temperature for 16 h. The reaction was quenched with water (50 mL). The reaction mixture was extracted with ethyl acetate (3×100 mL). The combined organic layer was dried over anhydrous sodium sulfate, filtered and evaporated under reduced pressure to obtain crude product (320 mg, 64%). LCMS: m/z=409.0 (M+H); retention time 1.48, 1.65 min (LCMS method: Column: Waters Acquity UPLC BEH C18 (2.1×50 mm), 1.7 µm; Mobile phase A: 0.1% TFA in water; Mobile phase B: 0.1% TFA in acetonitrile; Gradient=20-90% B over 1.1 minute, then a 0.6 minute hold at 90% B; Temperature: 50° C.; Flow rate: 0.7 mL/min; Detection: UV at 220 nm.

Intermediate 3 isopropyl 2-((2R,5S)-2,5-dimethylpiperazin-1-yl)-2-(4-fluorophenyl)acetate

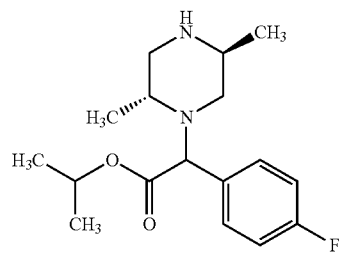
(I-3)

To a stirred solution of tert-butyl (2S,5R)-4-(1-(4-fluorophenyl)-2-isopropoxy-2-oxoethyl)-2,5-dimethylpiperazine-1-carboxylate (300 mg, 0.73 mmol) in DCM (5 mL) was added HCl in dioxane (2 mL, 65.8 mmol). The reaction mixture was stirred at room temperature for 1 h. The reaction mixture was concentrated under reduced pressure to obtain crude product. The crude compound was triturated with DCM and hexane (1:4) and filtered to obtain isopropyl 2-((2R,5S)-2,5-dimethylpiperazin-1-yl)-2-(4-fluorophenyl)acetate (180 mg, 71%). LCMS: m/z=309.5 (M+H); retention time 0.73 min (LCMS method: Column: Waters Acquity UPLC BEH C18 (2.1×50 mm) 1.7 µm, Mobile phase A: 10 mM NH$_4$OAc:acetonitrile (95:5); Mobile phase B: 10 mM NH$_4$OAc:acetonitrile (5:95), Gradient=20-90% B over 1.1 minute, then a 0.6 minute hold at 90% B; Temperature: 50° C.; Flow rate: 0.7 mL/min; Detection: UV at 220 nm.

Examples 1 and 2

Isopropyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate

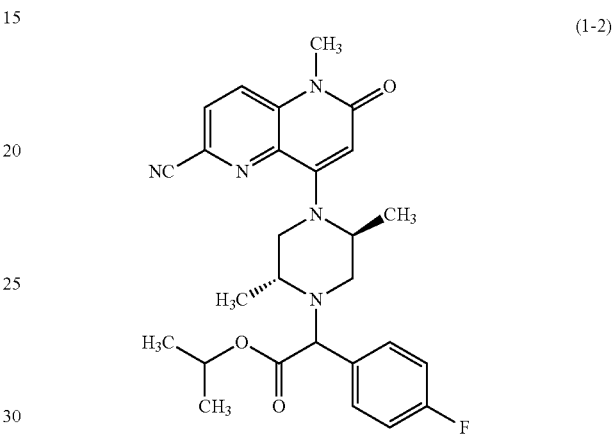
(1-2)

To a stirred solution of 6-cyano-1-methyl-2-oxo-1,2-dihydro-1,5-naphthyridin-4-yl trifluoromethanesulfonate, HCl (200 mg, 0.54 mmol) in acetonitrile (8 mL) was added DIPEA (0.283 mL, 1.62 mmol). The reaction mixture was stirred for 5 min and isopropyl 2-((2R,5S)-2,5-dimethylpiperazin-1-yl)-2-(4-fluorophenyl)acetate (167 mg, 0.54 mmol) was added. The reaction mixture was heated at 85° C. for 3 h. The reaction mixture was cooled to room temperature, evaporated under reduced pressure to obtain crude product, which was purified via preparative HPLC (Method: column: Sunfire C18 (150×19) mm-5 µm; Mobile phase A: 10 mM ammonium acetate in water, pH: 4.5; Mobile phase B: Acetonitrile; Flow: 20 mL/min) to afford Examples 1 and 2.

Example 1: 13.0 mg, 4.9% yield. LCMS: m/z=492.2 (M+H); retention time 2.25 min (LCMS method: Column: Ascentis Express C18 (2.1×50 mm), 2.7 µm; Mobile phase A: 10 mM NH$_4$OAc:acetonitrile (95:5), Mobile phase B: 10 mM NH$_4$OAc:acetonitrile (5:95), Gradient=0-100% B over 3 minutes; Temperature: 50° C.; Flow rate: 1.1 mL/min; Detection: UV at 220 nm). $^1$H NMR (400 MHz, DMSO-d$_6$) δ ppm 8.12-8.18 (m, 1H), 8.04-8.10 (m, 1H), 7.53-7.62 (m, 2H) 7.22 (t, J=8.80 Hz, 2H), 6.04 (s, 1H), 4.92 (quin, J=6.17 Hz, 1H), 4.35-4.45 (m, 1H), 4.32 (s, 1H), 3.61-3.71 (m, 1H), 3.49-3.61 (m, 4H), 3.37 (br s, 1H), 2.76 (dd, J=11.37, 3.30 Hz, 1H), 2.06-2.14 (m, 1H), 1.17-1.23 (m, 6H), 1.11 (t, J=6.60 Hz, 6H).

Example 2: 22.0 mg, 8.1% yield. LCMS: m/z=492.2 (M+H); retention time 2.23 min (LCMS method: Column: Ascentis Express C18 (2.1×50 mm), 2.7 µm; Mobile phase A: 10 mM NH$_4$OAc:acetonitrile (95:5), Mobile phase B: 10 mM NH$_4$OAc:acetonitrile (5:95), Gradient=0-100% B over 3 minutes; Temperature: 50° C.; Flow rate: 1.1 mL/min; Detection: UV at 220 nm). $^1$H NMR (400 MHz, DMSO-d$_6$) δ ppm 8.13-8.18 (m, 1H), 8.03-8.11 (m, 1H), 7.60 (dd, J=8.56, 5.62 Hz, 2H), 7.24 (t, J=8.80 Hz, 2H), 5.99 (s, 1H), 4.90 (quin, J=6.24 Hz, 1H), 4.52-4.65 (m, 1H), 4.29 (s, 1H), 3.55-3.63 (m, 1H), 3.52 (s, 3H), 3.42 (dd, J=2.59, 3.30 Hz, 1H), 3.13 (dd, J=11.25, 3.42 Hz, 1H), 2.77-2.88 (m, 1H), 2.44 (br d, J=10.52 Hz, 1H), 1.28 (d, J=6.36 Hz, 3H), 1.16 (d, J=6.11 Hz, 3H), 1.11 (d, J=6.36 Hz, 3H), 1.00 (d, J=6.36 Hz, 3H).

Examples 3 and 4

Methyl 2-((2R,5S)-4-(6-cyano-1-methyl-2-oxo-1,2-dihydro-1,5-naphthyridin-4-yl)-2,5-dimethylpiperazin-1-yl)-2-(5-fluoropyridin-2-yl)acetate

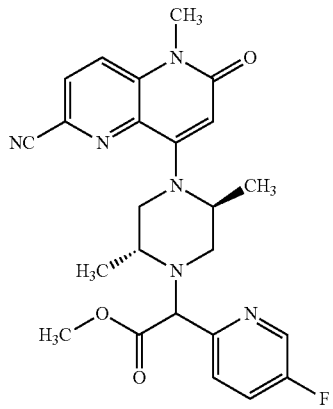

(3-4)

To a stirred solution of 8-((2S,5R)-2,5-dimethylpiperazin-1-yl)-5-methyl-6-oxo-5,6-dihydro-1,5-naphthyridine-2-carbonitrile, HCl (300 mg, 0.9 mmol) in acetonitrile (8 mL) was added DIPEA (0.471 mL, 2.70 mmol, followed by methyl 2-bromo-2-(5-fluoropyridin-2-yl)acetate (268 mg, 1.08 mmol). The reaction mixture was heated at 85° C. for 16 h. The reaction mixture was filtered through celite pad and was concentrated under reduced pressure to obtain crude product. The crude product was purified via preparative SFC (Method: Column/dimensions: Lux Amylose-2(250×4.6) mm, 5 µm; % $CO_2$: 65%; % Cosolvent: 35% ACN:MeOH (50:50); Total Flow: 4.0 g/min; Back Pressure: 100 bar; Temperature: 30° C.; UV: 225 nm) to afford Examples 3 and 4.

Example 3: 20.3 mg, 39.4% yield. LCMS: m/z=465.2 (M+H); retention time 1.67 min (LCMS method: Column: Ascentis Express C8 (50×2.1 mm) 2.7 µm; Mobile phase A: 10 mM ammonium formate:acetonitrile (98:2), Mobile phase B: 10 mM ammonium formate:acetonitrile (2:98), Gradient=0-100% B over 1.5 minutes, then a 0.6 min hold at 100% B; Temperature: 27° C.; Flow rate: 1.0 mL/min; Detection: UV at 220 nm). $^1$H NMR (400 MHz, DMSO-$d_6$) δ ppm 8.53 (d, J=2.9 Hz, 1H), 8.21-8.13 (m, 1H), 8.10-8.03 (m, 1H), 7.87-7.79 (m, 1H), 7.78-7.71 (m, 1H), 6.08 (s, 1H), 4.68 (s, 1H), 4.28-4.15 (m, 1H), 3.71-3.58 (m, 4H), 3.53 (s, 4H), 3.32-3.23 (m, 1H), 2.82 (dd, J=3.5, 11.9 Hz, 1H), 2.31 (dd, J=4.4, 12.0 Hz, 1H), 1.14 (dd, J=6.4, 16.6 Hz, 6H).

Example 4: 21.7 mg, 41.2% yield. LCMS: m/z=465.2 (M+H); retention time 1.67 min (LCMS method: Column: Ascentis Express C8 (50×2.1 mm) 2.7 µm; Mobile phase A: 10 mM ammonium formate:acetonitrile (98:2), Mobile phase B: 10 mM ammonium formate:acetonitrile (2:98), Gradient=0-100% B over 1.5 minutes, then a 0.6 min hold at 100% B; Temperature: 27° C.; Flow rate: 1.0 mL/min; Detection: UV at 220 nm). $^1$H NMR (400 MHz, DMSO-$d_6$) δ ppm 8.53 (d, J=2.7 Hz, 1H), 8.19-8.13 (m, 1H), 8.09-8.03 (m, 1H), 7.86-7.79 (m, 1H), 7.78-7.73 (m, 1H), 6.03 (s, 1H), 4.73 (s, 1H), 4.53-4.39 (m, 1H), 3.66 (s, 3H), 3.59-3.49 (m, 5H), 3.32 (br d, J=3.2 Hz, 1H), 3.11-3.02 (m, 1H), 2.40 (dd, J=2.6, 11.9 Hz, 1H), 1.17 (d, J=6.6 Hz, 3H), 1.06 (d, J=6.6 Hz, 3H).

Intermediate 4 tert-butyl (2S,5R)-4-(1-(4-fluorophenyl)-2-methoxy-2-oxoethyl)-2,5-dimethylpiperazine-1-carboxylate

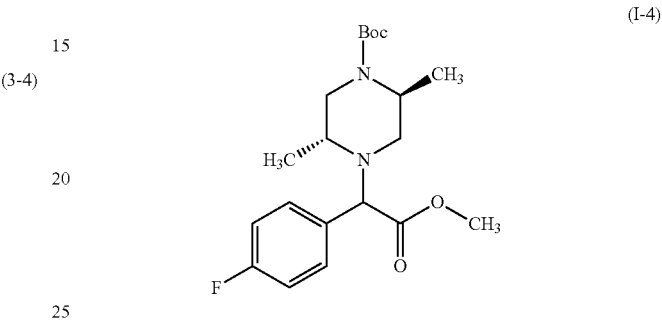

(I-4)

To a solution of methyl 2-bromo-2-(4-fluorophenyl)acetate (1.0 g, 4.05 mmol) in acetonitrile (10 mL) was added DIPEA (2.12 mL, 12.14 mmol), followed by tert-butyl (2S,5R)-2,5-dimethylpiperazine-1-carboxylate (1.04 g, 4.86 mmol). The reaction mixture was stirred at 85° C. overnight. The reaction mixture was concentrated under reduced pressure to remove volatiles, and the crude residue was dissolved in ethyl acetate (150 mL) and washed with water. The aqueous layer was back extracted with ethyl acetate (100 mL×2). The combined organic layer was flushed with brine, dried over anhydrous sodium sulfate, concentrated under reduced pressure to get crude product. The crude residue was purified via silica gel chromatography (10-20% ethyl acetate/petroleum ether; 40 g column) to afford tert-butyl (2S,5R)-4-(1-(4-fluorophenyl)-2-methoxy-2-oxoethyl)-2,5-dimethylpiperazine-1-carboxylate (1.201 g, 3.16 mmol, 78% yield). LCMS: m/z=381.4 (M+H); rt 2.18 min (LCMS method: Column: Waters Acquity UPLC BEH C18 (2.1×50 mm) 1.7 µm, Mobile phase A: 10 mM $NH_4OAc$:acetonitrile (95:5); Mobile phase B: 10 mM $NH_4OAc$:acetonitrile (5:95), Gradient=20-90% B over 1.1 minute, then a 0.6 minute hold at 90% B; Temperature: 50° C.; Flow rate: 0.7 mL/min; Detection: UV at 220 nm).

Intermediate 5

2-((2R,5S)-4-(tert-butoxycarbonyl)-2,5-dimethylpiperazin-1-yl)-2-(4-fluorophenyl)acetic acid

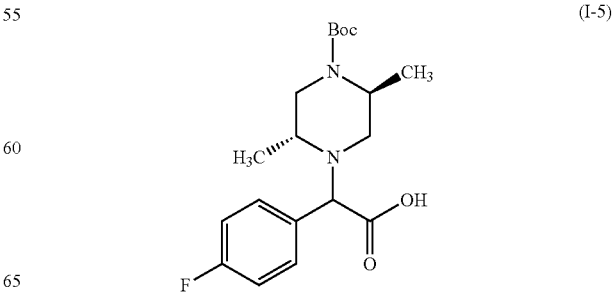

(I-5)

To a solution of tert-butyl (2S,5R)-4-(1-(4-fluorophenyl)-2-methoxy-2-oxoethyl)-2,5-dimethylpiperazine-1-carboxylate (500 mg, 1.31 mmol) in THF (12 mL)/water (4 mL) was added LiOH (315 mg, 13.14 mmol). The reaction mixture was stirred at 60° C. overnight. The reaction mixture was partially concentrated under reduced pressure to remove volatiles and extracted with ethyl acetate. The combined organic layer was washed with brine, dried over Na$_2$SO$_4$, concentrated under reduced pressure to give 2-((2R,5S)-4-(tert-butoxycarbonyl)-2,5-dimethylpiperazin-1-yl)-2-(4-fluorophenyl)acetic acid (451 mg, 94% yield). LCMS: m/z=367.2 (M+H); rt 0.97 and 1.01 min (LCMS method: Column: Waters Acquity UPLC BEH C18 (2.1×50 mm) 1.7 μm, Mobile phase A: 10 mM NH$_4$OAc:acetonitrile (95:5); Mobile phase B: 10 mM NH$_4$OAc:acetonitrile (5:95), Gradient=20-90% B over 1.1 minute, then a 0.6 minute hold at 90% B; Temperature: 50° C.; Flow rate: 0.7 mL/min; Detection: UV at 220 nm).

Intermediate 6 tert-butyl (2S,5R)-4-(2-((2,2-difluoroethyl)amino)-1-(4-fluorophenyl)-2-oxoethyl)-2,5-dimethylpiperazine-1-carboxylate

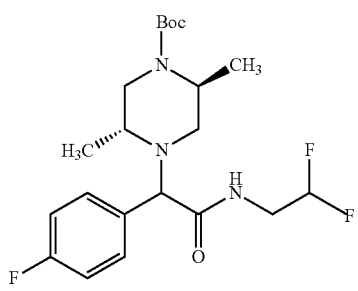

(I-6)

To a solution of 2-((2R,5S)-4-(tert-butoxycarbonyl)-2,5-dimethylpiperazin-1-yl)-2-(4-fluorophenyl)acetic acid (100 mg, 0.27 mmol) in DMF (5 mL) was added 1-propanephosphonic anhydride (0.55 mL, 0.55 mmol), followed by DIPEA (0.05 mL, 0.27 mmol). The reaction mixture was stirred at room temperature for 30 min. Next, 2,2-difluoroethan-1-amine (22.12 mg, 0.27 mmol) was added and the reaction mixture was stirred at room temperature overnight. The reaction mixture was concentrated under reduced pressure to remove volatiles and the crude residue was dissolved in ethyl acetate (20 mL), and washed with water. The aqueous layer was back extracted with ethyl acetate (15 mL×2). The combined organic layer was flushed with brine, dried over Na$_2$SO$_4$, concentrated under reduced pressure to give crude product. The crude residue was purified via silica gel chromatography (10-20% Methanol/Chloroform; 12 g column) to afford tert-butyl (2S,5R)-4-(2-((2,2-difluoroethyl)amino)-1-(4-fluorophenyl)-2-oxoethyl)-2,5-dimethylpiperazine-1-carboxylate (65 mg, 55.5% yield). LCMS: m/z=430.4 (M+H); rt 1.86 min (LCMS method: Column: Waters Acquity UPLC BEH C18 (2.1×50 mm) 1.7 μm, Mobile phase A: 10 mM NH$_4$OAc:acetonitrile (95:5); Mobile phase B: 10 mM NH$_4$OAc:acetonitrile (5:95), Gradient=20-90% B over 1.1 minute, then a 0.6 minute hold at 90% B; Temperature: 50° C.; Flow rate: 0.7 mL/min; Detection: UV at 220 nm).

Intermediate 7

N-(2,2-difluoroethyl)-2-((2R,5S)-2,5-dimethylpiperazin-1-yl)-2-(4-fluorophenyl)acetamide

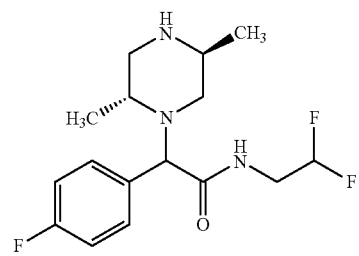

(I-7)

To a solution of tert-butyl (2S,5R)-4-(2-((2,2-difluoroethyl)amino)-1-(4-fluorophenyl)-2-oxoethyl)-2,5-dimethylpiperazine-1-carboxylate (60 mg, 0.14 mmol) in DCM (10 mL) was added HCl (0.04 mL, 1.39 mmol) in dioxane. The reaction mixture was stirred for 3 h. The reaction mixture was evaporated under reduced pressure and the crude residue was triturated with hexane. The solid was filtered through sintered funnel, dried under reduced pressure to afford N-(2,2-difluoroethyl)-2-((2R,5S)-2,5-dimethylpiperazin-1-yl)-2-(4-fluorophenyl)acetamide (42 mg, 91% yield). LCMS: m/z=330.3 (M+H); rt 0.81 and 0.91 min (LCMS method: Column: Waters Acquity UPLC BEH C18 (2.1×50 mm) 1.7 μm, Mobile phase A: 10 mM NH$_4$OAc:acetonitrile (95:5); Mobile phase B: 10 mM NH$_4$OAc:acetonitrile (5:95), Gradient=20-90% B over 1.1 minute, then a 0.6 minute hold at 90% B; Temperature: 50° C.; Flow rate: 0.7 mL/min; Detection: UV at 220 nm).

Examples 5 and 6

2-((2R,5S)-4-(6-cyano-1-methyl-2-oxo-1,2-dihydro-1,5-naphthyridin-4-yl)-2,5-dimethylpiperazin-1-yl)-N-(2,2-difluoroethyl)-2-(4-fluorophenyl)acetamide

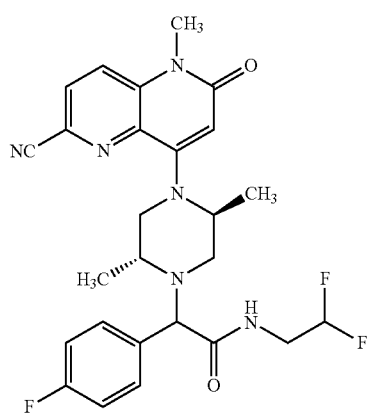

(5-6)

To a solution of 6-cyano-1-methyl-2-oxo-1,2-dihydro-1,5-naphthyridin-4-yl trifluoromethanesulfonate (47.4 mg, 0.14 mmol) in acetonitrile (3 mL) was added DIPEA (0.06 mL, 0.33 mmol), followed by N-(2,2-difluoroethyl)-2-((2R,5S)-2,5-dimethylpiperazin-1-yl)-2-(4-fluorophenyl)acetamide, HCl (40 mg, 0.11 mmol). The reaction mixture was stirred at 85° C. overnight. The reaction mixture was concentrated under reduced pressure to remove volatiles and the crude residue was dissolved in ethyl acetate and washed with water. The aqueous layer was back extracted with ethyl acetate (15 mL×2). The combined organic layer was flushed with brine, dried over $Na_2SO_4$, concentrated under reduced pressure to give crude product. The crude residue was purified via preparative HPLC (Method: Column: DAD-1-Cellulose-2 (250×4.6 mm), 5 micron; DAD-2-Cellulose-4 (250×4.6 mm), 5 micron; Mobile Phase: 0.1% DEA in acetonitrile; Flow: 2.0 mL\min) to afford Examples 5 and 6.

Example 5: 1.2 mg, 2.1% yield. LCMS: m/z=513.2 (M+H); rt 1.731 min (LCMS method: Column: XBridge BEH XP C18 (2.1×50 mm), 2.5 μm; Mobile phase A: 10 mM ammonium acetate:acetonitrile (95:5), Mobile phase B: 10 mM ammonium acetate:acetonitrile (5:95), Gradient=0-100% B over 3 minutes; Temperature: 50° C.; Flow rate: 1.1 mL/min; Detection: UV at 220 nm). $^1$H NMR (400 MHz, DMSO-$d_6$): δ 8.30-8.44 (m, 1H) 8.12-8.20 (m, 1H) 8.01-8.10 (m, 1H) 7.55-7.69 (m, 2H) 7.15-7.29 (m, 2H) 5.84-6.19 (m, 1H) 4.58-4.69 (m, 1H) 4.12 (s, 1H) 3.42-3.59 (m, 6H) 3.03-3.08 (m, 1H) 2.81-2.93 (m, 3H) 2.59 (br d, J=0.73 Hz, 1H) 1.20-1.34 (m, 3H) 0.94 (d, J=6.60 Hz, 3H) ppm.

Example 6: (0.5 mg, 0.9% yield. LCMS: m/z=513.2 (M+H); rt 1.734 min (LCMS method: Column: XBridge BEH XP C18 (2.1×50 mm), 2.5 μm; Mobile phase A: 10 mM ammonium acetate:acetonitrile (95:5), Mobile phase B: 10 mM ammonium acetate:acetonitrile (5:95), Gradient=0-100% B over 3 minutes; Temperature: 50° C.; Flow rate: 1.1 mL/min; Detection: UV at 220 nm). $^1$H NMR (400 MHz, DMSO-$d_6$): δ 8.55-8.74 (m, 1H) 8.12-8.22 (m, 1H) 7.98-8.09 (m, 1H) 7.45-7.64 (m, 2H) 7.06-7.25 (m, 2H) 5.83-6.18 (m, 2H) 4.39-4.49 (m, 1H) 4.18-4.28 (m, 1H) 3.66-3.77 (m, 1H) 3.48-3.63 (m, 4H) 3.36 (br s, 1H) 2.85-2.94 (m, 1H) 2.67-2.75 (m, 2H) 2.07 (br d, J=11.74 Hz, 1H) 0.97-1.33 (m, 6H).

Examples 7 and 8

Methyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate

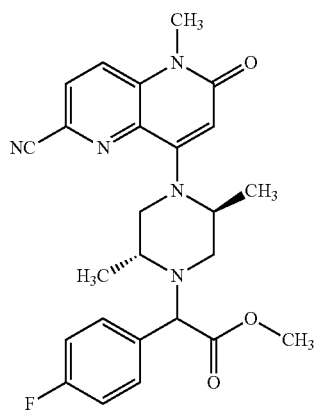

(7-8)

To a solution of 8-((2S,5R)-2,5-dimethylpiperazin-1-yl)-5-methyl-6-oxo-5,6-dihydro-1,5-naphthyridine-2-carbonitrile, HCl (200 mg, 0.59 mmol) in acetonitrile (8 mL) was added DIPEA (0.31 mL, 1.8 mmol). The reaction mixture was stirred for 5 min and methyl 2-bromo-2-(4-fluorophenyl)acetate (148 mg, 0.6 mmol) was added. The reaction mixture was heated at 85° C. for 16 h. The reaction mixture was filtered through a cartridge and was concentrated under reduced pressure to get a solid residue. The crude compound was purified by silica gel column (12 g silica gel column; using 60-67% ethyl acetate/petroleum ether) to afford methyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (250 mg, 90% yield) as a brown solid. The purified compound (30 mg) was further purified by preparative HPLC (Method: Column: Inersil ODS (250 mm×19 mm ID, 5 μm); Mobile phase A=0.1% TFA in water; Mobile phase B=Acetonitrile; Gradient: 40-100% B over 20 minutes; Flow 17 mL/min) to afford Examples 7 and 8.

Example 7: methyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate, TFA (12.2 mg, 32.4% yield). LCMS: m/z=464.2 (M+H); rt 2.07 min (LCMS method: Column: Ascentis Express C8 (50×2.1 mm) 2.7 μm; Mobile phase A: 10 mM ammonium formate:acetonitrile (98:2), Mobile phase B: 10 mM ammonium formate:acetonitrile (2:98), Gradient=0-100% B over 1.5 minutes, then a 0.6 minute hold at 100% B; Temperature: 27° C.; Flow rate: 1.0 mL/min; Detection: UV at 220 nm). $^1$H NMR (400 MHz, DMSO-$d_6$) δ 8.20-8.15 (m, 1H), 8.10-8.03 (m, 1H), 7.62 (dd, J=5.6, 8.3 Hz, 2H), 7.27 (t, J=8.9 Hz, 2H), 7.24-6.95 (m, 1H), 6.03 (s, 1H), 4.71-4.51 (m, 2H), 3.65 (s, 4H), 3.53 (s, 4H), 3.23-3.13 (m, 1H), 2.92 (br d, J=6.6 Hz, 1H), 2.55 (s, 1H), 1.32-1.19 (m, 3H), 1.11-0.95 (m, 3H).

Example 8: methyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate, TFA (17.5 mg, 46.8% yield). LCMS: m/z=464.2 (M+H); rt 2.08 min (LCMS method: Column: Ascentis Express C8 (50×2.1 mm) 2.7 μm; Mobile phase A: 10 mM ammonium formate:acetonitrile (98:2), Mobile phase B: 10 mM ammonium formate:acetonitrile (2:98), Gradient=0-100% B over 1.5 minutes, then a 0.6 minute hold at 100% B; Temperature: 27° C.; Flow rate: 1.0 mL/min; Detection: UV at 220 nm). $^1$H NMR (400 MHz, DMSO-$d_6$) δ 8.19-8.13 (m, 1H), 8.11-8.05 (m, 1H), 7.62-7.53 (m, 2H), 7.28-7.18 (m, 2H), 6.05 (s, 1H), 4.52-4.37 (m, 2H), 3.66 (s, 3H), 3.53 (s, 3H), 3.39-3.32 (m, 1H), 2.85-2.76 (m, 1H), 2.55 (s, 2H), 2.20-2.08 (m, 1H), 1.19 (d, J=6.6 Hz, 3H), 1.12 (d, J=6.4 Hz, 3H).

Examples 9 and 10

2-((2R,5S)-4-(6-Cyano-1-methyl-2-oxo-1,2-dihydro-1,5-naphthyridin-4-yl)-2,5-dimethylpiperazin-1-yl)-2-(4-fluorophenyl)acetic acid

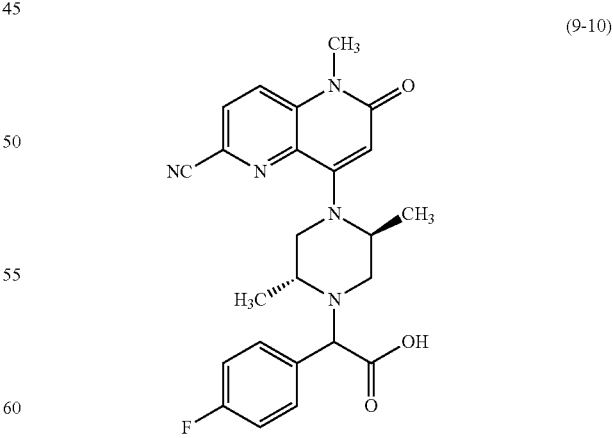

(9-10)

To a solution of methyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (0.9 g, 1.94 mmol) in 1,4-dioxane (15 mL) was added trimethyltin hydroxide (1.76 g, 9.71 mmol). The reaction mixture was heated at 100° C. for 28 h. The reaction mixture was cooled under ice bath and diluted with ethyl acetate 50 mL. The precipitate was filtered out through a Buckner funnel. The filtrate was concentrated under reduced pressure to get crude 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetic acid (Crude=1.11 g). LCMS: m/z=450.4 and 450.3 (M+H); rt 0.88 and 0.93 min (LCMS method: Column: Waters Acquity UPLC BEH C18 (2.1×50 mm) 1.7 μm, Mobile phase A: 10 mM NH$_4$OAc:acetonitrile (95:5); Mobile phase B: 10 mM NH$_4$OAc:acetonitrile (5:95), Gradient=20-90% B over 1.1 minute, then a 0.6 minute hold at 90% B; Temperature: 50° C.; Flow rate: 0.7 mL/min; Detection: UV at 220 nm). The crude compound (0.08 g) was purified via preparative HPLC (Method Column: SUN FIRE C18 (150 mm×19 mm ID, 5 μm); Mobile phase A=10 MM AA in water; Mobile phase B=Acetonitrile; Gradient: 10-55% B over 25 minutes; Flow 19 mL/min) to afford Diastereomers 1 and 2.

Example 9: 2.0 mg, 2.5% yield. LCMS: m/z=450.1 (M+H); rt 1.07 min (LCMS method: Column: Ascentis Express C8 (50×2.1 mm) 2.7 μm; Mobile phase A: 10 mM ammonium formate:acetonitrile (98:2), Mobile phase B: 10 mM ammonium formate:acetonitrile (2:98), Gradient=0-100% B over 1.5 minutes, then a 0.6 min hold at 100% B; Temperature: 27° C.; Flow rate: 1.0 mL/min; Detection: UV at 220 nm). $^1$H NMR (400 MHz, DMSO-d$_6$) δ 8.13-8.19 (m, 1H), 8.02-8.09 (m, 1H), 7.60 (dd, J=8.56, 5.62 Hz, 2H), 7.23 (t, J=8.80 Hz, 2H), 6.00 (s, 1H), 4.51-4.64 (m, 1H), 4.22 (s, 1H) 3.57-3.66 (m, 1H), 3.52 (s, 4H), 3.42-3.46 (m, 1H), 3.11 (dd, J=11.25, 4.16 Hz, 1H), 2.78-2.86 (m, 1H), 1.28 (d, J=6.36 Hz, 3H), 1.00 (d, J=6.60 Hz, 3H).

Example 10: 4.5 mg, 5.6% yield. LCMS: m/z=450.1 (M+H); rt 1.15 min (LCMS method: Column: Ascentis Express C8 (50×2.1 mm) 2.7 μm; Mobile phase A: 10 mM ammonium formate:acetonitrile (98:2), Mobile phase B: 10 mM ammonium formate:acetonitrile (2:98), Gradient=0-100% B over 1.5 minutes, then a 0.6 min hold at 100% B; Temperature: 27° C.; Flow rate: 1.0 mL/min; Detection: UV at 220 nm). $^1$H NMR (400 MHz, DMSO-d$_6$) δ 8.11-8.18 (m, 1H), 8.02-8.09 (m, 1H), 7.57 (dd, J=8.68, 5.50 Hz, 2H), 7.21 (t, J=8.93 Hz, 2H), 6.04 (s, 1H), 4.38-4.48 (m, 1H), 4.25 (s, 1H), 3.65 (br s, 1H), 3.55-3.61 (m, 1H), 3.53 (s, 4H), 3.43-3.49 (m, 1H), 2.75 (dd, J=11.49, 3.42 Hz, 1H), 1.20 (d, J=6.60 Hz, 3H), 1.12 (d, J=6.60 Hz, 3H).

Examples 11 and 12

(8-((2S,5R)-4-(1-(4-fluorophenyl)-2-oxo-2-(piperidin-1-yl)ethyl)-2,5-dimethylpiperazin-1-yl)-5-methyl-6-oxo-5,6-dihydro-1,5-naphthyridine-2-carbonitrile (11-12)

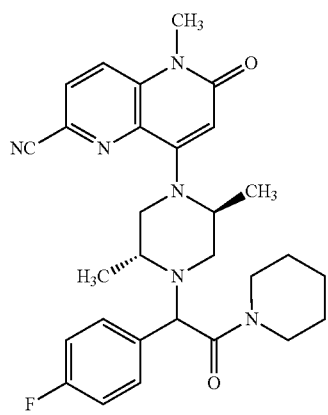

To a stirred solution of 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetic acid (70 mg, 0.16 mmol) in DCM (5 mL) were added EDC (35.8 mg, 0.19 mmol), HOBt (28.6 mg, 0.19 mmol), and DIPEA (0.05 mL, 0.31 mmol) followed by piperidine (0.02 mL, 0.19 mmol) at room temperature. The reaction mixture was stirred for 12 h. The reaction mixture was extracted with DCM (2×30 mL), washed with water, brine, dried over sodium sulphate and solvent was removed under reduced pressure to give crude residue which was purified by prep-HPLC [Method: Column: Waters XBridge C18, 150 mm×19 mm, 5-μm particles; Mobile Phase A: 5:95 acetonitrile:water with 10-mM ammonium acetate; Mobile Phase B: 95:5 acetonitrile:water with 10-mM ammonium acetate; Gradient: a 2-minute hold at 15% B, 15-52% B over 25 minutes, then a 5-minute hold at 100% B; Flow Rate: 15 mL/min; Column Temperature: 25° C.]. Fractions containing the product were combined and dried via centrifugal evaporation to afford Examples 11 and 12.

Example 11: 1 mg, 1% yield. LCMS: m/z=517.2 (M+H); rt 1.98 min (LCMS method: Column: XBridge BEH XP C18 (2.1×50 mm), 2.5 μm; Mobile phase A: 10 mM ammonium acetate:acetonitrile (95:5), Mobile phase B: 10 mM ammonium acetate:acetonitrile (5:95), Gradient=0-100% B over 3 minutes; Temperature: 50° C.; Flow rate: 1.1 mL/min; Detection: UV at 220 nm). $^1$H NMR (400 MHz, DMSO-d$_6$) δ ppm 8.09-8.17 (m, 1H), 7.99-8.07 (m, 1H), 7.59 (dd, J=8.44, 5.75 Hz, 2H), 7.20 (t, J=8.80 Hz, 2H), 5.99 (s, 1H), 4.81 (s, 1H), 4.47 (br dd, J=7.70, 4.28 Hz, 1H), 3.61-3.71 (m, 1H), 3.47-3.58 (m, 6H), 3.38-3.47 (m, 4H), 3.07-3.18 (m, 1H), 2.83-2.92 (m, 1H), 1.46-1.61 (m, 2H), 1.26-1.44 (m, 4H), 1.20 (d, J=6.36 Hz, 4H), 1.02 (d, J=6.36 Hz, 3H).

Example 12: 1 mg, 1% yield. LCMS: m/z=517.2 (M+H); rt 1.98 min (LCMS method: Column: XBridge BEH XP C18 (2.1×50 mm), 2.5 μm; Mobile phase A: 10 mM ammonium acetate:acetonitrile (95:5), Mobile phase B: 10 mM ammonium acetate:acetonitrile (5:95), Gradient=0-100% B over 3 minutes; Temperature: 50° C.; Flow rate: 1.1 mL/min; Detection: UV at 220 nm). $^1$H NMR (400 MHz, DMSO-d$_6$) δ ppm 8.11-8.16 (m, 1H), 8.01-8.10 (m, 1H), 7.58 (dd, J=8.44, 5.50 Hz, 2H), 7.11-7.23 (m, 2H), 6.02 (s, 1H), 4.81 (s, 1H), 4.29-4.41 (m, 1H), 3.69-3.83 (m, 1H), 3.50-3.63 (m, 6H), 2.73-2.82 (m, 1H), 2.19-2.26 (m, 2H), 1.48-1.61 (m, 3H), 1.24-1.41 (m, 4H), 1.13 (d, J=6.60 Hz, 3H), 1.09 (d, J=6.36 Hz, 3H).

TABLE 1
| Ex. No. | Structure | LCMS Method | LCMS RT | M + H | Stereo. chem. |
|---|---|---|---|---|---|
| 13 | 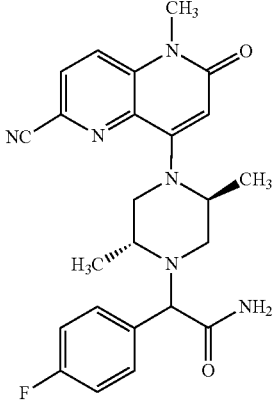 [SMILES: C[C@@H]1CN(c2cc(=O)n(C)c3ccc(C#N)nc23)[C@@H](C)CN1C(C(N)=O)c1ccc(F)cc1] | A | 1.478 | 449.1 | H |
| 14 | 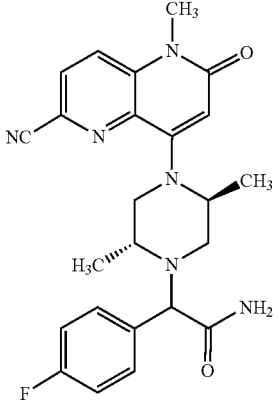 [SMILES: C[C@@H]1CN(c2cc(=O)n(C)c3ccc(C#N)nc23)[C@@H](C)CN1C(C(N)=O)c1ccc(F)cc1] | A | 1.489 | 449.2 | H |
| 15 | 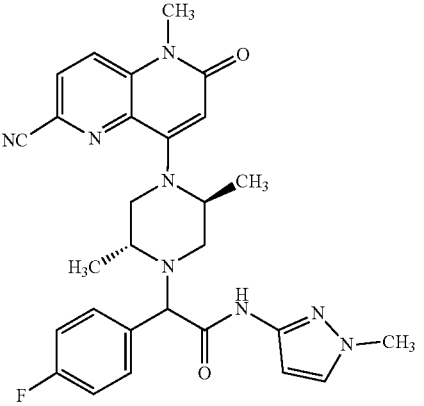 [SMILES: C[C@@H]1CN(c2cc(=O)n(C)c3ccc(C#N)nc23)[C@@H](C)CN1C(C(=O)Nc1ccn(C)n1)c1ccc(F)cc1] | A | 1.618 | 529.3 | H |

TABLE 1-continued
| Ex. No. | Structure | LCMS Method | LCMS RT | M + H | Stereo. chem. |
|---|---|---|---|---|---|
| 16 | 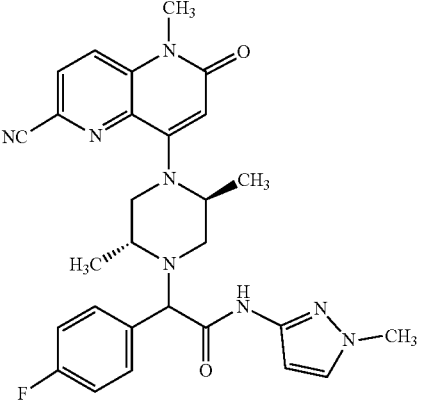 [SMILES: C[C@@H]1CN(c2cc(=O)n(C)c3ccc(C#N)nc23)[C@@H](C)CN1C(C(=O)Nc1ccn(C)n1)c1ccc(F)cc1] | A | 1.610 | 529.2 | H |
| 17 | 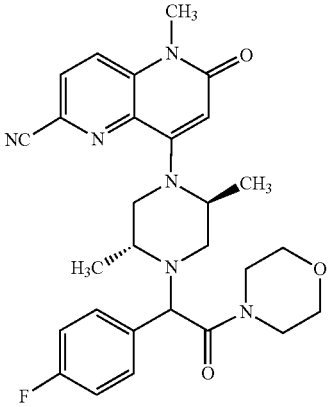 [SMILES: C[C@@H]1CN(c2cc(=O)n(C)c3ccc(C#N)nc23)[C@@H](C)CN1C(C(=O)N1CCOCC1)c1ccc(F)cc1] | A | 1.66 | 519.2 | H |
| 18 | 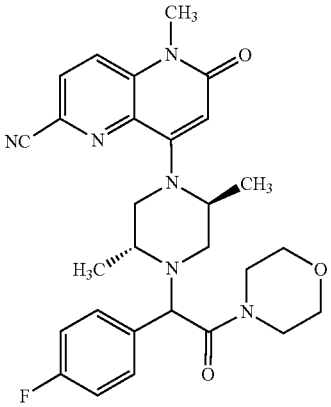 [SMILES: C[C@@H]1CN(c2cc(=O)n(C)c3ccc(C#N)nc23)[C@@H](C)CN1C(C(=O)N1CCOCC1)c1ccc(F)cc1] | A | 1.66 | 519.2 | H |

TABLE 1-continued
| Ex. No. | Structure | LCMS Method | LCMS RT | M + H | Stereo. chem. |
|---|---|---|---|---|---|
| 19 | 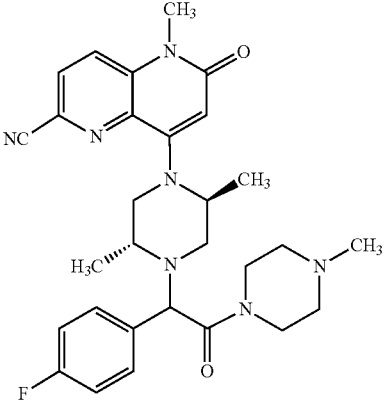 [SMILES: C[C@@H]1CN(c2cc(=O)n(C)c3ccc(C#N)nc23)[C@@H](C)CN1C(C(=O)N1CCN(C)CC1)c1ccc(F)cc1] | A | 1.59 | 532.2 | H |
| 20 | 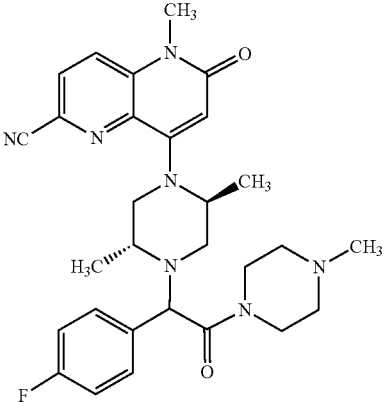 [SMILES: C[C@@H]1CN(c2cc(=O)n(C)c3ccc(C#N)nc23)[C@@H](C)CN1C(C(=O)N1CCN(C)CC1)c1ccc(F)cc1] | A | 1.6 | 532.2 | H |
| 21 | 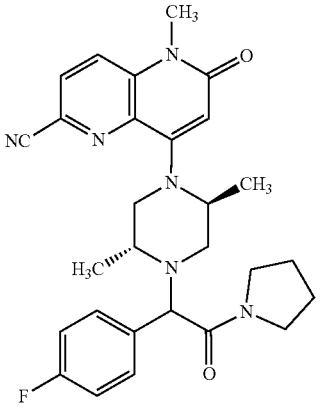 [SMILES: C[C@@H]1CN(c2cc(=O)n(C)c3ccc(C#N)nc23)[C@@H](C)CN1C(C(=O)N1CCCC1)c1ccc(F)cc1] | A | 1.822 | 503.3 | H |

TABLE 1-continued
| Ex. No. | Structure | LCMS Method | LCMS RT | M + H | Stereo. chem. |
|---|---|---|---|---|---|
| 22 | 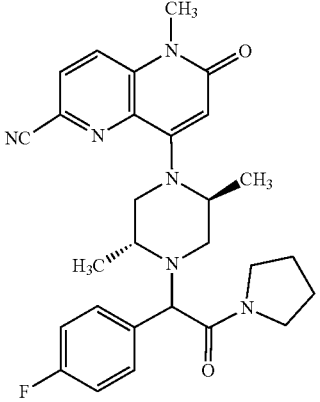 [SMILES: C[C@@H]1CN(c2cc(=O)n(C)c3ccc(C#N)nc23)[C@@H](C)CN1C(C(=O)N1CCCC1)c1ccc(F)cc1] | A | 1.82 | 503.3 | H |
| 23 | 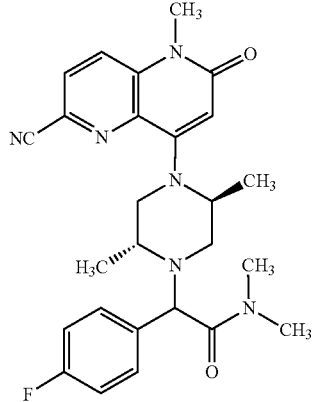 [SMILES: C[C@@H]1CN(c2cc(=O)n(C)c3ccc(C#N)nc23)[C@@H](C)CN1C(C(=O)N(C)C)c1ccc(F)cc1] | A | 1.71 | 477.2 | H |
| 24 | 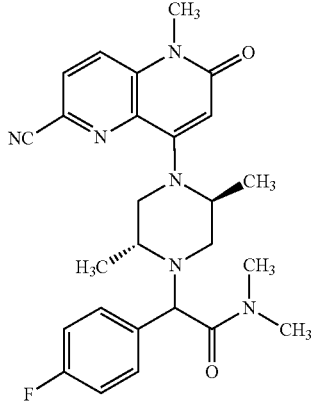 [SMILES: C[C@@H]1CN(c2cc(=O)n(C)c3ccc(C#N)nc23)[C@@H](C)CN1C(C(=O)N(C)C)c1ccc(F)cc1] | A | 1.71 | 477.2 | H |

TABLE 1-continued
| Ex. No. | Structure | LCMS Method | LCMS RT | M + H | Stereo. chem. |
|---|---|---|---|---|---|
| 25 | 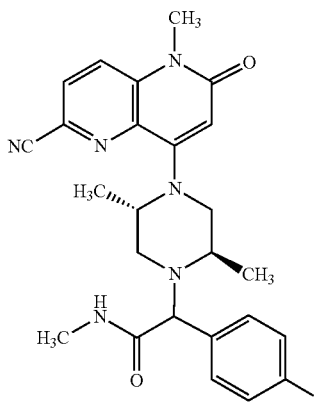 | A | 1.56 | 463.2 | H |
| 26 | 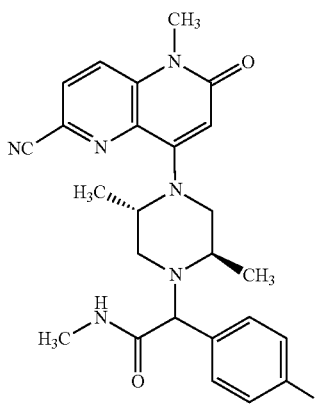 | A | 1.56 | 463.2 | H |
| 27 | 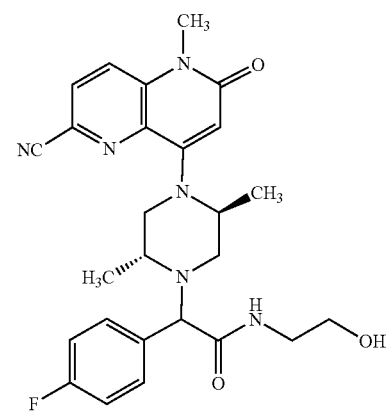 [SMILES: C[C@@H]1CN(c2cc(=O)n(C)c3ccc(C#N)nc23)[C@@H](C)CN1C(C(=O)NCCO)c1ccc(F)cc1] | A | 1.49 | 493.2 | H |

TABLE 1-continued

| Ex. No. | Structure | LCMS Method | LCMS RT | M + H | Stereo. chem. |
|---|---|---|---|---|---|
| 28 | | A | 1.49 | 493.2 | H |
| 29 | | A | 1.777 | 516.2 | H |
| 30 | | A | 1.791 | 516.2 | H |

Intermediate 8: tert-butyl (2S,5R)-4-(1-(4-fluorophenyl)-3-methoxy-3-oxopropyl)-2,5-dimethylpiperazine-1-carboxylate

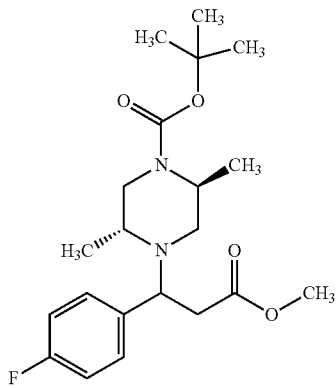

(I-8)

To a stirred solution of tert-butyl (2S,5R)-2,5-dimethylpiperazine-1-carboxylate (1 g, 4.67 mmol) in DMSO (10 mL) were added 4-fluorobenzaldehyde (0.87 g, 7.00 mmol) and trimethyl borate (0.52 mL, 4.67 mmol). The reaction mixture was stirred at room temperature for 15 min. The resulting solution was treated with 1-(tert-butyldimethylsilyloxy)-1-methoxyethene (1.5 mL, 7.00 mmol) drop wise and stirred at room temperature for 16 h. The reaction mixture was extracted with EtOAc (2×100 mL), washed with water, brine and dried over sodium sulphate. The solvent was removed under reduced pressure to get crude residue which was purified by silica gel flash column chromatography (30% EtOAc in n-hexane; 24 g column) to afford tert-butyl (2S,5R)-4-(1-(4-fluorophenyl)-3-methoxy-3-oxopropyl)-2,5-dimethylpiperazine-1-carboxylate (1.2 g, 65% yield) as a diastereomeric mixture. LCMS: m/z, 453.2 (M+59); rt 2.17 min. (LCMS Method: Column: Waters Acquity UPLC BEH C18 (2.1×50 mm) 1.7 µm, Mobile phase A: 10 mM NH$_4$OAc:acetonitrile (95:5); Mobile phase B: 10 mM NH$_4$OAc:acetonitrile (5:95), Gradient=20-100% B over 2 minute, then a 0.3 minute hold at 100% B; Temperature: 50° C.; Flow rate: 0.7 mL/min; Detection: UV at 220 nm).

Intermediate 9: methyl 3-((2R,5S)-2,5-dimethylpiperazin-1-yl)-3-(4-fluorophenyl) propanoate hydrochloride

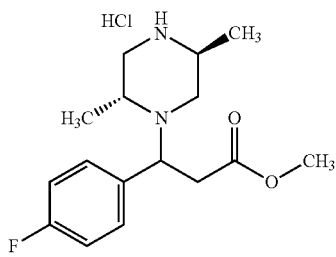

(I-9)

To a stirred solution of tert-butyl (2S,5R)-4-(1-(4-fluorophenyl)-3-methoxy-3-oxopropyl)-2,5-dimethylpiperazine-1-carboxylate (125 mg, 0.32 mmol) in DCM (5 mL) was added 4 N HCl in 1,4-dioxane (0.8 mL, 3.17 mmol) at room temperature. The reaction mixture was stirred for 2 h. The reaction mixture was concentrated under reduced pressure to give a diastereomeric mixture of methyl 3-((2R,5S)-2,5-dimethylpiperazin-1-yl)-3-(4-fluorophenyl)propanoate (120 mg, 64% yield). LCMS: m/z, 295.4 (M+H); rt 1.08 and 1.11 min. (LCMS Method: Column: Acquity UPLC BEH C18 (3.0×50 mm) 1.7 µm; Mobile phase A: 10 mM ammonium acetate:acetonitrile (95:5), Mobile phase B: 10 mM ammonium acetate:acetonitrile (5:95), Method: % B: 0 min-20:2 min-100: 2.3 min-100, Temperature: 27° C.; Flow rate: 0.7 mL/min; Detection: UV at 220 nm).

Examples 31 and 32

Methyl 3-((2R,5S)-4-(6-cyano-1-methyl-2-oxo-1,2-dihydro-1,5-naphthyridin-4-yl)-2,5-dimethylpiperazin-1-yl)-3-(4-fluorophenyl)propanoate

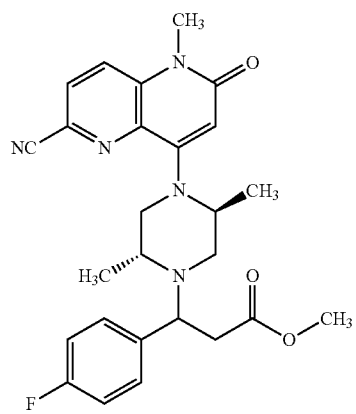

(31-32)

To a stirred solution of methyl 3-((2R,5S)-2,5-dimethylpiperazin-1-yl)-3-(4-fluorophenyl)propanoate (100 mg, 0.34 mmol) in acetonitrile (5 mL) were added DIPEA (0.3 mL, 1.70 mmol) and 6-cyano-1-methyl-2-oxo-1,2-dihydro-1,5-naphthyridin-4-yl trifluoromethanesulfonate (113 mg, 0.34 mmol) at room temperature. The reaction mixture was heated at 80° C. for 3 h. The reaction mixture was cooled to room temperature and solvent was removed under reduced pressure to obtain the diastereomeric mixture of product and the crude mixture was purified by prep-HPLC (Chiral Separation Method: Column: Lux cellulose C2 (250*21) mm, 5 micron, Mobile Phase: 0.1% DEA in MeOH, Flow rate: 17 mL/min) to obtain Peak 1 and Peak 2.

Example 31: 10 mg, 6% yield; LCMS: m/z, 478.1 (M+H); rt 1.99 min; Column: XBridge BEH XP C18 (2.1×50 mm), 2.5 µm; Mobile phase A: 10 mM ammonium acetate:acetonitrile (95:5), Mobile phase B: 10 mM ammonium acetate:acetonitrile (5:95), Gradient=0-100% B over 3 minutes; Temperature: 50° C.; Flow rate: 1.1 m/min; Detection: UV at 220 nm. $^1$H NMR (400 MHz, DMSO-d$_6$) δ ppm 8.13-8.17 (m, 1H), 8.05-8.08 (m, 1H), 7.39-7.46 (m, 2H), 7.15-7.22 (m, 2H), 6.05 (s, 1H), 4.24-4.34 (m, 1H), 4.13-4.18 (m, 1H), 3.53 (s, 3H), 3.50 (s, 3H), 3.39-3.44 (m, 1H), 3.19-3.25 (m, 1H), 3.04-3.12 (m, 2H), 2.68-2.77 (m, 1H), 2.54-2.63 (m, 1H), 2.36-2.44 (m, 1H), 1.14 (d, J=6.4 Hz, 3H), 1.01 (d, J=6.4 Hz, 3H).

Example 32: 15 mg, 9% yield. LCMS: m/z, 478.2 (M+H); rt 2.0 min; Column: XBridge BEH XP C18 (2.1×50 mm), 2.5 µm; Mobile phase A: 10 mM ammonium acetate:acetonitrile (95:5), Mobile phase B: 10 mM ammonium acetate:acetonitrile (5:95), Gradient=0-100% B over 3 minutes; Temperature: 50° C.; Flow rate: 1.1 m/min; Detection: UV at 220 nm. $^1$H NMR (400 MHz, DMSO-d$_6$) δ ppm 8.13-8.17 (m, 1H), 8.05-8.09 (m, 1H), 7.40 (dd, J=8.4, 5.7 Hz, 2H), 7.15 (t, J=8.8 Hz, 2H), 6.01 (s, 1H), 4.28-4.36 (m, 1H), 3.97 (dd, J=9.4, 5.3 Hz, 1H), 3.62-3.69 (m, 1H), 3.48-3.55 (m, 5 H), 3.45 (s, 3H), 3.40-3.44 (m, 1H), 3.04-3.13 (m, 1H), 2.70-2.76 (m, 1H), 2.13-2.20 (m, 1H), 1.12 (d, J=6.4 Hz, 3H), 1.05 (d, J=6.6 Hz, 3H).

Intermediate 11: 3-((2R,5S)-4-(tert-butoxycarbonyl)-2,5-dimethylpiperazin-1-yl)-3-(4-fluorophenyl)propanoic acid

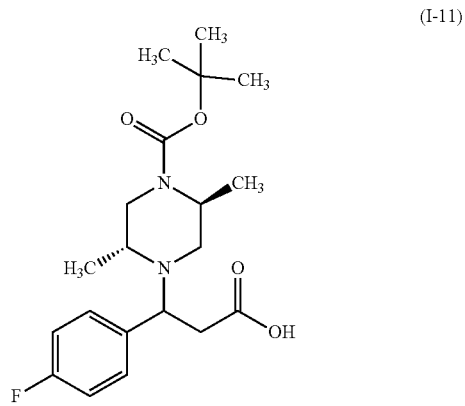 [SMILES: C[C@@H]1CN(C(=O)OC(C)(C)C)[C@@H](C)CN1C(CC(=O)O)c1ccc(F)cc1]

(I-11)

To a stirred solution of tert-butyl (2S,5R)-4-(1-(4-fluorophenyl)-3-methoxy-3-oxopropyl)-2,5-dimethylpiperazine-1-carboxylate (1.0 g, 2.53 mmol) in THF (20 mL) and water (10 mL) was added lithium hydroxide monohydrate (0.53 g, 12.67 mmol) at room temperature. The reaction mixture was stirred for 16 h. The reaction mixture was neutralized with aqueous 1.5 N HCl and extracted with EtOAc (2×100 mL). The combined organic extracts were washed with water, brine, dried over sodium sulphate and concentrated to afford 3-((2R,5S)-4-(tert-butoxycarbonyl)-2,5-dimethylpiperazin-1-yl)-3-(4-fluorophenyl)propanoic acid (0.85 g, 88% yield) as a diastereomeric mixture. LCMS: m/z, 381.3 (M+H); rt 1.11 min. (LCMS Method: Column: Acquity UPLC BEH C18 (3.0×50 mm) 1.7 μm; Mobile phase A: 10 mM ammonium acetate:acetonitrile (95:5), Mobile phase B: 10 mM ammonium acetate:acetonitrile (5:95), Method: % B: 0 min-20: 2 min-100: 2.3 min-100, Temperature: 27° C.; Flow rate: 0.7 mL/min; Detection: UV at 220 nm).

Intermediate 12: tert-butyl (2S,5R)-4-(3-(tert-butylamino)-1-(4-fluorophenyl)-3-oxopropyl)-2,5-dimethylpiperazine-1-carboxylate

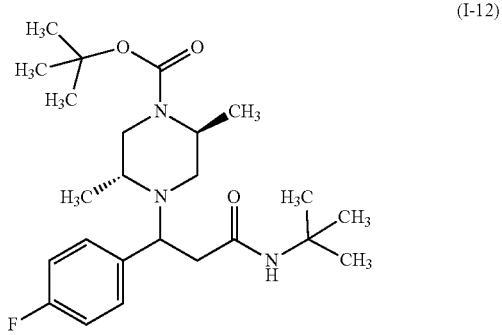 [SMILES: C[C@@H]1CN(C(=O)OC(C)(C)C)[C@@H](C)CN1C(CC(=O)NC(C)(C)C)c1ccc(F)cc1]

(I-12)

To a stirred solution of 3-((2R,5S)-4-(tert-butoxycarbonyl)-2,5-dimethylpiperazin-1-yl)-3-(4-fluorophenyl)propanoic acid (350 mg, 0.92 mmol) in DMF (5 mL) were added DIPEA (0.32 mL, 1.84 mmol), BOP (450 mg, 1.01 mmol) and 2-methylpropan-2-amine (135 mg, 1.84 mmol) at room temperature. The reaction mixture was stirred for 3 h. The reaction mixture was extracted with EtOAc (2×50 mL) and washed with water. The combined organic extracts were washed with brine, dried over sodium sulphate and concentrated under reduced pressure. The crude residue was purified by flash column chromatography (Column: 12 g silica; Solvent run: 40-50% EtOAc in n-hexane) to give a diastereomeric mixture of tert-butyl (2S,5R)-4-(3-(tert-butylamino)-1-(4-fluorophenyl)-3-oxopropyl)-2,5-dimethylpiperazine-1-carboxylate (250 mg, 62% yield). LCMS: m/z, 436.2 (M+H); rt 3.61 min. (LC-MS Method info: Column-Kinetex-XB-C18 (75×3 mm-2.6 μm); M. phase A: 10 mM ammonium formate in water:acetonitrile (98:2); M. phase B: 10 mM ammonium formate in water:acetonitrile (2:98); Gradient: 20-100% B over 4 minutes, flow rate 1.0 mL/min, then a 0.6 minute hold at 100% B flow rate 1.5 mL/min; then Gradient: 100-20% B over 0.1 minutes, flow rate 1.5 mL/min).

Intermediate 13: N-(tert-butyl)-3-((2R,5S)-2,5-dimethylpiperazin-1-yl)-3-(4-fluorophenyl)propanamide

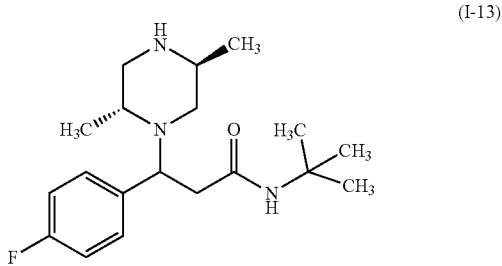 [SMILES: C[C@@H]1CN[C@@H](C)CN1C(CC(=O)NC(C)(C)C)c1ccc(F)cc1]

(I-13)

To a stirred solution of tert-butyl (2S,5R)-4-(3-(tert-butylamino)-1-(4-fluorophenyl)-3-oxopropyl)-2,5-dimethylpiperazine-1-carboxylate (0.2 g, 0.46 mmol) in DCM (5 mL) were added 2,6-lutidine (0.32 mL, 2.75 mmol) and TMS-OTf (0.58 mL, 3.21 mmol) at 0° C. The reaction mixture was allowed to reach room temperature and stirred for 2 h. The reaction mixture was concentrated under reduced pressure and co-distilled with acetonitrile (2×10 mL) to afford the diastereomeric mixture of N-(tert-butyl)-3-((2R,5S)-2,5-dimethylpiperazin-1-yl)-3-(4-fluorophenyl)propanamide (150 mg, 97%) as brown solid. LCMS: m/z, 336.2 (M+H); rt 0.95 and 1.05 min. (LCMS Method: Column: Waters Acquity UPLC BEH C18 (2.1×50 mm) 1.7 μm, Mobile phase A: 10 mM NH$_4$OAc:acetonitrile (95:5); Mobile phase B: 10 mM NH$_4$OAc:acetonitrile (5:95), Gradient=20-100% B over 2 minute, then a 0.3 minute hold at 100% B; Temperature: 50° C.; Flow rate: 0.7 mL/min; Detection: UV at 220 nm).

Examples 33 and 34

N-(tert-butyl)-3-((2R,5S)-4-(6-cyano-1-methyl-2-oxo-1,2-dihydro-1,5-naphthyridin-4-yl)-2,5-dimethylpiperazin-1-yl)-3-(4-fluorophenyl)propanamide

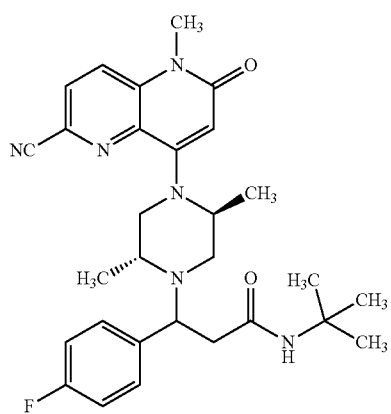

(33-34)

To a stirred solution of N-(tert-butyl)-3-((2R,5S)-2,5-dimethylpiperazin-1-yl)-3-(4-fluorophenyl)propanamide (0.10 g, 0.30 mmol) in acetonitrile (2 mL) were added sodium bicarbonate (0.13 g, 1.50 mmol) and 6-cyano-1-methyl-2-oxo-1,2-dihydro-1,5-naphthyridin-4-yl trifluoromethanesulfonate (0.1 g, 0.30 mmol) at room temperature. The reaction mixture was heated at 80° C. for 12 h. The reaction mixture was cooled to room temperature and the solvent was removed under reduced pressure to obtain the diastereomeric mixture of product. The crude mixture was purified by prep-HPLC (Chiral Separation Method: Column: Cellulose-4 (250×4.6) mm, 5 micron, Mobile Phase A: 0.1% DEA in ACN, Mobile Phase B: 0.1% DEA in MeOH, Gradient: 0-100% of B over 12 minutes) to obtain Peak-1 and Peak-2.

Example 33: LCMS: m/z, 519.3 (M+H); rt 1.92 min; Column: XBridge BEH XP C18 (2.1×50 mm), 2.5 μm; Mobile phase A: 10 mM ammonium acetate:acetonitrile (95:5), Mobile phase B: 10 mM ammonium acetate:acetonitrile (5:95), Gradient=0-100% B over 3 minutes; Temperature: 50° C.; Flow rate: 1.1 mL/min; Detection: UV at 220 nm. $^1$H NMR (400 MHz, DMSO-$d_6$) δ ppm 8.15 (d, J=8.8 Hz, 1H), 8.05-8.09 (m, 1H), 7.36 (dd, J=8.6, 5.9 Hz, 2H), 7.22 (s, 1H), 7.12 (t, J=8.8 Hz, 2H), 6.03 (s, 1H), 4.23-4.34 (m, 1H), 3.87-3.95 (m, 1H), 3.62-3.70 (m, 1H), 3.48-3.55 (m, 4H), 3.38-3.45 (m, 1H), 2.62-2.75 (m, 2H), 2.27-2.35 (m, 1H), 2.08-2.17 (m, 1H), 1.15 (d, J=6.4 Hz, 3H), 1.02-1.08 (m, 12H).

Example 34: LCMS: m/z, 519.2 (M+H); rt 1.89 min; Column: XBridge BEH XP C18 (2.1×50 mm), 2.5 μm; Mobile phase A: 10 mM ammonium acetate:acetonitrile (95:5), Mobile phase B: 10 mM ammonium acetate:acetonitrile (5:95), Gradient=0-100% B over 3 minutes; Temperature: 50° C.; Flow rate: 1.1 mL/min; Detection: UV at 220 nm $^1$H NMR (400 MHz, DMSO-$d_6$) δ ppm 8.14 (d, J=8.8 Hz, 1H), 8.04-8.08 (m, 1H), 7.33-7.40 (m, 3H), 7.16 (t, J=8.8 Hz, 2H), 6.03 (s, 1H), 4.31-4.53 (m, 1H), 4.04-4.15 (m, 1H), 3.52 (s, 3H), 3.38-3.43 (m, 2H), 2.98-3.11 (m, 1H), 2.68-2.81 (m, 2H), 2.42-2.47 (m, 1H), 2.13-2.27 (m, 1H), 1.17 (d, J=6.4 Hz, 3H), 1.09 (s, 9H), 1.03 (d, J=6.1 Hz, 3H).

The examples in the table 35 were prepared according to the general procedure in Examples 33 and 34, substituting 2-methylpropan-2-amine with the appropriate amines in the synthetic sequence. When the reaction provided a mixture of diastereomers, the mixture was separated at the final stage using either preparative chromatography or preparative chiral chromatography. The absolute stereochemistry was not assigned at the newly formed carbon-nitrogen bond.

TABLE 2

| Ex. No. | Structure | LCMS Method | LCMS RT | M + H | Stereo. chem. |
|---|---|---|---|---|---|
| 35 | ![structure] | A | 1.73 | 505.2 | H |

TABLE 2-continued

| Ex. No. | Structure | LCMS Method | LCMS RT | M + H | Stereo. chem. |
|---|---|---|---|---|---|
| 36 | | A | 1.73 | 505.2 | H |
| 37 | | A | 1.47 | 463.2 | H |
| 38 | | A | 1.45 | 463.2 | H |

TABLE 2-continued

| Ex. No. | Structure | LCMS Method | LCMS RT | M + H | Stereo. chem. |
|---|---|---|---|---|---|
| 39 | | A | 1.53 | 477.2 | H |
| 40 | | A | 1.53 | 477.2 | H |
| 41 | | A | 1.91 | 519.3 | H |

TABLE 2-continued

| Ex. No. | Structure | LCMS Method | LCMS RT | M + H | Stereo. chem. |
|---|---|---|---|---|---|
| 42 | | A | 1.94 | 519.3 | H |

Intermediate 14

2-((2R,5S)-4-(6-cyano-1-methyl-2-oxo-1,2-dihydro-1,5-naphthyridin-4-yl)-2,5-dimethylpiperazin-1-yl)propanoic acid

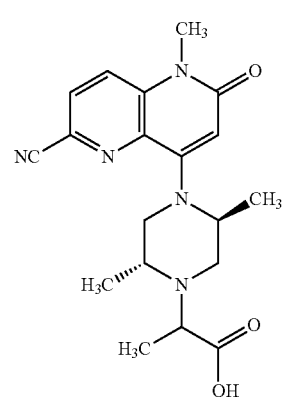

(I-14)

To a solution of 2-bromopropanoic acid (0.77 g, 5.04 mmol) in dry acetonitrile (3.0 mL), 8-((2S,5R)-2,5-dimethylpiperazin-1-yl)-5-methyl-6-oxo-5,6-dihydro-1,5-naphthyridine-2-carbonitrile (1.0 g, 3.36 mmol) and DIPEA (0.59 mL, 3.36 mmol) were added at room temperature. The reaction mixture was stirred for 10 minutes at room temperature and then heated to 85° C. and stirred for 16 h. The reaction mixture was cooled to room temperature and concentrated under reduced pressure to give 2-((2R,5S)-4-(6-cyano-1-methyl-2-oxo-1,2-dihydro-1,5-naphthyridin-4-yl)-2,5-dimethylpiperazin-1-yl)propanoic acid (1.20 g, 58% yield) as a brown gummy liquid. LCMS: m/z, 370.3 (M+H); rt 0.60 min. LCMS Method: Column: Waters Acquity UPLC BEH C18 (2.1×50 mm) 1.7 μm, Mobile phase A: 10 mM ammonium acetate:acetonitrile (95:5); Mobile phase B: 10 mM ammonium acetate:acetonitrile (5:95), Gradient=20-100% B over 2 minute, then a 0.2 minute hold at 100% B; Temperature: 50° C.; Flow rate: 0.7 mL/min; Detection: UV at 220 nm.

Examples 43 and 44

2-((2R,5S)-4-(6-cyano-1-methyl-2-oxo-1,2-dihydro-1,5-naphthyridin-4-yl)-2,5-dimethylpiperazin-1-yl)-N-cyclopentylpropanamide

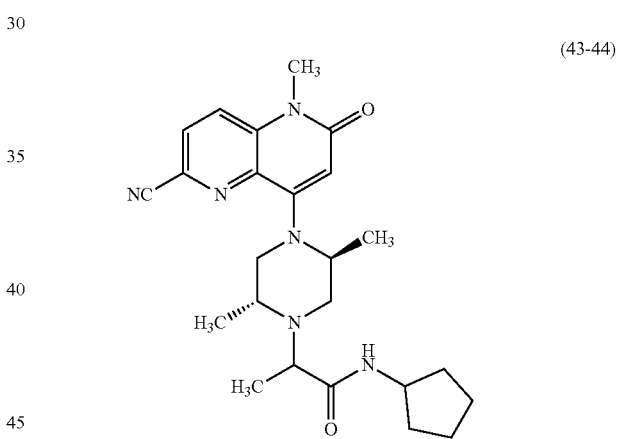

(43-44)

To a solution 2-((2R,5S)-4-(6-cyano-1-methyl-2-oxo-1,2-dihydro-1,5-naphthyridin-4-yl)-2,5-dimethylpiperazin-1-yl) propanoic acid (0.05 g, 0.14 mmol) in DMF (2 mL) were added HATU (0.15 g, 0.41 mmol) and DIPEA (0.07 mL, 0.41 mmol) at room temperature. The reaction mixture was stirred for 5 minutes followed by the addition of cyclopentanamine (0.023 g, 0.27 mmol). The mixture was stirred at room temperature for 3 h. The reaction was quenched with saturated NaHCO₃ solution (5 mL). The reaction mixture was dissolved in DCM (100 mL). The organic layer washed with water (20 mL), brine (20 mL), dried over anhydrous sodium sulfate, filtered and evaporated under reduced pressure. The crude product was purified via preparative HPLC followed by chiral HPLC. (Chiral Separation Method: Column: Cellulose-2 (250×4.6 mm), 5 μm; Mobile Phase: 10 mM ammonium acetate in MeOH, Flow: 2.0 mL/min) to afford Examples 43 and 44.

Example 43 (9.3 mg, 16% yield); LCMS: m/z 437.2 (M+H); rt 1.61 min; (LCMS method: Column: XBridge BEH XP C18 (50×2.1 mm) 2.5 μm; Mobile Phase A: 5:95 acetonitrile:water with 10 mM NH₄OAc; Mobile Phase B: 95:5 acetonitrile:water with 10 mM NH₄OAc; Gradient: 0-100% B over 3 minutes; Flow: 1.1 mL/min; Temp: 50° C.; ¹H NMR (400 MHz, DMSO-d₆) δ ppm 8.17-8.15 (m, 1H), 8.08-8.06 (m, 1H), 7.42 (d, J=7.8 Hz, 1H), 6.06 (s, 1H), 4.43 (br d, J=1.7 Hz, 1H), 4.03-4.00 (m, 1H), 3.58-3.56 (m, 1H), 3.50 (s, 3H), 3.48-3.40 (m, 1H), 3.35-3.20 (m, 1H), 3.10-3.04 (m, 2H), 1.94-1.73 (m, 3H), 1.70-1.50 (m, 4H), 1.49-1.35 (m, 2H), 1.18 (t, J=6.1 Hz, 6H), 1.05 (d, J=6.6 Hz, 3H).

Example 44 (7.1 mg, 12% yield); LCMS: m/z, 437.2 (M+H); rt 1.6 min; (LCMS method: Column: XBridge BEH XP C18 (2.1×50 mm), 2.5 µm; Mobile phase A: 10 mM ammonium acetate:acetonitrile (95:5), Mobile phase B: 10 mM ammonium acetate:acetonitrile (5:95), Gradient=0-100% B over 3 minutes; Temperature: 50° C.; Flow rate: 1.1 mL/min; Detection: UV at 220 nm; ¹H NMR (400 MHz, DMSO-d₆) δ ppm 8.17-8.15 (m, 1H), 8.09-8.06 (m, 1H), 7.67 (d, J=7.8 Hz, 1H), 6.06 (s, 1H), 4.43 (br d, J=1.7 Hz, 1H), 4.03-4.00 (m, 1H), 3.58-3.56 (m, 1H), 3.50 (s, 3H), 3.48-3.40 (m, 1H), 3.35-3.20 (m, 1H), 3.10-3.04 (m, 2H), 1.94-1.73 (m, 3H), 1.70-1.50 (m, 4H), 1.49-1.35 (m, 2H), 1.18 (t, J=6.1 Hz, 6H), 1.05 (d, J=6.6 Hz, 3H).

The compounds in Table 2 were prepared from the acid intermediate using corresponding amine as described for Example 42 and 43. When the reaction provided a mixture of diastereomers, the mixture was separated at the final stage using either preparative chromatography or preparative chiral chromatography. The absolute stereochemistry was not assigned at the newly formed carbon-nitrogen bond.

TABLE 3

| Ex. No. | Structure | LCMS Method | LCMS RT | M + H | Stereo. chem. |
|---|---|---|---|---|---|
| 45 | | A | 1.28 | 449.2 | H |
| 46 | | A | 1.28 | 449.2 | H |
| 47 | | A | 1.34 | 409.2 | H |

TABLE 3-continued

| Ex. No. | Structure | LCMS Method | LCMS RT | M + H | Stereo. chem. |
|---|---|---|---|---|---|
| 48 | 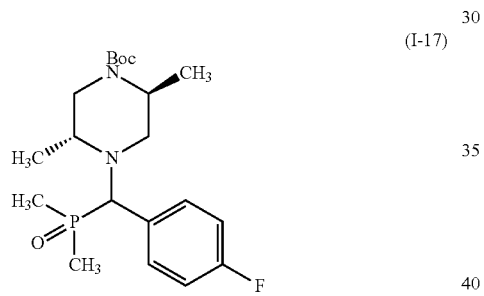 | A | 1.34 | 409.2 | H |

Intermediate 17 tert-butyl (2S,5R)-4-((dimethylphosphoryl)(4-fluorophenyl)methyl)-2,5-dimethylpiperazine-1-carboxylate (I-17)

To a solution of tert-butyl (2S,5R)-2,5-dimethylpiperazine-1-carboxylate (700 mg, 3.27 mmol) in dry toluene (15 mL) was added 4-fluorobenzaldehyde (486 mg, 3.92 mmol) at room temperature. The reaction mixture was stirred at the same temperature for 1 h, followed by addition of dimethylphosphine oxide (306 mg, 3.92 mmol). The reaction mixture was fitted with a Dean Stark apparatus and was heated to reflux for 16 h. The reaction mixture was cooled to room temperature and was concentrated under reduced pressure. The crude was triturated with diethyl ether (2×20 mL) to afford the crude compound. The crude compound was purified by 12 g silica gel chromatography by using 0-10% MeOH/CHCl$_3$ as eluent to obtain tert-butyl (2S,5R)-4-((dimethylphosphoryl)(4-fluorophenyl)methyl)-2,5-dimethylpiperazine-1-carboxylate (1.1 g, 85% yield). LCMS: m/z, 399.5 (M+H); rt 1.52 and 1.57 min; LCMS Method: Column: Waters Acquity UPLC BEH C18 (2.1×50 mm) 1.7 μm, Mobile phase A: 10 mM ammonium acetate:acetonitrile (95:5); Mobile phase B: 10 mM ammonium acetate:acetonitrile (5:95), Gradient=20-100% B over 2 minute, then a 0.3 minute hold at 100% B; Flow rate: 0.7 mL/min; Detection: UV at 220 nm.

Intermediate 18

(((2R,5S)-2,5-dimethylpiperazin-1-yl)(4-fluorophenyl)methyl)dimethylphosphine oxide

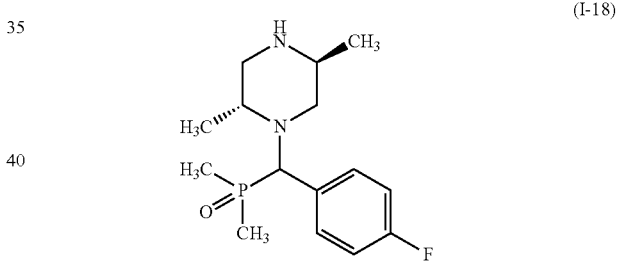

(I-18)

To a stirred solution of tert-butyl (2S,5R)-4-((dimethylphosphoryl)(4-fluorophenyl)methyl)-2,5-dimethylpiperazine-1-carboxylate (200 mg, 0.5 mmol) in DCM (3 mL) was added TFA (0.387 mL, 5.02 mmol). The reaction mixture was stirred at room temperature for 2 h. The solvent was removed under reduced pressure to yield the TFA salt of (((2R,5S)-2,5-dimethylpiperazin-1-yl)(4-fluorophenyl)methyl)dimethylphosphine oxide as a brown semi-solid. LCMS: m/z, 299.0 (M+H); rt 0.51 and 0.53 min.; LCMS Method: Column: Waters Acquity UPLC BEH C18 (2.1×50 mm) 1.7 μm, Mobile phase A: 10 mM ammonium acetate:acetonitrile (95:5); Mobile phase B: 10 mM ammonium acetate:acetonitrile (5:95), Gradient=20-100% B over 2 minute, then a 0.3 minute hold at 100% B; Flow rate: 0.7 mL/min; Detection: UV at 220 nm.

Examples 49 and 50

8-((2S,5R)-4-((dimethylphosphoryl)(4-fluorophenyl)methyl)-2,5-dimethylpiperazin-1-yl)-5-methyl-6-oxo-5,6-dihydro-1,5-naphthyridine-2-carbonitrile

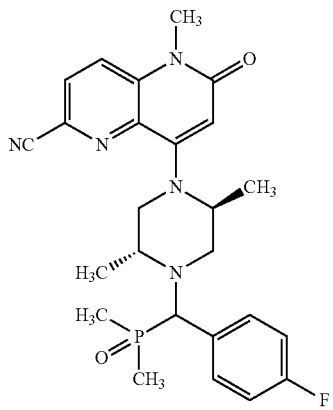

(49-50)

To a solution of (((2R,5S)-2,5-dimethylpiperazin-1-yl)(4-fluorophenyl)methyl)dimethylphosphine oxide (59.1 mg, 0.2 mmol) in dry acetonitrile (3 mL), 6-cyano-1-methyl-2-oxo-1,2-dihydro-1,5-naphthyridin-4-yl trifluoromethanesulfonate (60 mg, 0.18 mmol), sodium bicarbonate (45.4 mg, 0.54 mmol) were added at room temperature under argon atmosphere and stirred for 10 minutes at the same temperature. The reaction mixture was heated to 85° C. and maintained for 16 h at the same temperature. The reaction mixture was cooled to room temperature and concentrated under reduced pressure. The crude was purified on a 12 g silica gel column chromatography by eluting with 10% MeOH in DCM. The fractions were concentrated under reduced pressure to yield 8-((2S,5R)-4-((dimethylphosphoryl)(4-fluorophenyl)methyl)-2,5-dimethylpiperazin-1-yl)-5-methyl-6-oxo-5,6-dihydro-1,5-naphthyridine-2-carbonitrile. The crude material was further purified via preparative HPLC followed by chiral HPLC (Chiral HPLC Method: Column: Cellulose 4 (250 mm×21.2 mm) 5 μm, Mobile phase A: 0.1% DEA in acetonitrile, Mobile phase B: 0.1% DEA in MeOH; Gradient=0-100% B over 12 minute, then 100-0% B over 2 minute and 6 minute hold at 0% B) to afford Examples 51 and 52.

Example 49 (7 mg, 8% yield); LCMS: m/z, 482.1 (M+H); rt 1.48 min; (LCMS method: Column: XBridge BEH XP C18 (50×2.1 mm) 2.5 μm; Mobile phase A: 95% Water: 5% acetonitrile; 10 mM ammonium acetate; Mobile phase B: 5% Water: 95% acetonitrile; 10 mM ammonium acetate; Flow: 1.1 mL/min; Temp: 50° C.; Time (min): 0-3; % B: 0-100/6); $^1$H NMR (400 MHz, DMSO-$d_6$) δ ppm 8.18-8.11 (m, 1H), 8.10-8.03 (m, 1H), 7.61 (dd, J=6.0, 7.9 Hz, 2H), 7.28 (t, J=8.8 Hz, 2H), 6.18 (s, 1H), 4.14 (d, J=12.2 Hz, 1H), 4.08-3.95 (m, 1H), 3.69-3.57 (m, 2H), 3.54 (s, 3H), 3.15-3.02 (m, 1H), 2.78-2.69 (m, 1H), 2.55 (s, 1H), 1.46 (d, J=12.7 Hz, 3H), 1.23 (d, J=12.7 Hz, 3H), 1.07 (dd, J=6.1, 14.2 Hz, 6H).

Examples 50 (15 mg, 16% yield); LCMS: m/z, 482.1 (M+H); rt 1.47 min; (LCMS method: Column: XBridge BEH XP C18 (50×2.1 mm) 2.5 μm; Mobile phase A: 95% Water: 5% acetonitrile; 10 mM ammonium acetate; Mobile phase B: 5% Water: 95% acetonitrile; 10 mM ammonium acetate; Flow: 1.1 mL/min; Temp: 50° C.; Time (min): 0-3; % B: 0-100/6); $^1$H NMR (400 MHz, DMSO-$d_6$) δ ppm 8.17-8.11 (m, 1H), 8.08-8.02 (m, 1H), 7.63-7.50 (m, 2H), 7.23 (t, J=8.8 Hz, 2H), 6.01 (s, 1H), 4.67-4.50 (m, 1H), 4.13 (d, J=10.8 Hz, 1H), 3.67-3.47 (m, 4H), 3.26 (br s, 1H), 3.09-3.02 (m, 1H), 3.00-2.91 (m, 1H), 2.58-2.54 (m, 1H), 1.52 (d, J=12.5 Hz, 3H), 1.26 (d, J=6.4 Hz, 3H), 1.13-0.96 (m, 6H).

Intermediate 36

Ethyl 2-bromo-2-(4-(trifluoromethyl)phenyl)acetate

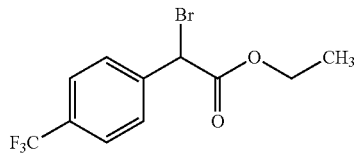

(I-36)

To a stirred solution of ethyl 2-(4-(trifluoromethyl)phenyl)acetate (2 g, 8.61 mmol) in CCl$_4$ (50 mL) were added NBS (1.84 g, 10.34 mmol) and HBr (0.1 mL, 0.86 mmol). The reaction mixture was heated at reflux for 16 h. The reaction mixture was cooled to room temperature and the obtained solid was filtered and the filtrate was washed with water the organic layer was dried over anhydrous Na$_2$SO$_4$, filtered and evaporated under reduced pressure to afford ethyl 2-bromo-2-(4-(trifluoromethyl)phenyl)acetate (2.3 g, 7.32 mmol, 85% yield) as a liquid. LCMS: m/z=309 (M−H); rt 3.19 min. (LCMS Method: Column: Kinetex XB-C18 (75×3 mm-2.6 μm) Mobile phase A: 10 mM ammonium formate:acetonitrile (98:2); Mobile phase B: 10 mM ammonium acetate:acetonitrile (2:98), Gradient=20% B over 4 minute, then a 0.6 minute hold at 100% B; Flow rate: 1.0 mL/min; Detection: UV at 220 nm).

Example 51

Ethyl 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetate

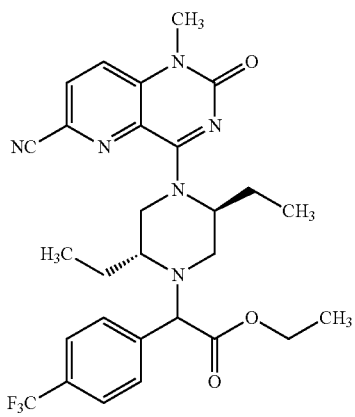

(51)

To a stirred solution of 4-((2S,5R)-2,5-diethylpiperazin-1-yl)-1-methyl-2-oxo-1,2-dihydropyrido[3,2-d]pyrimidine- 6-carbonitrile, HCl (0.5 g, 1.38 mmol) in acetonitrile (15 mL) was added DIPEA (0.722 mL, 4.13 mmol), followed by ethyl 2-bromo-2-(4-(trifluoromethyl)phenyl)acetate (0.857 g, 2.76 mmol). The reaction mixture was heated at 85° C. for 16 h. The reaction mixture was concentrated under reduced pressure to remove the volatiles and to afford the crude compound. The crude residue was purified via silica gel chromatography on ISCO® (50-70% EtOAc/petroleum ether; 40 g column) to afford ethyl 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetate (0.5 g, 0.862 mmol, 62.6% yield) as a light brown solid. LCMS: m/z=557.2 (M+H); rt 3.411 min. (LCMS Method: Column: Kinetex XB-C18 (75×3 mm-2.6 μm) Mobile phase A: 10 mM ammonium formate:acetonitrile (98:2); Mobile phase B: 10 mM ammonium acetate:acetonitrile (2:98), Gradient=20% B over 2 minute, then a 0.6 minute hold at 100% B; Flow rate: 1.0 mL/min; Detection: UV at 220 nm).

Example 52

2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetic acid

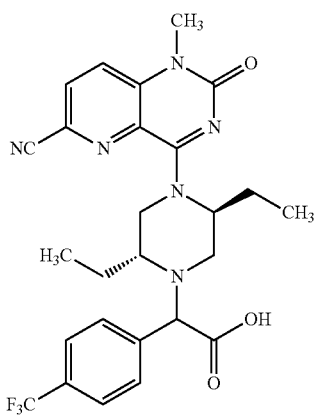

(52)

To a stirred solution of ethyl 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetate (500 mg, 0.898 mmol) in 1,4-dioxane (10 mL) was added trimethylstannanol (1624 mg, 8.98 mmol). The reaction mixture was heated at 100° C. for 16 h. The reaction mixture was filtered through celite pad, washed with ethyl acetate and the filtrate was removed under reduced pressure to yield the crude product, which was purified by preparative HPLC (HPLC Method: Column: ACE C18 PFP (250 mm×21.2 mm ID, 5 μm), Mobile Phase A: A=10 mM ammonium acetate pH 4.5 in water; Mobile Phase B: acetonitrile:MeOH (1:1) acetonitrile; Gradient: 80% B over 2 minutes, then a 16 minute hold at 100% B; Flow: 19 mL/min). The fraction was concentrated under reduced pressure and the residue was diluted with (EtOH/H₂O, 1:5) and lyophilized to yield 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetic acid (150 mg, 31.6% yield). LCMS: m/z=529.2 (M+H); rt 1.602 min. (LCMS Method: Column: Kinetex XB-C18 (75×3 mm-2.6 μm) Mobile phase A: 10 mM ammonium formate:acetonitrile (98:2); Mobile phase B: 10 mM ammonium acetate:acetonitrile (2:98), Gradient=20% B over 2 minute, then a 0.6 minute hold at 100% B; Flow rate: 1.0 mL/min; Detection: UV at 220 nm).

Examples 53 and 54

4-((2S,5R)-2,5-diethyl-4-(2-morpholino-2-oxo-1-(4-(trifluoromethyl)phenyl)ethyl)piperazin-1-yl)-1-methyl-2-oxo-1,2-dihydropyrido[3,2-d]pyrimidine-6-carbonitrile

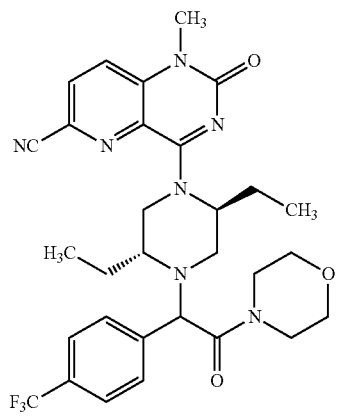 [SMILES: CC[C@H]1CN(C(C(=O)N2CCOCC2)c2ccc(C(F)(F)F)cc2)[C@H](CC)CN1c1nc(=O)n(C)c2ccc(C)nc12]

(53-54)

To a stirred solution of 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetic acid (50 mg, 0.095 mmol) in DMF (2 mL) were added TEA (0.04 mL, 0.28 mmol) and HATU (71.9 mg, 0.189 mmol). The reaction mixture was stirred at room temperature for 5 min, then morpholine (8.24 mg, 0.095 mmol) was added. The reaction mixture was stirred at the same temperature for 16 h. The reaction mixture was concentrated under reduced pressure to remove the volatiles and to yield the crude compound. The crude compound was purified by preparative HPLC (HPLC Method: Column: ACE C18 PFP (250 mm×21.2 mm ID, 5 μm), Mobile Phase A: A=10 mM ammonium acetate pH 4.5 in water; Mobile Phase B: Acetonitrile: MeOH (1:1) acetonitrile; Gradient: 80% B over 2 minutes, then a 16 minute hold at 100% B; Flow: 19 mL/min) to yield Examples 53 and 54.

Example 53 was dried via centrifugal evaporation (4.7 mg, 8.2% yield). LCMS: m/z=598.3 (M+H); rt 1.847 min; ((LCMS Method: Column: XBridge BEH XP C18 (50×2.1) mm, 2.5 μm; Mobile phase A: 95% Water: 5% acetonitrile; 10 mM NH₄OAC; Mobile phase B: 5% Water: 95% acetonitrile; 10 mM NH₄OAc; Flow: 1.1 mL/min; Temp: 50° C.; Time (min)). ¹H NMR (400 MHz, DMSO-d₆) δ 8.30-8.13 (m, 1H), 8.06-7.91 (m, 1H), 7.86-7.66 (m, 4H), 6.07-5.58 (m, 1H), 5.58-5.17 (m, 1H), 5.07-4.64 (m, 1H), 4.02-3.86 (m, 1H), 3.70-3.55 (m, 3H), 3.54-3.45 (m, 4H), 3.43 (s, 3H), 3.09-2.89 (m, 1H), 2.65-2.55 (m, 1H), 2.10-1.67 (m, 2H), 1.56-1.34 (m, 2H), 1.00-0.80 (m, 3H), 0.68 (t, J=7.3 Hz, 3H) (2 protons merged with DMSO peak).

Example 54 was dried via centrifugal evaporation (7.4 mg, 13% yield). LCMS: m/z=598.3 (M+H); rt 1.885 min; ((LCMS Method: Column: XBridge BEH XP C18 (50×2.1) mm, 2.5 μm; Mobile phase A: 95% Water: 5% acetonitrile; 10 mM NH₄OAc; Mobile phase B: 5% Water: 95% Acetoni- 7trile; 10 mM NH₄OAC; Flow: 1.1 mL/min; Temp: 50° C.; Time (min)). ¹H NMR (400 MHz, DMSO-d₆) δ 8.23 (d, J=8.8 Hz, 1H), 7.98 (d, J=8.6 Hz, 1H), 7.76 (s, 4H), 5.89-5.31 (m, 1H), 5.01 (s, 1H), 4.95-4.81 (m, 1H), 3.81-3.71 (m, 1H), 3.57-3.35 (m, 9H), 3.30-3.14 (m, 2H), 3.01-2.87 (m, 1H), 2.73-2.61 (m, 1H), 2.45-2.35 (m, 1H), 2.21-1.89 (m, 1H), 1.85-1.71 (m, 1H), 1.55-1.33 (m, 2H), 0.89-0.77 (m, 3H), 0.76-0.55 (m, 3H).

The examples in the Table 6 were prepared according to the general procedure described in the preparation of Examples 54 and 55, using the appropriate amines in the synthetic sequence. When the reaction provided a mixture of diastereomers, the mixture was separated at the final stage using either preparative chromatography or preparative chiral chromatography. The absolute stereochemistry was not assigned at the newly formed carbon-nitrogen bond Intermediate 45

3-(3-(but-3-yn-1-yl)-3H-diazirin-3-yl)propan-1-ol

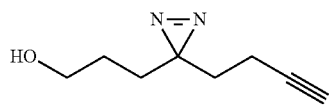

(I-45)

To a −10° C. solution of 3-(3-(but-3-yn-1-yl)-3H-diazirin-3-yl)propanoic acid (0.53 g, 3.17 mmol) (synthesized from 4-oxooct-7-ynoic acid according to literature procedure: Parker, C. G. et al, Cell, 168(3), 527-541, 2017) in THF (10

TABLE 6

| Ex. No. | Structure | LCMS Method | LCMS RT | M + H | Stereo. chem. |
|---|---|---|---|---|---|
| 55 | [structure] | A | 1.81 | 586.3 | H |
| 56 | [structure] | A | 1.82 | 586.3 | H | mL) was added N-methylmorpholine (0.53 mL, 4.75 mmol), followed by isobutyl chloroformate (0.55 mL, 4.11 mmol). The reaction mixture was stirred at −5° C. for ~10 min., followed by the addition of NaBH$_4$ (0.305 g, 7.91 mmol). The resultant mixture was stirred at room temperature for 16 h. The reaction was quenched with water. The reaction mixture was extracted with EtOAc (2×25 mL). The combined organic layer was washed with brine, dried, over anhydrous MgSO$_4$, filtered and the filtrate evaporated to give a pale yellow oil, which was purified by silica gel column chromatography (24 g RediSep® column, eluting with a gradient of 0 to 50% hexanes in EtOAc). Fractions containing the product were combined and evaporated to afford 3-(3-(but-3-yn-1-yl)-3H-diazirin-3-yl)propan-1-ol as a pale yellow oil (0.37 g, 77% yield). $^1$H NMR (500 MHz, CHLOROFORM-d) δ 3.65-3.57 (m, 2H), 2.07-1.97 (m, 3H), 1.69-1.62 (m, 2H), 1.58-1.47 (m, 3H), 1.44-1.34 (m, 2H).

Example 57

3-(3-(but-3-yn-1-yl)-3H-diazirin-3-yl)propyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate

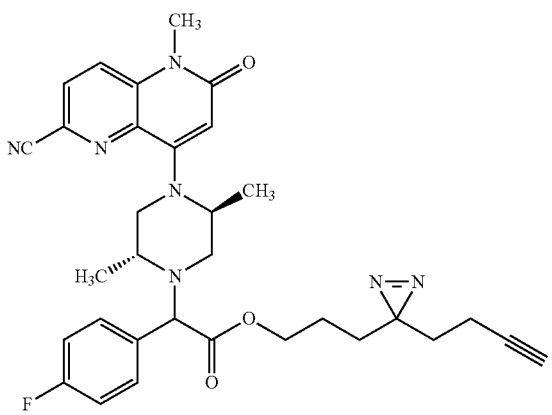

(57)

To a solution of 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetic acid (0.045 g, 0.1 mmol) in DCM (2 mL) were added DCC (0.041 g, 0.2 mmol) and DMAP (3 mg, 0.02 mmol). The reaction mixture was stirred at room temperature for 10 min., followed by the addition of a solution of 3-(3-(but-3-yn-1-yl)-3H-diazirin-3-yl)propan-1-ol (0.030 g, 0.2 mmol) in DCM (~0.5 mL). The resultant mixture was continued stirring at room temperature for 1 h and then the volatiles were evaporated under reduced pressure to afford a residue that was dissolved in DMF and purified by preparative HPLC with the following conditions: Column: XBridge C18, 200 mm×19 mm, 5 μm particles; Mobile Phase A: 5:95 acetonitrile:water with 10 mM ammonium acetate; Mobile Phase B: 95:5 acetonitrile:water with 10 mM ammonium acetate; Gradient: a 0 minute hold at 43% B, 43-83% B over 20 minutes, then a 6-minute hold at 100% B; Flow Rate: 20 mL/min; Column Temperature: 25° C. Fractions containing the product were combined and dried under vacuum to afford 3-(3-(but-3-yn-1-yl)-3H-diazirin-3-yl)propyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate. MS (ES), m/z=584.4 [M+H]$^+$; HPLC Ret. Time 2.37 min. and 2.09 min. (HPLC Methods B and C, respectively); $^1$H NMR (500 MHz, DMSO-d$_6$) δ ppm 8.18-8.11 (m, 1H), 8.10-8.02 (m, 1H), 7.63-7.52 (m, 2H), 7.29-7.17 (m, 2H), 6.04 (s, 1H), 4.46-4.34 (m, 2H), 4.11-3.95 (m, 2H), 3.75-3.63 (m, 1H), 3.61-3.49 (m, 2H), 2.83-2.72 (m, 2H), 2.54 (s, 3H), 2.14-2.05 (m, 1H), 2.00-1.92 (m, 2H), 1.57-1.47 (m, 2H), 1.42-1.31 (m, 4H), 1.23-1.10 (m, 6H).

Intermediate 46

Methyl 2-(4-methoxyphenyl)acetate

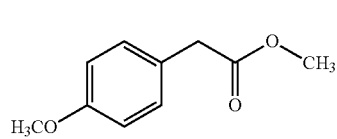

(I-46)

To a 0° C. suspension of NaH (0.590 g, 14.74 mmol) (60% in mineral oil) in THF (15 mL) was added dropwise, a solution of methyl 2-(4-hydroxyphenyl)acetate (2.5 g, 14.74 mmol) in THF (5 mL). The reaction mixture was stirred at 0° C. for 90 min., followed by the addition of a solution of MeI (2.95 mL, 47.2 mmol) in THF (5 mL). The resultant mixture was stirred at room temperature for 16 h. The reaction was quenched with saturate aqueous NH$_4$Cl and brine. The solution was diluted with EtOAc and the two layers were separated. The aqueous layer was back-extracted with EtOAc (2×25 mL). The combined organic layer was washed with brine, dried over anhydrous MgSO$_4$, filtered and the filtrate evaporated under reduced pressure to give an oil. The crude oil was purified by silica gel column chromatography (80 g RediSep® column, eluting with 35% hexanes in EtOAc). Fractions containing the product were evaporated to afford methyl 2-(4-methoxyphenyl)acetate as a colorless oil (2.39 g, 90% yield). MS (ES), m/z=181.0 [M+H]$^+$; HPLC Ret. Time 0.84 min. (HPLC Method C).

Example 58

Methyl 2-((2R,5S)-4-(6-cyano-1-methyl-2-oxo-1,2-dihydropyrido[3,2-d]pyrimidin-4-yl)-2,5-dimethylpiperazin-1-yl)-2-(4-methoxyphenyl)acetate

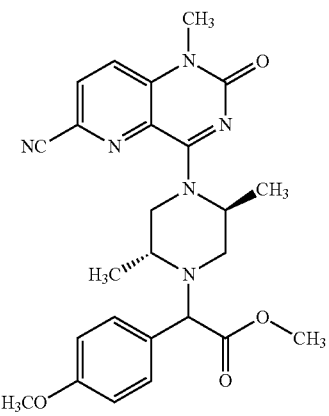

(58)

Methyl 2-((2R,5S)-4-(6-cyano-1-methyl-2-oxo-1,2-dihydropyrido[3,2-d]pyrimidin-4-yl)-2,5-dimethylpiperazin-1-yl)-2-(4-methoxyphenyl)acetate was obtained as a diastereomeric mixture using the general experimental conditions described in the synthesis of methyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate, by reacting methyl 2-bromo-2-(4-methoxyphenyl)acetate (Intermediate 48, synthesized according to the literature procedure: Okano, K. et al, *Angewandte Chemie, International Ed.*, 49(34), 5925-5929, 2010) with 4-((2S,5R)-2,5-dimethylpiperazin-1-yl)-1-methyl-2-oxo-1,2-dihydropyrido[3,2-d]pyrimidine-6-carbonitrile (Intermediate 49). MS (ES), m/z=477.4 [M+H]$^+$; HPLC ret. Time 0.73 min. (Diastereomer 1) and 0.76 min. (Diastereomer 2) (HPLC Method C).

Example 59

2-((2R,5S)-4-(6-cyano-1-methyl-2-oxo-1,2-dihydropyrido[3,2-d]pyrimidin-4-yl)-2,5-dimethylpiperazin-1-yl)-2-(4-methoxyphenyl)acetic acid

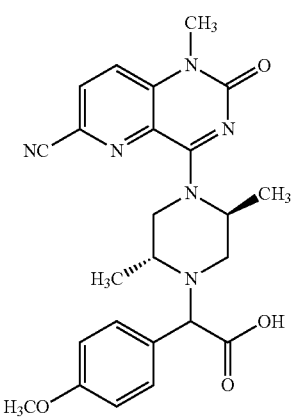

(59)

2-((2R,5S)-4-(6-cyano-1-methyl-2-oxo-1,2-dihydropyrido[3,2-d]pyrimidin-4-yl)-2,5-dimethylpiperazin-1-yl)-2-(4-methoxyphenyl)acetic acid was obtained as a diastereomeric mixture using the experimental conditions analogous to 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetic acid, by reacting methyl 2-((2R,5S)-4-(6-cyano-1-methyl-2-oxo-1,2-dihydropyrido[3,2-d]pyrimidin-4-yl)-2,5-dimethylpiperazin-1-yl)-2-(4-methoxyphenyl)acetate with trimethylstannanol. MS (ES), m/z=463.2 [M+H]$^+$; HPLC ret. Time 0.62 min. (Diastereomers 1 and 2) (HPLC Method C).

Examples 60 and 61

3-(3-(but-3-yn-1-yl)-3H-diazirin-3-yl)propyl 2-((2R, 5S)-4-(6-cyano-1-methyl-2-oxo-1,2-dihydropyrido[3,2-d]pyrimidin-4-yl)-2,5-dimethylpiperazin-1-yl)-2-(4-methoxyphenyl)acetate

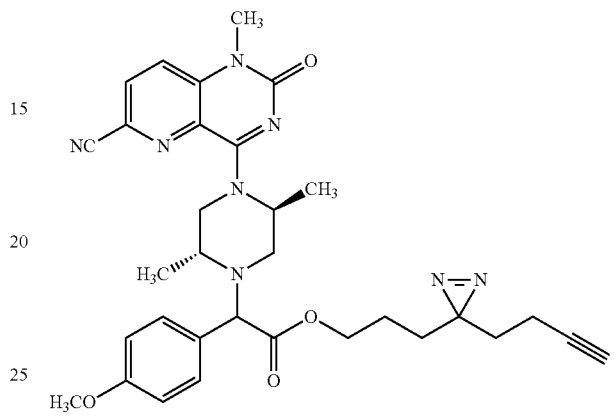

(60-61)

3-(3-(But-3-yn-1-yl)-3H-diazirin-3-yl)propyl 2-((2R,5S)-4-(6-cyano-1-methyl-2-oxo-1,2-dihydropyrido[3,2-d]pyrimidin-4-yl)-2,5-dimethylpiperazin-1-yl)-2-(4-methoxyphenyl)acetate was synthesized according to the general procedure described in Example 57, by coupling the diastereomeric mixture of 2-((2R,5S)-4-(6-cyano-1-methyl-2-oxo-1,2-dihydropyrido[3,2-d]pyrimidin-4-yl)-2,5-dimethylpiperazin-1-yl)-2-(4-methoxyphenyl)acetic acid with 3-(3-(but-3-yn-1-yl)-3H-diazirin-3-yl)propan-1-ol. MS (ES), m/z=597.4 [M+H]$^+$; HPLC ret. Time 0.87 min. (Diastereomer 1) and 0.91 min. (Diastereomer 2) (HPLC Method C). The crude material was purified via preparative LC/MS with the following conditions: Column: XBridge C18, 200 mm×19 mm, 5 µm particles; Mobile Phase A: 5:95 acetonitrile:water with 0.05% trifluoroacetic acid; Mobile Phase B: 95:5 acetonitrile:water with 0.05% trifluoroacetic acid; Gradient: a 0 minute hold at 20% B, 20-70% B over 25 minutes, then a 0 minute hold at 100% B; Flow Rate: 20 mL/min; Column Temperature: 25° C. Fractions containing the product were combined and evaporated to afford Examples 60 and 61.

Example 60: (6.4 mg, 8.1% yield). MS (ES), m/z=597.2 [M+H]$^+$; HPLC ret. Time 2.21 min. and 1.91 min. (HPLC Methods D and E, respectively); $^1$H NMR (500 MHz, DMSO-d$_6$) δ 8.32-8.17 (m, 1H), 8.05-7.96 (m, 1H), 7.49-7.35 (m, 2H), 7.03-6.91 (m, 2H), 5.73-5.46 (m, 1H), 5.02-4.77 (m, 1H), 4.28-4.18 (m, 1H), 4.12-3.92 (m, 2H), 3.84-3.74 (m, 3H), 2.88-2.78 (m, 1H), 2.65-2.46 (m, 6H), 2.32-2.14 (m, 1H), 2.02-1.91 (m, 2H), 1.58-1.48 (m, 2H), 1.44-1.20 (m, 7H), 1.16-0.98 (m, 3H).

Example 61: (5.5 mg, 6.9% yield). MS (ES), m/z=597.2 [M+H]$^+$; HPLC ret. Time 2.29 min. and 1.85 min. (HPLC Methods D and E, respectively); $^1$H NMR (500 MHz, DMSO-d$_6$) δ ppm 8.29-8.15 (m, 1H), 8.04-7.91 (m, 1H), 7.54-7.37 (m, 2H), 7.04-6.91 (m, 2H), 5.75-5.37 (m, 1H), 5.14-4.58 (m, 1H), 4.23-4.13 (m, 1H), 4.09-3.90 (m, 2H), 3.84-3.72 (m, 3H), 3.84-3.72 (m, 2H), 3.53-3.40 (m, 1H), 3.00-2.86 (m, 2H), 2.85-2.77 (m, 1H), 2.60-2.54 (m, 2H), 2.50-2.41 (m, 1H), 2.02-1.89 (m, 2H), 1.64-1.38 (m, 5H), 1.37-1.27 (m, 3H), 0.96-0.78 (m, 3H).

Intermediate 52

2-(3-methyl-3H-diazirin-3-yl)ethan-1-ol

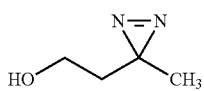

(I-52)

2-(3-methyl-3H-diazirin-3-yl)ethan-1-ol was synthesized according to Wang et al, *Angewandte Chemie, International Edition*, 56(3), 870-873, 2017).

Example 62

2-(3-methyl-3H-diazirin-3-yl)ethyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate

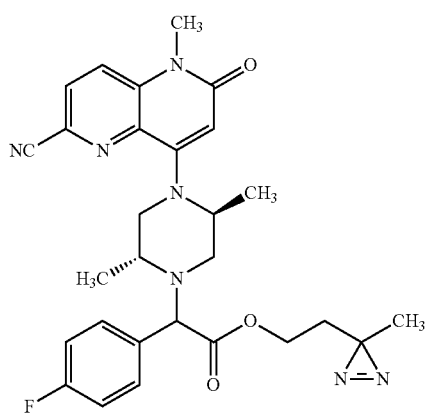

(62)

2-(3-methyl-3H-diazirin-3-yl)ethyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate was synthesized according to the general procedure described in the preparation of 3-(3-(but-3-yn-1-yl)-3H-diazirin-3-yl) propyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate), by coupling 2-(3-methyl-3H-diazirin-3-yl)ethan-1-ol with 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetic acid. MS (ES), m/z=532.4 [M+H]+; HPLC Ret. Time 2.28 min. and 1.96 min. (HPLC Methods B and C, respectively); $^1$H NMR (500 MHz, DMSO-$d_6$) δ 8.19-8.11 (m, 1H), 8.08-8.02 (m, 1H), 7.67-7.55 (m, 2H), 7.29-7.16 (m, 2H), 6.08-6.01 (m, 1H), 4.46-4.35 (m, 2H), 4.09-3.92 (m, 2H), 3.73-3.36 (m, 6H), 2.81-2.71 (m, 1H), 2.58-2.53 (m, 3H), 2.14-2.05 (m, 1H), 1.68-1.56 (m, 2H), 1.26-1.19 (m, 3H), 1.17-1.10 (m, 3H).

Intermediate 53

2,5-dioxopyrrolidin-1-yl 3',6'-dihydroxy-3-oxo-3H-spiro[isobenzofuran-1,9'-xanthene]-5-carboxylate

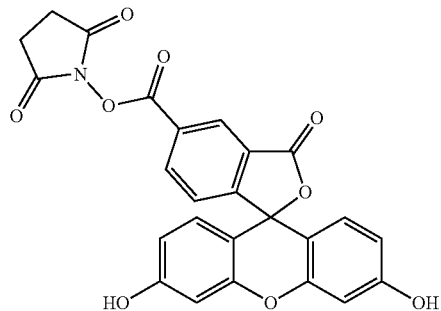

(I-53)

To a solution of 3',6'-dihydroxy-3-oxo-3H-spiro[isobenzofuran-1,9'-xanthene]-5-carboxylic acid (0.05 g, 0.133 mmol) in DMF (1 mL) was added EDC (0.032 g, 0.166 mmol), followed by 1-hydroxypyrrolidine-2,5-dione (0.02 g, 0.173 mmol). The reaction mixture was stirred at room temperature for 1 h. The reaction mixture was diluted with EtOAc and the organic layer was washed with phosphate buffer (pH=7.4). The organic layer was separated and the aqueous wash was back-extracted with EtOAc (2×5 mL). The combined organic layer was washed with brine, dried over anhydrous MgSO$_4$, filtered and the filtrate evaporated under reduced pressure to afford crude 2,5-dioxopyrrolidin-1-yl 3',6'-dihydroxy-3-oxo-3H-spiro[isobenzofuran-1,9'-xanthene]-5-carboxylate as an orange oil that later solidified (0.056 g, 89% yield). MS (ES), m/z=474.0 [M+H]+; HPLC Ret. Time 1.48 min. (HPLC Method C).

Example 63 tert-butyl (2-(2-(2-(2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetamido)ethoxy)ethoxy)ethyl) carbamate

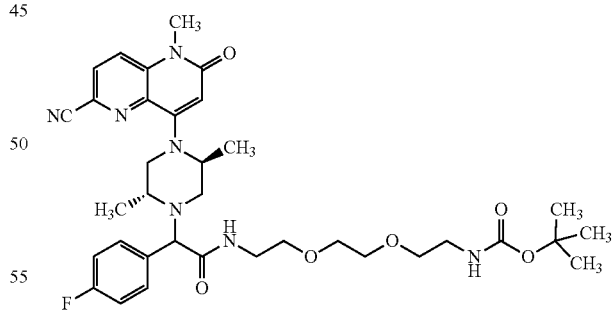

(63)

A solution of 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetic acid (0.065 g, 0.145 mmol), tert-butyl (2-(2-(2-aminoethoxy)ethoxy)ethyl)carbamate (0.044 g, 0.174 mmol), HATU (0.066 g, 0.174 mmol) and DIPEA (0.05 mL, 0.289 mmol) in DMF (1.5 mL) was stirred at room temperature for 45 min. The reaction mixture was diluted with water and extracted with a solution of 5% MeOH in DCM (3×5 mL). The combined organic layer was washed with water, brine, dried, over anhydrous MgSO$_4$, filtered and the filtrate evaporated under reduced pressure to afford a yellow oil. The crude product was purified by silica gel chromatography (12 g RediSep® column, eluting with a gradient of 0-5% MeOH in DCM). Fractions containing the product were combined and evaporated to afford tert-butyl (2-(2-(2-(2-((2R,5S)-4-(6-cyano-1-methyl-2-oxo-1,2-dihydro-1,5-naphthyridin-4-yl)-2,5-dimethylpiperazin-1-yl)-2-(4-fluorophenyl) acetamido)ethoxy)ethoxy)ethyl)carbamate as a brown oil (0.067 g, 68% yield). MS (ES), m/z=680.3 [M+H]⁺; HPLC Ret. Time 0.81 min. (HPLC method C).

Example 64

N-(2-(2-(2-aminoethoxy)ethoxy)ethyl)-2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetamide To a solution of tert-butyl (2-(2-(2-(2-((2R,5S)-4-(6-cyano-1-methyl-2-oxo-1,2-dihydro-1,5-naphthyridin-4-yl)-2,5-dimethylpiperazin-1-yl)-2-(4-fluorophenyl) acetamido)ethoxy)ethoxy)ethyl)carbamate (0.067 g, 0.099 mmol) in DCM (1 mL) was added TFA (0.09 mL, 1.183 mmol). The reaction mixture was stirred at room temperature for 1 h. The volatiles were evaporated under reduced pressure to afford N-(2-(2-(2-aminoethoxy)ethoxy)ethyl)-2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetamide as a TFA salt (0.067 g, >99% yield). MS (ES), m/z=580.3 [M+H]⁺; HPLC Ret. Time 0.63 min. (HPLC method C).

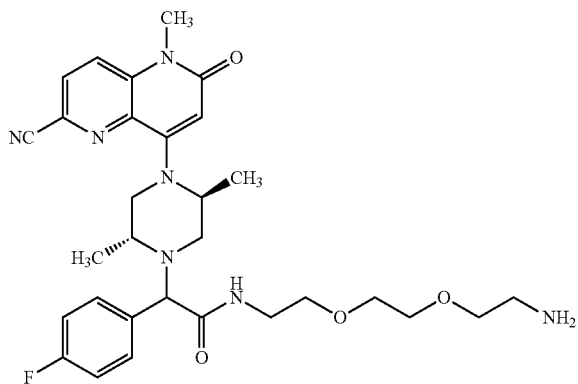

(64) TFA

Example 65

N-(2-(2-(2-(2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetamido)ethoxy)ethoxy)ethyl)-3',6'-dihydroxy-3-oxo-3H-spiro[isobenzofuran-1,9'-xanthene]-5-carboxamide

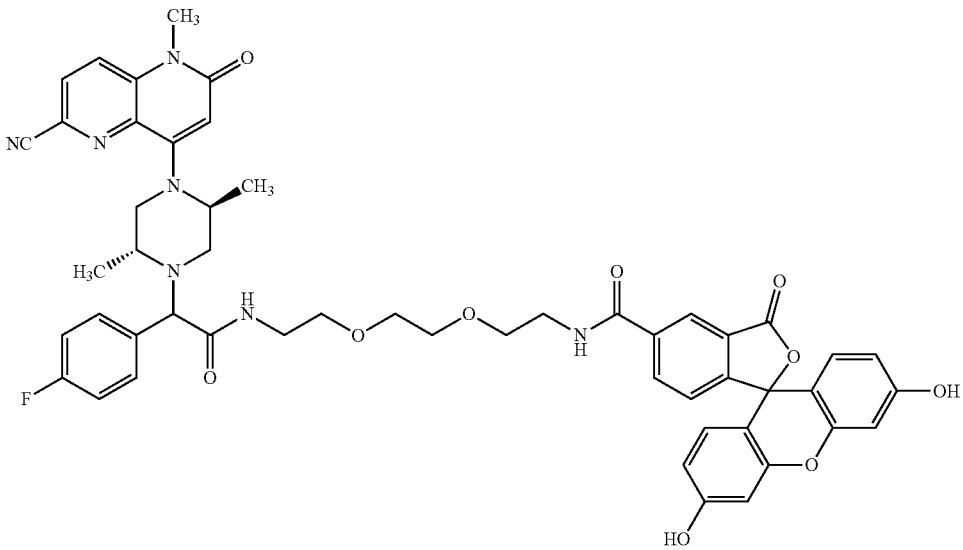

(65)

To a solution of N-(2-(2-(2-aminoethoxy)ethoxy)ethyl)-2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetamide, TFA (0.068 g, 0.098 mmol) in DMF (1 mL) was added DIPEA (0.09 mL, 0.490 mmol) followed by 2,5-dioxopyrrolidin-1-yl 3',6'-dihydroxy-3-oxo-3H-spiro[isobenzofuran-1,9'-xanthene]-5-carboxylate (0.056 g, 0.118 mmol). The reaction mixture was stirred at room temperature for 1 h. The mixture was diluted with DMF and purified by preparative HPLC with the following conditions: Column: XBridge C18, 200 mm×19 mm, 5 µm particles; Mobile Phase A: 5:95 acetonitrile:water with ammonium acetate; Mobile Phase B: 95:5 acetonitrile:water with ammonium acetate; Gradient: a 0 minute hold at 12% B, 12-52% B over 30 minutes, then a 0 minute hold at 100% B; Flow Rate: 20 mL/min; Column Temperature: 25° C. Fractions containing the product were combined and dried under vacuum to afford N-(2-(2-(2-(2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetamido)ethoxy)ethoxy)ethyl)-3',6'-dihydroxy-3-oxo-3H-spiro[isobenzofuran-1,9'-xanthene]-5-carboxamide). MS (ES), m/z=938.1 [M+H]$^+$; HPLC Ret. Time 1.42 min. and 1.41 min. (HPLC Methods B and C, respectively).

Example 66

2,2-dimethyl-4-oxo-3,8,11-trioxa-5-azatridecan-13-yl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (66)

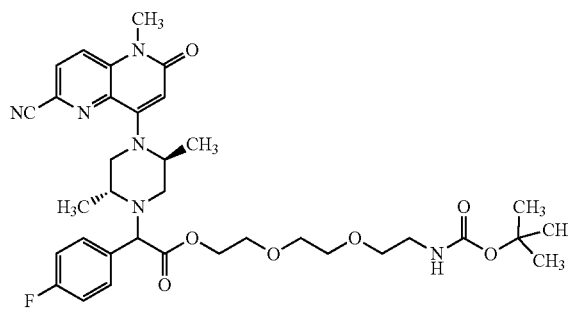

To a solution of 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetic acid (0.07 g, 0.156 mmol) in DCM (1 mL) were added DCC (0.039 g, 0.187 mmol) and DMAP (1.9 mg, 0.016 mmol). The reaction mixture was stirred at room temperature for ~15 min., followed by the addition of tert-butyl (2-(2-(2-hydroxyethoxy)ethoxy)ethyl)carbamate (0.049 g, 0.187 mmol). The mixture was stirred at room temperature for 1 h. and then diluted with water and DCM. The two layers were separated and the aqueous layer was back-extracted with DCM (2×5 mL). The combined organic layer was washed with brine, dried over anhydrous MgSO$_4$, filtered and the filtrate evaporated under reduced pressure to afford 2,2-dimethyl-4-oxo-3,8,11-trioxa-5-azatridecan-13-yl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate as a pale yellow solid (0.1 g, 94% yield). MS (ES), m/z=681.3 [M+H]$^+$; HPLC Ret. Time 0.88 min. (HPLC method C).

Example 67

2-(2-(2-aminoethoxy)ethoxy)ethyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate, TFA (67)

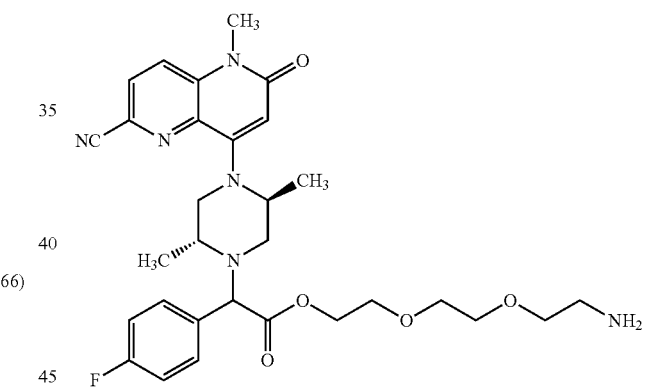

To a solution of 2,2-dimethyl-4-oxo-3,8,11-trioxa-5-azatridecan-13-yl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (0.1 g, 0.147 mmol) in DCM (1.5 mL) was added TFA (0.12 mL, 1.47 mmol). The reaction mixture was continued stirring at room temperature for 1 h. The volatiles were evaporated under reduced pressure to afford crude 2-(2-(2-aminoethoxy)ethoxy)ethyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate as a TFA salt (0.099 g, >99% yield). MS (ES), m/z=581.3 [M+H]$^+$; HPLC Ret. Time 0.69 min. (HPLC method C).

Example 68

2-(2-(2-(3',6'-dihydroxy-3-oxo-3H-spiro[isobenzofuran-1,9'-xanthene]-5-carboxamido)ethoxy)ethoxy)ethyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate

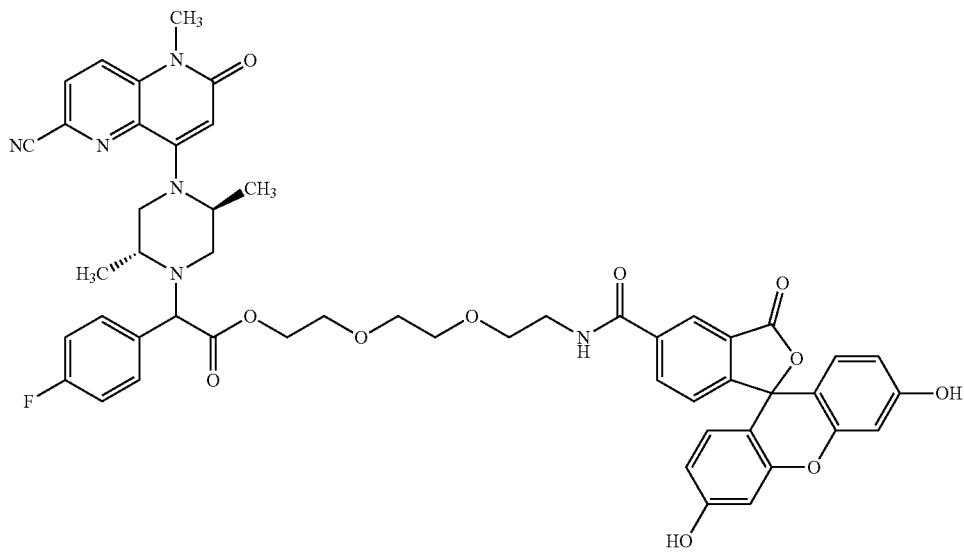

(68)

2-(2-(2-(3',6'-dihydroxy-3-oxo-3H-spiro[isobenzofuran-1,9'-xanthene]-5-carboxamido)ethoxy)ethoxy)ethyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl) acetate was synthesized according to the general synthesis procedure described in the preparation of N-(2-(2-(2-(2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetamido)ethoxy)ethoxy)ethyl)-3',6'-dihydroxy-3-oxo-3H-spiro[isobenzofuran-1,9'-xanthene]-5-carboxamide, by reacting 2-(2-(2-aminoethoxy)ethoxy)ethyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate, TFA with 2,5-dioxopyrrolidin-1-yl 3',6'-dihydroxy-3-oxo-3H-spiro[isobenzofuran-1,9'-xanthene]-5-carboxylate. MS (ES), m/z=939.2 [M+H]$^+$; HPLC Ret. Time 1.722 min. and 1.675 min. (HPLC Methods B and C, respectively). Additional LCMS Conditions:

Method FA: Column: Kinetex XB-C18 (75×3.0) mm, 2.6 μm, Mobile Phase A: 5 mm, Ammonium formate pH 3.3: ACN (98:2), Mobile Phase B: ACN:Buffer (98:2), Flow Rate: 1.0 mL/min. Detection: UV at 220 nm.

Method FB: Column: Kinetex Biphenyl (100×4.6) mm, 2.6 μm, Mobile phase A: 0.05% TFA in water:ACN (95:5), Mobile phase B: ACN: 0.05% TFA in water (95:5), Flow: 1.0 mL/min. Detection: UV at 220 nm.

Method FC: Column: Kinetex EVO C18 (100×4.6) mm, 2.6 μm, Mobile phase A: 0.05% TFA in water:ACN (95:5), Mobile phase B: ACN: 0.05% TFA in water (95:5), Flow: 1.0 mL/min. Detection: UV at 220 nm.

Method FD: Column: XBridge C8 (50×4.6 mm) 5 μm, Mobile phase A: 0.1% TFA in H$_2$O, Mobile phase B: 0.1% TFA in ACN, Flow Rate: 1.5 mL/min. Detection: UV at 220 nm.

Method FE: Column: XBridge C8 (50×4.6 mm), 3.5 μm, Mobile phase: A: 10 mm NH$_4$HCO$_3$ in H$_2$O, Mobile phase: B: ACN, Flow Rate: 1.5 mL/min. Detection: UV at 220 nm.

Method FF: Column: XBridge C8 (50×4.6 mm) 5 μm, Mobile phase: A: 10 mm Ammonium Acetate in H$_2$O, Mobile phase: B: ACN, Flow Rate: 1.5 mL/min. Detection: UV at 220 nm.

Method FG: Column: X-Bridge C8 (50×4.6 mm), 3.5 μm, Mobile phase B: 10 mM Ammonium Bicarbonate in water, Mobile phase A: Acetonitrile, Flow: 1.0 mL/min.

Method FH: Column: Kinetex Biphenyl (100×4.6) mm, 2.6 μm, Mobile phase A: 10 mM Ammonium acetate in water, Mobile phase B: Acetonitrile, Flow: 1.0 mL/min.

Method FI: Column: Kinetex EVO C18 (100×4.6) mm, 2.6 μm, Mobile phase: A: 10 mM ammonium acetate, Mobile phase B: ACN, Flow: 1.0 mL/min.

Examples 69 and 70

Ethyl 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetate

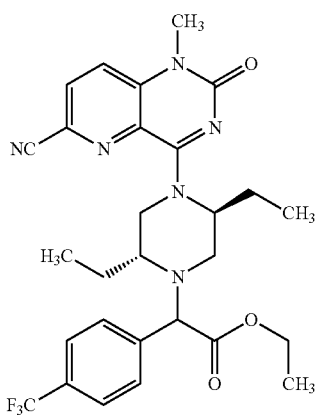

(69-70)

To a stirred solution of 4-((2S,5R)-2,5-diethylpiperazin-1-yl)-1-methyl-2-oxo-1,2-dihydropyrido[3,2-d]pyrimidine-6-carbonitrile, HCl (0.3 g, 0.83 mmol) in acetonitrile (10 mL) was added DIPEA (0.4 mL, 2.48 mmol), followed by ethyl 2-bromo-2-(4-(trifluoromethyl)phenyl)acetate (0.514 g, 1.65 mmol) and sodium iodide (0.124 g, 0.83 mmol) and the reaction mixture was heated at 85° C. for 16 h. The reaction mixture was cooled to room temperature and filtered through Celite pad, washed with ethyl acetate and the filtrate was evaporated under reduced pressure to obtain crude compound, which was purified by silica gel column chromatography (80 g silica gel, eluted with 60-70% ethyl acetate/Pet ether) to obtain ethyl 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetate (130 mg, 28% yield). The product was further purified by preparative HPLC (HPLC method: Column: Sunfire C18 (150×19 mm ID, 5 μm); Mobile phase A=0.1% TFA in water; Mobile phase B=Acetonitrile; Flow 19 mL/min; Gradient: Time: 0.01-22.0; % of B Conc.: 10-75) to provide Example 69 and Example 70.

Example 69: LCMS: m/z=557.2 (M+H); Ret. Time: 2.34 min; ((LCMS Method: Column: XBridge BEH XP C18 (50×2.1) mm, 2.5 μm; Mobile phase A: 95% Water: 5% Acetonitrile; 10 mM NH$_4$OAc; Mobile phase B: 5% Water: 95% Acetonitrile; 10 mM NH$_4$OAc; Flow: 1.1 mL/min; Temp: 50° C.; Time (min). $^1$H NMR (400 MHz, DMSO-d$_6$) δ 8.22 (s, 1H), 7.99 (d, J=9.0 Hz, 1H), 7.85-7.67 (m, 4H), 5.91-5.37 (m, 1H), 4.90-4.92 (m, 1H), 4.54 (s, 1H), 4.19-3.97 (m, 2H), 3.44 (s, 3H), 3.24-2.80 (m, 2H), 2.32-2.38 (m, 2H), 2.11-1.72 (m, 2H), 1.55-1.29 (m, 2H), 1.18-1.11 (m, 3H), 0.97-0.80 (m, 3H), 0.72-0.45 (m, 3H).

Example 70; LCMS: m/z=557.2 (M+H); Ret. Time: 2.34 min; (LCMS Method: Column: XBridge BEH XP C18 (50×2.1) mm, 2.5 μm; Mobile phase A: 95% Water: 5% Acetonitrile; 10 mM NH$_4$OAc; Mobile phase B: 5% Water: 95% Acetonitrile; 10 mM NH$_4$OAc; Flow: 1.1 mL/min; Temp: 50° C.). $^1$H NMR (400 MHz, DMSO-d$_6$) δ 8.32-8.14 (m, 1H), 7.98-8.02 (m, 1H), 7.77-7.75 (m, 4H), 6.06-5.33 (m, 1H), 5.05-4.78 (m, 1H), 4.60-4.48 (m, 1H), 4.24-4.13 (m, 1H), 4.13-4.00 (m, 1H), 3.41-3.46 (m, 4H), 3.04-2.87 (m, 1H), 2.64-2.54 (m, 1H), 2.30-1.71 (m, 3H), 1.66-1.43 (m, 2H), 1.16 (t, J=7.0 Hz, 3H), 0.99-0.79 (m, 3H), 0.68 (t, J=7.5 Hz, 3H).

Examples 71 and 72

2-((2R,5S)-4-(6-Cyano-1-methyl-2-oxo-1,2-dihydropyrido[3,2-d]pyrimidin-4-yl)-2,5-diethylpiperazin-1-yl)-2-(4-(trifluoromethyl)phenyl)acetic acid

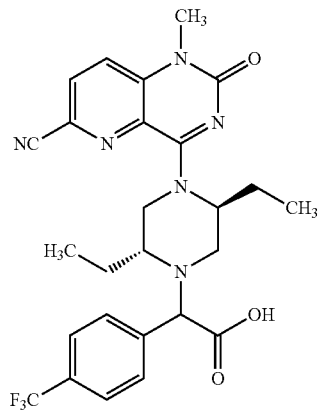 [SMILES: CC[C@H]1CN(C(C(=O)NC#N)c2ccc(C(F)(F)F)cc2)[C@H](CC)CN1c1nc(=O)n(C)c2ccc(C#N)nc12]

(71-72)

To a stirred solution of ethyl 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetate (60 mg, 0.11 mmol) in 1,4-dioxane (10 mL) was added trimethylstannanol (100 mg, 0.55 mmol) and the reaction mixture was heated at 100° C. for 16 h. The reaction mixture was cooled to room temperature and filtered through Celite pad, washed with ethyl acetate and the filtrate was evaporated under reduced pressure to obtain the crude compound, which was purified by preparative HPLC (HPLC method: Preparative column: C-5; Mobile phase A: 10 mm ammonium acetate in Me-OH; Mobile phase B, Flow: 20 mL/min) to obtain Example 71 and Example 72.

Example 71: (8.3 mg, 15% yield). LCMS: m/z=529.3 (M+H); Ret. Time: 1.41 min; (LCMS Method: Column: XBridge BEH XP C18 (50×2.1) mm, 2.5 μm; Mobile phase A: 95% Water: 5% Acetonitrile; 10 mM NH$_4$OAc; Mobile phase B: 5% Water: 95% Acetonitrile; 10 mM NH$_4$OAc; Flow: 1.1 mL/min; Temp: 50° C.). $^1$H NMR (400 MHz, DMSO-d$_6$) δ 12.85-12.57 (m, 1H), 8.22 (td, J=1.6, 8.8 Hz, 1H), 7.97 (d, J=8.8 Hz, 1H), 7.74-7.70 (m, 4H), 5.86-5.23 (m, 1H), 5.01-4.75 (m, 1H), 4.46-4.17 (m, 1H), 3.43 (s, 3H), 3.19-3.12 (m, 1H), 2.89-2.70 (m, 2H), 2.38-1.78 (m, 3H), 1.48-1.28 (m, 2H), 1.00-0.81 (m, 3H), 0.73-0.47 (m, 3H).

Example 72: (6 mg, 10% yield), LCMS: m/z=529.3 (M+H); Ret. Time: 1.42 min; (LCMS Method: Column: XBridge BEH XP C18 (50×2.1) mm, 2.5 μm; Mobile phase A: 95% Water: 5% Acetonitrile; 10 mM NH$_4$OAc; Mobile phase B: 5% Water: 95% Acetonitrile; 10 mM NH$_4$OAc; Flow: 1.1 mL/min; Temp: 50° C.). $^1$H NMR (400 MHz, DMSO-d$_6$) δ 8.31-8.12 (m, 1H), 8.06-7.89 (m, 1H), 7.81-7.59 (m, 4H), 6.06-5.28 (m, 1H), 5.09-4.73 (m, 1H), 4.41-4.20 (m, 1H), 3.68-3.59 (m, 1H), 3.43 (s, 3H), 3.19-3.11 (m, 1H), 2.51-2.56 (m, 1H), 2.30-1.75 (m, 3H), 1.63-1.40 (m, 2H), 0.99-0.80 (m, 3H), 0.66-0.68 (m, 3H), 0.43-0.17 (m, 1H).

Examples 73 and 74

2-((2R,5S)-4-(6-Cyano-1-methyl-2-oxo-1,2-dihydropyrido[3,2-d]pyrimidin-4-yl)-2,5-diethylpiperazin-1-yl)-N-((1-hydroxycyclopropyl)methyl)-2-(4-(trifluoromethyl)phenyl)acetamide

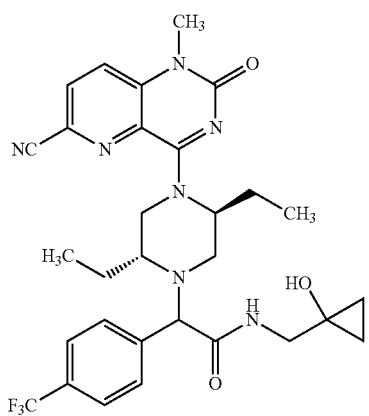
(73-74)

To a stirred solution of 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetic acid (50 mg, 0.1 mmol) in DMF (3 mL) were added HATU (71.9 mg, 0.19 mmol), DIPEA (0.05 mL, 0.28 mmol) and 1-(aminomethyl)cyclopropan-1-ol (12.4 mg, 0.14 mmol) and the reaction mixture was stirred at room temperature for 16 h. The reaction quenched with water (20 mL). The reaction mixture was extracted with ethyl acetate (3×20 mL). The combined organic layer was dried over anhydrous sodium sulfate, filtered and evaporated under reduced pressure to obtain crude product, which was purified by preparative SFC (SFC method: Column/dimensions: Chiralpak IC (250×30) mm, 5 μm % $CO_2$: 75%; Co solvent: 25% of methanol; Total Flow: 100.0 mL/min; Back Pressure: 100 bar; Temperature: 35° C.; UV: 220 nm) to obtain Example 73 and Example 74.

Example 73: LCMS: m/z=598.3 (M+H); Ret. Time: 1.71 min; (LCMS Method: Column: XBridge BEH XP C18 (50×2.1) mm, 2.5 μm; Mobile phase A: 95% Water: 5% Acetonitrile; 10 mM $NH_4OAc$; Mobile phase B: 5% Water: 95% Acetonitrile; 10 mM $NH_4OAc$; Flow: 1.1 mL min; Temp: 50° C.). $^1H$ NMR (400 MHz, DMSO-$d_6$) δ 8.45 (br d, J=4.0 Hz, 1H), 8.31-8.15 (m, 1H), 7.96-8.01 (m, 1H), 7.71-7.77 (m, 4H), 6.06-4.77 (m, 3H), 4.39 (br d, J=7.8 Hz, 1H), 3.44-3.32 (m, 3H), 3.28-3.13 (m, 2H), 3.10-2.95 (m, 1H), 2.61-2.54 (m, 1H), 2.30-1.80 (m, 3H), 1.67-1.42 (m, 2H), 1.04-0.80 (m, 3H), 0.71 (t, J=7.4 Hz, 3H), 0.55-0.33 (m, 4H).

Example 74: LCMS: m/z=598.2 (M+H); Ret. Time: 1.72 min; (LCMS Method: Column: XBridge BEH XP C18 (50×2.1) mm, 2.5 μm; Mobile phase A: 95% Water: 5% Acetonitrile; 10 mM $NH_4OAc$; Mobile phase B: 5% Water: 95% Acetonitrile; 10 mM $NH_4OAc$; Flow: 1.1 mL/min; Temp: 50° C.). $^1H$ NMR (400 MHz, DMSO-$d_6$) δ (400 MHz, DMSO-$d_6$) δ 8.30-8.12 (m, 2H), 7.97-7.80 (m, 1H), 7.77-7.71 (m, 4H), 5.93-4.83 (m, 3H), 4.35 (br s, 1H), 3.56 (br s, 1H), 3.43-3.32 (m, 3H), 3.23-3.17 (m, 3H), 2.87-2.71 (m, 2H), 2.45-2.36 (m, 2H), 2.11-1.91 (m, 2H), 1.80 (s, 3H), 1.48-1.28 (m, 2H), 1.23-1.25 (m, 1H), 0.99-0.32 (m, 4H).

The examples in the Table 1 were prepared according to the general procedure described in the preparation of examples 73 and 74, using the appropriate amines in the synthetic sequence. When the reaction provided a mixture of diastereomers, the mixture was separated at the final stage by preparative HPLC. The absolute stereochemistry was not assigned at the newly formed carbon-nitrogen bond.

TABLE 1

| Ex. No. | Structure | LCMS Method | LCMS RT | M + H | Stereo. chem. |
|---|---|---|---|---|---|
| 75 | | A | 1.85 | 598.3 | H |
| 76 | | A | 1.89 | 598.3 | H |

TABLE 1-continued

| Ex. No. | Structure | LCMS Method | LCMS RT | M + H | Stereo. chem. |
|---|---|---|---|---|---|
| 77 | | A | 1.81 | 586.3 | H |
| 78 | | A | 1.82 | 586.3 | H |
| 79 | | A | 1.74 | 600.3 | H |
| 80 | | A | 1.75 | 600.4 | H |
| 81 | | A | 1.70 | 598.3 | H |
| 82 | | A | 1.74 | 598.3 | H |

TABLE 1-continued

| Ex. No. | Structure | LCMS Method | LCMS RT | M + H | Stereo. chem. |
|---|---|---|---|---|---|
| 83 | | A | 2.24 | 622.4 | H |
| 84 | | A | 2.27 | 622.3 | H |
| 85 | | A | 2.12 | 596.4 | H |
| 86 | | A | 2.16 | 596.4 | H |
| 87 | | A | 1.68 | 598.4 | H |
| 88 | | A | 1.64 | 598.4 | H |

| Ex. No. | Structure | LCMS Method | LCMS RT | M + H | Stereo. chem. |
|---|---|---|---|---|---|
| 89 | 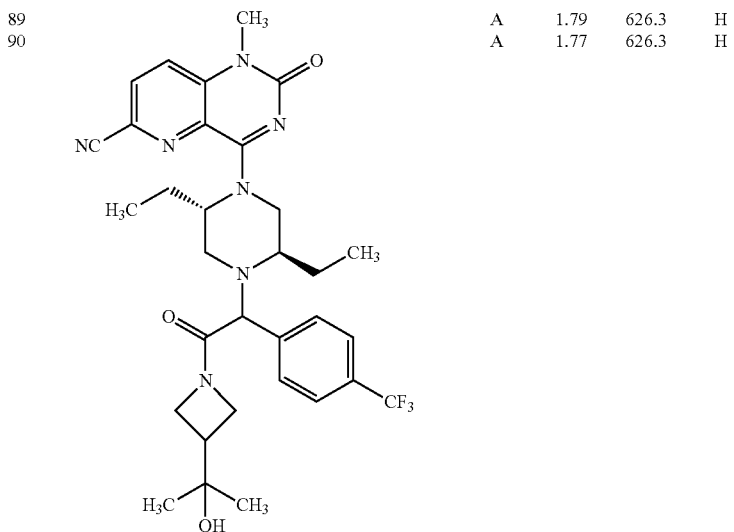 | A | 1.79 | 626.3 | H |
| 90 | | A | 1.77 | 626.3 | H |
| 91 | 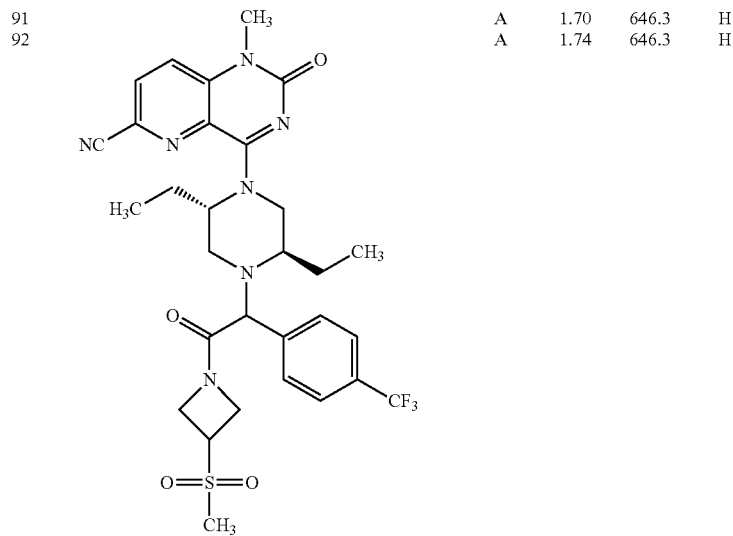 | A | 1.70 | 646.3 | H |
| 92 | | A | 1.74 | 646.3 | H |

TABLE 1-continued

| Ex. No. | Structure | LCMS Method | LCMS RT | M + H | Stereo. chem. |
|---|---|---|---|---|---|
| 93 | | A | 1.73 | 674.3 | H |
| 94 | | A | 1.77 | 674.3 | H |
| 95 | | A | 1.98 | 604.3 | H |
| 96 | | A | 2.01 | 604.3 | H |
| 97 | | A | 1.77 | 646.3 | H |
| 98 | | A | 1.79 | 646.2 | H |

TABLE 1-continued

| Ex. No. | Structure | LCMS Method | LCMS RT | M + H | Stereo. chem. |
|---|---|---|---|---|---|
| 99 | | A | 1.91 | 612.2 | H |
| 100 | | A | 1.88 | 612.3 | H |
| 101 | | A | 1.66 | 598.2 | H |
| 102 | | A | 1.64 | 598.2 | H |
| 103 | | A | 1.80 | 612.2 | H |
| 104 | | A | 1.80 | 612.2 | H |

TABLE 1-continued

| Ex. No. | Structure | LCMS Method | LCMS RT | M + H | Stereo. chem. |
|---|---|---|---|---|---|
| 105 | | A | 1.80 | 612.2 | H |
| 106 | | A | 1.80 | 612.2 | H |
| 107 | | A | 1.67 | 598.2 | H |
| 108 | | A | 1.62 | 598.2 | H |
| 109 | | A | 2.04 | 626.2 | H |
| 110 | | A | 2.06 | 626.3 | H |

TABLE 1-continued

| Ex. No. | Structure | LCMS Method | LCMS RT | M + H | Stereo. chem. |
|---|---|---|---|---|---|
| 111 | | A | 2.05 | 584.2 | H |
| 112 | | A | 2.08 | 584.2 | H |
| 113 | | A | 1.85 | 570.2 | H |
| 114 | | A | 1.87 | 570.2 | H |
| 115 | | A | 1.91 | 600.2 | H |
| 116 | | A | 1.94 | 600.2 | H |

Examples 117 and 118

2-((2R,5S)-4-(6-Cyano-1-methyl-2-oxo-1,2-dihydro-pyrido[3,2-d]pyrimidin-4-yl)-2,5-diethylpiperazin-1-yl)-N-methoxy-2-(4-(trifluoromethyl)phenyl)acetamide

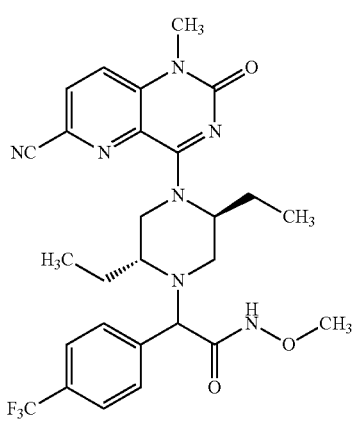
(117-118)

To a stirred solution of 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetic acid (200 mg, 0.378 mmol) in anhydrous DMF were added O-methyl hydroxylamine hydrochloride (37.9 mg, 0.454 mmol) (3 mL), DIPEA (0.13 mL, 0.76 mmol) and HATU (216 mg, 0.568 mmol). The reaction mixture stirred at ambient temperature. After 16 h, the reaction mixture was diluted with ethyl acetate (10 mL), washed with water (2×10 mL), dried over anhydrous sodium sulphate and concentrated under reduced pressure to obtain the crude product, which was purified by preparative HPLC (HPLC method: Column: Luna C18 (250×21) mm, 10 micron; Mobile phase A: 0.1% TFA in water; Mobile phase B: Acetonitrile; Diluent:Acetonitrile:Water (50:50); Gradient: 30% to 70% B from 0 to 15 minutes; Flow: 15 mL/min) to yield Examples 117 and 118.

The fractions of Example 117 was concentrated under reduced pressure, diluted with ACN/$H_2O$ (1:1) and lyophilized to yield 2-((2R,5S)-4-(6-cyano-1-methyl-2-oxo-1,2-dihydropyrido[3,2-d]pyrimidin-4-yl)-2,5-diethylpiperazin-1-yl)-N-methoxy-2-(4-(trifluoromethyl)phenyl) acetamide·TFA (35 mg, 14% yield) as off white solid. LCMS: m/z=558.2 $(M+H)^+$; Ret. Time: 2.56 min (LCMS method: Column: Kinetex XB-C18 (75×3.0) mm, 2.6 µm; Mobile Phase: A: 5 mm Ammonium formate pH 3.3: ACN (98:2); Mobile Phase: B: ACN: Buffer (98:2); Flow Rate: 1.0 mL/min. HPLC Ret. Time 8.75 and 8.22 min (HPLC Method FB and FC respectively). $^1$H NMR (400 MHz, DMSO-$d_6$): δ 11.56 (s, 1H), 8.24 (m, 1H), 8.00 (m, 1H), 7.78 (s, 4H), 5.87-5.40 (m, 1H), 4.96-4.89 (m, 1H), 4.16 (s, 1H), 3.57 (s, 3H), 3.43 (s, 3H), 3.24-3.21 (m, 1H), 2.82 (m, 1H), 2.70 (m, 2H), 2.45-2.30 (m, 2H), 2.15-1.88 (m, 2H), 1.42-1.30 (m, 2H), 0.96-0.87 (m, 3H), 0.68-0.52 (m, 3H).

The fractions of Example 118 was concentrated under reduced pressure, diluted with ACN/$H_2O$ (1:1) and lyophilized to yield 2-((2R,5S)-4-(6-cyano-1-methyl-2-oxo-1,2-dihydropyrido[3,2-d]pyrimidin-4-yl)-2,5-diethylpiperazin-1-yl)-N-methoxy-2-(4-(trifluoromethyl)phenyl) acetamide·TFA (30 mg, 11% yield). LCMS: m/z=558.0 $(M+H)^+$; HPLC Ret. Time: 2.48 min (LCMS method: Column: Kinetex XB-C18 (75×3.0) mm, 2.6 µm; Mobile Phase: A: 5 mm Ammonium formate pH 3.3: ACN (98:2); Mobile Phase: B: ACN: Buffer (98:2); Flow Rate: 1.0 mL/min). HPLC Ret. Time 9.38 and 8.97 min (HPLC Method FB and FC respectively). $^1$H NMR (400 MHz, DMSO-$d_6$): δ 11.76 (s, 1H), 8.29-8.21 (m, 1H), 8.03-7.97 (m, 1H), 7.78-7.72 (m, 4H), 6.04-5.35 (m, 1H), 5.07-4.82 (m, 1H), 4.10 (s, 1H), 3.60 (s, 3H), 3.44 (s, 3H), 3.06-2.98 (m, 1H), 2.6-2.85 (m, 1H), 2.27-2.08 (m, 2H), 1.92-1.83 (m, 2H), 1.53-1.51 (m, 2H), 0.98-0.91 (m, 3H), 0.71-0.69 (m, 3H).

The examples in the Table 2 were prepared according to the general procedure described in the preparation of Examples 117 and 118, using the appropriate amines in the synthetic sequence. When the reaction provided a mixture of diastereomers, the mixture was separated at the final stage by preparative HPLC. The absolute stereochemistry was not assigned at the newly formed carbon-nitrogen bond.

TABLE 2

| Ex. No. | Structure | LCMS Method | LCMS RT | M + H | Stereo. chem. |
|---|---|---|---|---|---|
| 119 | | FA | 1.81 | 553.1 | H |
| 120 | | FA | 2.02 | 553.4 | H |

TABLE 2-continued
| Ex. No. | Structure | LCMS Method | LCMS RT | M + H | Stereo. chem. |
|---|---|---|---|---|---|
| 121 | | FA | 2.67 | 567.0 | H |
| 122 | | FA | 2.656 | 567.0 | H |
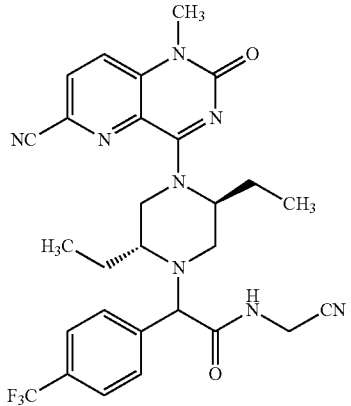
| 123 | | FA | 2.87 | 610.2 | H |
| 124 | | FA | 2.98 | 610.0 | H |
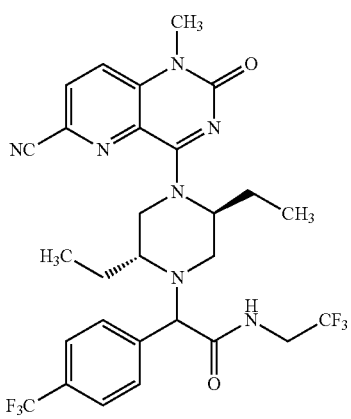 [SMILES: CC[C@H]1CN(C(C(=O)NCC(F)(F)F)c2ccc(C(F)(F)F)cc2)[C@H](CC)CN1c1nc(=O)n(C)c2ccc(C#N)nc12]
| 125 | | FA | 2.44 | 581.3 | H |
| 126 | | FA | 2.43 | 581.4 | H |
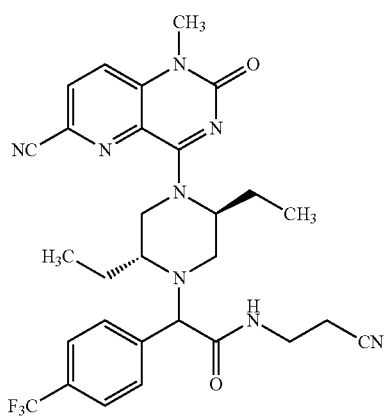 [SMILES: CC[C@H]1CN(C(C(=O)NCCC#N)c2ccc(C(F)(F)F)cc2)[C@H](CC)CN1c1nc(=O)n(C)c2ccc(C#N)nc12]

TABLE 2-continued

| Ex. No. | Structure | LCMS Method | LCMS RT | M + H | Stereo. chem. |
|---|---|---|---|---|---|
| 127 | | FA | 2.30 | 624.2 | H |
| 128 | | FA | 3.03 | 624.2 | H |
| 129 | | FA | 2.49 | 634.0 | H |
| 130 | | FA | 2.52 | 634.0 | H |
| 131 | | FA | 2.56 | 558.2 | H |
| 132 | | FA | 2.48 | 558.0 | H |

Example 133

Ethyl 2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetate

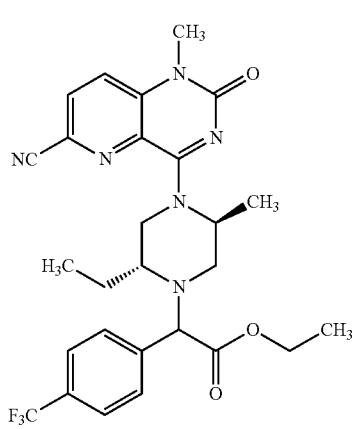

(133)

To a stirred solution of 4-((2S,5R)-5-ethyl-2-methylpiperazin-1-yl)-1-methyl-2-oxo-1,2-dihydropyrido[3,2-d]pyrimidine-6-carbonitrile·TFA (2.00 g, 4.69 mmol) in anhydrous acetonitrile (20 mL) at 0° C. was added DIPEA (1.638 mL, 9.38 mmol), followed by ethyl 2-bromo-2-(4-(trifluoromethyl)phenyl)acetate (1.837 g, 5.63 mmol). The reaction mixture was then heated at 75° C. and the progress of the reaction was monitored by TLC analysis. After 3 h, the volatiles were removed under reduced pressure and the residue thus obtained was diluted with DCM (50 mL), washed with water (2×20 mL), sat. brine solution (20 mL), dried over $Na_2SO_4$, filtered and concentrated under reduced pressure. The crude material thus obtained was purified by flash column chromatography on silica gel (230:400 mesh), eluting with 0-100% EtOAc in pet ether to yield ethyl 2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetate (1.8 g, 67.9% yield) as a brown solid. LCMS: m/z=543.2 (M+H); Ret. Time 3.31 min (LCMS method: Column: Kinetex XB-C18 (75×30) mm, 2.6 µm Mobile Phase: A: 5 mm Ammonium formate pH 3.3: ACN (98:2) Mobile Phase: B: ACN: Buffer (98:2) Flow Rate: 1.0 mL/min).

Example 134

2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetic acid

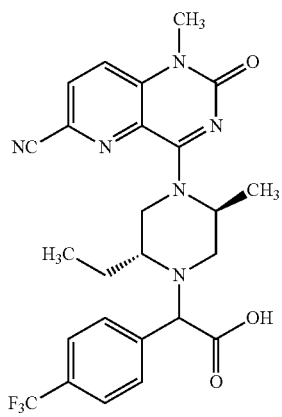

(134)

To a stirred solution of ethyl 2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetate (500 mg, 0.885 mmol) in anhydrous toluene (20 mL) was added trimethylstannanol (1440 mg, 7.96 mmol). The reaction mixture was then heated at 100° C. and the progress of the reaction was monitored by TLC analysis. After 36 h, the reaction mixture was cooled to room temperature and the volatiles were removed under reduced pressure. The resulting residue was then dissolved in DCM (30 mL) and filtered through Celite bed. The filtrate was washed with water (3×20 mL) and the organic layer dried over $Na_2SO_4$, concentrated under reduced pressure to yield 2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetic acid (400 mg, 71% yield) as a brown solid. LCMS: m/z=515.2 (M+H); Ret. Time: 1.49 and 1.78, (LCMS Method Column: Kinetex XB-C18 (75×3.0) mm, 2.6 µm, Mobile Phase: A: 5 mm Ammonium formate pH 3.3: ACN (98:2), Mobile Phase: B: ACN: Buffer (98:2), Flow Rate: 1.0 mL/min).

Examples 135 and 136

2-((2R,5S)-4-(6-Cyano-1-methyl-2-oxo-1,2-dihydro-pyrido[3,2-d]pyrimidin-4-yl)-2-ethyl-5-methylpiperazin-1-yl)-N-methoxy-2-(4-(trifluoromethyl)phenyl)acetamide

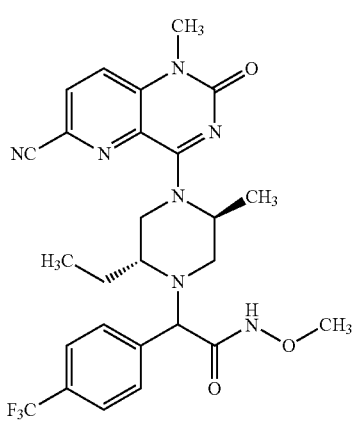
(135-136)

To a stirred solution of 2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetic acid (240 mg, 0.378 mmol) and O-methyl hydroxylamine hydrochloride (47.3 mg, 0.567 mmol) in anhydrous DMF (2 mL) were added HATU (172 mg, 0.453 mmol) and DIPEA (0.13 mL, 0.756 mmol). The reaction mixture was then allowed to stir at ambient temperature for 16 h. After completion of the reaction, the reaction mixture was diluted with ethyl acetate (15 mL), washed with aqueous sodium bicarbonate solution (10 mL), water (10 mL) and with sat. brine solution (10 mL). The organic layer was dried over sodium sulphate, filtered and concentrated under reduced pressure to obtain the crude product, which was purified by preparative HPLC (HPLC method: Column: XSelect C18 (150×19) mm, 5 micron; Mobile phase A: 0.1% TFA in water; Mobile phase B: Acetonitrile; Diluent:Acetonitrile: Water (50:50); Gradient: 20% to 80% B from 0 to 12 minutes; Flow: 15 mL/min to yield Examples 135 and 136.

The fractions of Example 135 was concentrated under reduced pressure, diluted with ACN/$H_2O$ (1:1) and lyophilized to yield 2-((2R,5S)-4-(6-cyano-1-methyl-2-oxo-1,2-dihydropyrido[3,2-d]pyrimidin-4-yl)-2-ethyl-5-methylpiperazin-1-yl)-N-methoxy-2-(4-(trifluoromethyl)phenyl)acetamide, TFA (45 mg, 17% yield). LCMS: m/z=544.2 (M+H); Ret. Time: 2.24; (LCMS method: Column: Kinetex XB-C18 (75×3.0) mm, 2.6 μm; Mobile Phase: A: 5 mm Ammonium formate pH 3.3: ACN (98:2); Mobile Phase: B: ACN: Buffer (98:2); Flow Rate: 1.0 mL/min. HPLC Ret. Time 8.31 and 7.63 min (HPLC Method B and C respectively). $^1$H NMR (400 MHz, DMSO-$d_6$): δ 11.55 (s, 1H), 8.25-8.23 (m, 1H), 8.01-7.99 (m, 1H), 7.79 (s, 4H), 5.84 (m, 1H), 4.93 (m, 1H), 4.22 (s, 1H), 3.62 (s, 3H), 3.42 (s, 3H), 2.94 (m, 1H), 1.60 (m, 1H), 1.42 (m, 4H), 0.64 (m, 3H). (−3H).

The fractions of Example 136 was concentrated under reduced pressure, diluted with ACN/$H_2O$ (1:1) and lyophilized to yield 2-((2R,5S)-4-(6-cyano-1-methyl-2-oxo-1,2-dihydropyrido[3,2-d]pyrimidin-4-yl)-2-ethyl-5-methylpiperazin-1-yl)-N-methoxy-2-(4-(trifluoromethyl)phenyl)acetamide·TFA (29 mg, 12% yield) as off white solid. LCMS: m/z=544.2 (M+H); Ret. Time: 2.18; (LCMS method: Column: Kinetex XB-C18 (75×3.0) mm, 2.6 μm; Mobile Phase: A: 5 mm Ammonium formate pH 3.3: ACN (98:2); Mobile Phase: B: ACN: Buffer (98:2); Flow Rate: 1.0 mL/min. HPLC Ret. Time 8.75 and 8.16 min (HPLC Method FB and FC respectively). $^1$H NMR (400 MHz, DMSO-$d_6$): δ 11.76 (s, 1H), 8.26 (m, 1H), 8.01 (m, 1H), 7.78-7.72 (m, 4H), 5.99 (m, 1H), 4.94 (m, 2H), 4.13 (s, 1H), 3.61 (m, 4H), 3.45 (s, 3H), 3.1-2.99 (m, 1H), 2.23-2.21 (m, 1H), 1.58-1.46 (m, 3H), 1.30 (m, 2H), 0.99 (s, 3H).

The examples in the Table 3 were prepared according to the general procedure described in the preparation of Examples 135 and 136, using the appropriate amines in the synthetic sequence. When the reaction provided a mixture of diastereomers, the mixture was separated at the final stage by preparative HPLC. The absolute stereochemistry was not assigned at the newly formed carbon-nitrogen bond.

TABLE 3

| Ex. No. | Structure | LCMS Method | LCMS RT | M + H | Stereo. chem. |
|---|---|---|---|---|---|
| 137 | | FA | 2.40 | 553.3 | H |
| 138 | | FA | 2.38 | 553.2 | H |

TABLE 3-continued

| Ex. No. | Structure | LCMS Method | LCMS RT | M + H | Stereo. chem. |
|---|---|---|---|---|---|
| 139 | | FA | 2.79 | 596.2 | H |
| 140 | | FA | 2.76 | 596.2 | H |
| 141 | | FA | 2.38 | 567.2 | H |
| 142 | | FA | 2.36 | 567.3 | H |
| 143 | | FA | 2.76 | 610.2 | H |
| 144 | | FA | 2.73 | 610.2 | H |

TABLE 3-continued

| Ex. No. | Structure | LCMS Method | LCMS RT | M + H | Stereo. chem. |
|---|---|---|---|---|---|
| 145 | | FA | 2.21 | 620.3 | H |
| 146 | | FA | 2.35 | 620.0 | H |

Examples 147 and 148

N-cyano-2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetamide

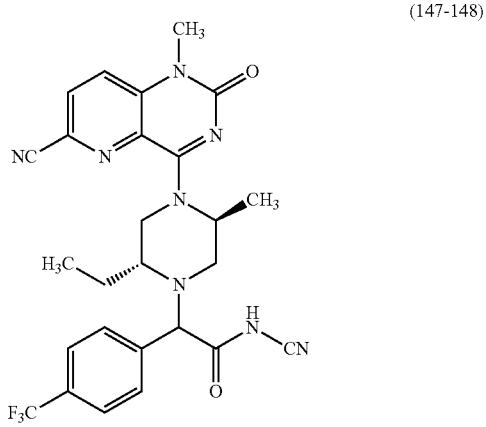 [SMILES: CC[C@@H]1CN(c2nc(=O)n(C)c3ccc(C#N)nc23)[C@@H](C)CN1C(C(=O)NC#N)c1ccc(C(F)(F)F)cc1]

(147-148)

To a stirred solution of 2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetic acid (250 mg, 0.394 mmol) in anhydrous DCM (2 mL) were added cyanamide (24.8 mg, 0.59 mmol), EDC·HCl (113 mg, 0.59 mmol) and DMAP (96 mg, 0.787 mmol). The reaction mixture was allowed to stir at ambient temperature for 16 h. After completion of the reaction, the reaction mixture was diluted with DCM (15 mL), washed with aqueous sodium bicarbonate solution (10 mL), water (10 mL), saturated brine solution (10 mL), dried over sodium sulphate, filtered and concentrated under reduced pressure to obtain crude product, which was purified by preparative HPLC (HPLC method: Column: Luna C18 (250×21.2) mm, 10 micron; Mobile phase A: 0.1% TFA in water; Mobile phase B: Acetonitrile; Diluent:Acetonitrile:Water (50:50); Gradient: 40% to 80% B from 0 to 15 minutes; Flow: 15 mL/min to yield Examples 147 and 148.

The fractions of Example 147 were concentrated under reduced pressure, diluted with ACN/H$_2$O (1:1) and lyophilized to yield N-cyano-2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetamide. TFA (16 mg, 6% yield) as off white solid. LCMS: m/z=539.2 (M+H)$^+$; Ret. Time: 1.617 min (LCMS method: Column: Kinetex XB-C18 (75×3.0) mm, 2.6 µm; Mobile Phase A: 5 mm Ammonium formate pH 3.3: ACN (98:2); Mobile Phase: B: ACN: Buffer (98:2); Flow Rate: 1.0 mL/min. HPLC Ret. Time 7.58 and 7.16 min (HPLC Method FB and FC respectively). $^1$H NMR (400 MHz, DMSO-d$_6$): δ 9.94 (bs, 1H), 8.28-8.26 (m, 1H), 8.05-8.03 (m, 1H), 7.92-7.87 (m, 4H), 5.94-5.74 (m, 1H), 5.19-4.94 (m, 2H), 4.00 (m, 1H), 3.39-3.46 (m, 3H), 3.23 (m, 1H), 2.83-2.82 (m, 1H), 1.65-1.47 (m, 5H), 0.57 (s, 3H).

The fractions of Example 148 were concentrated under reduced pressure and diluted with ACN/H$_2$O (1:1) and lyophilized to yield N-cyano-2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetamide·TFA (38 mg, 15% yield) as off white solid. LCMS: m/z=539.2 (M+H)$^+$; Ret. Time: 1.794 min (LCMS method: Column: Kinetex XB-C18 (75×3.0) mm, 2.6 µm; Mobile Phase: A: 5 mm Ammonium formate pH 3.3: ACN (98:2); Mobile Phase: B: ACN: Buffer (98:2); Flow Rate: 1.0 mL/min. HPLC Ret. Time 7.80 and 7.22 min (HPLC Method B and C respectively). $^1$H NMR (400 MHz, DMSO-d$_6$): δ 8.29-8.26 (m, 1H), 8.04-8.02 (m, 1H), 7.87-7.81 (m, 4H), 6.03-5.74 (m, 1H), 5.08-4.97 (m, 1H), 4.81 (s, 1H), 3.88 (m, 1H), 3.46 (s, 3H), 3.21 (m, 1H), 3.06 (m, 1H) 2.61-2.51 (m, 1H), 1.58-1.35 (m, 5H), 0.82 (s, 3H)

The examples in the Table 4 were prepared according to the general procedure described in the preparation of Examples 147 and 148, using the appropriate amines in the synthetic sequence. When the reaction provided a mixture of diastereomers, the mixture was separated at the final stage by preparative HPLC. The absolute stereochemistry was not assigned at the newly formed carbon-nitrogen bond.

TABLE 4

| Ex. No. | Structure | LCMS Method | LCMS RT | M + H | Stereo. chem. |
|---|---|---|---|---|---|
| 149 | | FA | 2.03 | 590.0 (M − H) | H |
| 150 | | FA | 2.16 | 592.2 | H |
| 151 | | FA | 2.44 | 618.2 | H |
| 152 | | FA | 2.48 | 618.2 | H |

Example 153

Methyl 3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propanoate

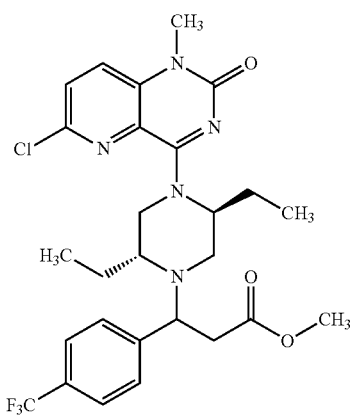

(153)

To a stirred solution of 6-chloro-4-((2S,5R)-2,5-diethylpiperazin-1-yl)-1-methylpyrido[3,2-d]pyrimidin-2(11)-one (500 mg, 1.49 mmol) in DMSO (5 mL) were added 4-(trifluoromethyl)benzaldehyde (0.31 mL, 2.23 mmol) and trimethyl borate (0.17 mL, 1.49 mmol). The reaction mixture was stirred at room temperature for 15 min. The resulting solution was treated with 1-(tert-butyldimethylsilyloxy)-1-methoxyethene (0.5 mL, 2.23 mmol) dropwise and stirred at room temperature for 16 h. The reaction mixture was extracted with EtOAc (2×100 mL), washed with water, brine and dried over sodium sulphate. The solvent was removed under reduced pressure to obtain crude residue which was purified by silica gel flash column chromatography (10% MeOH in DCM; 24 g column) to afford methyl 3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propanoate (700 mg, 83% yield) as a diastereomeric mixture. LCMS: m/z, 566.2 (M+1); Ret. Time: 1.23 min. (LCMS Method: Column: Waters Acquity UPLC BEH C18 (2.1×50 mm) 1.7 µm, Mobile phase A: 10 mM $NH_4OAc$:acetonitrile (95:5); Mobile phase B: 10 mM $NH_4OAc$:acetonitrile (5:95), Gradient=20-100% B over 2 minute, then a 0.3 minute hold at 100% B; Temperature: 50° C.; Flow rate: 0.7 mL/min; Detection: UV at 220 nm).

Example 154 and 155

Methyl 3-((2R,5S)-4-(6-cyano-1-methyl-2-oxo-1,2-dihydropyrido[3,2-d]pyrimidin-4-yl)-2,5-diethylpiperazin-1-yl)-3-(4-(trifluoromethyl)phenyl)propanoate

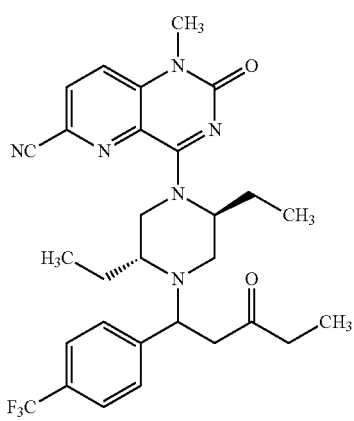

(154-155)

To a stirred solution of methyl 3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propanoate (150 mg, 0.26 mmol) in DMF (3.0 mL) were added zinc (26.0 mg, 0.40 mmol) and TEA (0.15 mL, 1.06 mmol). The reaction mixture was degassed with argon gas for 5 min, followed by the addition of zinc cyanide (93 mg, 0.79 mmol) and dichloro[9,9-dimethyl-4,5-bis(diphenylphosphino)xanthene]palladium(II) (80 mg, 0.11 mmol). The reaction mixture heated at 90° C. for 16 h. The reaction mixture was cooled to room temperature and concentrated under reduced pressure to afford a residue which was purified via preparative HPLC (COLUMN: Cellulose-5 (250×21.2 mm), 5 µm; Mobile Phase: 10 mM NH$_4$OAc in MeOH; Flow rate: 20 mL/min).

Example 154: (7 mg, 5% yield): LCMS: m/z=557.2 (M+H); Ret. Time: 2.14 min; (LCMS method: Column: XBridge BEH XP C18 (50×2.1 mm), 2.5 µm; Mobile phase A: 95% water: 5% acetonitrile; 10 mM ammonium acetate; Mobile phase B: 5% Water: 95% acetonitrile; 10 mM ammonium acetate; Flow: 1.1 mL/min; Temp: 50° C.; Time (min): 0-3; % B: 0-100. $^1$H NMR (400 MHz, DMSO-d$_6$) δ ppm 8.24 (d, J=8.8 Hz, 1H), 7.98 (d, J=8.8 Hz, 1H), 7.74 (d, J=8.1 Hz, 2H), 7.58-7.63 (m, 2H), 5.84-5.91 (m, 0.5H), 5.39-5.46 (m, 0.5H), 4.84-4.93 (m, 1H), 4.21 (br t, J=6.2 Hz, 1H), 3.45-3.50 (m, 3H), 3.44 (s, 3H), 3.09-3.19 (m, 2H), 2.93-3.03 (m, 1H), 2.56-2.63 (m, 1H), 2.35-2.47 (m, 1H), 1.86-2.04 (m, 1H), 1.68-1.86 (m, 2H), 1.28-1.49 (m, 2H), 0.87-0.99 (m, 3H), 0.60-0.79 (m, 3H).

Example 155: (15 mg, 10% yield LCMS: m/z=557.2 (M+H); Ret. Time: 2.12 min; (LCMS method: Column: XBridge BEH XP C18 (50×2.1 mm), 2.5 µm; Mobile phase A: 95% water: 5% acetonitrile; 10 mM ammonium acetate; Mobile phase B: 5% Water: 95% acetonitrile; 10 mM ammonium acetate; Flow: 1.1 mL/min; Temp: 50° C.; Time (min): 0-3; % B: 0-100. $^1$H NMR (400 MHz, DMSO-d$_6$) δ ppm 8.17-8.27 (m, 1H), 7.93-8.01 (m, 1H), 7.69 (d, J=8.3 Hz, 2H), 7.59 (d, J=8.3 Hz, 2H), 5.96-6.07 (m, 0.5H), 5.25-5.35 (m, 0.5H), 5.00-5.09 (m, 0.5H), 4.69-4.79 (m, 0.5H), 4.04 (dd, J=9.2, 5.5 Hz, 1H), 3.56-3.68 (m, 1H), 3.45 (s, 3H), 3.42 (s, 3H), 2.98-3.13 (m, 2H), 2.53-2.64 (m, 2H), 2.24-2.38 (m, 1H), 1.67-2.01 (m, 2H), 1.30-1.52 (m, 2H), 0.82-0.99 (m, 3H), 0.63 (br t, J=7.2 Hz, 3H).

Example 156

3-((2R,5S)-4-(6-Chloro-1-methyl-2-oxo-1,2-dihydropyrido[3,2-d]pyrimidin-4-yl)-2,5-diethylpiperazin-1-yl)-3-(4-(trifluoromethyl)phenyl)propanoic acid

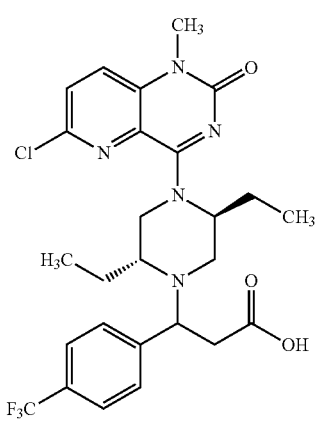

(156)

To a stirred solution of methyl 3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propanoate (550 mg, 0.97 mmol) in THF (12 mL) and water (6 mL) was added lithium hydroxide monohydrate (408 mg, 9.72 mmol) at room temperature. The reaction mixture was stirred for 16 h. The reaction mixture was neutralized with aqueous 1.5 N HCl and extracted with EtOAc (2×100 mL). The combined organic extracts were washed with water, brine, dried over sodium sulphate and concentrated to afford 3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propanoic acid (500 mg, 93% yield) as a diastereomeric mixture. LCMS: m/z, 552.2 (M+H); Ret. Time: 1.29 and 1.39 min. (LCMS Method: Column: Acquity UPLC BEH C18 (3.0×50 mm) 1.7 µm; Mobile phase A: 10 mM ammonium acetate:acetonitrile (95:5), Mobile phase B: 10 mM ammonium acetate:acetonitrile (5:95), Method: % B: 0 min-20: 2 min-100: 2.3 min-100, Temperature: 27° C.; Flow rate: 0.7 mL/min; Detection: UV at 220 nm).

Example 157 and 158

3-((2R,5S)-4-(6-Cyano-1-methyl-2-oxo-1,2-dihydro-pyrido[3,2-d]pyrimidin-4-yl)-2,5-diethylpiperazin-1-yl)-3-(4-(trifluoromethyl)phenyl)propanoic acid

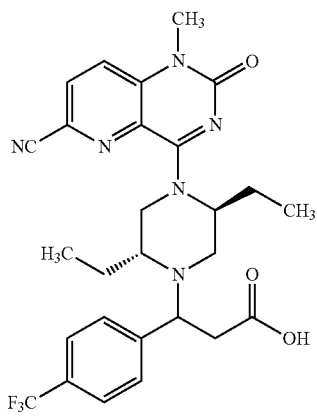

(157-158)

To a stirred solution of methyl 3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propanoic acid (100 mg, 0.18 mmol) in DMF (3.0 mL) were added zinc (18 mg, 0.27 mmol) and TEA (0.1 mL, 0.72 mmol). The reaction mixture was degassed with argon gas for 5 min, followed by the addition of zinc cyanide (64 mg, 0.54 mmol) and dichloro[9,9-dimethyl-4,5-bis(diphenylphosphino)xanthene]palladium(II) (55 mg, 0.07 mmol). The reaction mixture heated at 90° C. for 16 h. The reaction mixture was cooled to room temperature and concentrated under reduced pressure to afford a residue which was purified via preparative HPLC (Column: Waters XBridge C18, 19×150 mm, 5 µm; Mobile Phase A: 10-mM ammonium acetate; Mobile Phase B: acetonitrile; gradient: 15-55% B over 20 minutes, then a 5-minute hold at 100% B; Flow: 15 mL/min).

Example 157: (22 mg, 22% yield): LCMS: m/z=543.2 (M+H); Ret. Time: 1.36 min; (LCMS method: Column: XBridge BEH XP C18 (50×2.1 mm), 2.5 µm; Mobile phase A: 95% water: 5% acetonitrile; 10 mM ammonium acetate; Mobile phase B: 5% Water: 95% acetonitrile; 10 mM ammonium acetate; Flow: 1.1 mL/min; Temp: 50° C.; Time (min): 0-3; % B: 0-100.

Example 158: (7 mg, 7% yield): LCMS: m/z=543.2 (M+H); Ret. Time: 1.47 min; (LCMS method: Column: XBridge BEH XP C18 (50×2.1 mm), 2.5 µm; Mobile phase A: 95% water: 5% acetonitrile; 10 mM ammonium acetate; Mobile phase B: 5% Water: 95% acetonitrile; 10 mM ammonium acetate; Flow: 1.1 mL/min; Temp: 50° C.; Time (min): 0-3; % B: 0-100.

Examples 159 and 160

4-((2S,5R)-2,5-Diethyl-4-(3-oxo-3-(6-azaspiro[2.5] octan-6-yl)-1-(4-(trifluoromethyl)phenyl)propyl) piperazin-1-yl)-1-methyl-2-oxo-1,2-dihydropyrido[3,2-d]pyrimidine-6-carbonitrile

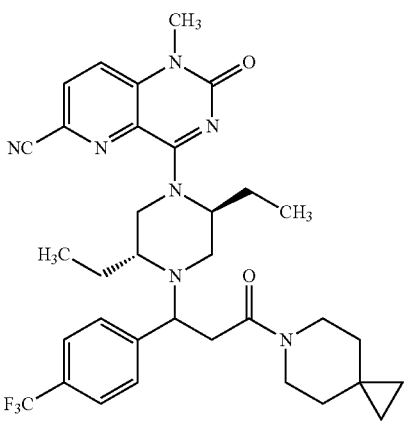

(159-160)

To a stirred solution of 3-((2R,5S)-4-(6-cyano-1-methyl-2-oxo-1,2-dihydropyrido[3,2-d]pyrimidin-4-yl)-2,5-diethylpiperazin-1-yl)-3-(4-(trifluoromethyl)phenyl)propanoic acid (100 mg, 0.18 mmol) in EtOAc (2 mL) was added 6-azaspiro[2.5]octane, HCl (43.5 mg, 0.29 mmol), TEA (0.05 mL, 0.37 mmol), followed by 1-propanephosphonic anhydride (50% in EtOAc) (0.18 mL, 0.29 mmol) at 0° C. The reaction mixture was allowed to warm to room temperature and stirred for 16 h. The reaction mixture was extracted with EtOAc (2×30 mL), washed with water, brine, dried over sodium sulphate and concentrated under reduced pressure to give crude residue which was purified by prep-HPLC [Column: Lux Cellulose-4 (250 mm×21 mm); Mobile Phase: 10 mM NH$_4$OAc in MeOH; Flow rate: 19 mL/min].

Example 159: (3.9 mg, 3% yield): LCMS: m/z=636.3 (M+H); Ret. Time: 2.25 min; (LCMS method: Column: XBridge BEH XP C18 (50×2.1 mm), 2.5 µm; Mobile phase A: 95% water: 5% acetonitrile; 10 mM ammonium acetate; Mobile phase B: 5% Water: 95% acetonitrile; 10 mM ammonium acetate; Flow: 1.1 mL/min; Temp: 50° C.; Time (min): 0-3; % B: 0-100. $^1$H NMR (400 MHz, DMSO-d$_6$) δ ppm 8.24 (br d, J=8.8 Hz, 1H), 7.98 (d, J=9.0 Hz, 1H), 7.71 (d, J=8.0 Hz, 2H), 7.60 (br d, J=8.3 Hz, 2H), 6.51 (s, 1H), 5.42 (br s, 1H), 4.97-4.81 (m, 1H), 4.36-4.21 (m, 1H), 3.49-3.38 (m, 6H), 3.11-2.91 (m, 2H), 2.77-2.68 (m, 1H), 2.61-2.55 (m, 1H), 2.45-2.37 (m, 1H), 2.05-1.68 (m, 2H), 1.54-1.42 (m, 1H), 1.40-1.19 (m, 2H), 1.15-1.02 (m, 3H), 0.99-0.85 (m, 3H), 0.81-0.60 (m, 3H), 0.15-0.30 (m, 4H).

Example 160: (2 mg, 2% yield); LCMS: m/z=636.3 (M+H); Ret. Time: 2.24 min; (LCMS method: Column: XBridge BEH XP C18 (50×2.1 mm), 2.5 µm; Mobile phase A: 95% water: 5% acetonitrile; 10 mM ammonium acetate; Mobile phase B: 5% Water: 95% acetonitrile; 10 mM ammonium acetate; Flow: 1.1 mL/min; Temp: 50° C.; Time (min): 0-3; % B: 0-100. $^1$H NMR (400 MHz, DMSO-d$_6$) δ ppm 8.17-8.30 (m, 1H), 7.92-8.04 (m, 1H), 7.65-7.71 (m, 2H), 7.57-7.63 (m, 2H), 6.00-6.13 (m, 1H), 5.25-5.34 (m, 1H), 5.03-5.13 (m, 1H), 4.69-4.79 (m, 1H), 4.03-4.13 (m, 1H), 3.58-3.73 (m, 1H), 3.48-3.56 (m, 1H), 3.43 (s, 3H), 3.11-3.20 (m, 2H), 2.73-2.87 (m, 2H), 1.68-2.04 (m, 3H), 1.41-1.55 (m, 2H), 1.20-1.27 (m, 1H), 0.74-1.10 (m, 7H), 0.64 (t, J=7.5 Hz, 3H), 0.14-0.30 (m, 4H).

The examples in the Table 5 were prepared according to the general procedure described in the preparation of Examples 159 and 160, using the appropriate amines in the synthetic sequence. When the reaction provided a mixture of diastereomers, the mixture was separated at the final stage by preparative HPLC. The absolute stereochemistry was not assigned at the newly formed carbon-nitrogen bond.

TABLE 5

| Ex. No. | Structure | LCMS Method | LCMS RT | M + H | Stereo. chem. |
|---|---|---|---|---|---|
| 161 | | A | 1.66 | 653.3 | H |
| 162 | | A | 1.57 | 653.3 | H |
| 163 | | B | 1.50 | 614.3 | H |
| 164 | | A | 1.92 | 614.2 | H |
| 165 | | A | 2.07 | 640.3 | H |
| 166 | | A | 2.06 | 640.3 | H |

Intermediate 54

6-Chloro-4-((2S,5R)-2,5-diethyl-4-(3-hydroxy-1-(4-(trifluoromethyl)phenyl)propyl)piperazin-1-yl)-1-methylpyrido[3,2-d]pyrimidin-2(1H)-one

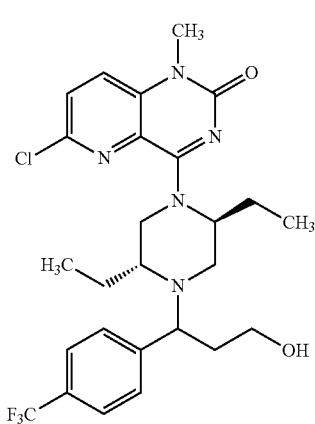

(I-58)

To a stirred solution of 3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propanoic acid (1.5 g, 2.72 mmol) and 4-methylmorpholine (0.6 mL, 5.43 mmol) in THF (15 mL) was added isobutyl chloroformate (0.5 mL, 3.26 mmol) at 0° C. The reaction mixture was allowed to warm to room temperature and stirred for 2 h. The reaction mixture was filtered through Celite pad and residue was washed with excess THF (10 mL). The filtrate was cooled to 0° C. and was added sodium borohydride (0.31 g, 8.15 mmol). The reaction mixture was allowed to warm to room temperature and stirred for overnight. The reaction mixture was cooled to 0° C. The reaction was quenched with saturated aqueous NH$_4$Cl solution. The reaction mixture was extracted with EtOAc (3×100 mL). The combined organic extracts were washed with brine, dried over Na$_2$SO$_4$ and concentrated to afford crude residue which was purified via flash chromatography using a 40 g silica gel column and eluted with 8-10% MeOH in DCM to afford 6-chloro-4-((2S,5R)-2,5-diethyl-4-(3-hydroxy-1-(4-(trifluoromethyl)phenyl)propyl)piperazin-1-yl)-1-methylpyrido[3,2-d]pyrimidin-2(1H)-one (1.1 g, 2.045 mmol, 75% yield). LCMS: m/z, 538.2 (M+H); Ret. Time: 2.27 min. (LCMS Method: Column: Kinetex XB-C18 (3×75 mm) 2.6 μm; Mobile phase A: 10 mM ammonium formate:acetonitrile (98:2), Mobile phase B: 10 mM ammonium formate:acetonitrile (2:98), Gradient=20-100% B over 4 minutes, then a 0.6 minute hold at 100% B; Temperature: 27° C.; Flow rate: 1.0 mL/min; Detection: UV at 220 nm).

Intermediate 55

4-((2S,5R)-4-(3-Azido-1-(4-(trifluoromethyl)phenyl)propyl)-2,5-diethylpiperazin-1-yl)-6-chloro-1-methylpyrido[3,2-d]pyrimidin-2(1H)-one

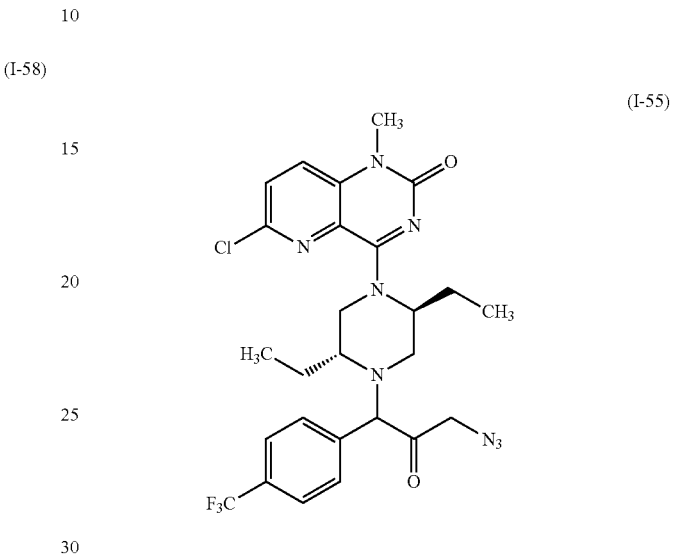

(I-55)

To a stirred solution of 6-chloro-4-((2S,5R)-2,5-diethyl-4-(3-hydroxy-1-(4-(trifluoromethyl)phenyl)propyl)piperazin-1-yl)-1-methylpyrido[3,2-d]pyrimidin-2(1H)-one (1.1 g, 2.04 mmol) in DCM (12 mL) was added TEA (0.8 mL, 6.13 mmol) and mesyl-Cl (0.32 mL, 4.09 mmol) at 0° C. The reaction mixture was stirred at room temperature for 2 h. The reaction mixture was extracted with DCM (3×50 mL), washed with water, brine, dried over sodium sulphate and concentrated under reduced pressure to give crude mesylate derivative. The crude mesylate was dissolved in DMF (10 mL) and was added sodium azide (0.580 g, 8.93 mmol) at room temperature. The reaction mixture was heated at 50° C. for 14 h. The reaction mixture was cooled to room temperature, diluted with water and extracted with EtOAc (3×50 mL). The combined organic extracts were washed with brine, dried over Na$_2$SO$_4$ and concentrated to afford crude residue which was purified via flash chromatography using a 40 g silica gel column and eluted with 5-7% MeOH in DCM to afford 4-((2S,5R)-4-(3-azido-1-(4-(trifluoromethyl)phenyl)propyl)-2,5-diethylpiperazin-1-yl)-6-chloro-1-methylpyrido[3,2-d]pyrimidin-2(1H)-one (900 mg, 90% yield). LCMS: m/z, 563.2 (M+1); Ret. Time: 1.16 and 1.25 min. (LCMS Method: Column: Kinetex XB-C18 (3×75 mm) 2.6 μm; Mobile phase A: 10 mM ammonium formate:acetonitrile (98:2), Mobile phase B: 10 mM ammonium formate:acetonitrile (2:98), Gradient=20-100% B over 4 minutes, then a 0.6 minute hold at 100% B; Temperature: 27° C.; Flow rate: 1.0 mL/min; Detection: UV at 220 nm).

Intermediate 56

4-((2S,5R)-4-(3-Amino-1-(4-(trifluoromethyl)phenyl)propyl)-2,5-diethylpiperazin-1-yl)-6-chloro-1-methylpyrido[3,2-d]pyrimidin-2(11)-one

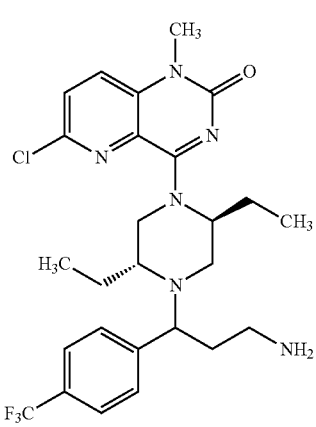

(I-56)

To a stirred solution of 4-((2S,5R)-4-(3-azido-1-(4-(trifluoromethyl)phenyl) propyl)-2,5-diethylpiperazin-1-yl)-6-chloro-1-methylpyrido[3,2-d]pyrimidin-2(1H)-one (400 mg, 0.71 mmol) in MeOH (5 mL) were added zinc (464 mg, 7.10 mmol) and ammonium chloride (380 mg, 7.10 mmol) in water (1 mL) at room temperature. The reaction mixture was stirred for 1 h. The reaction mixture was filtered through Celite pad and washed with excess MeOH (10 mL). The filtrate was concentrated under reduced pressure to give crude residue which was extracted with EtOAc (3×50 mL). The combined organic extracts were washed with brine, dried over $Na_2SO_4$ and concentrated to afford 4-((2S,5R)-4-(3-amino-1-(4-(trifluoromethyl)phenyl)propyl)-2,5-diethylpiperazin-1-yl)-6-chloro-1-methylpyrido[3,2-d]pyrimidin-2(11)-one (320 mg, 84% yield). LCMS: m/z, 537.2 (M+1); Ret. Time: 2.09 and 2.31 min. (LCMS Method: Column: Kinetex XB-C18 (3×75 mm) 2.6 μm; Mobile phase A: 10 mM ammonium formate:acetonitrile (98:2), Mobile phase B: 10 mM ammonium formate:acetonitrile (2:98), Gradient=20-100% B over 4 minutes, then a 0.6 minute hold at 100% B; Temperature: 27° C.; Flow rate: 1.0 mL/min; Detection: UV at 220 nm).

Example 167

Methyl (3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propyl)carbamate

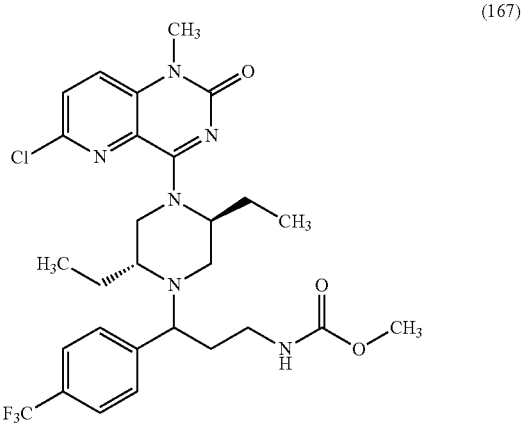 [SMILES: CC[C@H]1CN(C(CCNC(=O)OC)c2ccc(C(F)(F)F)cc2)[C@H](CC)CN1c1nc(=O)n(C)c2ccc(Cl)nc12]

(167)

To a stirred solution of 4-((2S,5R)-4-(3-amino-1-(4-(trifluoromethyl)phenyl) propyl)-2,5-diethylpiperazin-1-yl)-6-chloro-1-methylpyrido[3,2-d]pyrimidin-2(11)-one (120 mg, 0.22 mmol) in DCM (2 mL) was added TEA (0.1 mL, 0.67 mmol) and methyl chloroformate (0.04 mL, 0.45 mmol) at 0° C. The reaction mixture was allowed to reach room temperature and stirred for 2 h. The reaction mixture was extracted with DCM (3×30 mL), washed with water, brine, dried over sodium sulphate and concentrated under reduced pressure to afford methyl (3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propyl)carbamate (110 mg, 0.185 mmol, 83% yield). LCMS: m/z, 595.2 (M+H); Ret. Time: 2.01 and 2.02 min. (LCMS Method: Column: Acquity UPLC BEH C18 (3.0×50 mm) 1.7 μm; Mobile phase A: 10 mM ammonium acetate:acetonitrile (95:5), Mobile phase B: 10 mM ammonium acetate:acetonitrile (5:95), Method: % B: 0 min-20: 2 min-100: 2.3 min-100, Temperature: 27° C.; Flow rate: 0.7 mL/min; Detection: UV at 220 nm).

Examples 168 and 169

3-((2R,5S)-4-(6-Cyano-1-methyl-2-oxo-1,2-dihydro-pyrido[3,2-d]pyrimidin-4-yl)-2,5-diethylpiperazin-1-yl)-3-(4-(trifluoromethyl)phenyl)propanoic acid (168-169)

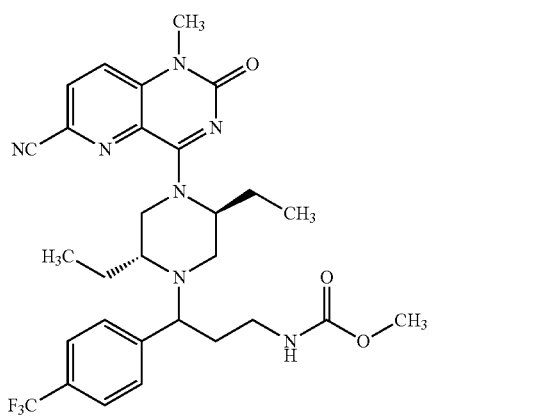

To a stirred solution of methyl (3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propyl)carbamate (80 mg, 0.13 mmol) in NMP (2 mL) were added dppf (5 mg, 8.07 µmol), zinc (2 mg, 0.027 mmol) and zinc cyanide (48 mg, 0.403 mmol). The reaction mixture was degassed for 5 min. and $Pd_2(dba)_3$ (12 mg, 0.013 mmol) was added. The reaction mixture was heated at 90° C. overnight. The reaction mixture was cooled to room temperature, diluted with ethyl acetate and filtered through Celite pad. The filtrate was washed with water, brine and the organic layer was dried over anhydrous $Na_2SO_4$, filtered and evaporated under reduced pressure to obtain crude reside which was purified prep-SFC [Column/dimensions: Chiralpak IC (250×21) mm, 5 µM % $CO_2$: 60%; % Co solvent: 40% ACN:MeOH (50:50); Total Flow: 80.0 g/min; Back Pressure: 100 bar; Temperature: 30° C.; UV: 270 nm].

Example 168: (5.3 mg, 7% yield): LCMS: m/z=586.2 (M+H); Ret. Time: 2.10 min; (LCMS method: Column: XBridge BEH XP C18 (50×2.1 mm), 2.5 µm; Mobile phase A: 95% water: 5% acetonitrile; 10 mM ammonium acetate; Mobile phase B: 5% Water: 95% acetonitrile; 10 mM ammonium acetate; Flow: 1.1 mL/min; Temp: 50° C.; Time (min): 0-3; % B: 0-100. $^1$H NMR (400 MHz, DMSO-$d_6$) δ ppm 8.22-8.27 (m, 1H), 7.99 (d, J=9.0 Hz, 1H), 7.75 (d, J=8.3 Hz, 2H), 7.54-7.63 (m, 2H), 7.02-7.12 (m, 1H), 5.82-5.92 (m, 0.5H), 5.46-5.55 (m, 0.5H), 4.83-5.00 (m, 1H), 3.78-3.85 (m, 1H), 3.48 (s, 3H), 3.44 (s, 3H), 3.18 (d, J=3.4 Hz, 1H), 2.85-2.91 (m, 1H), 2.76-2.84 (m, 2H), 2.30-2.44 (m, 2H), 1.97-2.16 (m, 2H), 1.70-1.93 (m, 3H), 1.40-1.52 (m, 1H), 1.27-1.37 (m, 1H), 0.88-1.04 (m, 3H), 0.57-0.76 (m, 3H).

Example 169: (7.7 mg, 9% yield): LCMS: m/z=586.2 (M+H); Ret. Time: 2.09 min; (LCMS method: Column: XBridge BEH XP C18 (50×2.1 mm), 2.5 µm; Mobile phase A: 95% water: 5% acetonitrile; 10 mM ammonium acetate; Mobile phase B: 5% Water: 95% acetonitrile; 10 mM ammonium acetate; Flow: 1.1 mL/min; Temp: 50° C.; Time (min): 0-3; % B: 0-100. $^1$H NMR (400 MHz, DMSO-$d_6$) δ ppm 8.15-8.31 (m, 1H), 7.92-8.08 (m, 1H), 7.69-7.75 (m, 2H), 7.58-7.64 (m, 2H), 7.09-7.15 (m, 1H), 6.01-6.08 (m, 0.5H), 5.24-5.35 (m, 0.5H), 5.06-5.15 (m, 0.5H), 4.71-4.82 (m, 0.5H), 3.60-3.68 (m, 1H), 3.49 (s, 3H), 3.44 (s, 3H), 3.26-3.31 (m, 1H), 3.09-3.23 (m, 1H), 2.62-2.82 (m, 2H), 2.15-2.29 (m, 1H), 1.96-2.08 (m, 1H), 1.62-1.88 (m, 3H), 1.35-1.56 (m, 2H), 0.89-1.02 (m, 3H), 0.62 (t, J=7.3 Hz, 3H).

The examples in the Table 6 were prepared according to the general procedure described in the preparation of Examples 168 and 169, using the appropriate amines in the synthetic sequence. When the reaction provided a mixture of diastereomers, the mixture was separated at the final stage by preparative HPLC. The absolute stereochemistry was not assigned at the newly formed carbon-nitrogen bond.

TABLE 6

| Ex. No. | Structure | Stereo-chemistry | LCMS Method | LCMS RT | M + H |
|---|---|---|---|---|---|
| 170 | | H | A | 2.0 | 606.3 |
| 171 | | H | A | 1.99 | 606.3 |

Intermediate 57

1-Benzyl 4-(tert-butyl) (2S,5R)-5-ethyl-2-methylpiperazine-1,4-dicarboxylate

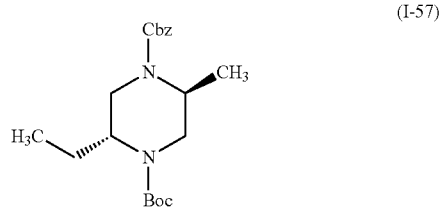 [SMILES: CC[C@@H]1CN(C(=O)OCc2ccccc2)[C@@H](C)CN1C(=O)OC(C)(C)C]

(I-57)

To a stirred solution of tert-butyl (2R,5S)-2-ethyl-5-methylpiperazine-1-carboxylate (1.0 g, 4.38 mmol) in dioxane (10 mL) was added DIPEA (2.3 mL, 13.14 mmol) and Cbz-Cl (0.94 mL, 6.57 mmol). The reaction mixture was heated at 95° C. for 16 h. The reaction mixture was quenched with water (100 mL) and was extracted with ethyl acetate (3×100 mL). The combined organic layer was dried over anhydrous sodium sulfate, filtered and evaporated under reduced pressure to obtain crude product, which was purified by silica gel chromatography (24 g silica gel column; using 10%-15% ethylacetate/Pet. ether) to obtain 1-benzyl 4-(tert-butyl) (2S,5R)-5-ethyl-2-methylpiperazine-1,4-dicarboxylate (1.5 g, 94% yield). LCMS: m/z=363.2 (M+H); retention time 2.05 min [LCMS Method: Column: Waters Acquity UPLC BEH C18 (2.1×50 mm) 1.7 μm, Mobile phase A: 10 mM NH$_4$OAc:acetonitrile (95:5); Mobile phase B: 10 mM NH$_4$OAc:acetonitrile (5:95), Gradient=20-90% B over 1.1 minute, then a 0.6 minute hold at 90% B; Temperature: 50° C.; Flow rate: 0.7 mL/min; Detection: UV at 220 nm].

Intermediate 58

Benzyl (2S,5R)-5-ethyl-2-methylpiperazine-1-carboxylate

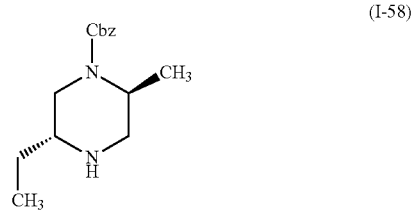 [SMILES: CC[C@@H]1CN(C(=O)OCc2ccccc2)[C@@H](C)CN1]

(I-58)

To a stirred solution of 1-benzyl 4-(tert-butyl) (2S,5R)-5-ethyl-2-methylpiperazine-1,4-dicarboxylate (1.0 g, 2.76 mmol) in DCM (10 mL) was added 4 N HCl in Dioxane (4.2 mL, 16.55 mmol. The reaction mixture was stirred at room temperature for 16 h. The reaction mixture was concentrated under reduced pressure to obtain the crude product, which was triturated with DCM/hexane (1:4) to obtain solid, filtered, dried under reduced pressure to obtain benzyl (2S,5R)-5-ethyl-2-methylpiperazine-1-carboxylate, HCl (0.8 g, 97% yield). LCMS: m/z=263.2 (M+H); retention time 1.02 min [LCMS Method: Column: Waters Acquity UPLC BEH C18 (2.1×50 mm) 1.7 μm, Mobile phase A: 10 mM NH$_4$OAc:acetonitrile (95:5); Mobile phase B: 10 mM NH$_4$OAc:acetonitrile (5:95), Gradient=20-90% B over 1.1 minute, then a 0.6 minute hold at 90% B; Temperature: 50° C.; Flow rate: 0.7 mL/min; Detection: UV at 220 nm.]

Intermediate 59

Benzyl (2S,5R)-4-(2-ethoxy-2-oxo-1-(4-(trifluoromethyl)phenyl)ethyl)-5-ethyl-2-methylpiperazine-1-carboxylate

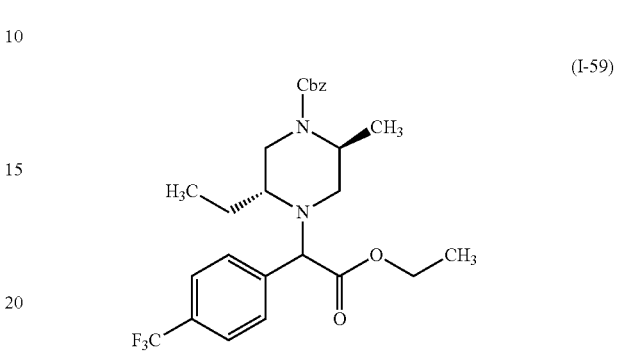

(I-59)

To a stirred solution of benzyl (2S,5R)-5-ethyl-2-methylpiperazine-1-carboxylate, HCl (0.85 g, 2.84 mmol in acetonitrile (10 mL) was added DIPEA (1.5 mL, 8.53 mmol). The reaction mixture was stirred for 5 min and was added ethyl 2-bromo-2-(4-(trifluoromethyl)phenyl)acetate (1.770 g, 5.69 mmol) and sodium iodide (0.213 g, 1.42 mmol). The reaction mixture was heated at 85° C. for 16 h. The reaction mixture was filtered through Celite bed and was concentrated under reduced pressure to obtain the crude product, which was purified by silica gel chromatography (using 24 g silica gel column; using 10%-20% ethyl acetate/ Pet. ether) to obtain benzyl (2S,5R)-4-(2-ethoxy-2-oxo-1-(4-(trifluoromethyl)phenyl)ethyl)-5-ethyl-2-methylpiperazine-1-carboxylate (0.8 g, 57.1% yield). LCMS: m/z=493.0 (M+H); retention time 1.50 min [LCMS Method: Column: Waters Acquity UPLC BEH C18 (2.1×50 mm) 1.7μ, Mobile phase A: 10 mM NH$_4$OAc:acetonitrile (95:5); Mobile phase B: 10 mM NH$_4$OAc:acetonitrile (5:95), Gradient=20-90% B over 1.1 minute, then a 0.6 minute hold at 90% B; Temperature: 50° C.; Flow rate: 0.7 mL/min; Detection: UV at 220 nm.]

Intermediate 60

Benzyl (2S,5R)-5-ethyl-4-(2-hydroxy-1-(4-(trifluoromethyl)phenyl)ethyl)-2-methylpiperazine-1-carboxylate

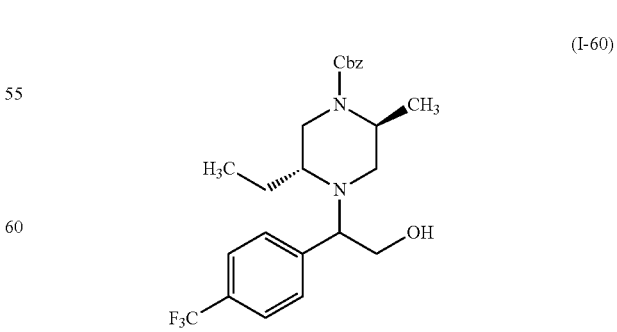

(I-60)

To a stirred solution of benzyl (2S,5R)-4-(2-ethoxy-2-oxo-1-(4-(trifluoromethyl)phenyl)ethyl)-5-ethyl-2-methylpiperazine-1-carboxylate (0.3 g, 0.61 mmol) in tetrahydrofuran (5 mL) was added LiBH$_4$ in THF (2M, 1.5 mL, 3.05 mmol) followed by MeOH (0.3 mL). The reaction mixture was heated at 60° C. for 2 h. The reaction was quenched with saturated aqueous ammonium chloride solution (50 mL) and the reaction mixture was extracted with ethyl acetate (3×100 mL). The combined organic layer was dried over anhydrous sodium sulfate, filtered and evaporated under reduced pressure to obtain benzyl (2S,5R)-5-ethyl-4-(2-hydroxy-1-(4-(trifluoromethyl)phenyl)ethyl)-2-methylpiperazine-1-carboxylate (180 mg, 66%). LCMS: m/z=451.0 (M+H); retention time 2.09 min [LCMS Method: Column: Waters Acquity UPLC BEH C18 (2.1×50 mm) 1.7μ, Mobile phase A: 10 mM NH$_4$OAc:acetonitrile (95:5); Mobile phase B: 10 mM NH$_4$OAc:acetonitrile (5:95), Gradient=20-90% B over 1.1 minute, then a 0.6 minute hold at 90% B; Temperature: 50° C.; Flow rate: 0.7 mL/min; Detection: UV at 220 nm.]

Examples 172 and 173

4-((2S,5R)-4-(2-((Cyanomethyl)(methyl)amino)-1-(4-(trifluoromethyl)phenyl)ethyl)-5-ethyl-2-methylpiperazin-1-yl)-1-methyl-2-oxo-1,2-dihydropyrido[3,2-d]pyrimidine-6-carbonitrile (172-173)

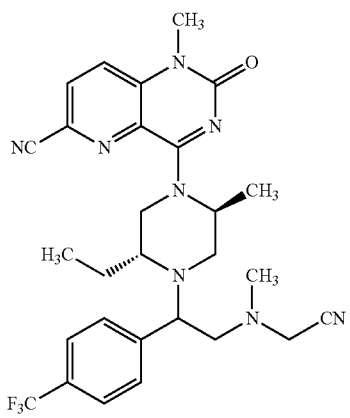 [SMILES: CC[C@@H]1CN(c2nc(=O)n(C)c3ccc(C#N)nc23)[C@@H](C)CN1C(CNCC#N)c1ccc(C(F)(F)F)cc1]

To a stirred solution of 2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl methanesulfonate (500 mg, 0.864 mmol) in anhydrous acetonitrile (5 mL) was added DIPEA (0.3 mL, 1.728 mmol), followed by 2-(methylamino)acetonitrile (182 mg, 2.59 mmol). The resultant reaction mixture was heated at 85° C. for 6 h. After completion of the reaction, the reaction mixture was diluted with water (100 mL) and extracted with EtOAc (100 mL×2). The combined organic layers were washed with sat. brine solution (150 mL) and dried over sodium sulphate, filtered and concentrated under reduced pressure. The residue thus obtained was purified by flash column chromatography on silica gel (230-400 mesh) using 70-80% EtOAc in hexane. The material thus obtained was further purified preparative HPLC (HPLC method: Kinetex EVO C18 (250×21.2) mm, 5 micron; Mobile phase A: 0.1% TFA in water; Mobile phase B: Acetonitrile; Diluent:Acetonitrile:Water (50:50); Gradient: 20% to 60% B from 0 to 12 minutes; Flow: 15 mL/min) to yield the examples 1 and 2 as diastereomeric mixture. The obtained diastereomeric mixture was separated using chiral SFC purification (Method: Column: Chiralpak AS-H, Co-solvent: 30% IPA, Flow rate: 4 mL/minute) to afford Example 172 and 173 as an individual diastereomers.

The fractions of Example 172 was concentrated under reduced pressure and diluted with ACN/H$_2$O (1:1) and lyophilized to yield 4-((2S,5R)-4-(2-((cyanomethyl)(methyl)amino)-1-(4-(trifluoromethyl)phenyl)ethyl)-5-ethyl-2-methylpiperazin-1-yl)-1-methyl-2-oxo-1,2-dihydropyrido[3,2-d]pyrimidine-6-carbonitrile (47 mg, 9% yield) as an off-white solid. LCMS: m/z=553.1 (M+H); RT-1.889; (LCMS method: Column: XBridge C8 (50×4.6 mm) 5 μm; Mobile Phase: A: 0.1% TFA in H$_2$O; Mobile Phase: B: 0.1% TFA in ACN; Flow Rate: 1.5 mL/min. HPLC Ret. Time 8.448 and 7.126 min (HPLC Method FB and FC respectively). $^1$H NMR (400 MHz, DMSO-d$_6$): δ 8.24 (d, J=8.80 Hz, 1H), 7.98 (d, J=9.20 Hz, 1H), 7.71 (d, J=8.00 Hz, 2H), 7.59 (d, J=8.00 Hz, 2H), 6.20-5.35 (m, 1H), 5.10-4.70 (m, 1H), 3.94 (d, J=17.20 Hz, 1H), 3.70-3.67 (m, 1H), 3.42 (s, 3H), 3.07 (dd, J=6.40, 13.40 Hz, 1H), 2.81-2.77 (m, 2H), 2.40-2.30 (m, 1H), 2.28 (s, 3H), 1.34-1.12 (m, 6H), 0.89 (t, J=6.80 Hz, 3H). (−2H)

The fractions of Example 173 was concentrated under reduced pressure and diluted with ACN/H$_2$O (1:1) and lyophilized to yield 4-((2S,5R)-4-(2-((cyanomethyl)(methyl)amino)-1-(4-(trifluoromethyl)phenyl)ethyl)-5-ethyl-2-methylpiperazin-1-yl)-1-methyl-2-oxo-1,2-dihydropyrido[3,2-d]pyrimidine-6-carbonitrile (53.96 mg, 11.09% yield) as an off white solid. LCMS: m/z=553.2 (M+H); Ret. Time: 1.881; (LCMS method: Column: XBridge C8 (50×4.6 mm) 5 μm; Mobile Phase: A: 0.1% TFA in H$_2$O; Mobile Phase: B: 0.1% TFA in ACN; Flow Rate: 1.5 mL/min. HPLC Ret. Time 8.453 and 7.171 min (HPLC Method B and C respectively). $^1$H NMR (400 MHz, DMSO-d$_6$): δ 8.23 (d, J=8.80 Hz, 1H), 7.98 (d, J=9.20 Hz, 1H), 7.73 (d, J=8.40 Hz, 2H), 7.59 (d, J=8.00 Hz, 2H), 6.95-5.45 (m, 1H), 5.15-4.70 (m, 1H), 3.97 (d, J=17.20 Hz, 1H), 3.74-3.64 (m, 2H), 3.48 (s, 3H), 2.89 (dd, J=6.00, 13.40 Hz, 1H), 2.80-2.76 (m, 2H), 2.70-2.60 (m, 1H), 2.28 (s, 3H), 1.40-1.15 (m, 6H), 0.91 (t, J=7.60 Hz, 3H).

The examples in the Table 9 were prepared according to the general procedure described in the preparation of Examples 172 and 173, using the appropriate amines in the synthetic sequence. When the reaction provided a mixture of diastereomers, the mixture was separated at the final stage by preparative chiral SFC purification method. The absolute stereochemistry was not assigned at the newly formed carbon-nitrogen bond.

TABLE 9
| Ex. No. | Structure | LCMS Method | LCMS RT | M + H | Stereo. chem. |
|---|---|---|---|---|---|
| 174 | 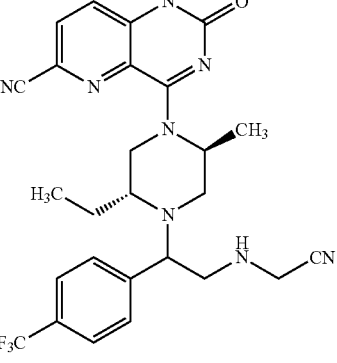 | FA | 3.01 | 539.0 | H |
| 175 | | FA | 2.95 | 539.0 | H |
| 176 | 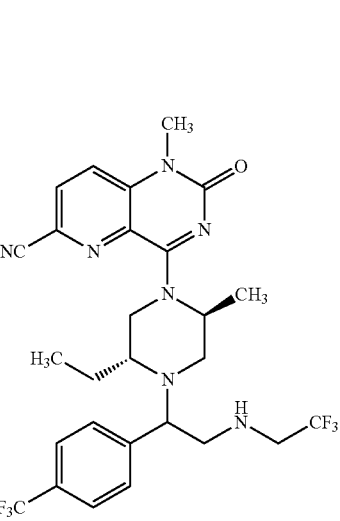 | FA | 3.40 | 582.0 | H |
| 177 | | FA | 3.38 | 582.0 | H |
| 178 | 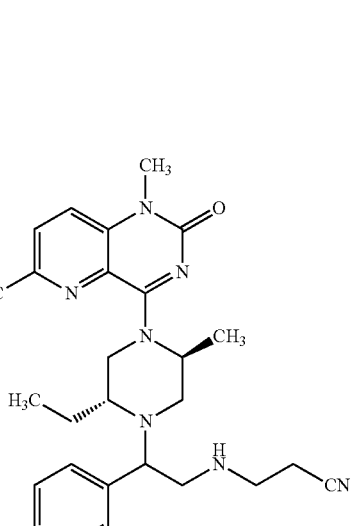 | FA | 2.22 | 553.2 | H |
| 179 | | FA | 2.24 | 553.2 | H |

TABLE 9-continued

| Ex. No. | Structure | LCMS Method | LCMS RT | M + H | Stereo. chem. |
|---|---|---|---|---|---|
| 180 | | FA | 2.72 | 596.1 | H |
| 181 | | FA | 2.65 | 596.2 | H |

Examples 182 and 183

4-((2S,5R)-4-(2-(((Cyanomethyl)(methyl)amino)-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile

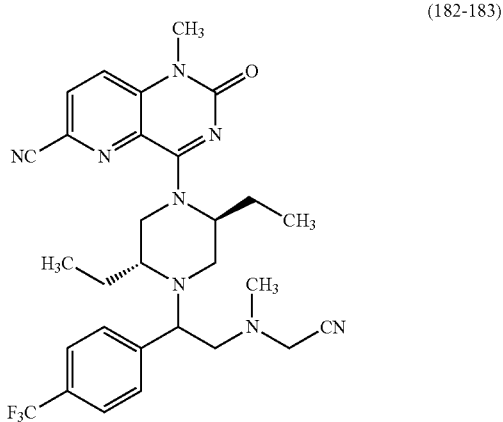 [SMILES: CC[C@H]1CN(C(CN(C)CC#N)c2ccc(C(F)(F)F)cc2)[C@H](CC)CN1c1nc(=O)n(C)c2ccc(C#N)nc12]

(182-183)

In a 20 mL sealed tube, to solution of 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)ethyl methanesulfonate (600 mg, 1.012 mmol) in anhydrous acetonitrile (10 mL) was added DIPEA (0.5 mL, 3.04 mmol) followed by 2-(methylamino)acetonitrile (213 mg, 3.04 mmol). The resultant reaction mixture was heated to 85° C. for 6 h. After completion of the reaction, the reaction mixture was diluted with water (100 mL) and extracted with EtOAc (100 mL×2). The combined organic layers were washed with sat. brine solution (150 mL) and dried over sodium sulphate, filtered and concentrated under reduced pressure. The residue thus obtained was purified by flash column chromatography on silica gel (230-400 mesh) using 70-80% EtOAc in hexane. The resultant material was further purified preparative HPLC (HPLC method: LUNA C18 (250×21.2) mm 5 micron; Mobile phase: 10 mm ammonium acetate in water/ACN to yield a diastereomeric mixture. The diastereomeric mixture was separated using chiral SFC (Method: Column: Chiralpak AS-H, Co-solvent: 30% IPA, Flow rate: 4 mL/minute) to afford Example 182 and 183 as an individual diastereomers.

The fractions of Example 182 were concentrated under reduced pressure and diluted with ACN/H$_2$O (1:1) and lyophilized to yield 4-((2S,5R)-4-(2-((cyanomethyl)(methyl)amino)-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile (17.5 mg, 2.75% yield) as an off-white solid. LCMS: m/z=567.0 (M+H); rt 2.532; (LCMS method: Column: XBridge C8 (50×4.6) mm, 3.5 μm; Mobile Phase: A: 10 mM NH$_4$HCO$_3$ in H$_2$O; Mobile Phase B: ACN; Flow Rate: 1.5 mL/min. HPLC Ret. Time 8.955 and 8.453 min (HPLC Method FB and FC respectively). $^1$H NMR (400 MHz, DMSO-d$_6$): δ 8.22 (d, J=9.20 Hz, 1H), 7.96 (d, J=8.80 Hz, 1H), 7.71 (d, J=8.00 Hz, 2H), 7.60 (d, J=8.00 Hz, 2H), 6.00-5.10 (m, 1H), 5.00-4.70 (m, 1H), 3.92 (d, J=17.20 Hz, 1H), 3.66-3.63 (m, 2H), 3.42 (s, 3H), 3.13-3.02 (m, 2H), 2.80-2.68 (m, 2H), 2.27 (s, 3H), 1.90-1.70 (m, 1H), 1.70-1.20 (m, 4H), 0.93-0.83 (m, 3H), 0.71-0.67 (m, 3H).

The fractions of Example 183 were concentrated under reduced pressure and diluted with ACN/H$_2$O (1:1) and lyophilized to yield 4-((2S,5R)-4-(2-((cyanomethyl)(methyl)amino)-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile (87.22 mg, 15.07% yield) as an off-white solid. LCMS: m/z=567.2 (M+H); rt 2.979; (LCMS method: Column: Kinetex XB-C18 (75×3.0) mm, 2.6 μm; Mobile Phase: A: 5 mm Ammonium formate pH 3.3: ACN (98:2); Mobile Phase: B: ACN: Buffer (98:2); Flow Rate: 1.0 mL/min. HPLC Ret. Time 6.193 and 5.753 min (HPLC Method B and C respectively). $^1$H NMR (400 MHz, DMSO-d$_6$): δ 8.24 (d, J=8.80 Hz, 1H), 7.98 (d, J=8.80 Hz, 1H), 7.73 (d, J=8.00 Hz, 2H), 7.57 (d, J=8.00 Hz, 2H), 6.00-5.30 (m, 1H), 4.88-4.84 (m, 1H), 3.95 (d, J=17.20 Hz, 1H), 3.74-3.65 (m, 2H), 3.43 (s, 3H), 2.98-2.87 (m, 2H), 2.79 (dd, J=8.00, 13.20 Hz, 1H), 2.70-2.63 (m, 2H), 2.23 (s, 3H), 1.85-1.50 (m, 2H), 1.45-1.25 (m, 2H), 1.00-0.70 (m, 6H).

The examples in the Table 10 were prepared according to the general procedure described in the preparation of Examples 182 and 183 using the appropriate amines in the synthetic sequence. When the reaction provided a mixture of diastereomers, the mixture was separated at the final stage by chiral SFC purification. The absolute stereochemistry was not assigned at the newly formed carbon-nitrogen bond.

TABLE 10

| Ex. No. | Structure | LCMS Method | LCMS RT | M + H | Stereo. chem. |
|---|---|---|---|---|---|
| 184 | | FA | 2.53 | 567.0 | H |
| 185 | | FA | 2.98 | 567.2 | H |
| 186 | | FE | 2.92 | 597.0 | H |
| 187 | | FA | 2.96 | 597.2 | H |
| 188 | | FA | 2.35 | 567.2 | H |
| 189 | | FA | 2.39 | 567.1 | H |

TABLE 10-continued

| Ex. No. | Structure | LCMS Method | LCMS RT | M + H | Stereo. chem. |
|---|---|---|---|---|---|
| 190 | | FA | 2.86 | 610.0 | H |
| 191 | | FA | 2.75 | 610.2 | H |

(structure shown for Ex. 190/191)

Intermediates 61 and 62

4-((2S,5R)-4-(2-Amino-1-(4-(trifluoromethyl)phenyl)ethyl)-5-ethyl-2-methylpiperazin-1-yl)-1-methyl-2-oxo-1,2-dihydropyrido[3,2-d]pyrimidine-6-carbonitrile

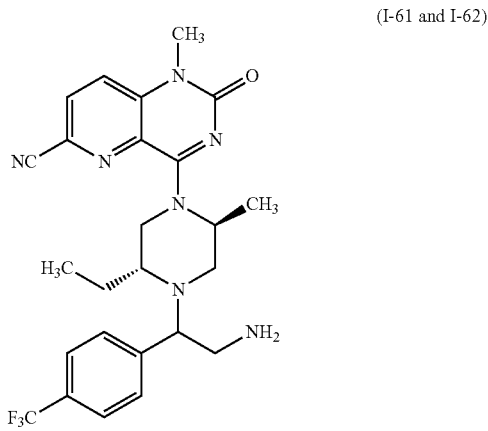 [SMILES: CC[C@@H]1CN(c2nc(=O)n(C)c3ccc(C#N)nc23)[C@@H](C)CN1C(CN)c1ccc(C(F)(F)F)cc1]

(I-61 and I-62)

In a 150 mL miniclave, to a stirred solution of 2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl methanesulfonate (1.3 g, 2.247 mmol) in anhydrous THF (10 mL) was added 0.5 M ammonia in THF (44.9 mL, 22.47 mmol). The resultant reaction mixture was heated to 70° C. for 16 h. After completion of the reaction, the volatiles were removed under reduced pressure and the resultant crude reaction mixture was purified by flash column chromatography on silica gel (230-400 mesh) eluting with 5-10% MeOH/DCM to afford 4-((2S,5R)-4-(2-amino-1-(4-(trifluoromethyl)phenyl)ethyl)-5-ethyl-2-methylpiperazin-1-yl)-1-methyl-2-oxo-1,2-dihydropyrido[3,2-d]pyrimidine-6-carbonitrile (750 mg, 45.4% yield) as a brown solid. 300 mg of obtained product was purified again using preparative HPLC (HPLC method: Column: XBridge C18(19×250), 5 Micron; Mobile phase A: 0.1% FA in water; Mobile phase B: 0.1% FA in Acetonitrile) to yield the examples 86 and 87 (150 mg, 95% LCMS purity) as a diastereomeric mixture. The resultant diastereomeric mixture was purified using chiral SFC (SFC method: Column: Chiralpak AD-H, Co-solvent: 0.5% IPA in MeOH, Flow rate: 4 mL/minute) to afford Intermediate 61 and Intermediate 62 as individual diastereomers.

The fractions of Intermediate 61 were concentrated once again purified by preparative HPLC (HPLC Method: Column: XBridge C18 (19×250), 5 Micron; Mobile phase A: 0.1% formic acid in water; Mobile phase B: 0.1% formic acid in acetonitrile). The fractions were evaporated under reduced pressure and diluted with ACN/H$_2$O (1:1) and lyophilized to yield 4-((2S,5R)-4-(2-amino-1-(4-(trifluoromethyl)phenyl)ethyl)-5-ethyl-2-methylpiperazin-1-yl)-1-methyl-2-oxo-1,2-dihydropyrido[3,2-d]pyrimidine-6-carbonitrile, HCOOH (30 mg, 2.036% yield) as an off-white solid. LCMS: m/z=500.0 (M+H); Ret. Time: 1.837; (LCMS method: Column: Kinetex XB-C18 (75×3.0) mm, 2.6 μm; Mobile Phase: A: 5 mm Ammonium formate pH 3.3: ACN (98:2); Mobile Phase: B: ACN: Buffer (98:2); Flow Rate: 1.0 mL/min. HPLC Ret. Time 6.076 and 7.178 min (HPLC Method FG and FC respectively). $^1$H NMR (400 MHz, DMSO-d$_6$): δ 8.56 (s, 1H, formate salt peak), 8.10 (d, J=8.80 Hz, 1H), 8.02 (d, J=8.80 Hz, 1H), 7.74 (d, J=8.40 Hz, 2H), 7.66 (d, J=8.40 Hz, 2H), 6.50-5.60 (m, 1H), 5.50-5.00 (m, 1H), 4.39 (dd, J=5.20, 8.60 Hz, 1H), 3.60 (s, 3H), 3.09 (dd, J=4.80, 12.00 Hz, 1H), 2.92 (dd, J=5.60, 13.40 Hz, 1H), 2.79-2.70 (m, 2H), 2.54 (dd, J=3.60, 12.20 Hz, 1H), 1.80-1.30 (m, 5H), 1.05 (t, J=7.60 Hz, 3H).

The fractions of Intermediate 62 were concentrated under reduced pressure and diluted with ACN/H$_2$O (1:1) and lyophilized to yield 4-((2S,5R)-4-(2-amino-1-(4-(trifluoromethyl)phenyl)ethyl)-5-ethyl-2-methylpiperazin-1-yl)-1-methyl-2-oxo-1,2-dihydropyrido[3,2-d]pyrimidine-6-carbonitrile (15.22 mg, 1.311% yield) as an off-white solid. LCMS: m/z=500.3 (M+H); Ret. Time: 2.088; (LCMS method: Column: XBridge C8 (50×4.6 mm) 5 μm; Mobile Phase: A: 10 mm ammonium acetate in H$_2$O; Mobile Phase: B: ACN: Flow Rate: 1.5 mL/min. HPLC Ret. Time 5.902 and 8.113 min (HPLC Method FH and FC respectively). $^1$H NMR (400 MHz, DMSO-d$_6$): δ 8.10 (d, J=8.80 Hz, 1H), 8.02 (d, J=8.80 Hz, 1H), 7.72 (d, J=8.00 Hz, 2H), 7.65 (d, J=8.00 Hz, 2H), 5.50-5.00 (m, 1H), 6.50-5.60 (m, 1H), 4.28-4.24 (m, 1H), 3.60 (s, 3H), 3.01 (dd, J=4.00, 12.20 Hz, 1H), 2.81-2.70 (m, 3H), 2.67 (d, J=1.60 Hz, 1H), 1.60-1.42 (m, 5H), 1.02 (t, J=7.20 Hz, 3H).

Examples 192 and 193

N-(2-((2R,5S)-4-(6-Cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl) acetamide

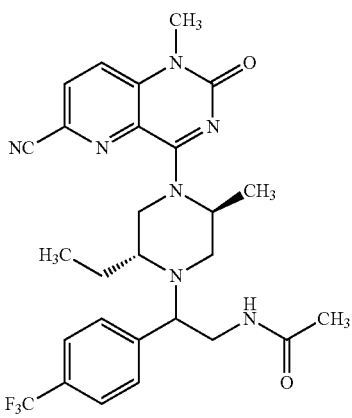 [SMILES: CC[C@@H]1CN(c2nc(=O)n(C)c3ccc(C#N)nc23)[C@@H](C)CN1C(CNS(C)(=O)=O)c1ccc(C(F)(F)F)cc1]
(192-193)

To a stirred solution of 4-((2S,5R)-4-(2-amino-1-(4-(trifluoromethyl)phenyl)ethyl)-5-ethyl-2-methylpiperazin-1-yl)-1-methyl-2-oxo-1,2-dihydropyrido[3,2-d]pyrimidine-6-carbonitrile (350 mg, 0.7 mmol) in anhydrous dichloromethane (10 mL) was added DIPEA (0.61 mL, 0.35 mmol) followed by the addition of acetyl chloride (0.1 mL, 1.4 mmol) at 0° C. The resultant reaction mixture was warmed to room temperature and stirred for 2 h. After completion of the reaction, the reaction mixture was diluted with water (100 mL) and extracted with EtOAc (100 mL×2). The combined organic layers were washed with saturated brine solution (150 mL) and dried over sodium sulphate. Filtered the organic layer and concentrated under reduced pressure. The crude product was purified by flash column chromatography on silica gel (230-400 mesh) eluting with 5-10% MeOH/DCM followed by preparative HPLC (Method: Column: ZORBAX C18 (50×21.5) mm, 5 micron, Mobile Phase A: 10 mM ammonium acetate in water, Mobile Phase B: Acetonitrile, Gradient: 90-40% A and 10-60% B, Flow rate: 15 m/minute) to afford N-(2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl) acetamide. The obtained diastereomeric mixture was purified by chiral SFC (Method: Column: Chiralpak Lux C4, Co-solvent: 0.5% Isopropyl amine in IPA, Flow rate: 3 m/minute) to afford Example 192 and Example 193 as individual diastereomers.

The fractions of Example 192 were concentrated under reduced pressure and diluted with ACN/H$_2$O (1:1) and lyophilized to yield N-(2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl) acetamide (32.27 mg, 8.39% yield) as an off-white solid. LCMS: m/z=542.0 (M+H); Ret. Time: 1.731; (Method D). HPLC Ret. Time 7.336 and 6.213 min (HPLC Method FB and FC respectively). $^1$H NMR (400 MHz, DMSO-d$_6$): δ 8.34 (d, J=8.40 Hz, 1H), 8.24 (d, J=9.20 Hz, 1H), 7.99 (d, J=8.80 Hz, 1H), 7.71 (d, J=8.00 Hz, 2H), 7.59 (d, J=8.00 Hz, 2H), 6.00-5.50 (m, 1H), 5.05-5.00 (m, 2H), 3.44 (s, 3H), 2.85 (dd, J=4.40, 12.00 Hz, 1H), 2.76 (dd, J=7.20, 12.80 Hz, 1H), 2.69-2.64 (m, 1H), 2.70-2.60 (m, 1H), 2.50-2.45 (m, 1H), 1.87 (s, 3H), 1.50-1.20 (m, 5H), 0.91 (t, J=7.60 Hz, 3H).

The fractions of Example 193 were concentrated under reduced pressure and diluted with ACN/H$_2$O (1:1) and lyophilized to yield N-(2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl) acetamide (27.02 mg, 7.02% yield) as an off white solid. LCMS: m/z=544.2 (M+H); Ret. Time: 1.746; (LCMS Method D). HPLC Ret. Time 7.444 (HPLC Method B). $^1$H NMR (400 MHz, DMSO-d$_6$): δ 8.32 (d, J=8.00 Hz, 1H), 8.25 (d, J=8.80 Hz, 1H), 7.99 (d, J=9.20 Hz, 1H), 7.69 (d, J=8.00 Hz, 2H), 7.57 (d, J=8.00 Hz, 2H), 6.00-5.45 (m, 1H), 5.03-4.97 (m, 2H), 3.44 (s, 3H), 2.84 (dd, J=4.00, 12.00 Hz, 1H), 2.73-2.63 (m, 3H), 1.90 (s, 3H), 1.42-1.08 (m, 6H), 0.88 (t, J=7.20 Hz, 3H).

The examples in the Table 12 were prepared according to the general procedure described in the preparation of Examples 192 and 193, using the appropriate amines in the synthetic sequence. When the reaction provided a mixture of diastereomers, the mixture was separated at the final stage by chiral SFC purification. The absolute stereochemistry was not assigned at the newly formed carbon-nitrogen bond.

TABLE 12

| Ex. No. | Structure | LCMS Method | LCMS RT | M + H | Stereo. chem. |
|---|---|---|---|---|---|
| 194 | | FF | 2.326 | 570.2 | H |
| 195 | | FF | 2.321 | 570.2 | H |

TABLE 12-continued

| Ex. No. | Structure | LCMS Method | LCMS RT | M + H | Stereo. chem. |
|---|---|---|---|---|---|
| 196 | | FF | 2.317 | 558.1 | H |
| 197 | | FF | 2.330 | 558.1 | H |
| 198 | | FF | 2.485 | 586.2 | H |
| 199 | | FF | 2.466 | 586.2 | H |
| 200 | | FD | 2.084 | 578.2 | H |
| 201 | | FA | 2.649 | 578.0 | H |

Intermediates 63 and 64

4-((2S,5R)-4-(2-Amino-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile

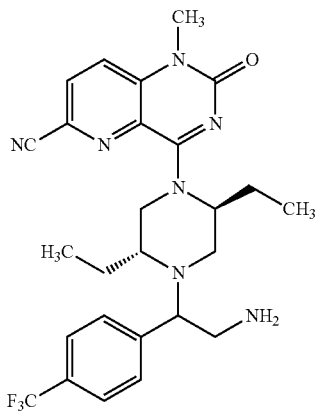

(I-63 and I-64)

In a 150 mL miniclave, to a stirred solution of 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)ethyl methanesulfonate (3.5 g, 5.91 mmol) in anhydrous THF (50 mL) was added 0.5 M ammonia in THF (118 mL, 59.1 mmol). The resultant reaction mixture was heated to 70° C. for 16 h. After completion of the reaction, the volatiles were removed under reduced pressure to afford crude 4-((2S,5R)-4-(2-amino-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile (3.0 g, 75% yield). 300 mg of obtained product was purified again using preparative HPLC (HPLC method: Column: X-Select C18(150×19) 5.0 micron; Mobile phase A: 10 mM Ammonium acetate in water; Mobile phase B: Acetonitrile) to yield a diastereomeric mixture. The resultant diastereomeric mixture was purified by chiral SFC (Method: Column: Chiralpak-(R,R) Whelk-01, Co-solvent: 0.5% IPA in MeOH, Flow rate: 3 mL/minute) to afford Intermediate 63 and Intermediate 64 as individual diastereomers.

The fractions of Intermediate 63 were concentrated and diluted with ACN/H$_2$O (1:1) and lyophilized to yield -((2S, 5R)-4-(2-amino-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile (26.09 mg, 8.6% yield) as a pale brown solid. LCMS: m/z=514.0 (M+H); Ret. Time: 1.830; (Method: Column: Kinetex XB-C18 (75×3.0) mm, 2.6 μm; Mobile Phase: A: 5 mm Ammonium formate pH 3.3: ACN (98:2); Mobile Phase: B: ACN:Buffer (98:2); Flow Rate: 1.0 mL/min. HPLC Ret. Time 7.801 and 6.305 min (HPLC Method FH and FI respectively). $^1$H NMR (400 MHz, DMSO-d$_6$): δ 8.25 (d, J=8.80 Hz, 1H), 7.99 (d, J=8.80 Hz, 1H), 7.72-7.58 (m, 4H), 6.00-5.30 (m, 1H), 5.05-4.80 (m, 1H), 4.08 (t, J=6.40 Hz, 1H), 3.44 (s, 3H), 2.83 (dd, J=4.00, 12.00 Hz, 1H), 2.70-2.60 (m, 3H), 2.20-1.90 (m, 2H), 1.88-1.70 (m, 2H), 1.50-1.30 (m, 2H), 1.00-0.70 (m, 6H).

The fractions of Intermediate 64 were concentrated and diluted with ACN/H$_2$O (1:1) and lyophilized to yield -((2S, 5R)-4-(2-amino-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile (13.6 mg, 4.53% yield) as a pale brown solid. LCMS: m/z=514.0 (M+H); Ret. Time: 1.850; (LCMS method: Column: Kinetex XB-C18 (75×3.0) mm, 2.6 μm; Mobile Phase: A: 5 mm Ammonium formate pH 3.3: ACN (98:2); Mobile Phase: B: ACN: Buffer (98:2); Flow Rate: 1.0 mL/min. HPLC Ret. Time 5.480 and 4.588 min (HPLC Method FB and FC respectively). $^1$H NMR (400 MHz, DMSO-d$_6$): δ 8.25 (d, J=8.80 Hz, 1H), 8.00 (d, J=8.00 Hz, 1H), 7.68-7.59 (m, 4H), 6.00-5.30 (m, 1H), 5.00-4.90 (m, 1H), 4.09 (dd, J=4.80, 9.00 Hz, 1H), 3.44 (s, 3H), 2.80-2.60 (m, 3H), 245.00-2.35 (m, 2H), 2.30-2.00 (m, 3H), 1.90-1.70 (m, 2H), 1.00-0.70 (m, 6H).

Examples 202 and 203

N-(2-((2R,5S)-4-(6-Cyano-1-methyl-2-oxo-1,2-dihydropyrido[3,2-d]pyrimidin-4-yl)-2,5-diethylpiperazin-1-yl)-2-(4-(trifluoromethyl)phenyl)ethyl)acetamide

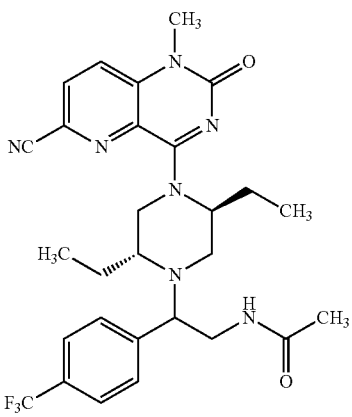

(202-203)

To a stirred solution of 4-((2S,5R)-4-(2-amino-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile (400 mg, 0.78 mmol) in anhydrous dichloromethane (5 mL) was added DIPEA (0.41 mL, 2.34 mmol) followed by the addition of acetyl chloride (0.09 mL, 1.17 mmol) at 0° C. The resultant reaction mixture was warmed to room temperature and stirred for 2 h. After completion of the reaction, the reaction mixture was diluted with DCM (50 mL), washed with saturated sodium bicarbonate (50 mL) followed by brine solution (50 mL) and dried over sodium sulphate. The organic layer was then filtered and concentrated under reduced pressure. The crude product was purified by preparative HPLC (Method: Kinetex EVO C18 (250×21.2) mm, 5 micron, Mobile Phase A: 10 mM Ammonium acetate in water, Mobile Phase B: Acetonitrile, Gradient: 60-10% A and 40-90% B, Flow rate: 15 mL/minute) to obtain N-(2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl)acetamide as a diastereomeric mixture. The obtained diastereomeric mixture was purified by chiral SFC (Method: Column: Chiralpak Lux A1, Co-solvent: IPA, Flow rate: 3 mL/minute) to afford Example 202 and Example 203 as individual diastereomers.

The fractions of Example 202 were concentrated under reduced pressure and diluted with ACN/H$_2$O (1:1) and lyophilized to yield N-(2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)ethyl)acetamide (52.21 mg, 11.97% yield) as an off-white solid. LCMS: m/z=556.0 (M+H); Ret. Time: 2.115; (LCMS Method A). HPLC Ret. Time 7.190 and 6.840 min (HPLC Method FH and FI respectively). $^1$H NMR (400 MHz, DMSO-d$_6$): δ 8.30 (d, J=8.40 Hz, 1H), 8.23 (d, J=9.20 Hz, 1H), 7.98 (d, J=8.80 Hz, 1H), 7.71 (d, J=8.40 Hz, 2H), 7.58 (d, J=8.00 Hz, 2H), 6.00-5.20 (m, 1H), 5.04-4.99 (m, 1H), 4.95-4.80 (m, 1H), 3.44 (s, 3H), 3.15-3.00 (m, 1H), 2.80-2.71 (m, 2H), 2.69-2.61 (m, 2H), 2.20-1.90 (m, 1H), 1.88 (s, 3H), 1.80-1.65 (m, 1H), 1.41-1.37 (m, 2H), 1.00-0.70 (m, 6H).

The fractions of Example 203 were concentrated under reduced pressure and diluted with ACN/H$_2$O (1:1) and lyophilized to yield N-(2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)ethyl)acetamide (34.77 mg, 7.91% yield) as an off white solid. LCMS: m/z=556.2 (M+H); Ret. Time: 2.131; (LCMS Method A). HPLC Ret. Time 7.218 and 6.846 (HPLC Method FH and FI respectively). $^1$H NMR (400 MHz, DMSO-d$_6$): δ 8.28 (d, J=7.20 Hz, 1H), 8.24 (d, J=8.80 Hz, 1H), 7.99 (d, J=8.80 Hz, 1H), 7.69 (d, J=8.00 Hz, 2H), 7.57 (d, J=8.00 Hz, 2H), 6.00-5.30 (m, 1H), 5.10-4.30 (m, 2H), 3.44 (s, 3H), 2.90-2.60 (m, 4H), 1.90 (s, 3H), 1.80-1.60 (m, 1H), 1.45-1.25 (m, 3H), 1.00-0.70 (m, 6H).

The examples in the Table 13 were prepared according to the general procedure described in the preparation of Examples 202 and 203, using the appropriate amines in the synthetic sequence. When the reaction provided a mixture of diastereomers, the mixture was separated at the final stage by chiral SFC purification. The absolute stereochemistry was not assigned at the newly formed carbon-nitrogen bond.

TABLE 13

| Ex. No. | Structure | LCMS Method | LCMS RT | M + H | Stereo. chem. |
|---|---|---|---|---|---|
| 204 |  | FA | 2.603 | 584.0 | H |
| 205 |  | FA | 2.617 | 584.2 | H |
| 206 |  | FF | 2.369 | 572.1 | H |
| 207 |  | FF | 2.380 | 572.2 | H |

TABLE 13-continued

| Ex. No. | Structure | LCMS Method | LCMS RT | M + H | Stereo. chem. |
|---|---|---|---|---|---|
| 208 | 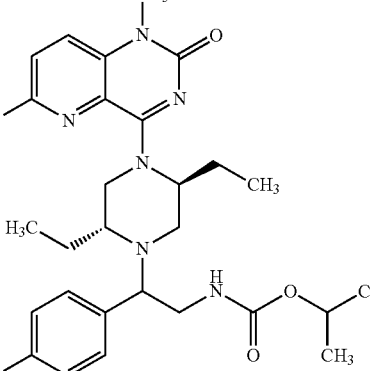 | FA | 2.402 | 600.0 | H |
| 209 | | FF | 2.533 | 600.2 | H |
| 210 | 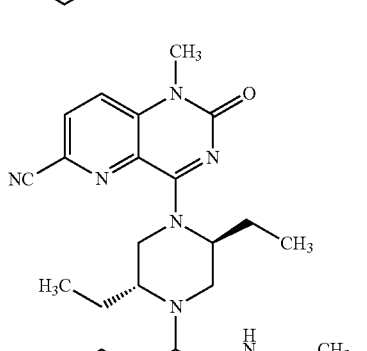 | FF | 2.306 | 592.1 | H |
| 211 | | FF | 2.321 | 592.2 | H |

Biological Assays

The pharmacological properties of the compounds of this invention may be confirmed by a number of biological assays. The exemplified biological assays, which follow, have been carried out with compounds of the invention.

Assay 1: In Vitro DGK Inhibition Assays—Method A

The DGKα and DGKζ reactions were performed using either extruded liposome (DGKα and DGKζ LIPGLO assays) or detergent/lipid micelle substrate (DGKα and DGKζ assays). The reactions were carried out in 50 mM MOPS pH 7.5, 100 mM NaCl, 10 mM MgCl$_2$, 1 µM CaCl$_2$), and 1 mM DTT (assay buffer). The reactions using a detergent/lipid micelle substrate also contained 50 mM octyl B-D-glucopyranoside. The lipid substrate concentrations were 11 mM PS and 1 mM DAG for the detergent/lipid micelle reactions. The lipid substrate concentrations were 2 mM PS, 0.25 mM DAG, and 2.75 mM PC for the extruded liposome reactions. The reactions were carried out in 150 µM ATP. The enzyme concentrations for the DGKα and DGKζ were 5 nM The compound inhibition studies were carried out as follows: 50 nL droplets of each test compound (top concentration 10 mM with 11 point, 3-fold dilution series for each compound) solubilized in DMSO were transferred to wells of a white 1536 well plate (Corning 3725). A 5 mL enzyme/substrate solution at 2× final reaction concentration was prepared by combining 2.5 mL 4× enzyme solution (20 nM DGKα or DGKζ (prepared as described below) in assay buffer) and 2.5 mL of either 4× liposome or 4× detergent/lipid micelle solution (compositions described below) and incubated at room temperature for 10 minutes. Next, 1 µL 2× enzyme/substrate solution was added to wells containing the test compound and reactions were initiated with the addition of 1 µL 300 uM ATP. The reactions were allowed to proceed for 1 hr, after which 2 µL Glo Reagent (Promega V9101) was added and incubated for 40 minutes. Next, 4 µL Kinase Detection Reagent was added and incubated for 30 minutes. Luminescence was recorded using an EnVision microplate reader. The percent inhibition was calculated from the ATP conversion generated by no enzyme control reactions for 100% inhibition and vehicle-only reactions for 0% inhibition. The compounds were evaluated at 11 concentrations to determine IC$_{50}$.

4× Detergent/lipid Micelle Preparation

The detergent/lipid micelle was prepared by combining 15 g phosphatidylserine (Avanti 840035P) and 1 g diacylglycerol (8008110) and dissolving into 150 mL chloroform in a 2 L round bottom flask. Chloroform was removed under high vacuum by rotary evaporation. The resulting colorless, tacky oil was resuspended in 400 mL 50 mM MOPS pH 7.5, 100 mM NaCl, 20 mM NaF, 10 mM MgCl$_2$, 1 µM CaCl$_2$), 1 mM DTT, and 200 mM octyl glucoside by vigorous mixing. The lipid/detergent solution was split into 5 mL aliquots and stored at −80° C.

4× Liposome Preparation

The lipid composition was 5 mol % DAG (Avanti 8008110), 40 mol % PS (Avanti 840035P), and 55 mol % PC (Avanti 850457) at a total lipid concentration of 15.2 mg/mL for the 4× liposome solution. The PC, DAG, and PS were dissolved in chloroform, combined, and dried in vacuo to a thin film. The lipids were hydrated to 20 mM in 50 mM MOPS pH 7.5, 100 mM NaCl, 5 mM MgCl$_2$, and were freeze-thawed five times. The lipid suspension was extruded through a 100 nm polycarbonate filter eleven times. Dynamic light scattering was carried out to confirm liposome size (50-60 nm radius). The liposome preparation was stored at 4° C. for as long as four weeks.

Baculovirus Expression of Human DGKα and DGKζ

Human DGK-alpha-TVMV-His-pFBgate and human DGK-zeta-transcript variant-2-TVMV-His-pFBgate baculovirus samples were generated using the Bac-to-Bac baculovirus expression system (Invitrogen) according to the manufacturer's protocol. The DNA used for expression of DGK-alpha and DGK-zeta have SEQ ID NOs: 1 and 3, respectively. Baculovirus amplification was achieved using infected Sf9 cells at 1:1500 virus/cell ratios, and grown for 65 hours at 27° C. post-transfection.

The expression scale up for each protein was carried out in the Cellbag 50L WAVE-Bioreactor System 20/50 from GE Healthcare Bioscience. 12 L of 2×10$^6$ cells/mL Sf9 cells (Expression System, Davis, CA) grown in ESF921 insect medium (Expression System) were infected with virus stock at 1:200 virus/cell ratios, and grown for 66-68 hours at 27° C. post-infection. The infected cell culture was harvested by centrifugation at 2000 rpm for 20 min 4° C. in a SORVALL® RC12BP centrifuge. The cell pellets were stored at −70° C. until purification.

Purification of Human DGK-Alpha and DGK-Zeta

Full length human DGKα and DGKζ, each expressed containing a TVMV-cleavable C-terminal Hexa-His tag sequence (SEQ ID NOs: 2 and 4, respectively) and produced as described above, were purified from Sf9 baculovirus-infected insect cell paste. The cells were lysed using nitrogen cavitation method with a nitrogen bomb (Parr Instruments), and the lysates were clarified by centrifugation. The clarified lysates were purified to ~90% homogeneity, using three successive column chromatography steps on an ÄKTA Purifier Plus system. The three steps column chromatography included nickel affinity resin capture (i.e. HisTrap FF crude, GE Healthcare), followed by size exclusion chromatography (i.e. HiLoad 26/600 Superdex 200 prep grade, GE Healthcare for DGK-alpha, and HiPrep 26/600 Sephacryl S 300_HR, GE Healthcare for DGK-zeta). The third step was ion exchange chromatography, and differed for the two isoforms. DGKα was polished using Q-Sepharose anion exchange chromatography (GE Healthcare). DGKζ was polished using SP Sepharose cation exchange chromatography (GE Healthcare). The proteins were delivered at concentrations of ≥2 mg/mL. The formulation buffers were identical for both proteins: 50 mM Hepes, pH 7.2, 500 mM NaCl, 10% v/v glycerol, 1 mM TCEP, and 0.5 mM EDTA.

Assay 2: In Vitro DGK Inhibition Assays—Method B

The DGKα and DGKζ reactions were performed using either extruded liposome (DGKα and DGKζ LIPGLO assays) or detergent/lipid micelle substrate (DGKα and DGKζ assays). The reactions were carried out in 50 mM MOPS pH 7.5, 100 mM NaCl, 10 mM MgCl$_2$, 1 μM CaCl$_2$), and 1 mM DTT (assay buffer). The reactions using a detergent/lipid micelle substrate also contained 50 mM octyl B-D-glucopyranoside. The lipid substrate concentrations were 11 mM PS and 1 mM DAG for the detergent/lipid micelle reactions. The lipid substrate concentrations were 2 mM PS, 0.25 mM DAG, and 2.75 mM PC for the extruded liposome reactions (5 mM total lipid). The reactions were carried out in 150 μM ATP. The enzyme concentrations for the DGKα and DGKζ were nM.

The compound inhibition studies were carried out as follows: 25 nL droplets of each test compound (top concentration 10 mM with 11 point, 3-fold dilution series for each compound) solubilized in DMSO were transferred to wells of a white 1536 well plate (Corning 3725). A 5 mL enzyme/lipid substrate solution at 2× final reaction concentration was prepared by combining 2.5 mL 4× enzyme solution (20 nM DGKα or DGKζ (prepared as described below) in assay buffer) and 2.5 mL of either 4× liposome or 4× detergent/lipid micelle solution (compositions described below) and incubated at room temperature for 10 minutes. Next, 1 μL 2× enzyme/lipid substrate solution was added to wells containing the test compound and reactions were initiated with the addition of 1 μL 300 uM ATP. The reactions were allowed to proceed for 2 hr, after which 2 μL Glo Reagent (Promega V9101) was added and incubated for 40 minutes. Next, 4 μL Kinase Detection Reagent was added and incubated for 30 minutes. Luminescence was recorded using an EnVision microplate reader. The percent inhibition was calculated from the ATP conversion generated by no enzyme control reactions for 100% inhibition and vehicle-only reactions for 0% inhibition. The compounds were evaluated at 11 concentrations to determine IC$_{50}$.

4× Detergent/Lipid Micelle Preparation

The detergent/lipid micelle was prepared by combining 15 g phosphatidylserine (Avanti 840035P) and 1 g diacylglycerol (8008110) and dissolving into 150 mL chloroform in a 2 L round bottom flask. Chloroform was removed under high vacuum by rotary evaporation. The resulting colorless, tacky oil was resuspended in 400 mL 50 mM MOPS pH 7.5, 100 mM NaCl, 20 mM NaF, 10 mM MgCl$_2$, 1 μM CaCl$_2$), 1 mM DTT, and 200 mM octyl glucoside by vigorous mixing. The lipid/detergent solution was split into 5 mL aliquots and stored at −80° C.

2× Liposome Preparation

The lipid composition was 5 mol % DAG (Avanti 8008110), 40 mol % PS (Avanti 840035P), and 55 mol % PC (Avanti 850457) at a total lipid concentration of 7-8 mg/mL for the liposome solution. The PC, DAG, and PS were dissolved in chloroform, combined, and dried in vacuo to a thin film. The lipids were hydrated to 20 mM in 50 mM MOPS pH 7.5, 100 mM NaCl, 5 mM MgCl$_2$, and were freeze-thawed five times. The lipid suspension was extruded through a 100 nm polycarbonate filter 10-12 times. Dynamic light scattering was carried out to confirm liposome size (50-60 nm radius). The liposome preparation was stored at 4° C. for as long as four weeks.

Baculovirus Expression of Near Full Length Human DGKα and Full Length DGKζ

Human MA-hDGKα-(S9-S727)-Ct-TVMV-His-pFBgate and full length human DGK-ζ-transcript variant-2-TVMV-His-pFBgate baculovirus samples were generated using the Bac-to-Bac baculovirus expression system (Invitrogen) according to the manufacturer's protocol (note: MA- in name of DGKα reagents indicates two extra amino acids added prior to Ser-9). The DNA used for expression of the DGK-α(9-727) and DGK-C have SEQ ID NOs: 5 and 3, respectively. Baculovirus amplification was achieved using infected Sf9 cells at 1:1500 virus/cell ratios, and grown for 65 hours at 27° C. post-transfection.

The expression scale up for the near full length DGK-α (9-727) protein was carried out in 2 L flasks, and the full length DGKζ was done using a Cellbag 50 L WAVE-Bioreactor System 20/50 from GE Healthcare Bioscience. The proteins were expressed at different volumes using similar conditions. For expression of DGKα (9-727), 2×2 L flasks each containing 0.8 L final volume of culture media were used, and DGKζ was grown at 12 L scale in a 50 L Cellbag. For each, an initial density of 2×10⁶ cells/mL Sf9 cells (Expression System, Davis, CA) was seeded in ESF921 insect medium (Expression System), infected with virus stock at 1:200 virus/cell ratios, and grown for 66-68 hours at 27° C. post-infection. The infected cell cultures were harvested by centrifugation at 2000 rpm for 20 min 4° C. in a SORVALL® RC12BP centrifuge. The cell pellets were stored at −80° C. until purification.

Purification of Human DGK-Alpha and DGK-Zeta

Human DGKα (9-727) and full length DGKζ, each expressed containing a TVMV-cleavable C-terminal Hexa-His tag sequence (SEQ ID NOs: 2 and 4, respectively) and produced as described above, were purified from Sf9 baculovirus-infected insect cell paste. The cell pastes were thawed and suspended in buffer (50 mM HEPES, pH 7.2, 300 mM NaCl, 10% v/v glycerol, 1 mM TCEP containing benzonase and protease inhibitors), to 1:10 v/v of original culture volume. Lysis was accomplished using the nitrogen cavitation method with a nitrogen bomb (Parr Instruments), and the lysates were clarified by high speed centrifugation. The clarified lysates were purified to ~90% homogeneity, using two or three successive column chromatography steps, respectively, on an ÄKTA Purifier Plus system. Both isoforms were purified by nickel affinity purification with imidazole gradient elution (i.e. HisTrap FF, GE Healthcare), followed by size exclusion chromatography (i.e. HiLoad 26/600 Superdex 200 prep grade, GE Healthcare, for DGKα (9-727), and HiPrep 26/600 Sephacryl S 300 HR, GE Healthcare, for DGKζ). These two steps yielded DGKα (9-727) at >90% purity. Achieving similar purity for full length DGKζ required a third step, employing cation exchange chromatography (SP Sepharose FF, GE Healthcare), and eluting with a NaCl gradient. The final formulation buffers were similar for both proteins, with DGKα (9-727) prepared in 50 mM Hepes, pH 7.3, 300 mM NaCl, 10% v/v glycerol, and 1 mM TCEP, and full length DGKζ prepared in 50 mM Hepes, pH 7.3, 500 mM NaCl, 5% v/v glycerol, and 1 mM TCEP. The proteins were concentrated to 1-2 mg/mL, flash frozen, and kept at −80° C. for long term storage.

Assay 3: Raji CD4 T Cell IL2 Assay

A 1536-well IL-2 assay was performed in 4 μL volume using pre-activated CD4 T cells and Raji cells. Prior to the assay, CD4 T cells were pre-activated by treatment with α-CD3, α-CD28 and PHA at 1.5 μg/mL, 1 μg/mL, and 10 μg/mL, respectively. Raji cells were treated with Staphylococcal enterotoxin B (SEB) at 10,000 ng/mL. Serially diluted compounds were first transferred to 1536-well assay plate (Corning, #3727), followed by addition of 2 μL of pre-activated CD4 T cells (final density at 6000 cells/well) and 2 μL of SEB-treated Raji cells (2000 cells/well). After 24 hours incubation at a 37° C./5% $CO_2$ incubator, 4 μl of IL-2 detection reagents were added to the assay plate (Cisbio, #64IL2PEC). The assay plates were read on an Envision reader. To assess compound cytotoxicity, either Raji or CD4 T cells were incubated with the serially diluted compounds. After 24 hours incubation, 4 μL of Cell Titer Glo (Promega, #G7572) were added, and the plates were read on an Envision reader. The 50% effective concentration ($IC_{50}$) was calculated using the four-parameter logistic formula $y=A+((B-A)/(1+((C/x)^D)))$, where A and B denote minimal and maximal % activation or inhibition, respectively, C is the $IC_{50}$, D is hill slope and x represent compound concentration.

Assay 4: CellTiter-Glo CD8 T Cell Proliferation Assay

Frozen naïve human CD8 T cells were thawed in RPMI+ 10% FBS, incubated for 2 h in 37° C., and counted. The 384-well tissue culture plate was coated overnight at 4° C. with 20 μl anti-human CD3 at 0.1 μg/mL in plain RPMI, which was removed off the plate before 20 k/40 μL CD8 T cells with 0.5 μg/mL soluble anti-human CD28 were added to each well. The compounds were echoed to the cell plate immediately after the cells were plated. After 72 h incubation at 37° C. incubator, 10 μL CellTiter-glo reagent (Promega catalog number G7570) was added to each well. The plate was vigorously shaken for 5 mins, incubated at room temperature for another 15 mins and read on Envision for CD8 T cell proliferation. In analysis, 0.1 μg/mL anti-CD3 and 0.5 μg/mL anti-CD28 stimulated CD8 T cell signal was background. The reference compound, 8-(4-(bis(4-fluorophenyl)methyl)piperazin-1-yl)-5-methyl-7-nitro-6-oxo-5,6-dihydro-1,5-naphthyridine-2-carbonitrile, at 3 μM was used to set the 100% range and $EC_{50}$ was at absolute 50% to normalize the data.

Assay 5: DGK AP1-Reporter Assay

The Jurkat AP1-luciferase Reporter was generated using the Cignal Lenti AP1 Reporter (luc) Kit from SABiosciences (CLS-011L).

The compounds were transferred from an Echo LDV plate to individual wells of a 384-well plate (white, solid-bottom, opaque PE CulturPlate 6007768) using an Echo550 instrument. The sample size was 30 nL per well; and one destination plate per source plate. The cell suspensions were prepared by transferring 40 mL cells (2×20 mL) to clean 50 mL conical tubes. The cells were concentrated by centrifugation (1200 rpm; 5 mins; ambient temperature). The supernatant was removed and all cells were suspended in RPMI (Gibco 11875)+10% FBS to make a 1.35×10⁶ cells/mL concentration. The cells were added manually using a multi-channel pipette, 30 μL/well of cell suspension to a 384-well TC plate containing the compounds, 4.0×10⁴ cells per well. The cell plates were incubated for 20 minutes at 37° C. and 5% $CO_2$.

During the incubation, anti-CD3 antibody (αCD3) solutions were prepared by mixing 3 μL αCD3 (1.3 mg/mL) with 10 mL medium [final conc=0.4 μg/mL]. Next, 1.5 μl aCD3 (1.3 mg/mL) was mixed with 0.5 mL medium [final conc=4 μg/mL]. After 20 minutes, 10 μL medium was added to all wells in column 1, wells A to M, and 10 μL αCD3 (4 ug/mL) per well was added in column 1, rows N to P for reference. Then using a multi-channel pipette, 10 μL αCD3 (0.4 ug/mL) per well was added. The αCD3 stimulated +/− compound-treated cells were incubated at 37° C., 5% $CO_2$ for 6 hours.

During this incubation period, Steady-Glo (Promega E2520) reagent was slowly thawed to ambient temperature. Next, 20 μL Steady-Glo reagent per well was added using a multi-drop Combi-dispenser. Bubbles were removed by centrifugation (2000 rpm, ambient temperature, 10 secs). The cells were incubated at room temperature for 5 minutes. Samples were characterized by measuring the Relative Light Units (RLU) with an using Envision Plate Reader Instrument on a luminescence protocol. The data was analyzed using the reference compound, 8-(4-(bis(4-fluorophenyl) methyl)piperazin-1-yl)-5-methyl-7-nitro-6-oxo-5,6-dihydro-1,5-naphthyridine-2-carbonitrile, to normalize 100% inhibition.

Assay 6: Murine Cytotoxic T Lymphocyte Assay

An antigen-specific cytolytic T-cell (CTL) assay was developed to evaluate functionally the ability of DGKα and DGKζ inhibitors to enhance effector T cell mediated tumor cell killing activity. CD8+ T-cells isolated from the OT-1 transgenic mouse recognize antigen presenting cells, MC38, that present the ovalbumin derived peptide SIINFEKL. Recognition of the cognate antigen initiates the cytolytic activity of the OT-1 antigen-specific CD8+ T cells.

Functional CTL cells were generated as follows: OT-1 splenocytes from 8-12 week old mice were isolated and expanded in the presence of the SIINFEKL peptide at 1 µg/mL and mIL2 at 10 U/mL. After three days, fresh media with mIL2 U/mL was added. On day 5 of the expansion, the CD8+ T cells were isolated and ready for use. Activated CTL cells may be stored frozen for 6 months. Separately, one million MC38 tumor cells were pulsed with 1 µg/mL of SIINFEKL-OVA peptide for 3 hours at 37° C. The cells were washed (3×) with fresh media to remove excess peptide. Finally, CTL cells that were pretreated with DGK inhibitors for 1 hour in a 96-well U bottom plate were combined with the antigen loaded MC38 tumor cells at a 1:10 ratio. The cells were then spun at 700 rpm for 5 min and placed in an incubator overnight at 37° C. After 24 hours, the supernatant was collected for analysis of IFN-γ cytokine levels by AlphaLisa purchased from Perkin Elmer.

Assay 7: PHA Proliferation Assay

Phytohaemagglutinin (PHA)-stimulated blast cells from frozen stocks were incubated in RPMI medium (Gibco, ThermoFisher Scientific, Waltham, MA) supplemented with 10% fetal bovine serum (Sigma Aldrich, St. Louis, MO) for one hour prior to adding to individual wells of a 384-well plate (10,000 cells per well). The compounds were transferred to individual wells of a 384-well plate and the treated cells are maintained at 37° C., 5% $CO_2$ for 72 h in culture medium containing human IL2 (20 ng/mL) prior to measuring growth using MTS reagent [3-(4,5-dimethyl-2-yl)-5-(3-carboxymethoxyphenyl)-2-(4-sulfophenyl)-2H-tetrazolium] following manufacturer's instructions (Promega, Madison, WI). Percent inhibition was calculated comparing values between IL2 stimulated (0% inhibition) and unstimulated control (100% inhibition). Inhibition concentration ($IC_{50}$) determinations were calculated based on 50% inhibition on the fold-induction between IL2 stimulated and unstimulated treatments.

Assay 8: Human CD8 T Cells IFN-γ Assay

Frozen naïve human CD8 T cells were thawed in AIM-V media, incubated for 2 h in 37° C., and counted. The 384-well tissue culture plate was coated overnight at 4° C. with 20 µL anti-human CD3 at 0.05 µg/mL in PBS, which was removed off the plate before 40,000 cells per 40 microliters CD8 T cells with 0.1 µg/mL soluble anti-human CD28 were added to each well. The compounds were transferred using an Echo liquid handler to the cell plate immediately after the cells were plated. After 20 h incubation at 37° C. incubator, 3 microliters per well supernatants transferred into a new 384-well white assay plate for cytokine measurement.

Interferon-γ (IFN-γ) was quantitated using the AlphLISA kit (Cat #AL217) as described by the manufacturer manual (Perkin Elmer). The counts from each well were converted to IFN-γ concentration (pg/mL). The compound $EC_{50}$ values were determined by setting 0.05 µg/mL anti-CD3 plus 0.1 µg/mL anti-CD28 as the baseline, and co-stimulation of 3 µM of the reference compound, 8-(4-(bis(4-fluorophenyl)methyl) piperazin-1-yl)-5-methyl-7-nitro-6-oxo-5,6-dihydro-1,5-naphthyridine-2-carbonitrile, with anti-CD3 plus anti-CD28 as 100% activation.

Assay 9: Human CD8 T Cells pERK Assay

Frozen naïve human CD8 T cells were thawed in AIM-V media, incubated for 2 h in 37° C., and counted. The CD8 positive T cells were added to 384-well tissue culture plate at 20,000 cells per well in AIM-V media. One compound was added to each well, then bead bound anti-human CD3 and anti-CD28 mAb were added at final concentration of 0.3 µg/mL. The cells were incubated at 37° C. for 10 minutes. The reaction was stopped by adding lysis buffer from the AlphaLISA Surefire kit. (Perkin Elmer, cat #ALSU-PERK-A). Lysate (5 µL per well) was transferred into a new 384-well white assay plate for pERK activation measurement.

Compound $EC_{50}$ was determined as setting anti-CD3 plus anti-CD28 as baseline, and co-stimulation of 3 µM 8-(4-(bis (4-fluorophenyl)methyl)piperazin-1-yl)-5-methyl-7-nitro-6-oxo-5,6-dihydro-1,5-naphthyridine-2-carbonitrile with anti-CD3 plus anti-CD28 as 100% activation.

Assay 10: Human Whole Blood IFN-γ Assay

Human venous whole blood (22.5 µL per well), obtained from healthy donors, was pre-treated with compounds for one hour at 37° C. in a humidified 95% air/5% $CO_2$ incubator. The blood was stimulated with 2.5 µL anti-human CD3 and anti-CD28 mAb at a final concentration of 1 µg/mL each for 24 hours at 37° C. IFN-7 in the supernatants was measured using AlphLISA kit (Cat #AL217).

Compound $EC_{50}$ determined as setting anti-CD3 plus anti-CD28 as baseline, and co-stimulation of 3 µM of the reference compound, 8-(4-(bis(4-fluorophenyl)methyl) piperazin-1-yl)-5-methyl-7-nitro-6-oxo-5,6-dihydro-1,5-naphthyridine-2-carbonitrile, with anti-CD3 plus anti-CD28 as 100% activation.

Assay 11: DGK Human Whole Blood pERK Assay

Human whole blood ERK phosphorylation assay was performed with human venous whole blood obtained from healthy donors (drawn with Heparin as anti-coagulant). Serial dilutions of compounds (11 points, 3-fold) in DMSO were added to 384 well plates at 20 nL/well using an ECHO 550 acoustic dispenser (Labcyte) to achieve final starting concentration of 20 µM in assay. Heparinized human whole blood was added to the compound plate at 9 µL per well and incubated for one hour at 37° C. in a humidified 95%, air/5% $CO_2$ incubator. After one hour of compound incubation, 1 µL of human anti-CD3 antibody (in-house) in the presence of cross-linking antibody goat anti-mouse IgG (4 µg/mL) was added to the well at 1 µg/mL final concentration for stimulation of pathway and additionally incubated for 15 minutes at 37° C. Stimulation was stopped by adding 90 µL Fix/Lyse buffer (BD 558049). Cells were washed and stained with anti-CD8 PE (BD 555635) antibodies for 60 minutes at room temperature, washed again, and permeabilized on ice using Perm III buffer (BD 558050) for 30 minutes. Cells were then stained with an Alexa Fluor® 647 anti-ERK1/2 Phospho (Thr202/Tyr204) Antibody (Bioleged 675504) for 60 minutes at 1:50 dilution. Samples were washed and resuspended in dPBS containing 1% BSA (dPBS, Gibco 14190136; BSA, Sigma-Aldrich A9205). Samples analyzed using the Intellicyt® iQue Screener PLUS. The pERK activation was quantitated by the percentage of pERK positive population within CD8 positive population. Calculations of compound potencies were based on internal compound at 20 µM concentration as a 100% activation, and anti-CD3 control as a 0% activation.

TABLE A

| Ex. No. | Assay 1 DGKα LIPGLO IC$_{50}$ (μM) | Assay 2 DGKα ADPGLO IC$_{50}$ (μM) | Assay 1 or 2 DGKζ LIPGLO IC$_{50}$ (μM) | Assay 10 INFg Whole Blood Normalized Agonist EC$_{50}$ (μM) | Assay 11 DGK HWB pERK IC$_{50}$ (μM) |
|---|---|---|---|---|---|
| 1 | 0.11 | — | 0.82 | 0.61 | — |
| 2 | 0.03 | — | 0.12 | 0.06 | 0.08 |
| 3 | 0.19 | — | 4.66 | — | — |
| 4 | 0.04 | — | 1.47 | — | — |
| 5 | 2.04 | — | 3.27 | — | — |
| 7 | 0.02 | — | 0.70 | 0.10 | — |
| 8 | 0.38 | — | 3.33 | — | — |
| 9 | 7.63 | — | 79.8 | — | — |
| 10 | 81.0 | — | 250 | 20.0 | — |
| 11 | 0.51 | — | 1.22 | — | — |
| 12 | 5.12 | — | 6.68 | — | — |
| 13 | 48.4 | — | 124 | 20.0 | — |
| 14 | 250 | — | 85.6 | 20.0 | — |
| 15 | 279 | — | 9.84 | 20.0 | 20.0 |
| 16 | 0.50 | — | 1.34 | 14.4 | 5.93 |
| 17 | 2.56 | — | 7.75 | 1.49 | — |
| 18 | 24.8 | — | 42.9 | 20.0 | — |
| 19 | 37.1 | — | 172 | 3.44 | — |
| 20 | 253 | — | 83.3 | — | — |
| 21 | 6.23 | — | 6.57 | 2.56 | — |
| 22 | 12.5 | — | 33.8 | 9.03 | — |
| 23 | 17.3 | — | 73.9 | 20.0 | — |
| 24 | 2.39 | — | 16.2 | 20.0 | — |
| 25 | 0.71 | — | 4.74 | 5.12 | — |
| 26 | 41.9 | — | 23.0 | 20.0 | 13.1 |
| 27 | 1.43 | — | 2.88 | 1.54 | — |
| 28 | 1.19 | — | 7.64 | 3.00 | — |
| 29 | 5.57 | — | 2.44 | 3.75 | — |
| 30 | 0.02 | — | 0.14 | — | — |
| 31 | 0.05 | — | 0.56 | 0.15 | — |
| 32 | 1.40 | — | 4.69 | 1.81 | — |
| 33 | 6.36 | — | 11.1 | — | — |
| 34 | 4.04 | — | 6.84 | — | — |
| 35 | 30.5 | — | 42.1 | — | — |
| 36 | 8.11 | — | 40.5 | — | — |
| 37 | 48.9 | — | 86.1 | — | — |
| 38 | 133 | — | 48.3 | — | — |
| 39 | 13.5 | — | 47.3 | — | — |
| 40 | 13.7 | — | 41.3 | — | — |
| 41 | 1.14 | — | 0.39 | 1.59 | 0.41 |
| 42 | 0.83 | — | 4.12 | 1.37 | — |
| 43 | 20.0 | — | 8.21 | 20.0 | — |
| 44 | 54.3 | — | 36.2 | 20.0 | 20.0 |
| 45 | 125 | — | 120 | 20.0 | — |
| 46 | 125 | — | 125 | 20.0 | — |
| 47 | 91.2 | — | 97.7 | 20.0 | — |
| 48 | 125 | — | 125 | 20.0 | — |
| 49 | 143 | — | 9.81 | 20.0 | — |
| 50 | 254 | — | 92.0 | 20.0 | — |
| 53 | — | 1.97 | 3.29 | — | 5.53 |
| 54 | — | 0.26 | 0.58 | — | 3.51 |
| 55 | — | 0.01 | — | — | — |
| 56 | — | 7.50 | 0.10 | — | 0.30 |
| 57 | 0.07 | — | 0.19 | 0.12 | — |
| 60 | — | 0.18 | — | — | — |
| 61 | — | — | — | — | — |
| 62 | 0.08 | — | 0.19 | 0.57 | — |
| 65 | 96.5 | — | 56.6 | — | — |
| 68 | 0.16 | — | 0.41 | — | — |

Table A lists in vitro DGK inhibition IC$_{50}$ activity values measured in the DGKα and DGKζ assays.

The compounds of the present invention possess activity as an inhibitor(s) of one or both of the DGKα and DGKζ enzymes, and therefore, may be used in the treatment of diseases associated with the inhibition of DGKα and DGKζ activity.

Nucleotide sequence encoding hDGKα-(M1-S735)-Ct-TVMV-His:
(SEQ ID NO: 1)

```
  1    ATGGCCAAGG AGAGGGGCCT AATAAGCCCC AGTGATTTTG CCCAGCTGCA

51    AAAATACATG GAATACTCCA CCAAAAAGGT CAGTGATGTC CTAAAGGTCT

101    TCGAGGATGG CGAGATGGCT AAATATGTCC AAGGAGATGC CATTGGGTAC

151    GAGGGATTCC AGCAATTCCT GAAAATCTAT CTCGAAGTGG ATAATGTTCC

201    CAGACACCTA AGCCTGGCAC TGTTTCAATC CTTTGAGACT GGTCACTGCT

251    TAAATGAGAC AAATGTGACA AAAGATGTGG TGTGTCTCAA TGATGTTTCC

301    TGCTACTTTT CCCTTCTGGA GGGTGGTCGG CCAGAAGACA AGTTAGAATT

351    CACCTTCAAG CTGTACGACA CGGACAGAAA TGGGATCCTG GACAGCTCAG

401    AAGTGGACAA AATTATCCTA CAGATGATGC GAGTGGCTGA ATACCTGGAT

451    TGGGATGTGT CTGAGCTGAG GCCGATTCTT CAGGAGATGA TGAAAGAGAT

501    TGACTATGAT GGCAGTGGCT CTGTCTCTCA AGCTGAGTGG GTCCGGGCTG

551    GGGCCACCAC CGTGCCACTG CTAGTGCTGC TGGGTCTGGA GATGACTCTG

601    AAGGACGACG GACAGCACAT GTGGAGGCCC AAGAGGTTCC CCAGACCAGT

651    CTACTGCAAT CTGTGCGAGT CAAGCATTGG TCTTGGCAAA CAGGGACTGA

701    GCTGTAACCT CTGTAAGTAC ACTGTTCACG ACCAGTGTGC CATGAAAGCC

751    CTGCCTTGTG AAGTCAGCAC CTATGCCAAG TCTCGGAAGG ACATTGGTGT

801    CCAATCACAT GTGTGGGTGC GAGGAGGCTG TGAGTCCGGG CGCTGCGACC

851    GCTGTCAGAA AAAGATCCGG ATCTACCACA GTCTGACCGG GCTGCATTGT
```

-continued

```
 901   GTATGGTGCC ACCTAGAGAT CGAGGATGAG TGCCTGCAAG CGGTGGGCCA
 951   TGAGTGTGAC TGTGGGCTGC TCCGGGATCA CATCCTGCCT CCATCTTCCA
1001   TCTATCCCAG TGTCCTGGCC TCTGGACCGG ATCGTAAAAA TAGCAAAACA
1051   AGCCAGAAGA CCATGGATGA TTTAAATTTG AGCACCTCTG AGGCTCTGCG
1101   GATTGACCCT GTTCCTAACA CCCACCCACT TCTCGTCTTT GTCAATCCTA
1151   AGAGTGGCGG GAAGCAGGGG CAGAGGGTGC TCTGGAAGTT CCAGTATATA
1201   TTAAACCCTC GACAGGTGTT CAACCTCCTA AAGGATGGTC CTGAGATAGG
1251   GCTCCGATTA TTCAAGGATG TTCCTGATAG CCGGATTTTG GTGTGTGGTG
1301   GAGACGGCAC AGTAGGCTGG ATTCTAGAGA CCATTGACAA AGCTAACTTG
1351   CCAGTTTTGC CTCCTGTTGC TGTGTTGCCC CTGGGTACTG GAAATGATCT
1401   GGCTCGATGC CTAAGATGGG GAGGAGGTTA TGAAGGACAG AATCTGGCAA
1451   AGATCCTCAA GGATTTAGAG ATGAGTAAAG TGGTACATAT GGATCGATGG
1501   TCTGTGGAGG TGATACCTCA ACAAACTGAA GAAAAAGTG ACCCAGTCCC
1551   CTTTCAAATC ATCAATAACT ACTTCTCTAT TGGCGTGGAT GCCTCTATTG
1601   CTCATCGATT CCACATCATG CGAGAGAAAT ATCCGGAGAA GTTCAACAGC
1651   AGAATGAAGA ACAAGCTATG GTACTTCGAA TTTGCCACAT CTGAATCCAT
1701   CTTCTCAACA TGCAAAAAGC TGGAGGAGTC TTTGACAGTT GAGATCTGTG
1751   GGAAACCGCT GGATCTGAGC AACCTGTCCC TAGAAGGCAT CGCAGTGCTA
1801   AACATCCCTA GCATGCATGG TGGCTCCAAC CTCTGGGGTG ATACCAGGAG
1851   ACCCCATGGG GATATCTATG GGATCAACCA GGCCTTAGGT GCTACAGCTA
1901   AAGTCATCAC CGACCCTGAT ATCCTGAAAA CCTGTGTACC AGACCTAAGT
1951   GACAAGAGAC TGGAAGTGGT TGGGCTGGAG GGTGCAATTG AGATGGGCCA
2001   AATCTATACC AAGCTCAAGA ATGCTGGACG TCGGCTGGCC AAGTGCTCTG
2051   AGATCACCTT CCACACCACA AAAACCCTTC CCATGCAAAT TGACGGAGAA
2101   CCCTGGATGC AGACGCCCTG TACAATCAAG ATCACCCACA GAACCAGAT
2151   GCCCATGCTC ATGGGCCCAC CCCCCCGCTC CACCAATTTC TTTGGCTTCT
2201   TGAGCGGATC CTCGGAGACA GTGCGGTTTC AGGGACACCA CCACCATCAC
2251   CACTGA
```

Amino acid sequence of hDGKα-(M1-S735)-Ct-TVMV-His:
(SEQ ID NO: 2)

```
0001 MAKERGLISP SDFAQLQKYM EYSTKKVSDV LKLFEDGEMA KYVQGDAIGY EGFQQFLKIY 0060
0061 LEVDNVPRHL SLALFQSFET GHCLNETNVT KDVVCLNDVS CYFSLLEGGR PEDKLEFTFK 0120
0121 LYDTDRNGIL DSSEVDKIIL QMMRVAEYLD WDVSELRPIL QEMMKEIDYD GSGSVSQAEW 0180
0181 VRAGATTVPL LVLLGLEMTL KDDGQHMWRP KRFPRPVYCN LCESSIGLGK QGLSCNLCKY 0240
0241 TVHDQCAMKA LPCEVSTYAK SRKDIGVQSH VWVRGGCESG RCDRCQKKIR IYHSLTGLHC 0300
0301 VWCHLEIHDD CLQAVGHECD CGLLRDHILP PSSIYPSVLA SGPDRKNSKT SQKTMDDLNL 0360
0361 STSEALRIDP VPNTHPLLVF VNPKSGGKQG QRVLWKFQYI LNPRQVFNLL KDGPEIGLRL 0420
0421 FKDVPDSRIL VCGGDTVGW ILETIDKANL PVLPPVAVLP LGTGNDLARC LRWGGGYEGQ 0480
0481 NLAKILKDLE MSKVVHMDRW SVEVIPQQTE EKSDPVPFQI INNYFSIGVD ASIAHRFHIM 0540
0541 REKYPEKFNS RMKNKLWYFE FATSESIFST CKKLEESLTV EICGKPLDLS NLSLEGIAVL 0600
0601 NIPSMHGGSN LWGDTRRPHG DIYGINQALG ATAKVITDPD ILKTCVPDLS DKRLEVVGLE 0660
```

-continued

```
0661 GAIEMGQIYT KLKNAGRRLA KCSEITFHTT KTLPMQIDGE PWMQTPCTIK ITHKNQMPML 0720

0721 MGPPPRSTNF FGFLSGSSET VRFQGHHHHH H                              0751
```

Nucleotide sequence encoding hDGKζ-(M1-A928)-
transcript variant-2 Ct-TVMV-His:

(SEQ ID NO: 3)

```
   1        ATGGAGCCGC GGGACGGTAG CCCCGAGGCC CGGAGCAGCG ACTCCGAGTC

51        GGCTTCCGCC TCGTCCAGCG GCTCCGAGCG CGACGCCGGT CCCGAGCCGG

101        ACAAGGCGCC GCGGCGACTC AACAAGCGGC GCTTCCCGGG GCTGCGGCTC

151        TTCGGGCACA GGAAAGCCAT CACGAAGTCG GCCTCCAGC ACCTGGCCCC

201        CCCTCCGCCC ACCCCTGGGG CCCCGTGCAG CGAGTCAGAG CGGCAGATCC

251        GGAGTACAGT GGACTGGAGC GAGTCAGCGA CATATGGGGA GCACATCTGG

301        TTCGAGACCA ACGTGTCCGG GGACTTCTGC TACGTTGGGG AGGAGTACTG

351        TGTAGCCAGG ATGCTGCAGA AGTCAGTGTC TCGAAGAAAG TGCGCAGCCT

401        GCAAGATTGT GGTGCACACG CCCTGCATCG AGCAGCTGGA GAAGATAAAT

451        TTCCGCTGTA AGCCGTCCTT CCGTGAATCA GGCTCCAGGA ATGTCCGGGA

501        GCCAACCTTT GTACGGCACC ACTGGGTACA CAGACGACGC CAGGACGGCA

551        AGTGTCGGCA CTGTGGGAAG GGATTCCAGC AGAAGTTCAC CTTCCACAGC

601        AAGGAGATTG TGGCCATCAG CTGCTCGTGG TGCAAGCAGG CATACCACAG

651        CAAGGTGTCC TGCTTCATGC TGCAGCAGAT CGAGGAGCCG TGCTCGCTGG

701        GGGTCCACGC AGCCGTGGTC ATCCCGCCCA CCTGGATCCT CCGCGCCCGG

751        AGGCCCCAGA ATACTCTGAA AGCAAGCAAG AAGAAGAAGA GGGCATCCTT

801        CAAGAGGAAG TCCAGCAAGA AAGGGCCTGA GGAGGGCCGC TGGAGACCCT

851        TCATCATCAG GCCCACCCCC TCCCCGCTCA TGAAGCCCCT GCTGGTGTTT

901        GTGAACCCCA AGAGTGGGGG CAACCAGGGT GCAAAGATCA TCCAGTCTTT

951        CCTCTGGTAT CTCAATCCCC GACAAGTCTT CGACCTGAGC CAGGGAGGGC

1001        CCAAGGAGGC GCTGGAGATG TACCGCAAAG TGCACAACCT GCGGATCCTG

1051        GCGTGCGGGG CGACGGCAC GGTGGGCTGG ATCCTCTCCA CCCTGGACCA

1101        GCTACGCCTG AAGCCGCCAC CCCCTGTTGC CATCCTGCCC CTGGGTACTG

1151        GCAACGACTT GGCCCGAACC CTCAACTGGG GTGGGGGCTA CACAGATGAG

1201        CCTGTGTCCA AGATCCTCTC CCACGTGGAG GAGGGAACG TGGTACAGCT

1251        GGACCGCTGG GACCTCCACG CTGAGCCCAA CCCCGAGGCA GGGCCTGAGG

1301        ACCGAGATGA AGGCGCCACC GACCGGTTGC CCCTGGATGT CTTCAACAAC

1351        TACTTCAGCC TGGGCTTTGA CGCCCACGTC ACCCTGGAGT TCCACGAGTC

1401        TCGAGAGGCC AACCCAGAGA AATTCAACAG CCGCTTTCGG AATAAGATGT

1451        TCTACGCCGG GACAGCTTTC TCTGACTTCC TGATGGGCAG CTCCAAGGAC

1501        CTGGCCAAGC ACATCCGAGT GGTGTGTGAT GGAATGGACT TGACTCCCAA

1551        GATCCAGGAC CTGAAACCCC AGTGTGTTGT TTTCCTGAAC ATCCCCAGGT

1601        ACTGTGCGGG CACCATGCCC TGGGGCCACC CTGGGGAGCA CCACGACTTT

1651        GAGCCCCAGC GGCATGACGA CGGCTACCTC GAGGTCATTG GCTTCACCAT

1701        GACGTCGTTG GCCGCGCTGC AGGTGGGCGG ACACGGCGAG CGGCTGACGC

1751        AGTGTCGCGA GGTGGTGCTC ACCACATCCA AGGCCATCCC GGTGCAGGTG

1801        GATGGCGAGC CTGCAAGCT TGCAGCCTCA CGCATCCGCA TCGCCCTGCG
```

```
1851    CAACCAGGCC ACCATGGTGC AGAAGGCCAA GCGGCGGAGC GCCGCCCCCC

1901    TGCACAGCGA CCAGCAGCCG GTGCCAGAGC AGTTGCGCAT CCAGGTGAGT

1951    CGCGTCAGCA TGCACGACTA TGAGGCCCTG CACTACGACA AGGAGCAGCT

2001    CAAGGAGGCC TCTGTGCCGC TGGGCACTGT GGTGGTCCCA GGAGACAGTG

2051    ACCTAGAGCT CTGCCGTGCC ACATTGAGA GACTCCAGCA GGAGCCCGAT

2101    GGTGCTGGAG CCAAGTCCCC GACATGCCAG AAACTGTCCC CAAGTGGTG

2151    CTTCCTGGAC GCCACCACTG CCAGCCGCTT CTACAGGATC GACCGAGCCC

2201    AGGAGCACCT CAACTATGTG ACTGAGATCG CACAGGATGA GATTTATATC

2251    CTGGACCCTG AGCTGCTGGG GGCATCGGCC CGGCCTGACC TCCCAACCCC

2301    CACTTCCCCT CTCCCCACCT CACCCTGCTC ACCCACGCCC CGGTCACTGC

2351    AAGGGGATGC TGCACCCCCT CAAGGTGAAG AGCTGATTGA GGCTGCCAAG

2401    AGGAACGACT TCTGTAAGCT CCAGGAGCTG CACCGAGCTG GGGGCGACCT

2451    CATGCACCGA GACGAGCAGA GTCGCACGCT CCTGCACCAC GCAGTCAGCA

2501    CTGGCAGCAA GGATGTGGTC CGCTACCTGC TGGACCACGC CCCCCCAGAG

2551    ATCCTTGATG CGGTGGAGGA AAACGGGGAG ACCTGTTTGC ACCAAGCAGC

2601    GGCCCTGGGC CAGCGCACCA TCTGCCACTA CATCGTGGAG GCCGGGGCCT

2651    CGCTCATGAA GACAGACCAG CAGGGCGACA CTCCCCGGCA GCGGGCTGAG

2701    AAGGCTCAGG ACACCGAGCT GGCCGCCTAC CTGGAGAACC GGCAGCACTA

2751    CCAGATGATC CAGCGGGAGG ACCAGGAGAC GGCTGTGGGA TCCTCGGAGA

2801    CAGTGCGGTT TCAGGGACAC CACCACCATC ACCACTGA
```

Amino acid sequence of hDGKζ-(M1-A928)-transcript variant-2 Ct-TVMV-His:

```
                                                       (SEQ ID NO: 4)
0001 MEPRDGSPEA RSSDSESASA SSSGSERDAG PEPDKAPRRL NKRRFPGLRL FGHRKAITKS 0060

0061 GLQHLAPPPP TPGAPCSESE RQIRSTVDWS ESATYGEHIW FETNVSGDFC YVGEQYCVAR 0120

0121 mLQKSVSRRK CAACKIVVHT PCIEQLEKIN FRCKPSFRES GSRNVREPTF VRHHWVHRRR 0180

0181 QDGKCRHCGK GFQQKFTFHS KEIVAISCSW CKQAYHSKVS CFMLQQIEEP CSLGVHAAVV 0240

0241 IPPTWILRAR RPQNTLKASK KKRASFKRK SSKKGPEEGR WRPFIIRPTP SPLMKPLLVF 0300

0301 VNPKSGGNQG AKIIQSFLWY LNPRQVFDLS QGGPKEALEM YRKVHNLRIL ACGGDGTVGW 0360

0361 ILSTLDQLRL KPPPPVAILP LGTGNDLART LNWGGGYTDE PVSKILSHVE EGNVVQLDRW 0420

0421 DLHAEPNPEA GPEDRDEGAT DRLPLDVFNN YFSLGFDAHV TLEFHESREA NPEKFNSRFR 0480

0481 NKMFYAGTAF SDFLMGSSKD LAKHIRVVCD GMDLTPKIQD LKPQCVVFLN IPRYCAGTMP 0540

0541 WGHPGEHHDF EPQRHDDGYL EVIGFTMTSL AALQVGGHGE RLTQCREVVL TTSKAIPVQV 0600

0601 DGEPCKLAAS RIRIALRNQA TMVQKAKRRS AAPLHSDQQP VPEQLRIQVS RVSMHDYEAL 0660

0661 HYDKEQLKEA SVPLGTVVVP GDSDLELCRA HIERLQQEPD GAGAKSPTCQ KLSPKWCFLD 0720

0721 ATTASRFYRI DRAQEHLNYV TEIAQDEIYI LDPELLGASA RPDLPTPTSP LPTSPCSPTP 0780

0781 RSLQGDAAPP QGEELIEAAK RNDFCKLQEL HRAGGDLMHR DEQSRTLLHH AVSTGSKDVV 0840

0841 RYLLDHAPPE ILDAVEENGE TCLHQAAALG QRTICHYIVE AGASLMKTDQ QGDTPRQRAE 0900

0901 KAQDTELAAY LENRQHYQMI QREDQETAVG SSETVRFQGH HHHHH                 0945
```

Nucleotide sequence encoding MA-hDGKα-(S9-S727)-Ct-TVMV-His:

```
                                                       (SEQ ID NO: 5)
0001 ATGGCTTCCC CAAGCGACTT CGCCCAGCTG CAGAAGTACA TGGAATACAG CACCAAGAAG 0060

0061 GTGTCTGACG TCCTGAAGCT GTTCGAGGAC GGTGAAATGG CTAAGTACGT CCAGGGCGAC 0120
```

```
0121 GCTATCGGAT AGGAGGGATT CCAGCAGTTC CTGAAGATCT ACCTGGAAGT GGACAACGTC 0180
0181 CCCAGGCACC TGTCACTGGC TCTGTTCCAG TCCTTCGAGA CTGGCCACTG CCTGAACGAA 0240
0241 ACCAACGTCA CTAAGGACGT GGTCTGCCTG AACGACGTGA GCTGCTACTT CTCTCTGCTG 0300
0301 GAGGGTGGCA GACCAGAGGA CAAGCTGGAA TTCACCTTCA AGGTGTACGA CACTGACCGC 0360
0361 AACGGAATCC TGGACTCCAG CGAAGTGGAC AAGATCATCC TGCAGATGAT GCGTGTCGCT 0420
0421 GAGTACCTGG ACTGGGACGT GAGCGAACTG AGGCCTATCC TGCAGGAGAT GATGAAGGAA 0480
0481 ATCGACTACG ACGGCTCTGG ATCAGTGTCC CAGGCTGAGT GGGTCCGCGC TGGTGCTACC 0540
0541 ACTGTGCCAC TGCTGGTCCT GCTGGGACTG GAAATGACCC TGAAGGACGA CGGTCAGCAC 0600
0601 ATGTGGCGCC CAAAGCGTTT CCCCAGGCCA GTCTACTGCA ACCTGTGCGA GTCTTCAATC 0660
0661 GGTCTGGGCA AGCAGGGCCT GTCATGCAAC CTGTGCAAGT ACACCGTGCA CGACCAGTGC 0720
0721 GCTATGAAGG CCCTGCCCTG CGAGGTCTCA ACTTACGCTA AGTCCCGTAA GGACATCGGA 0780
0781 GTGCAGTCAC ACGTGTGGGT CAGGGGAGGT TGCGAATCCG GTAGATGCGA CCGCTGCCAG 0840
0841 AAGAAGATCC GTATCTACCA CTCCCTGACC GGACTGCACT GCGTCTGGTG CCACCTGGAG 0900
0901 ATCCACGACG ACTGCCTGCA GGCCGTGGGA CACGAATGCG ACTGCGGTCT GCTGCGTGAC 0960
0961 CACATCCTGC CTCCCTCCAG CATCTACCCT TCAGTCCTGG CTTCCGGTCC CGACAGGAAG 1020
1021 AACAGCAAGA CCTCTCAGAA GACTATGGAC GACCTGAACC TGAGCACCTC TGAGGCCCTG 1080
1081 CGCATCGACC CTGTGCCCAA CACTCACCCA CTGCTGGTGT CGTCAACCC TAAGAGCGGC 1140
1141 GGAAAGCAGG GTCAGAGAGT CCTGTGGAAG TTCCAGTACA TCCTGAACCC ACGCCAGGTG 1200
1201 TTCAACCTGC TGAAGGACGG CCCTGAGATC GGACTGAGAC TGTTCAAGGA CGTGCCCGAC 1260
1261 TCTCGCATCC TCGTCTGCGG TGGCGACGGT ACTGTGGGAT GGATCCTGGA AACTATCGAC 1320
1321 AAGGCTAACC TGCCAGTGCT GCCACCTGTG CTGTCCTGC ACTGGGAAC CGGTAACGAC 1380
1381 CTGGCTCGTT GCCTGCGTTG GGGAGGTGGC TACGAGGGAC AGAACCTGGC CAAGATCCTG 1440
1441 AAGGACCTGG AAATGAGCAA GGTGGTCCAC ATGGACAGAT GGTCTGTGGA GGTCATCCCA 1500
1501 CAGCAGACTG AGGAAAAGTC AGACCCAGTC CCTTTCCAGA TCATCAACAA CTACTTCAGC 1560
1561 ATCGGTGTGG ACGCTTCTAT CGCCCACAGA TTCCACATCA TGCGCGAGAA GTACCCTGAA 1620
1621 AAGTTCAACT CCCGCATGAA GAACAAGCTG TGGTACTTCG AGTTCGCTAC CTCAGAATCC 1680
1681 ATCTTCTCAA CTTGCAAGAA GCTGGAGGAA TCCCTGACCG TCGAGATCTG CGGCAAGCCT 1740
1741 CTGGACCTGT CAAACCTGTC CCTGGAAGGC ATCGCTGTGC TGAACATCCC AAGCATGCAC 1800
1801 GGAGGTTCTA ACCTCTGGGG GGACACTAGG AGGCCTCACG TGACATCTA CGGCATCAAC 1860
1861 CAGGCCCTGG GAGCTACCGC CAAGGTCATC ACTGACCCCG ACATCCTGAA GACCTGCGTG 1920
1921 CCAGACCTGA GCGACAAGCG TCTGGAGGTG GTCGGACTGG AGGGTGCCAT CGAAATGGGC 1980
1981 CAGATCTACA CTAAGCTGAA GAACGCTGGA AGGAGACTGG CCAAGTGCTC TGAGATCACC 2040
2041 TTCCACACCA CTAAGACTCT GCCTATGCAG ATCGACGGTG AACCCTGGAT GCAGACCCCA 2100
2101 TGCACTATCA AGATCACCCA CAAGAACCAG ATGCCCATGC TGATGGGTCC TCCTCCTCGC 2160
2161 TCTGGATCTT CAGAAACTGT GAGGTTCCAG GCCACCACC ACCACCACCA CTGA       2214
```

Amino acid sequence of MA-hDGKα-(S9-S727)-Ct-TVMV-His:
(SEQ ID NO: 6)
```
0001 MASPSDFAQL QKYMEYSTKK VSDVLKLFED GEMAKYVQGD AIGYEGFQQF LKIYLEVDNV 0060
0061 PRHLSLALFQ SFETGHCLNE TNVTKDVVCL NDVSCYFSLL EGGRPEDKLE FTFKLYDTDR 0120
0121 NGILDSSEVD KIILQMMRVA EYLDWDVSEL RPILQEMMKE IDYDGSGSVS QAEWVRAGAT 0180
0181 TVPLLVLLGL EMTLKDDGQH MWRPKRFPRP VYCNLCESSI GLGKQGLSCN LCKYTVHDQC 0240
```

```
-continued
0241 AMKALPCEVS TYAKSRKDIG VQSHVWVRGG CESGRCDRCQ KKIRIYHSLT GLHCVWCHLE 0300

0301 IHDDCLQAVG HECDCGLLRD HILPPSSIYP SVLASGPDRK NSKTSQKTMD DLNLSTSEAL 0360

0361 RIDPVPNTHP LLVFVNPKSG GKQGQRVLWK FQYILNPRQV FNLLKDGPEI GLRLFKDVPD 0420

0421 SRILVCGGDG TVGWILETID KANLPVLPPV AVLPLGTGND LARCLRWGGG YEGQNLAKIL 0480

0481 KDLEMSKVVH MDRWSVEVIP QQTEEKSDPV PFQIINNYFS IGVDASIAHR FHIMREKYPE 0540

0541 KFNSRMKNKL WYFEFATSES IFSTCKKLEE SLTVEICGKP LDLSNLSLEG IAVLNIPSMH 0600

0601 GGSNLWGDTR RPHGDIYGIN QALGATAKVI TDPDILKTCV PDLSDKRLEV VGLEGAIEMG 0660

0661 QIYTKLKNAG RRLAKCSEIT FHTTKTLPMQ IDGEPWMQTP CTIKITHKNQ MPMLMGPPPR 0720

0721 SGSSETVRFQ GHHHHHH                                                 0737
```

---

What is claimed is:

1. A compound of Formula (I):

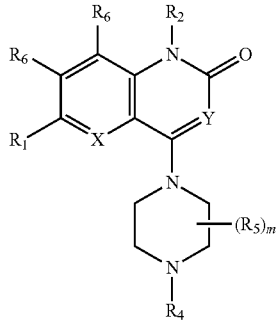

(I)

or a salt thereof, wherein:

X is N;

Y is $CR_3$ or N;

$R_4$ is $-CR_{4a}R_{4c}$-L-$R_{4b}$;

L is $L_1$ or $-(CH_2)_{1-2}L_1-$;

R is Cl or $-CN$;

$R_2$ is $-CH_3$;

$R_3$ is H;

$L_1$ is $-C(O)-$, $-C(O)O-$, $-C(O)NR_d-$, $-C(O)NHO-$, $-C(O)NHS(O)_2-$, $-CH_2C(O)-$, $-CH_2NR_d-$, $-CH_2NHC(O)-$, $-CH_2NHC(O)O-$, $-CH_2NHS(O)_2-$, $-CH_2C(O)O-$, $-CH_2C(O)NR_d-$, $-CH_2CH_2NHC(O)O-$, $-CH_2CH_2NHS(O)_2-$, or $-P(O)(CH_3)-$;

$R^{4a}$ is:
  (i) $-CH_3$; or
  (ii) phenyl or pyridinyl, each substituted with zero to 2 substituents independently selected from F, $-CH_3$, $-CF_3$, and $-OCH_3$;

$R^{4b}$ is:
  (i) H, $-CN$, $C_{1-4}$ alkyl, $-CH_2CN$, $-CH_2CHF_2$, $-CH_2CF_3$, $-CH_2CH_2OH$, $-CH_2CH_2CN$, $-CH_2CH_2CF_3$, $-CH_2CH_2OCH_3$, $-CH_2CH_2S(O)_2CH_3$, $-CH_2C(CH_3)_2OH$, $-CH_2(cyclopropyl)$, $-CH_2(hydroxycyclopropyl)$,

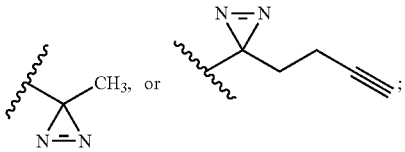

or (ii) azetidinyl, cyclopropyl, cyclopentyl, morpholinyl, pyrazolyl, isoxazolyl, piperidinyl, piperazinyl, pyrazolyl, pyrrolidinyl, dioxidothiomorpholinyl, or azaspiro[2.5]octanyl, each substituted with zero to 2 $R_b$;

each $R_b$ is independently F, $-OH$, $-CH_3$, $-CH_2OH$, $-C(CH_3)_2OH$, $-CH_2OCH_3$, $-OCH_3$, or $-S(O)_2CH_3$;

$R_{4c}$ is H;

$R_d$ is H or $-CH_3$;

each $R_5$ is independently H, $-CH_3$, or $-CH_2CH_3$;

each $R_6$ is hydrogen; and m is zero, 1, or 2.

2. The compound according to claim 1 or a salt thereof, wherein: L is $L_1$.

3. The compound according to claim 1 or a salt thereof, wherein: L is $-(CH_2)_{1-2}L_1-$.

4. The compound according to claim 1 or a salt thereof, having the structure:

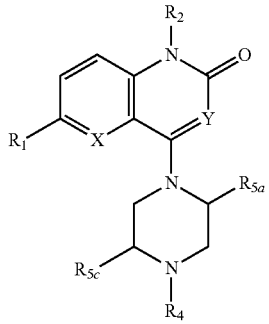

wherein $R_{5a}$ and $R_{5c}$ are independently selected from $R_5$.

5. The compound according to claim 1 or a salt thereof, having the structure:

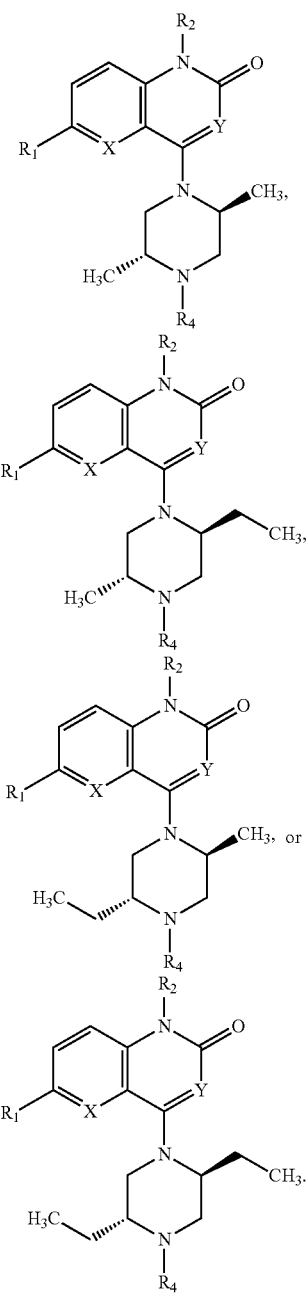

6. The compound according to claim 1 or a salt thereof, wherein $L_1$ is —C(O)— or —C(O)O—.

7. The compound according to claim 1 or a salt thereof, wherein $L_1$ is —C(O)—, —C(O)O—, —C(O)NR$_d$—, or —C(O)NR$_d$O—.

8. The compound according to claim 1 or a salt thereof, wherein $L_1$ is —NR$_d$—, —NR$_d$C(O)—, —NR$_d$C(O)O—, or —NR$_d$C(O)NR$_d$—.

9. The compound according to claim 1 or a salt thereof, wherein $L_1$ is —S(O)$_2$—, —S(O)$_2$NR$_d$—, —NR$_d$S(O)$_2$—, or —P(O)R$_e$—.

10. A compound or a salt thereof, wherein said compound is:

isopropyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (1-2);

Methyl 2-((2R,5S)-4-(6-cyano-1-methyl-2-oxo-1,2-dihydro-1,5-naphthyridin-4-yl)-2,5-dimethylpiperazin-1-yl)-2-(5-fluoropyridin-2-yl)acetate (3-4);

2-((2R,5S)-4-(6-cyano-1-methyl-2-oxo-1,2-dihydro-1,5-naphthyridin-4-yl)-2,5-dimethylpiperazin-1-yl)-N-(2,2-difluoroethyl)-2-(4-fluorophenyl)acetamide (5-6);

methyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (7-8);

2-((2R,5S)-4-(6-Cyano-1-methyl-2-oxo-1,2-dihydro-1,5-naphthyridin-4-yl)-2,5-dimethylpiperazin-1-yl)-2-(4-fluorophenyl)acetic acid (9-10);

(8-((2S,5R)-4-(1-(4-fluorophenyl)-2-oxo-2-(piperidin-1-yl)ethyl)-2,5-dimethylpiperazin-1-yl)-5-methyl-6-oxo-5,6-dihydro-1,5-naphthyridine-2-carbonitrile (11-12);

2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetamide (13-14);

2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)-N-(1-methyl-1H-pyrazol-3-yl)acetamide (15-16);

8-((2S,5R)-4-(1-(4-fluorophenyl)-2-morpholino-2-oxoethyl)-2,5-dimethylpiperazin-1-yl)-5-methyl-6-oxo-5,6-dihydro-1,5-naphthyridine-2-carbonitrile (17-18);

8-((2S,5R)-4-(1-(4-fluorophenyl)-2-(4-methylpiperazin-1-yl)-2-oxoethyl)-2,5-dimethylpiperazin-1-yl)-5-methyl-6-oxo-5,6-dihydro-1,5-naphthyridine-2-carbonitrile (19-20);

8-((2S,5R)-4-(1-(4-fluorophenyl)-2-oxo-2-(pyrrolidin-1-yl)ethyl)-2,5-dimethylpiperazin-1-yl)-5-methyl-6-oxo-5,6-dihydro-1,5-naphthyridine-2-carbonitrile (21-22);

2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)-N,N-dimethylacetamide (23-24);

2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)-N-methylacetamide (25-26);

2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)-N-(2-hydroxyethyl)acetamide (27-28);

2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)-N-(isoxazol-3-yl)acetamide (29-30);

methyl 3-((2R,5S)-4-(6-cyano-1-methyl-2-oxo-1,2-dihydro-1,5-naphthyridin-4-yl)-2,5-dimethylpiperazin-1-yl)-3-(4-fluorophenyl)propanoate (31-32);

N-(tert-butyl)-3-((2R,5S)-4-(6-cyano-1-methyl-2-oxo-1,2-dihydro-1,5-naphthyridin-4-yl)-2,5-dimethylpiperazin-1-yl)-3-(4-fluorophenyl)propanamide (33-34);

3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)-N-(propan-2-yl)propanamide (35);

3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)-N-(propan-2-yl)propanamide (36);

3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)propanamide (37);

3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)propanamide (38);

3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)-N-methylpropanamide (39);

3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)-N-methylpropanamide (40);

3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)-N-methyl-N-(propan-2-yl)propanamide (41);

3-[(2R,5S)-4-(6-cyano-1-methyl-2-oxo-1,2-dihydro-1,5-naphthyridin-4-yl)-2,5-dimethylpiperazin-1-yl]-3-(4-fluorophenyl)-N-methyl-N-(propan-2-yl)propanamide (42);

2-((2R,5S)-4-(6-cyano-1-methyl-2-oxo-1,2-dihydro-1,5-naphthyridin-4-yl)-2,5-dimethylpiperazin-1-yl)-N-cyclopentylpropanamide (43-44);

2-((2R,5S)-4-(6-cyano-1-methyl-2-oxo-1,2-dihydro-1,5-naphthyridin-4-yl)-2,5-dimethylpiperazin-1-yl)-N-(1-methyl-1H-pyrazol-4-yl)propanamide (45);

2-((2R,5S)-4-(6-cyano-1-methyl-2-oxo-1,2-dihydro-1,5-naphthyridin-4-yl)-2,5-dimethylpiperazin-1-yl)-N-(1-methyl-1H-pyrazol-4-yl)propanamide (46);

2-((2R,5S)-4-(6-cyano-1-methyl-2-oxo-1,2-dihydro-1,5-naphthyridin-4-yl)-2,5-dimethylpiperazin-1-yl)-N-cyclopropylpropanamide (47);

2-((2R,5S)-4-(6-cyano-1-methyl-2-oxo-1,2-dihydro-1,5-naphthyridin-4-yl)-2,5-dimethylpiperazin-1-yl)-N-cyclopropylpropanamide (48);

8-((2S,5R)-4-((dimethylphosphoryl)(4-fluorophenyl)methyl)-2,5-dimethylpiperazin-1-yl)-5-methyl-6-oxo-5,6-dihydro-1,5-naphthyridine-2-carbonitrile (49-50);

ethyl 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetate (51);

2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetic acid (52);

4-((2S,5R)-2,5-diethyl-4-(2-morpholino-2-oxo-1-(4-(trifluoromethyl)phenyl)ethyl)piperazin-1-yl)-1-methyl-2-oxo-1,2-dihydropyrido[3,2-d]pyrimidine-6-carbonitrile (53-54);

2-((2R,5S)-4-(6-cyano-1-methyl-2-oxo-1,2-dihydropyrido[3,2-d]pyrimidin-4-yl)-2,5-diethylpiperazin-1-yl)-N-(2-methoxyethyl)-2-(4-(trifluoromethyl)phenyl)acetamide (55-56);

3-(3-(but-3-yn-1-yl)-3H-diazirin-3-yl)propyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (57);

methyl 2-((2R,5S)-4-(6-cyano-1-methyl-2-oxo-1,2-dihydropyrido[3,2-d]pyrimidin-4-yl)-2,5-dimethylpiperazin-1-yl)-2-(4-methoxyphenyl)acetate (58);

2-((2R,5S)-4-(6-cyano-1-methyl-2-oxo-1,2-dihydropyrido[3,2-d]pyrimidin-4-yl)-2,5-dimethylpiperazin-1-yl)-2-(4-methoxyphenyl)acetic acid (59);

3-(3-(but-3-yn-1-yl)-3H-diazirin-3-yl)propyl 2-((2R,5S)-4-(6-cyano-1-methyl-2-oxo-1,2-dihydropyrido[3,2-d]pyrimidin-4-yl)-2,5-dimethylpiperazin-1-yl)-2-(4-methoxyphenyl)acetate (60-61);

2-(3-methyl-3H-diazirin-3-yl)ethyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (62);

ethyl 2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetate (69-70);

2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetic acid (71-72);

2-((2R,5S)-4-(6-Cyano-1-methyl-2-oxo-1,2-dihydropyrido[3,2-d]pyrimidin-4-yl)-2,5-diethylpiperazin-1-yl)-N-((1-hydroxycyclopropyl)methyl)-2-(4-(trifluoromethyl)phenyl) acetamide (73-74);

4-((2S,5R)-2,5-diethyl-4-(2-morpholino-2-oxo-1-(4-(trifluoromethyl)phenyl)ethyl)piperazin-1-yl)-6-(12-methyl)-1-methylpyrido[3,2-d]pyrimidin-2 (1H)-one (75-76);

2-((2R,5S)-4-(6-cyano-1-methyl-2-oxo-1,2-dihydropyrido[3,2-d]pyrimidin-4-yl)-2,5-diethylpiperazin-1-yl)-N-(2-methoxyethyl)-2-(4-(trifluoromethyl)phenyl) acetamide (77-78);

2-((2R,5S)-4-(6-cyano-1-methyl-2-oxo-1,2-dihydropyrido[3,2-d]pyrimidin-4-yl)-2,5-diethylpiperazin-1-yl)-N-(2-hydroxy-2-methylpropyl)-2-(4-(trifluoromethyl)phenyl)acetamide (79-80);

4-((2S,5R)-2,5-diethyl-4-(2-(3-hydroxy-3-methylazetidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (81-82);

4-((2S,5R)-2,5-diethyl-4-(2-oxo-2-(6-azaspiro[2.5]octan-6-yl)-1-(4-(trifluoromethyl)phenyl)ethyl)piperazin-1-yl)-1-methyl-2-oxo-1,2-dihydropyrido[3,2-d]pyrimidine-6-carbonitrile (83-84);

2-((2R,5S)-4-(6-cyano-1-methyl-2-oxo-1,2-dihydropyrido[3,2-d]pyrimidin-4-yl)-2,5-diethylpiperazin-1-yl)-N-(cyclopropylmethyl)-N-methyl-2-(4-(trifluoromethyl)phenyl) acetamide (85-86);

4-((2S,5R)-2,5-diethyl-4-(2-(3-(hydroxymethyl)azetidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (87-88);

4-((2S,5R)-2,5-diethyl-4-(2-(3-(2-hydroxypropan-2-yl)azetidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (89-90);

4-((2S,5R)-2,5-diethyl-4-(2-(3-(methylsulfonyl)azetidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (91-92);

4-((2S,5R)-2,5-diethyl-4-(2-(4-(methylsulfonyl)piperidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (93-94);

4-((2S,5R)-4-(2-(3,3-difluoroazetidin-1-yl)-2-oxo-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile (95-96);

4-((2S,5R)-4-(2-(1,1-dioxidothiomorpholino)-2-oxo-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile (97-98);

4-((2S,5R)-2,5-diethyl-4-(2-(3-methoxy-3-methylazetidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (99-100);

4-((2S,5R)-2,5-diethyl-4-(2-((S)-3-hydroxypyrrolidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (101-102);

4-((2S,5R)-2,5-diethyl-4-(2-((S)-2-(hydroxymethyl)pyrrolidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (103-104);

4-((2S,5R)-2,5-diethyl-4-(2-((R)-2-(hydroxymethyl)pyrrolidin-1-yl)-2-oxo-1-(4-(trifluoromethyl)phenyl)

ethyl)piperazin-1-yl)-1-methyl-2-oxo-1,2-dihydropyrido[3,2-d]pyrimidine-6-carbonitrile (105-106);

4-((2S,5R)-2,5-diethyl-4-(2-((R)-3-hydroxypyrrolidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (107-108);

4-((2S,5R)-2,5-diethyl-4-(2-((S)-2-(methoxymethyl)pyrrolidin-1-yl)-2-oxo-1-(4-(trifluoromethyl)phenyl)ethyl)piperazin-1-yl)-1-methyl-2-oxo-1,2-dihydropyrido[3,2-d]pyrimidine-6-carbonitrile (109-110);

2-((2R,5S)-4-(6-cyano-1-methyl-2-oxo-1,2-dihydropyrido[3,2-d]pyrimidin-4-yl)-2,5-diethylpiperazin-1-yl)-N-isopropyl-N-methyl-2-(4-(trifluoromethyl)phenyl)acetamide (111-112);

2-((2R,5S)-4-(6-cyano-1-methyl-2-oxo-1,2-dihydropyrido[3,2-d]pyrimidin-4-yl)-2,5-diethylpiperazin-1-yl)-N-isopropyl-2-(4-(trifluoromethyl)phenyl)acetamide (113-114);

2-((2R,5S)-4-(6-cyano-1-methyl-2-oxo-1,2-dihydropyrido[3,2-d]pyrimidin-4-yl)-2,5-diethylpiperazin-1-yl)-N-(2-methoxyethyl)-N-methyl-2-(4-(trifluoromethyl)phenyl)acetamide (115-116);

2-((2R,5S)-4-(6-cyano-1-methyl-2-oxo-1,2-dihydropyrido[3,2-d]pyrimidin-4-yl)-2,5-diethylpiperazin-1-yl)-N-methoxy-2-(4-(trifluoromethyl)phenyl)acetamide (117-118);

N-cyano-2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)acetamide (119-120);

2-((2R,5S)-4-(6-cyano-1-methyl-2-oxo-1,2-dihydropyrido[3,2-d]pyrimidin-4-yl)-2,5-diethylpiperazin-1-yl)-N-(cyanomethyl)-2-(4-(trifluoromethyl)phenyl)acetamide (121-122);

2-((2R,5S)-4-(6-cyano-1-methyl-2-oxo-1,2-dihydropyrido[3,2-d]pyrimidin-4-yl)-2,5-diethylpiperazin-1-yl)-N-(2,2,2-trifluoroethyl)-2-(4-(trifluoromethyl)phenyl)acetamide (123-124);

2-((2R,5S)-4-(6-cyano-1-methyl-2-oxo-1,2-dihydropyrido[3,2-d]pyrimidin-4-yl)-2,5-diethylpiperazin-1-yl)-N-(2-cyanoethyl)-2-(4-(trifluoromethyl)phenyl)acetamide (125-126);

2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)-N-(3,3,3-trifluoropropyl)acetamide (127-128);

2-((2R,5S)-4-(6-cyano-1-methyl-2-oxo-1,2-dihydropyrido[3,2-d]pyrimidin-4-yl)-2,5-diethylpiperazin-1-yl)-N-(2-(methylsulfonyl)ethyl)-2-(4-(trifluoromethyl)phenyl)acetamide (129-130);

2-((2R,5S)-4-(6-cyano-1-methyl-2-oxo-1,2-dihydropyrido[3,2-d]pyrimidin-4-yl)-2,5-diethylpiperazin-1-yl)-N-methoxy-2-(4-(trifluoromethyl)phenyl)acetamide (131-132);

ethyl 2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetate (133);

2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetic acid (134);

2-((2R,5S)-4-(6-cyano-1-methyl-2-oxo-1,2-dihydropyrido[3,2-d]pyrimidin-4-yl)-2-ethyl-5-methylpiperazin-1-yl)-N-methoxy-2-(4-(trifluoromethyl)phenyl)acetamide (135-136);

2-((2R,5S)-4-(6-cyano-1-methyl-2-oxo-1,2-dihydropyrido[3,2-d]pyrimidin-4-yl)-2-ethyl-5-methylpiperazin-1-yl)-N-(cyanomethyl)-2-(4-(trifluoromethyl)phenyl)acetamide (137-138);

2-((2R,5S)-4-(6-cyano-1-methyl-2-oxo-1,2-dihydropyrido[3,2-d]pyrimidin-4-yl)-2-ethyl-5-methylpiperazin-1-yl)-N-(2,2,2-trifluoroethyl)-2-(4-(trifluoromethyl)phenyl)acetamide (139-140);

2-((2R,5S)-4-(6-cyano-1-methyl-2-oxo-1,2-dihydropyrido[3,2-d]pyrimidin-4-yl)-2-ethyl-5-methylpiperazin-1-yl)-N-(2-cyanoethyl)-2-(4-(trifluoromethyl)phenyl)acetamide (141-142);

2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)-N-(3,3,3-trifluoropropyl)acetamide (143-144);

2-((2R,5S)-4-(6-cyano-1-methyl-2-oxo-1,2-dihydropyrido[3,2-d]pyrimidin-4-yl)-2-ethyl-5-methylpiperazin-1-yl)-N-(2-(methylsulfonyl)ethyl)-2-(4-(trifluoromethyl)phenyl)acetamide (145-146);

N-cyano-2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)acetamide (147-148);

2-((2R,5S)-4-(6-cyano-1-methyl-2-oxo-1,2-dihydropyrido[3,2-d]pyrimidin-4-yl)-2-ethyl-5-methylpiperazin-1-yl)-N-(methylsulfonyl)-2-(4-(trifluoromethyl)phenyl)acetamide (149-150);

2-((2R,5S)-4-(6-cyano-1-methyl-2-oxo-1,2-dihydropyrido[3,2-d]pyrimidin-4-yl)-2-ethyl-5-methylpiperazin-1-yl)-N-(cyclopropylsulfonyl)-2-(4-(trifluoromethyl)phenyl)acetamide (151-152);

methyl 3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propanoate (153);

methyl 3-((2R,5S)-4-(6-cyano-1-methyl-2-oxo-1,2-dihydropyrido[3,2-d]pyrimidin-4-yl)-2,5-diethylpiperazin-1-yl)-3-(4-(trifluoromethyl)phenyl)propanoate (154-155);

3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propanoic acid (156);

3-((2R,5S)-4-(6-cyano-1-methyl-2-oxo-1,2-dihydropyrido[3,2-d]pyrimidin-4-yl)-2,5-diethylpiperazin-1-yl)-3-(4-(trifluoromethyl)phenyl)propanoic acid (157-158);

4-((2S,5R)-2,5-diethyl-4-(3-oxo-3-(6-azaspiro[2.5]octan-6-yl)-1-(4-(trifluoromethyl)phenyl)propyl)piperazin-1-yl)-1-methyl-2-oxo-1,2-dihydropyrido[3,2-d]pyrimidine-6-carbonitrile (159-160);

3-((2R,5S)-4-(6-cyano-1-methyl-2-oxo-1,2-dihydropyrido[3,2-d]pyrimidin-4-yl)-2,5-diethylpiperazin-1-yl)-N-methyl-N-(1-methylpiperidin-4-yl)-3-(4-(trifluoromethyl)phenyl)propanamide (161-162);

3-((2R,5S)-4-(6-cyano-1-methyl-2-oxo-1,2-dihydropyrido[3,2-d]pyrimidin-4-yl)-2,5-diethylpiperazin-1-yl)-N-(2-methoxyethyl)-N-methyl-3-(4-(trifluoromethyl)phenyl)propanamide (163-164);

4-((2S,5R)-2,5-diethyl-4-(3-((R)-2-(methoxymethyl)pyrrolidin-1-yl)-3-oxo-1-(4-(trifluoromethyl)phenyl)propyl)piperazin-1-yl)-1-methyl-2-oxo-1,2-dihydropyrido[3,2-d]pyrimidine-6-carbonitrile (165-166);

methyl (3-((2R,5S)-4-(6-chloro-1-methyl-2-oxo-1,2-dihydropyrido[3,2-d]pyrimidin-4-yl)-2,5-diethylpiperazin-1-yl)-3-(4-(trifluoromethyl)phenyl)propyl) carbamate (167);

3-((2R,5S)-4-(6-cyano-1-methyl-2-oxo-1,2-dihydropyrido[3,2-d]pyrimidin-4-yl)-2,5-diethylpiperazin-1-yl)-3-(4-(trifluoromethyl)phenyl)propanoic acid (168-169);

N-(3-((2R,5S)-4-(6-cyano-1-methyl-2-oxo-1,2-dihydropyrido[3,2-d]pyrimidin-4-yl)-2,5-diethylpiperazin-1-yl)-3-(4-(trifluoromethyl)phenyl)propyl)methanesulfonamide (170-171);

4-((2S,5R)-4-(2-((cyanomethyl)(methyl)amino)-1-(4-(trifluoromethyl)phenyl)ethyl)-5-ethyl-2-methylpiperazin-1-yl)-1-methyl-2-oxo-1,2-dihydropyrido[3,2-d]pyrimidine-6-carbonitrile (172-173);

4-((2S,5R)-4-(2-((cyanomethyl)amino)-1-(4-(trifluoromethyl)phenyl)ethyl)-5-ethyl-2-methylpiperazin-1-yl)-1-methyl-2-oxo-1,2-dihydropyrido[3,2-d]pyrimidine-6-carbonitrile (174-175);

4-((2S,5R)-5-ethyl-2-methyl-4-(2-((2,2,2-trifluoroethyl)amino)-1-(4-(trifluoromethyl)phenyl)ethyl) piperazin-1-yl)-1-methyl-2-oxo-1,2-dihydropyrido[3,2-d]pyrimidine-6-carbonitrile (176-177);

4-((2S,5R)-4-(2-((2-cyanoethyl)amino)-1-(4-(trifluoromethyl)phenyl)ethyl)-5-ethyl-2-methylpiperazin-1-yl)-1-methyl-2-oxo-1,2-dihydropyrido[3,2-d]pyrimidine-6-carbonitrile (178-179);

4-((2S,5R)-5-ethyl-2-methyl-4-(1-(4-(trifluoromethyl)phenyl)-2-((3,3,3-trifluoropropyl)amino)ethyl)piperazin-1-yl)-1-methyl-2-oxo-1,2-dihydropyrido[3,2-d]pyrimidine-6-carbonitrile (180-181);

4-((2S,5R)-4-(2-((cyanomethyl)(methyl)amino)-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile (182-183);

4-((2S,5R)-4-(2-((cyanomethyl)(methyl)amino)-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile (184-185);

4-((2S,5R)-2,5-diethyl-4-(2-((2,2,2-trifluoroethyl)amino)-1-(4-(trifluoromethyl)phenyl)ethyl) piperazin-1-yl)-1-methyl-2-oxo-1,2-dihydropyrido[3,2-d]pyrimidine-6-carbonitrile (186-187);

4-((2S,5R)-4-(2-((2-cyanoethyl)amino)-1-(4-(trifluoromethyl)phenyl)ethyl)-2,5-diethylpiperazin-1-yl)-1-methyl-2-oxo-1,2-dihydropyrido[3,2-d]pyrimidine-6-carbonitrile (188-189);

4-((2S,5R)-2,5-diethyl-4-(1-(4-(trifluoromethyl)phenyl)-2-((3,3,3-trifluoropropyl)amino) ethyl)piperazin-1-yl)-1-methyl-2-oxo-1,2-dihydropyrido[3,2-d]pyrimidine-6-carbonitrile (190-191);

N-(2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl)acetamide (192-193);

N-(2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl)isobutyramide (194-195);

methyl (2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl)carbamate (196-197);

isopropyl (2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl) carbamate (198-199);

N-(2-((2R,5S)-4-(6-cyano-1-methyl-2-oxo-1,2-dihydropyrido[3,2-d]pyrimidin-4-yl)-2-ethyl-5-methylpiperazin-1-yl)-2-(4-(trifluoromethyl)phenyl)ethyl)methanesulfonamide (200-201);

N-(2-((2R,5S)-4-(6-Cyano-1-methyl-2-oxo-1,2-dihydropyrido[3,2-d]pyrimidin-4-yl)-2,5-diethylpiperazin-1-yl)-2-(4-(trifluoromethyl)phenyl)ethyl)acetamide (202-203);

N-(2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)ethyl)isobutyramide (204-205);

methyl (2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)ethyl)carbamate (206-207);

isopropyl (2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)ethyl)carbamate (208-209); or N-(2-((2R,5S)-4-(6-cyano-1-methyl-2-oxo-1,2-dihydropyrido[3,2-d]pyrimidin-4-yl)-2,5-diethylpiperazin-1-yl)-2-(4-(trifluoromethyl)phenyl)ethyl)methanesulfonamide (210-211).

11. A pharmaceutical composition comprising a compound according to claim 1 or a pharmaceutically-acceptable salt thereof; and a pharmaceutically acceptable carrier.

12. A compound of Formula (I):

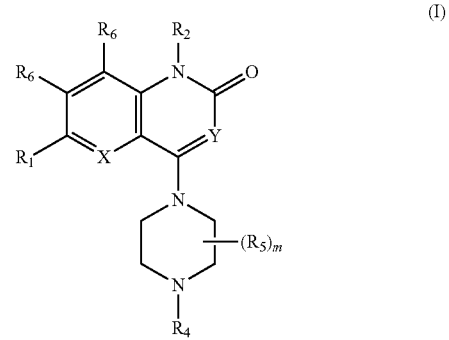

or a salt thereof, wherein:

X is $CR_6$ or N;

Y is $CR_3$ or N;

$R_1$ is H, F, Cl, Br, —CN, $C_{1-3}$ alkyl substituted with zero to 4 $R_{1a}$, $C_{3-4}$ cycloalkyl substituted with zero to 4 $R_{1a}$, $C_{1-3}$ alkoxy substituted with zero to 4 $R_{1a}$, —C(O)$NR_aR_a$, —$NR_aR_a$, —$S(O)_nR_f$, or —$P(O)R_fR_f$;

each $R_{1a}$ is independently F, Cl, —CN, —OH, —$OCH_3$, or —$NR_aR_a$;

each $R_a$ is independently H or $C_{1-3}$ alkyl;

$R_2$ is H, $C_{1-3}$ alkyl substituted with zero to 4 $R_{2a}$, $C_{2-3}$ alkenyl substituted with zero to 4 $R_{2a}$, or $C_{3-4}$ cycloalkyl substituted with zero to 4 $R_{2a}$;

each $R_{2a}$ is independently F, Cl, —CN, —OH, —O($C_{1-2}$ alkyl), $C_{3-4}$ cycloalkyl, $C_{3-4}$ alkenyl, or $C_{3-4}$ alkynyl;

$R_3$ is H, F, Cl, Br, —CN, $C_{1-3}$ alkyl, $C_{1-2}$ fluoroalkyl, $C_{3-4}$ cycloalkyl, $C_{3-4}$ fluorocycloalkyl, —$NO_2$, or pyridinyl substituted with zero to 2 $R_{3a}$;

each $R_{3a}$ is halo, —CN, $C_{1-3}$ alkyl, or $C_{1-3}$ alkoxy;

$R_4$ is —$CR_{4a}R_{4c}$-L-$R_{4b}$;

L is $L_1$ or —$(CH_2)_{1-3}L_1$-;

239

$L_1$ is —C(O)—, —C(O)O—, —C(O)$NR_d$—, —C(O)$NR_dO$—, —$NR_d$—, —$NR_dC(O)$—, —$NR_dC(O)O$—, —$NR_dC(O)NR_d$—, —C(O)$NR_dO$—, —S(O)$_2$—, —S(O)$_2NR_d$—, —$NR_dS(O)_2$—, or —P(O)$R_e$—;

$R^{4a}$ is:
(i) H or $C_{1-6}$ alkyl substituted with zero to 4 substituents independently selected from F, Cl, —CN, —OH, —OCH$_3$, —SCH$_3$, $C_{1-3}$ fluoroalkoxy, —$NR_aR_a$, —S(O)$_2R_f$, or —$NR_aS(O)_2R_f$; or
(ii) $C_{3-6}$ cycloalkyl, $C_{5-14}$ heterocyclyl, $C_{6-10}$ aryl, or $C_{5-14}$ heteroaryl, each substituted with zero to 4 $R_b$;

each $R_b$ is independently F, Cl, Br, —CN, —OH, $C_{1-6}$ alkyl, $C_{1-3}$ fluoroalkyl, $C_{1-4}$ hydroxyalkyl, —(CH$_2$)$_{1-2}$O($C_{1-3}$ alkyl), $C_{1-4}$ alkoxy, —O($C_{1-4}$ hydroxyalkyl), —O(CH)$_{1-3}$O($C_{1-3}$ alkyl), $C_{1-3}$ fluoroalkoxy, —O(CH)$_{1-3}NR_cR_c$, —OCH$_2$CH=CH$_2$, —OCH$_2$C≡CH, —C(O)($C_{1-4}$ alkyl), —C(O)OH, —C(O)O($C_{1-4}$ alkyl), —C(O)NH$_2$, —C(O)NH($C_{1-4}$ alkyl), —C(O)N($C_{1-4}$ alkyl)$_2$, —$NR_aR_c$, —$NR_aS(O)_2$($C_{1-3}$ alkyl), —$NR_aC(O)$($C_{1-3}$ alkyl), —$NR_aC(O)O$($C_{1-4}$ alkyl), —P(O)($C_{1-3}$ alkyl)$_2$, —S(O)$_2$($C_{1-3}$ alkyl), —O(CH$_2$)$_{1-2}$ ($C_{3-6}$ cycloalkyl), —O(CH$_2$)$_{1-2}$(morpholinyl), $C_{3-6}$ cycloalkyl, cyanocyclopropyl, methylazetidinyl, acetylazetidinyl, triazolyl, tetrahydropyranyl, morpholinyl, thiophenyl, methylpiperidinyl, or —$CR_cR_c$(phenyl);

$R^{4b}$ is:
(i) —CH$_2$CH$_2$OCH$_2$CH$_2$OCH$_2$CH$_2$NH$_2$;
(ii) —CH$_2$CH$_2$OCH$_2$CH$_2$OCH$_2$CH$_2$NHC(O)OC(CH$_3$)$_3$; or (iii)

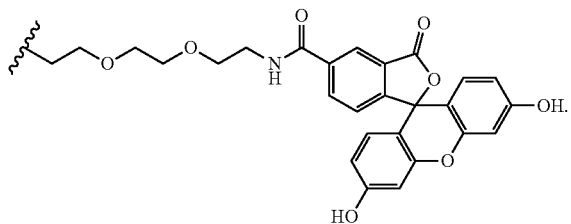

$R_{4c}$ is H or $C_{1-6}$ alkyl;
each $R_c$ is independently H or $C_{1-2}$ alkyl;
each $R_d$ is independently H or $C_{1-6}$ alkyl;
$R_e$ is $C_{1-6}$ alkyl;
each $R_f$ is independently $C_{3-4}$ cycloalkyl or $C_{1-3}$ alkyl substituted with zero to 4 $R_{1a}$;
each $R_5$ is independently F, Cl, —CN, —OH, $C_{1-6}$ alkyl substituted with zero to 4 $R_g$, $C_{1-3}$ alkoxy substituted

240 with zero to 4 $R_g$, $C_{2-4}$ alkenyl substituted with zero to 4 $R_g$, $C_{2-4}$ alkynyl substituted with zero to 4 $R_g$, $C_{3-4}$ cycloalkyl substituted with zero to 4 $R_g$, phenyl substituted with zero to 4 $R_g$, oxadiazolyl substituted with zero to 3 $R_g$, pyridinyl substituted with zero to 4 $R_g$, —(CH$_2$)$_{1-2}$(heterocyclyl substituted with zero to 4 $R_g$), —(CH$_2$)$_{1-2}NR_cC(O)$($C_{1-4}$ alkyl), —(CH$_2$)$_{1-2}NR_cC(O)O$($C_{1-4}$ alkyl), —(CH$_2$)$_{1-2}NR_cS(O)_2$($C_{1-4}$ alkyl), —C(O)($C_{1-4}$ alkyl), —C(O)OH, —C(O)O($C_{1-4}$ alkyl), —C(O)O($C_{3-4}$ cycloalkyl), —C(O)$NR_aR_a$, or —C(O)$NR_a$($C_{3-4}$ cycloalkyl), or two $R_5$ attached to the same carbon atom form =O;

each $R_g$ is independently F, Cl, —CN, —OH, $C_{1-3}$ alkoxy, $C_{1-3}$ fluoroalkoxy, —O(CH$_2$)$_{1-2}$O($C_{1-2}$ alkyl), $C_{3-5}$ cycloalkyl, or —$NR_cR_c$;

each $R_6$ is H, F, Cl, —CN, —CH$_3$, —CH$_2$F, —CHF$_2$, —CF$_3$, or —OCH$_3$;

m is zero, 1, 2, or 3; and n is zero, 1, or 2.

13. The compound according to claim 12 or a salt thereof, wherein said compound is:

tert-butyl (2-(2-(2-(2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetamido)ethoxy)ethoxy)ethyl)carbamate (63);

N-(2-(2-(2-aminoethoxy)ethoxy)ethyl)-2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetamide, TFA (64);

N-(2-(2-(2-(2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetamido)ethoxy)ethoxy)ethyl)-3',6'-dihydroxy-3-oxo-3H-spiro[isobenzofuran-1,9'-xanthene]-5-carboxamide (65);

2,2-dimethyl-4-oxo-3,8,11-trioxa-5-azatridecan-13-yl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (66);

2-(2-(2-aminoethoxy)ethoxy)ethyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate, TFA (67); or 2-(2-(2-(3',6'-dihydroxy-3-oxo-3H-spiro[isobenzofuran-1,9'-xanthene]-5-carboxamido)ethoxy)ethoxy)ethyl 2-((2R,5S)-4-(6-cyano-1-methyl-2-oxo-1,2-dihydro-1,5-naphthyridin-4-yl)-2,5-dimethylpiperazin-1-yl)-2-(4-fluorophenyl)acetate (68).

* * * * *

SEQUENCE LISTING

<160> NUMBER OF SEQ ID NOS: 6

<210> SEQ ID NO 1
<211> LENGTH: 2256
<212> TYPE: DNA
<213> ORGANISM: Homo sapiens

<400> SEQUENCE: 1

```
atggccaagg agaggggcct aataagcccc agtgattttg cccagctgca aaatacatg      60 gaatactcca ccaaaaaggt cagtgatgtc ctaaagctct tcgaggatgg cgagatggct    120
aaatatgtcc aaggagatgc cattgggtac gagggattcc agcaattcct gaaaatctat    180
ctcgaagtgg ataatgttcc cagacaccta agcctggcac tgtttcaatc ctttgagact    240
ggtcactgct aaatgagac aaatgtgaca aaagatgtgt gtgtctcaa tgatgtttcc      300 tgctactttt cccttctgga gggtggtcgg ccagaagaca agttagaatt caccttcaag    360
ctgtacgaca cggacagaaa tgggatcctg acagctcag aagtgacaa aattatccta       420 cagatgatgc gagtggctga atacctggat tgggatgtgt ctgagctgag gccgattctt    480
caggagatga tgaaagagat tgactatgat ggcagtggct ctgtctctca agctgagtgg    540
gtccgggctg ggccaccac cgtgccactg ctagtgctgc tgggtctgga gatgactctg     600
aaggacgacg acagcacat gtggaggccc aagaggttcc ccagaccagt ctactgcaat    660
ctgtgcgagt caagcattgg tcttggcaaa cagggactga gctgtaacct ctgtaagtac    720
actgttcacg accagtgtgc catgaaagcc ctgccttgtg aagtcagcac ctatgccaag    780
tctcggaagg acattggtgt ccaatcacat gtgtgggtgc gaggaggctg tgagtccggg    840
cgctgcgacc gctgtcagaa aaagatccgg atctaccaca gtctgaccgg ctgcattgt      900 gtatggtgcc acctagagat ccacgatgac tgcctgcaag cggtgggcca tgagtgtgac    960
tgtgggctgc tccgggatca catcctgcct ccatcttcca tctatcccag tgtcctggcc   1020
tctggaccgg atcgtaaaaa tagcaaaaca agccagaaga ccatggatga tttaaatttg   1080
agcacctctg aggctctgcg gattgaccct gttcctaaca cccacccact tctcgtcttt   1140
gtcaatccta gagtggcgg gaagcagggg cagagggtgc tctggaagtt ccagtatata   1200
ttaaaccctc gacaggtgtt caacctccta aaggatggtc ctgagatagg gctccgatta   1260
ttcaaggatg ttcctgatag ccggattttg gtgtgtggtg gagacggcac agtaggctgg   1320
attctagaga ccattgacaa agctaacttg ccagttttgc ctcctgttgc gtgtgttgccc   1380 ctgggtactg gaaatgatct ggctcgatgc ctaagatggg gaggaggtta tgaaggacag   1440
```

-continued

```
aatctggcaa agatcctcaa ggatttagag atgagtaaag tggtacatat ggatcgatgg    1500
tctgtggagg tgatacctca acaaactgaa gaaaaagtg acccagtccc ctttcaaatc     1560
atcaataact acttctctat tggcgtggat gcctctattg ctcatcgatt ccacatcatg    1620
cgagagaaat atccggagaa gttcaacagc agaatgaaga acaagctatg gtacttcgaa    1680
tttgccacat ctgaatccat cttctcaaca tgcaaaaagc tggaggagtc tttgacagtt    1740
gagatctgtg ggaaaccgct ggatctgagc aacctgtccc tagaaggcat cgcagtgcta    1800
aacatcccta gcatgcatgg tggctccaac ctctggggtg ataccaggag accccatggg    1860
gatatctatg ggatcaacca ggccttaggt gctacagcta aagtcatcac cgaccctgat    1920
atcctgaaaa cctgtgtacc agacctaagt gacaagagac tggaagtggt tgggctggag    1980
ggtgcaattg agatgggcca aatctatacc aagctcaaga atgctggacg tcggctggcc    2040
aagtgctctg agatcacctt ccacaccaca aaaacccttc ccatgcaaat tgacggagaa    2100
ccctggatgc agacgccctg tacaatcaag atcacccaca gaaccagat gcccatgctc     2160 atgggcccac ccccccgctc caccaatttc tttggcttct tgagcggatc ctcggagaca    2220
gtgcggtttc agggacacca ccaccatcac cactga                              2256
```

```
<210> SEQ ID NO 2
<211> LENGTH: 737
<212> TYPE: PRT
<213> ORGANISM: Homo sapiens

<400> SEQUENCE: 2
```

```
Met Ala Ser Pro Ser Asp Phe Ala Gln Leu Gln Lys Tyr Met Glu Tyr
1               5                   10                  15

Ser Thr Lys Lys Val Ser Asp Val Leu Lys Leu Phe Glu Asp Gly Glu
            20                  25                  30

Met Ala Lys Tyr Val Gln Gly Asp Ala Ile Gly Tyr Glu Gly Phe Gln
        35                  40                  45

Gln Phe Leu Lys Ile Tyr Leu Glu Val Asp Asn Val Pro Arg His Leu
    50                  55                  60

Ser Leu Ala Leu Phe Gln Ser Phe Glu Thr Gly His Cys Leu Asn Glu
65                  70                  75                  80

Thr Asn Val Thr Lys Asp Val Val Cys Leu Asn Asp Val Ser Cys Tyr
                85                  90                  95

Phe Ser Leu Leu Glu Gly Gly Arg Pro Glu Asp Lys Leu Glu Phe Thr
            100                 105                 110

Phe Lys Leu Tyr Asp Thr Asp Arg Asn Gly Ile Leu Asp Ser Ser Glu
        115                 120                 125

Val Asp Lys Ile Ile Leu Gln Met Met Arg Val Ala Glu Tyr Leu Asp
    130                 135                 140

Trp Asp Val Ser Glu Leu Arg Pro Ile Leu Gln Glu Met Met Lys Glu
145                 150                 155                 160

Ile Asp Tyr Asp Gly Ser Gly Ser Val Ser Ala Glu Trp Val Arg
                165                 170                 175

Ala Gly Ala Thr Thr Val Pro Leu Leu Val Leu Leu Gly Leu Glu Met
            180                 185                 190

Thr Leu Lys Asp Asp Gly Gln His Met Trp Arg Pro Lys Arg Phe Pro
        195                 200                 205

Arg Pro Val Tyr Cys Asn Leu Cys Glu Ser Ser Ile Gly Leu Gly Lys
    210                 215                 220

Gln Gly Leu Ser Cys Asn Leu Cys Lys Tyr Thr Val His Asp Gln Cys
```

```
            225                 230                 235                 240
        Ala Met Lys Ala Leu Pro Cys Glu Val Ser Thr Tyr Ala Lys Ser Arg
                        245                 250                 255

Lys Asp Ile Gly Val Gln Ser His Val Trp Val Arg Gly Gly Cys Glu
                        260                 265                 270

Ser Gly Arg Cys Asp Arg Cys Gln Lys Ile Arg Ile Tyr His Ser
                        275                 280                 285

Leu Thr Gly Leu His Cys Val Trp Cys His Leu Glu Ile His Asp Asp
                290                 295                 300

Cys Leu Gln Ala Val Gly His Glu Cys Asp Cys Gly Leu Leu Arg Asp
        305                 310                 315                 320

His Ile Leu Pro Pro Ser Ser Ile Tyr Pro Ser Val Leu Ala Ser Gly
                            325                 330                 335

Pro Asp Arg Lys Asn Ser Lys Thr Ser Gln Lys Thr Met Asp Asp Leu
                        340                 345                 350

Asn Leu Ser Thr Ser Glu Ala Leu Arg Ile Asp Pro Val Pro Asn Thr
                    355                 360                 365

His Pro Leu Leu Val Phe Val Asn Pro Lys Ser Gly Gly Lys Gln Gly
                370                 375                 380

Gln Arg Val Leu Trp Lys Phe Gln Tyr Ile Leu Asn Pro Arg Gln Val
        385                 390                 395                 400

Phe Asn Leu Leu Lys Asp Gly Pro Glu Ile Gly Leu Arg Leu Phe Lys
                        405                 410                 415

Asp Val Pro Asp Ser Arg Ile Leu Val Cys Gly Gly Asp Gly Thr Val
                        420                 425                 430

Gly Trp Ile Leu Glu Thr Ile Asp Lys Ala Asn Leu Pro Val Leu Pro
                    435                 440                 445

Pro Val Ala Val Leu Pro Leu Gly Thr Gly Asn Asp Leu Ala Arg Cys
                    450                 455                 460

Leu Arg Trp Gly Gly Gly Tyr Glu Gly Gln Asn Leu Ala Lys Ile Leu
        465                 470                 475                 480

Lys Asp Leu Glu Met Ser Lys Val Val His Met Asp Arg Trp Ser Val
                            485                 490                 495

Glu Val Ile Pro Gln Gln Thr Glu Glu Lys Ser Asp Pro Val Pro Phe
                        500                 505                 510

Gln Ile Ile Asn Asn Tyr Phe Ser Ile Gly Val Asp Ala Ser Ile Ala
                    515                 520                 525

His Arg Phe His Ile Met Arg Glu Lys Tyr Pro Glu Lys Phe Asn Ser
                    530                 535                 540

Arg Met Lys Asn Lys Leu Trp Tyr Phe Glu Phe Ala Thr Ser Glu Ser
        545                 550                 555                 560

Ile Phe Ser Thr Cys Lys Lys Leu Glu Glu Ser Leu Thr Val Glu Ile
                        565                 570                 575

Cys Gly Lys Pro Leu Asp Leu Ser Asn Leu Ser Leu Glu Gly Ile Ala
                        580                 585                 590

Val Leu Asn Ile Pro Ser Met His Gly Gly Ser Asn Leu Trp Gly Asp
                    595                 600                 605

Thr Arg Arg Pro His Gly Asp Ile Tyr Gly Ile Asn Gln Ala Leu Gly
                    610                 615                 620

Ala Thr Ala Lys Val Ile Thr Asp Pro Asp Ile Leu Lys Thr Cys Val
        625                 630                 635                 640

Pro Asp Leu Ser Asp Lys Arg Leu Glu Val Val Gly Leu Glu Gly Ala
                        645                 650                 655
```

```
Ile Glu Met Gly Gln Ile Tyr Thr Lys Leu Lys Asn Ala Gly Arg Arg
            660                 665                 670

Leu Ala Lys Cys Ser Glu Ile Thr Phe His Thr Thr Lys Thr Leu Pro
        675                 680                 685

Met Gln Ile Asp Gly Glu Pro Trp Met Gln Thr Pro Cys Thr Ile Lys
        690                 695                 700

Ile Thr His Lys Asn Gln Met Pro Met Leu Met Gly Pro Pro Pro Arg
705                 710                 715                 720

Ser Gly Ser Ser Glu Thr Val Arg Phe Gln Gly His His His His
                725                 730                 735

His

<210> SEQ ID NO 3
<211> LENGTH: 2838
<212> TYPE: PRT
<213> ORGANISM: Homo sapiens

<400> SEQUENCE: 3

Ala Thr Gly Gly Ala Gly Cys Cys Gly Cys Gly Gly Ala Cys Gly
1               5                   10                  15

Gly Thr Ala Gly Cys Cys Cys Cys Gly Ala Gly Cys Cys Cys Gly
                20                  25                  30

Gly Ala Gly Cys Ala Gly Cys Gly Ala Cys Thr Cys Cys Gly Ala Gly
            35                  40                  45

Thr Cys Gly Gly Cys Thr Thr Cys Cys Gly Cys Cys Thr Cys Gly Thr
        50                  55                  60

Cys Cys Ala Gly Cys Gly Gly Cys Thr Cys Cys Gly Ala Gly Cys Gly
65                  70                  75                  80

Cys Gly Ala Cys Gly Cys Cys Gly Gly Thr Cys Cys Cys Gly Ala Gly
                85                  90                  95

Cys Cys Gly Gly Ala Cys Ala Ala Gly Gly Cys Gly Cys Cys Gly Cys
                100                 105                 110

Gly Gly Cys Gly Ala Cys Thr Cys Ala Ala Cys Ala Ala Gly Cys Gly
        115                 120                 125

Gly Cys Gly Cys Thr Thr Cys Cys Gly Gly Gly Cys Thr Gly
        130                 135                 140

Cys Gly Gly Cys Thr Cys Thr Cys Gly Gly Gly Cys Ala Cys Ala
145                 150                 155                 160

Gly Gly Ala Ala Ala Gly Cys Cys Ala Thr Cys Ala Cys Gly Ala Ala
                165                 170                 175

Gly Thr Cys Gly Gly Gly Cys Cys Thr Cys Cys Ala Gly Cys Ala Cys
            180                 185                 190

Cys Thr Gly Gly Cys Cys Cys Cys Cys Cys Thr Cys Cys Gly Cys
        195                 200                 205

Cys Cys Ala Cys Cys Cys Thr Gly Gly Gly Cys Cys Cys
        210                 215                 220

Gly Thr Gly Cys Ala Gly Cys Gly Ala Gly Thr Cys Ala Gly Ala Gly
225                 230                 235                 240

Cys Gly Gly Cys Ala Gly Ala Thr Cys Cys Gly Gly Ala Gly Thr Ala
                245                 250                 255

Cys Ala Gly Thr Gly Gly Ala Cys Thr Gly Gly Ala Gly Cys Gly Ala
                260                 265                 270

Gly Thr Cys Ala Gly Cys Gly Ala Cys Ala Thr Ala Thr Gly Gly Gly
        275                 280                 285
```

Gly Ala Gly Cys Ala Cys Ala Thr Cys Thr Gly Thr Thr Cys Gly
            290                 295                 300

Ala Gly Ala Cys Cys Ala Ala Cys Gly Thr Gly Thr Cys Cys Gly Gly
305                 310                 315                 320

Gly Gly Ala Cys Thr Thr Cys Thr Gly Cys Thr Ala Cys Gly Thr Thr
                325                 330                 335

Gly Gly Gly Gly Ala Gly Cys Ala Gly Thr Ala Cys Thr Gly Thr Gly
            340                 345                 350

Thr Ala Gly Cys Cys Ala Gly Gly Ala Thr Gly Cys Thr Gly Cys Ala
            355                 360                 365

Gly Ala Ala Gly Thr Cys Ala Gly Thr Gly Thr Cys Thr Cys Gly Ala
            370                 375                 380

Ala Gly Ala Ala Ala Gly Thr Gly Cys Gly Cys Ala Gly Cys Cys Thr
385                 390                 395                 400

Gly Cys Ala Ala Gly Ala Thr Thr Gly Thr Gly Gly Thr Gly Cys Ala
                405                 410                 415

Cys Ala Cys Gly Cys Cys Cys Thr Gly Cys Ala Thr Cys Gly Ala Gly
            420                 425                 430

Cys Ala Gly Cys Thr Gly Gly Ala Gly Ala Ala Gly Ala Thr Ala Ala
            435                 440                 445

Ala Thr Thr Thr Cys Cys Gly Cys Thr Gly Ala Ala Gly Cys Cys
            450                 455                 460

Gly Thr Cys Cys Thr Thr Cys Cys Gly Thr Gly Ala Ala Thr Cys Ala
465                 470                 475                 480

Gly Gly Cys Thr Cys Cys Ala Gly Gly Ala Thr Gly Thr Cys Cys
                485                 490                 495

Gly Cys Gly Ala Gly Cys Cys Ala Ala Cys Cys Thr Thr Thr Gly Thr
            500                 505                 510

Ala Cys Gly Gly Cys Ala Cys Ala Cys Thr Gly Gly Gly Thr Ala
            515                 520                 525

Cys Ala Cys Ala Gly Ala Cys Gly Ala Cys Gly Cys Cys Ala Gly Gly
            530                 535                 540

Ala Cys Gly Gly Cys Ala Ala Gly Thr Gly Thr Cys Gly Gly Cys Ala
545                 550                 555                 560

Cys Thr Gly Thr Gly Gly Ala Ala Gly Gly Ala Thr Thr Cys
                565                 570                 575

Cys Ala Gly Cys Ala Gly Ala Ala Gly Thr Thr Cys Ala Cys Cys Thr
            580                 585                 590

Thr Cys Cys Ala Cys Ala Gly Cys Ala Ala Gly Gly Ala Gly Ala Thr
            595                 600                 605

Thr Gly Thr Gly Gly Cys Cys Ala Thr Cys Ala Gly Cys Thr Gly Cys
            610                 615                 620

Thr Cys Gly Thr Gly Gly Thr Gly Cys Ala Ala Gly Cys Ala Gly Gly
625                 630                 635                 640

Cys Ala Thr Ala Cys Cys Ala Cys Ala Gly Cys Ala Ala Gly Gly Thr
                645                 650                 655

Gly Thr Cys Cys Thr Gly Cys Thr Thr Cys Ala Thr Gly Cys Thr Gly
            660                 665                 670

Cys Ala Gly Cys Ala Gly Ala Thr Cys Gly Ala Gly Ala Gly Cys
            675                 680                 685

Cys Gly Thr Gly Cys Thr Cys Gly Cys Thr Gly Gly Gly Gly Thr
            690                 695                 700

```
Cys Cys Ala Cys Gly Cys Ala Gly Cys Cys Gly Thr Gly Gly Thr Cys
705                 710                 715                 720

Ala Thr Cys Cys Cys Gly Cys Cys Ala Cys Cys Thr Gly Gly Ala
            725                 730                 735

Thr Cys Cys Thr Cys Cys Gly Cys Gly Cys Cys Gly Gly Ala Gly
                740                 745                 750

Gly Cys Cys Cys Cys Ala Gly Ala Ala Thr Ala Cys Thr Cys Thr Gly
                755                 760                 765

Ala Ala Ala Gly Cys Ala Ala Gly Cys Ala Ala Gly Ala Ala Gly Ala
            770                 775                 780

Ala Gly Ala Ala Gly Ala Gly Gly Gly Cys Ala Thr Cys Cys Thr Thr
785                 790                 795                 800

Cys Ala Ala Gly Ala Gly Gly Ala Ala Gly Thr Cys Cys Ala Gly Cys
                805                 810                 815

Ala Ala Gly Ala Ala Ala Gly Gly Gly Cys Cys Thr Gly Ala Gly Gly
            820                 825                 830

Ala Gly Gly Gly Cys Cys Gly Cys Thr Gly Gly Ala Gly Ala Cys Cys
            835                 840                 845

Cys Thr Thr Cys Ala Thr Cys Ala Thr Cys Ala Gly Gly Cys Cys Cys
850                 855                 860

Ala Cys Cys Cys Cys Cys Thr Cys Cys Cys Cys Gly Cys Thr Cys Ala
865                 870                 875                 880

Thr Gly Ala Ala Gly Cys Cys Cys Thr Gly Cys Thr Gly Gly Thr
                885                 890                 895

Gly Thr Thr Thr Gly Thr Gly Ala Ala Cys Cys Cys Ala Ala Gly
            900                 905                 910

Ala Gly Thr Gly Gly Gly Gly Gly Cys Ala Ala Cys Cys Ala Gly Gly
            915                 920                 925

Gly Thr Gly Cys Ala Ala Ala Gly Ala Thr Cys Ala Thr Cys Cys Ala
            930                 935                 940

Gly Thr Cys Thr Thr Thr Cys Cys Thr Cys Thr Gly Gly Thr Ala Thr
945                 950                 955                 960

Cys Thr Cys Ala Ala Thr Cys Cys Cys Gly Ala Cys Ala Ala Gly
                965                 970                 975

Thr Cys Thr Thr Cys Gly Ala Cys Cys Thr Gly Ala Gly Cys Cys Ala
                980                 985                 990

Gly Gly Gly Ala Gly Gly Gly Cys Cys Cys Ala Ala Gly Gly Ala Gly
            995                 1000                1005

Gly Cys Gly Cys Thr Gly Gly Ala Gly Ala Thr Gly Thr Ala Cys
1010                1015                1020

Cys Gly Cys Ala Ala Ala Gly Thr Gly Cys Ala Cys Ala Ala Cys
1025                1030                1035

Cys Thr Gly Cys Gly Gly Ala Thr Cys Thr Gly Gly Cys Gly Gly
1040                1045                1050

Thr Gly Cys Gly Gly Gly Gly Cys Gly Ala Cys Gly Gly Cys Gly
1055                1060                1065

Ala Cys Gly Gly Thr Gly Gly Gly Cys Thr Gly Ala Thr Cys
1070                1075                1080

Cys Thr Cys Thr Cys Cys Ala Cys Cys Cys Thr Gly Gly Ala Cys
1085                1090                1095

Cys Ala Gly Cys Thr Ala Cys Gly Cys Cys Thr Gly Ala Ala Gly
1100                1105                1110

Cys Cys Gly Cys Cys Ala Cys Cys Cys Cys Thr Gly Thr Thr
```

-continued

|     |     |     |     |     | 1115 |     |     |     | 1120 |     |     |     | 1125 |     |
|-----|-----|-----|-----|-----|------|-----|-----|-----|------|-----|-----|-----|------|-----|

Gly Cys Cys Ala Thr Cys Cys Thr Gly Cys Cys Cys Thr Gly
            1130                1135              1140

Gly Gly Thr Ala Cys Thr Gly Gly Cys Ala Cys Gly Ala Cys
    1145                1150              1155

Thr Thr Gly Gly Cys Cys Gly Ala Ala Cys Cys Cys Thr Cys
        1160              1165              1170

Ala Ala Cys Thr Gly Gly Gly Thr Gly Gly Gly Gly Gly Cys
    1175              1180              1185

Thr Ala Cys Ala Cys Ala Gly Ala Thr Gly Ala Gly Cys Cys Thr
    1190              1195              1200

Gly Thr Gly Thr Cys Ala Ala Gly Ala Thr Cys Cys Thr Cys
    1205              1210              1215

Thr Cys Cys Ala Cys Gly Thr Gly Gly Ala Gly Gly Ala Gly
    1220              1225              1230

Gly Gly Gly Ala Ala Cys Gly Thr Gly Gly Thr Ala Cys Ala Gly
    1235              1240              1245

Cys Thr Gly Gly Ala Cys Cys Gly Cys Thr Gly Gly Ala Cys
    1250              1255              1260

Cys Thr Cys Cys Ala Cys Gly Cys Thr Gly Ala Gly Cys Cys Cys
    1265              1270              1275

Ala Ala Cys Cys Cys Cys Gly Ala Gly Gly Cys Ala Gly Gly Gly
    1280              1285              1290

Cys Cys Thr Gly Ala Gly Gly Ala Cys Cys Gly Ala Gly Ala Thr
    1295              1300              1305

Gly Ala Ala Gly Gly Cys Gly Cys Cys Ala Cys Cys Gly Ala Cys
    1310              1315              1320

Cys Gly Gly Thr Thr Gly Cys Cys Cys Cys Thr Gly Gly Ala Thr
    1325              1330              1335

Gly Thr Cys Thr Thr Cys Ala Ala Cys Ala Ala Cys Thr Ala Cys
    1340              1345              1350

Thr Thr Cys Ala Gly Cys Cys Thr Gly Gly Gly Cys Thr Thr Thr
    1355              1360              1365

Gly Ala Cys Gly Cys Cys Cys Ala Cys Gly Thr Cys Ala Cys Cys
    1370              1375              1380

Cys Thr Gly Gly Ala Gly Thr Thr Cys Ala Cys Gly Ala Gly
    1385              1390              1395

Thr Cys Thr Cys Gly Ala Gly Ala Gly Gly Cys Cys Ala Ala Cys
    1400              1405              1410

Cys Cys Ala Gly Ala Gly Ala Ala Ala Thr Thr Cys Ala Ala Cys
    1415              1420              1425

Ala Gly Cys Cys Gly Cys Thr Thr Thr Cys Gly Gly Ala Ala Thr
    1430              1435              1440

Ala Ala Gly Ala Thr Gly Thr Cys Thr Ala Cys Gly Cys Cys
    1445              1450              1455

Gly Gly Gly Ala Cys Ala Gly Cys Thr Thr Cys Thr Cys Thr
    1460              1465              1470

Gly Ala Cys Thr Thr Cys Cys Thr Gly Ala Thr Gly Gly Cys
    1475              1480              1485

Ala Gly Cys Thr Cys Ala Ala Gly Gly Ala Cys Cys Thr Gly
    1490              1495              1500

Gly Cys Cys Ala Ala Gly Cys Ala Cys Ala Thr Cys Cys Gly Ala
    1505              1510              1515

Gly Thr Gly Gly Thr Gly Thr Gly Thr Gly Ala Thr Gly Gly Ala
    1520                1525                1530

Ala Thr Gly Gly Ala Cys Thr Thr Gly Ala Cys Thr Cys Cys Cys
    1535                1540                1545

Ala Ala Gly Ala Thr Cys Cys Ala Gly Gly Ala Cys Cys Thr Gly
    1550                1555                1560

Ala Ala Ala Cys Cys Cys Cys Ala Gly Thr Gly Thr Gly Thr Thr
    1565                1570                1575

Gly Thr Thr Thr Thr Cys Cys Thr Gly Ala Ala Cys Ala Thr Cys
    1580                1585                1590

Cys Cys Cys Ala Gly Gly Thr Ala Cys Thr Gly Thr Gly Cys Gly
    1595                1600                1605

Gly Gly Cys Ala Cys Cys Ala Thr Gly Cys Cys Cys Thr Gly Gly
    1610                1615                1620

Gly Gly Cys Cys Ala Cys Cys Cys Thr Gly Gly Gly Ala Gly
    1625                1630                1635

Cys Ala Cys Cys Ala Cys Gly Ala Cys Thr Thr Thr Gly Ala Gly
    1640                1645                1650

Cys Cys Cys Cys Ala Gly Cys Gly Gly Cys Ala Thr Gly Ala Cys
    1655                1660                1665

Gly Ala Cys Gly Gly Cys Thr Ala Cys Cys Thr Cys Gly Ala Gly
    1670                1675                1680

Gly Thr Cys Ala Thr Thr Gly Gly Cys Thr Thr Cys Ala Cys Cys
    1685                1690                1695

Ala Thr Gly Ala Cys Gly Thr Cys Gly Thr Thr Gly Gly Cys Cys
    1700                1705                1710

Gly Cys Gly Cys Thr Gly Cys Ala Gly Gly Thr Gly Gly Gly Cys
    1715                1720                1725

Gly Gly Ala Cys Ala Cys Gly Gly Cys Gly Ala Gly Cys Gly Gly
    1730                1735                1740

Cys Thr Gly Ala Cys Gly Cys Ala Gly Thr Gly Thr Cys Gly Cys
    1745                1750                1755

Gly Ala Gly Gly Thr Gly Gly Thr Gly Cys Thr Cys Ala Cys Cys
    1760                1765                1770

Ala Cys Ala Thr Cys Cys Ala Ala Gly Gly Cys Cys Ala Thr Cys
    1775                1780                1785

Cys Cys Gly Gly Thr Gly Cys Ala Gly Gly Thr Gly Gly Ala Thr
    1790                1795                1800

Gly Gly Cys Gly Ala Gly Cys Cys Cys Thr Gly Cys Ala Ala Gly
    1805                1810                1815

Cys Thr Thr Gly Cys Ala Gly Cys Cys Thr Cys Ala Cys Gly Cys
    1820                1825                1830

Ala Thr Cys Cys Gly Cys Ala Thr Cys Gly Cys Cys Cys Thr Gly
    1835                1840                1845

Cys Gly Cys Ala Ala Cys Cys Ala Gly Gly Cys Cys Ala Cys Cys
    1850                1855                1860

Ala Thr Gly Gly Thr Gly Cys Ala Gly Ala Ala Gly Gly Cys Cys
    1865                1870                1875

Ala Ala Gly Cys Gly Gly Cys Gly Gly Ala Gly Cys Gly Cys Cys
    1880                1885                1890

Gly Cys Cys Cys Cys Cys Cys Thr Gly Cys Ala Cys Ala Gly Cys
    1895                1900                1905

```
Gly Ala Cys Cys Ala Gly Cys Ala Gly Cys Cys Gly Gly Thr Gly
1910             1915                 1920

Cys Cys Ala Gly Ala Gly Cys Ala Gly Thr Thr Gly Cys Gly Cys
1925             1930                 1935

Ala Thr Cys Cys Ala Gly Gly Thr Gly Ala Gly Thr Cys Gly Cys
1940             1945                 1950

Gly Thr Cys Ala Gly Cys Ala Thr Gly Cys Ala Cys Gly Ala Cys
1955             1960                 1965

Thr Ala Thr Gly Ala Gly Gly Cys Cys Cys Thr Gly Cys Ala Cys
1970             1975                 1980

Thr Ala Cys Gly Ala Cys Ala Ala Gly Gly Ala Gly Cys Ala Gly
1985             1990                 1995

Cys Thr Cys Ala Ala Gly Gly Ala Gly Gly Cys Cys Thr Cys Thr
2000             2005                 2010

Gly Thr Gly Cys Cys Gly Cys Thr Gly Gly Gly Cys Ala Cys Thr
2015             2020                 2025

Gly Thr Gly Gly Thr Gly Gly Thr Cys Cys Cys Ala Gly Gly Ala
2030             2035                 2040

Gly Ala Cys Ala Gly Thr Gly Ala Cys Cys Thr Ala Gly Ala Gly
2045             2050                 2055

Cys Thr Cys Thr Gly Cys Cys Gly Thr Gly Cys Cys Cys Ala Cys
2060             2065                 2070

Ala Thr Thr Gly Ala Gly Ala Gly Ala Cys Thr Cys Cys Ala Gly
2075             2080                 2085

Cys Ala Gly Gly Ala Gly Cys Cys Gly Ala Thr Gly Gly Thr
2090             2095                 2100

Gly Cys Thr Gly Gly Ala Gly Cys Cys Ala Ala Gly Thr Cys Cys
2105             2110                 2115

Cys Cys Gly Ala Cys Ala Thr Gly Cys Cys Ala Gly Ala Ala Ala
2120             2125                 2130

Cys Thr Gly Thr Cys Cys Cys Cys Cys Ala Ala Gly Thr Gly Gly
2135             2140                 2145

Thr Gly Cys Thr Thr Cys Cys Thr Gly Gly Ala Cys Gly Cys Cys
2150             2155                 2160

Ala Cys Cys Ala Cys Thr Gly Cys Cys Ala Gly Cys Cys Gly Cys
2165             2170                 2175

Thr Thr Cys Thr Ala Cys Ala Gly Gly Ala Thr Cys Gly Ala Cys
2180             2185                 2190

Cys Gly Ala Gly Cys Cys Cys Ala Gly Gly Ala Gly Cys Ala Cys
2195             2200                 2205

Cys Thr Cys Ala Ala Cys Thr Ala Thr Gly Thr Gly Ala Cys Thr
2210             2215                 2220

Gly Ala Gly Ala Thr Cys Gly Cys Ala Cys Ala Gly Gly Ala Thr
2225             2230                 2235

Gly Ala Gly Ala Thr Thr Thr Ala Thr Ala Thr Cys Cys Thr Gly
2240             2245                 2250

Gly Ala Cys Cys Cys Thr Gly Ala Gly Cys Thr Gly Cys Thr Gly
2255             2260                 2265

Gly Gly Gly Gly Cys Ala Thr Cys Gly Gly Cys Cys Cys Gly Gly
2270             2275                 2280

Cys Cys Thr Gly Ala Cys Thr Cys Cys Cys Ala Ala Cys Cys
2285             2290                 2295

Cys Cys Cys Ala Cys Thr Thr Cys Cys Cys Cys Thr Cys Thr Cys
```

-continued

```
                2300                2305                2310

Cys  Cys  Cys  Ala  Cys  Cys  Thr  Cys  Ala  Cys  Cys  Cys  Thr  Gly  Cys
        2315                2320                2325

Thr  Cys  Ala  Cys  Cys  Ala  Cys  Gly  Cys  Cys  Cys  Cys  Gly  Gly
        2330                2335                2340

Thr  Cys  Ala  Cys  Thr  Gly  Cys  Ala  Ala  Gly  Gly  Gly  Ala  Thr
        2345                2350                2355

Gly  Cys  Thr  Gly  Cys  Ala  Cys  Cys  Cys  Cys  Thr  Cys  Ala  Ala
        2360                2365                2370

Gly  Gly  Thr  Gly  Ala  Ala  Gly  Ala  Gly  Cys  Thr  Gly  Ala  Thr  Thr
        2375                2380                2385

Gly  Ala  Gly  Gly  Cys  Thr  Gly  Cys  Cys  Ala  Ala  Gly  Ala  Gly  Gly
        2390                2395                2400

Ala  Ala  Cys  Gly  Ala  Cys  Thr  Thr  Cys  Thr  Gly  Thr  Ala  Ala  Gly
        2405                2410                2415

Cys  Thr  Cys  Cys  Ala  Gly  Gly  Ala  Gly  Cys  Thr  Gly  Cys  Ala  Cys
        2420                2425                2430

Cys  Gly  Ala  Gly  Cys  Thr  Gly  Gly  Gly  Gly  Cys  Gly  Ala  Cys
        2435                2440                2445

Cys  Thr  Cys  Ala  Thr  Gly  Cys  Ala  Cys  Cys  Gly  Ala  Gly  Ala  Cys
        2450                2455                2460

Gly  Ala  Gly  Cys  Ala  Gly  Ala  Gly  Thr  Cys  Gly  Cys  Ala  Cys  Gly
        2465                2470                2475

Cys  Thr  Cys  Thr  Gly  Cys  Ala  Cys  Cys  Ala  Cys  Gly  Cys  Ala
        2480                2485                2490

Gly  Thr  Cys  Ala  Gly  Cys  Ala  Cys  Thr  Gly  Gly  Cys  Ala  Gly  Cys
        2495                2500                2505

Ala  Ala  Gly  Gly  Ala  Thr  Gly  Thr  Gly  Gly  Thr  Cys  Cys  Gly  Cys
        2510                2515                2520

Thr  Ala  Cys  Cys  Thr  Gly  Cys  Thr  Gly  Gly  Ala  Cys  Cys  Ala  Cys
        2525                2530                2535

Gly  Cys  Cys  Cys  Cys  Cys  Cys  Ala  Gly  Ala  Gly  Ala  Thr  Cys
        2540                2545                2550

Cys  Thr  Thr  Gly  Ala  Thr  Gly  Cys  Gly  Gly  Thr  Gly  Gly  Ala  Gly
        2555                2560                2565

Gly  Ala  Ala  Ala  Ala  Cys  Gly  Gly  Gly  Ala  Gly  Ala  Cys  Cys
        2570                2575                2580

Thr  Gly  Thr  Thr  Thr  Gly  Cys  Ala  Cys  Cys  Ala  Ala  Gly  Cys  Ala
        2585                2590                2595

Gly  Cys  Gly  Gly  Cys  Cys  Cys  Thr  Gly  Gly  Cys  Cys  Ala  Gly
        2600                2605                2610

Cys  Gly  Cys  Ala  Cys  Cys  Ala  Thr  Cys  Thr  Gly  Cys  Cys  Ala  Cys
        2615                2620                2625

Thr  Ala  Cys  Ala  Thr  Cys  Gly  Thr  Gly  Ala  Gly  Gly  Cys  Cys
        2630                2635                2640

Gly  Gly  Gly  Gly  Cys  Cys  Thr  Cys  Gly  Cys  Thr  Cys  Ala  Thr  Gly
        2645                2650                2655

Ala  Ala  Gly  Ala  Cys  Ala  Gly  Ala  Cys  Cys  Ala  Gly  Cys  Ala  Gly
        2660                2665                2670

Gly  Gly  Cys  Gly  Ala  Cys  Ala  Cys  Thr  Cys  Cys  Cys  Gly  Gly
        2675                2680                2685

Cys  Ala  Gly  Cys  Gly  Gly  Gly  Cys  Thr  Gly  Ala  Gly  Ala  Ala  Gly
        2690                2695                2700
```

-continued

```
Gly Cys Thr Cys Ala Gly Gly Ala Cys Ala Cys Gly Ala Gly
    2705                2710                2715

Cys Thr Gly Gly Cys Cys Gly Cys Cys Thr Ala Cys Cys Thr Gly
    2720                2725                2730

Gly Ala Gly Ala Ala Cys Cys Gly Gly Cys Ala Gly Cys Ala Cys
    2735                2740                2745

Thr Ala Cys Cys Ala Gly Ala Thr Gly Ala Thr Cys Cys Ala Gly
    2750                2755                2760

Cys Gly Gly Gly Ala Gly Gly Ala Cys Ala Gly Gly Ala Gly
    2765                2770                2775

Ala Cys Gly Gly Cys Thr Gly Thr Gly Gly Gly Ala Thr Cys Cys
    2780                2785                2790

Thr Cys Gly Gly Ala Gly Ala Cys Ala Gly Thr Gly Cys Gly Gly
    2795                2800                2805

Thr Thr Thr Cys Ala Gly Gly Gly Ala Cys Ala Cys Cys Ala Cys
    2810                2815                2820

Cys Ala Cys Cys Ala Thr Cys Ala Cys Cys Ala Cys Thr Gly Ala
    2825                2830                2835
```

<210> SEQ ID NO 4
<211> LENGTH: 945
<212> TYPE: PRT
<213> ORGANISM: Homo sapiens

<400> SEQUENCE: 4

```
Met Glu Pro Arg Asp Gly Ser Pro Glu Ala Arg Ser Ser Asp Ser Glu
1               5                   10                  15

Ser Ala Ser Ala Ser Ser Gly Ser Glu Arg Asp Ala Gly Pro Glu
                20                  25                  30

Pro Asp Lys Ala Pro Arg Arg Leu Asn Lys Arg Arg Phe Pro Gly Leu
            35                  40                  45

Arg Leu Phe Gly His Arg Lys Ala Ile Thr Lys Ser Gly Leu Gln His
        50                  55                  60

Leu Ala Pro Pro Pro Thr Pro Gly Ala Pro Cys Ser Glu Ser Glu
65                  70                  75                  80

Arg Gln Ile Arg Ser Thr Val Asp Trp Ser Glu Ser Ala Thr Tyr Gly
                85                  90                  95

Glu His Ile Trp Phe Glu Thr Asn Val Ser Gly Asp Phe Cys Tyr Val
            100                 105                 110

Gly Glu Gln Tyr Cys Val Ala Arg Met Leu Gln Lys Ser Val Ser Arg
        115                 120                 125

Arg Lys Cys Ala Ala Cys Lys Ile Val Val His Thr Pro Cys Ile Glu
    130                 135                 140

Gln Leu Glu Lys Ile Asn Phe Arg Cys Lys Pro Ser Phe Arg Glu Ser
145                 150                 155                 160

Gly Ser Arg Asn Val Arg Glu Pro Thr Phe Val Arg His His Trp Val
                165                 170                 175

His Arg Arg Arg Gln Asp Gly Lys Cys Arg His Cys Gly Lys Gly Phe
            180                 185                 190

Gln Gln Lys Phe Thr Phe His Ser Lys Glu Ile Val Ala Ile Ser Cys
        195                 200                 205

Ser Trp Cys Lys Gln Ala Tyr His Ser Lys Val Ser Cys Phe Met Leu
    210                 215                 220

Gln Gln Ile Glu Glu Pro Cys Ser Leu Gly Val His Ala Ala Val Val
```

-continued

```
            225                 230                 235                 240
    Ile Pro Pro Thr Trp Ile Leu Arg Ala Arg Pro Gln Asn Thr Leu
                        245                 250                 255
    Lys Ala Ser Lys Lys Lys Arg Ala Ser Phe Lys Arg Lys Ser Ser
                        260                 265                 270
    Lys Lys Gly Pro Glu Glu Gly Arg Trp Arg Pro Phe Ile Ile Arg Pro
                        275                 280                 285
    Thr Pro Ser Pro Leu Met Lys Pro Leu Leu Val Phe Val Asn Pro Lys
                        290                 295                 300
    Ser Gly Gly Asn Gln Gly Ala Lys Ile Ile Gln Ser Phe Leu Trp Tyr
    305                 310                 315                 320
    Leu Asn Pro Arg Gln Val Phe Asp Leu Ser Gln Gly Gly Pro Lys Glu
                        325                 330                 335
    Ala Leu Glu Met Tyr Arg Lys Val His Asn Leu Arg Ile Leu Ala Cys
                        340                 345                 350
    Gly Gly Asp Gly Thr Val Gly Trp Ile Leu Ser Thr Leu Asp Gln Leu
                        355                 360                 365
    Arg Leu Lys Pro Pro Pro Val Ala Ile Leu Pro Leu Gly Thr Gly
    370                 375                 380
    Asn Asp Leu Ala Arg Thr Leu Asn Trp Gly Gly Gly Tyr Thr Asp Glu
    385                 390                 395                 400
    Pro Val Ser Lys Ile Leu Ser His Val Glu Glu Gly Asn Val Val Gln
                        405                 410                 415
    Leu Asp Arg Trp Asp Leu His Ala Glu Pro Asn Pro Glu Ala Gly Pro
                        420                 425                 430
    Glu Asp Arg Asp Glu Gly Ala Thr Asp Arg Leu Pro Leu Asp Val Phe
                        435                 440                 445
    Asn Asn Tyr Phe Ser Leu Gly Phe Asp Ala His Val Thr Leu Glu Phe
                        450                 455                 460
    His Glu Ser Arg Glu Ala Asn Pro Glu Lys Phe Asn Ser Arg Phe Arg
    465                 470                 475                 480
    Asn Lys Met Phe Tyr Ala Gly Thr Ala Phe Ser Asp Phe Leu Met Gly
                        485                 490                 495
    Ser Ser Lys Asp Leu Ala Lys His Ile Arg Val Val Cys Asp Gly Met
                        500                 505                 510
    Asp Leu Thr Pro Lys Ile Gln Asp Leu Lys Pro Gln Cys Val Val Phe
                        515                 520                 525
    Leu Asn Ile Pro Arg Tyr Cys Ala Gly Thr Met Pro Trp Gly His Pro
    530                 535                 540
    Gly Glu His His Asp Phe Glu Pro Gln Arg His Asp Asp Gly Tyr Leu
    545                 550                 555                 560
    Glu Val Ile Gly Phe Thr Met Thr Ser Leu Ala Ala Leu Gln Val Gly
                        565                 570                 575
    Gly His Gly Glu Arg Leu Thr Gln Cys Arg Glu Val Val Leu Thr Thr
                        580                 585                 590
    Ser Lys Ala Ile Pro Val Gln Val Asp Gly Glu Pro Cys Lys Leu Ala
                        595                 600                 605
    Ala Ser Arg Ile Arg Ile Ala Leu Arg Asn Gln Ala Thr Met Val Gln
                        610                 615                 620
    Lys Ala Lys Arg Arg Ser Ala Ala Pro Leu His Ser Asp Gln Gln Pro
    625                 630                 635                 640
    Val Pro Glu Gln Leu Arg Ile Gln Val Ser Arg Val Ser Met His Asp
                        645                 650                 655
```

```
Tyr Glu Ala Leu His Tyr Asp Lys Glu Gln Leu Lys Glu Ala Ser Val
            660                 665                 670

Pro Leu Gly Thr Val Val Pro Gly Asp Ser Asp Leu Glu Leu Cys
        675                 680                 685

Arg Ala His Ile Glu Arg Leu Gln Gln Glu Pro Asp Gly Ala Gly Ala
        690                 695                 700

Lys Ser Pro Thr Cys Gln Lys Leu Ser Pro Lys Trp Cys Phe Leu Asp
705                 710                 715                 720

Ala Thr Thr Ala Ser Arg Phe Tyr Arg Ile Asp Arg Ala Gln Glu His
                725                 730                 735

Leu Asn Tyr Val Thr Glu Ile Ala Gln Asp Glu Ile Tyr Ile Leu Asp
            740                 745                 750

Pro Glu Leu Leu Gly Ala Ser Ala Arg Pro Asp Leu Pro Thr Pro Thr
        755                 760                 765

Ser Pro Leu Pro Thr Ser Pro Cys Ser Pro Thr Pro Arg Ser Leu Gln
        770                 775                 780

Gly Asp Ala Ala Pro Pro Gln Gly Glu Glu Leu Ile Glu Ala Ala Lys
785                 790                 795                 800

Arg Asn Asp Phe Cys Lys Leu Gln Glu Leu His Arg Ala Gly Gly Asp
                805                 810                 815

Leu Met His Arg Asp Glu Gln Ser Arg Thr Leu Leu His His Ala Val
            820                 825                 830

Ser Thr Gly Ser Lys Asp Val Val Arg Tyr Leu Leu Asp His Ala Pro
        835                 840                 845

Pro Glu Ile Leu Asp Ala Val Glu Glu Asn Gly Glu Thr Cys Leu His
        850                 855                 860

Gln Ala Ala Ala Leu Gly Gln Arg Thr Ile Cys His Tyr Ile Val Glu
865                 870                 875                 880

Ala Gly Ala Ser Leu Met Lys Thr Asp Gln Gln Gly Asp Thr Pro Arg
                885                 890                 895

Gln Arg Ala Glu Lys Ala Gln Asp Thr Glu Leu Ala Ala Tyr Leu Glu
            900                 905                 910

Asn Arg Gln His Tyr Gln Met Ile Gln Arg Glu Asp Gln Glu Thr Ala
        915                 920                 925

Val Gly Ser Ser Glu Thr Val Arg Phe Gln Gly His His His His
        930                 935                 940

His
945

<210> SEQ ID NO 5
<211> LENGTH: 2214
<212> TYPE: PRT
<213> ORGANISM: Homo sapiens

<400> SEQUENCE: 5

Ala Thr Gly Gly Cys Thr Thr Cys Cys Cys Ala Ala Gly Cys Gly
1               5                   10                  15

Ala Cys Thr Thr Cys Gly Cys Cys Ala Gly Cys Thr Gly Cys Ala
            20                  25                  30

Gly Ala Gly Thr Ala Cys Ala Thr Gly Gly Ala Thr Ala Cys
        35                  40                  45

Ala Gly Cys Ala Cys Cys Ala Ala Gly Ala Gly Gly Thr Gly Thr
    50                  55                  60

Cys Thr Gly Ala Cys Gly Thr Cys Cys Thr Gly Ala Ala Gly Cys Thr
```

65 70 75 80

Gly Thr Thr Cys Gly Ala Gly Gly Ala Cys Gly Gly Thr Gly Ala Ala
85 90 95

Ala Thr Gly Gly Cys Thr Ala Ala Gly Thr Ala Cys Gly Thr Cys Cys
100 105 110

Ala Gly Gly Gly Cys Gly Ala Cys Gly Cys Thr Ala Thr Cys Gly Gly
115 120 125

Ala Thr Ala Cys Gly Ala Gly Gly Gly Ala Thr Thr Cys Cys Ala Gly
130 135 140

Cys Ala Gly Thr Thr Cys Cys Thr Gly Ala Ala Gly Ala Thr Cys Thr
145 150 155 160

Ala Cys Cys Thr Gly Gly Ala Ala Gly Thr Gly Gly Ala Cys Ala Ala
165 170 175

Cys Gly Thr Cys Cys Cys Cys Ala Gly Gly Cys Ala Cys Cys Thr Gly
180 185 190

Thr Cys Ala Cys Thr Gly Gly Cys Thr Cys Thr Gly Thr Thr Cys Cys
195 200 205

Ala Gly Thr Cys Cys Thr Thr Cys Gly Ala Gly Ala Cys Thr Gly Gly
210 215 220

Cys Cys Ala Cys Thr Gly Cys Cys Thr Gly Ala Ala Cys Gly Ala Ala
225 230 235 240

Ala Cys Cys Ala Ala Cys Gly Thr Cys Ala Cys Thr Ala Ala Gly Gly
245 250 255

Ala Cys Gly Thr Gly Gly Thr Cys Thr Gly Cys Cys Thr Gly Ala Ala
260 265 270

Cys Gly Ala Cys Gly Thr Gly Ala Gly Cys Thr Gly Cys Thr Ala Cys
275 280 285

Thr Thr Cys Thr Cys Thr Cys Thr Gly Cys Thr Gly Gly Ala Gly Gly
290 295 300

Gly Thr Gly Gly Cys Ala Gly Ala Cys Cys Ala Gly Ala Gly Gly Ala
305 310 315 320

Cys Ala Ala Gly Cys Thr Gly Gly Ala Ala Thr Thr Cys Ala Cys Cys
325 330 335

Thr Thr Cys Ala Ala Gly Cys Thr Gly Thr Ala Cys Gly Ala Cys Ala
340 345 350

Cys Thr Gly Ala Cys Cys Gly Cys Ala Ala Cys Gly Gly Ala Ala Thr
355 360 365

Cys Cys Thr Gly Gly Ala Cys Thr Cys Cys Ala Gly Cys Gly Ala Ala
370 375 380

Gly Thr Gly Gly Ala Cys Ala Ala Gly Ala Thr Cys Ala Thr Cys Cys
385 390 395 400

Thr Gly Cys Ala Gly Ala Thr Gly Ala Thr Gly Cys Gly Thr Gly Thr
405 410 415

Cys Gly Cys Thr Gly Ala Gly Thr Ala Cys Cys Thr Gly Gly Ala Cys
420 425 430

Thr Gly Gly Gly Ala Cys Gly Thr Gly Ala Gly Cys Gly Ala Ala Cys
435 440 445

Thr Gly Ala Gly Gly Cys Cys Thr Ala Thr Cys Cys Thr Gly Cys Ala
450 455 460

Gly Gly Ala Gly Ala Thr Gly Ala Thr Gly Ala Ala Gly Gly Ala Ala
465 470 475 480

Ala Thr Cys Gly Ala Cys Thr Ala Cys Gly Ala Cys Gly Gly Cys Thr
485 490 495

```
Cys Thr Gly Gly Ala Thr Cys Ala Gly Thr Cys Cys Ala
            500                 505                 510
Gly Gly Cys Thr Gly Ala Gly Thr Gly Gly Thr Cys Cys Gly Cys
            515                 520                 525
Gly Cys Thr Gly Gly Thr Gly Cys Thr Ala Cys Ala Cys Thr Gly
            530                 535                 540
Thr Gly Cys Cys Ala Cys Thr Gly Cys Thr Gly Thr Cys Cys Thr
545                 550                 555                 560
Gly Cys Thr Gly Gly Ala Cys Thr Gly Gly Ala Ala Thr Gly
            565                 570                 575
Ala Cys Cys Cys Thr Gly Ala Ala Gly Gly Ala Cys Gly Ala Cys Gly
            580                 585                 590
Gly Thr Cys Ala Gly Cys Ala Cys Ala Thr Gly Gly Cys Gly
            595                 600                 605
Cys Cys Cys Ala Ala Gly Cys Gly Thr Thr Thr Cys Cys Cys
            610                 615                 620
Ala Gly Gly Cys Cys Ala Gly Thr Cys Thr Ala Cys Thr Gly Cys Ala
625                 630                 635                 640
Ala Cys Cys Thr Gly Thr Gly Cys Gly Ala Gly Thr Cys Thr Thr Cys
            645                 650                 655
Ala Ala Thr Cys Gly Gly Thr Cys Thr Gly Gly Gly Cys Ala Ala Gly
            660                 665                 670
Cys Ala Gly Gly Gly Cys Cys Thr Gly Thr Cys Ala Thr Gly Cys Ala
            675                 680                 685
Ala Cys Cys Thr Gly Thr Gly Cys Ala Ala Gly Thr Ala Cys Ala Cys
            690                 695                 700
Cys Gly Thr Gly Cys Ala Cys Gly Ala Cys Ala Gly Thr Gly Cys
705                 710                 715                 720
Gly Cys Thr Ala Thr Gly Ala Ala Gly Gly Cys Cys Thr Gly Cys
            725                 730                 735
Cys Cys Thr Gly Cys Gly Ala Gly Gly Thr Cys Thr Cys Ala Ala Cys
            740                 745                 750
Thr Thr Ala Cys Gly Cys Thr Ala Ala Gly Thr Cys Cys Cys Gly Thr
            755                 760                 765
Ala Ala Gly Gly Ala Cys Ala Thr Cys Gly Gly Ala Gly Thr Gly Cys
            770                 775                 780
Ala Gly Thr Cys Ala Cys Ala Cys Gly Thr Gly Gly Gly Thr
785                 790                 795                 800
Cys Ala Gly Gly Gly Ala Gly Gly Thr Gly Cys Gly Ala Ala
            805                 810                 815
Thr Cys Cys Gly Gly Thr Ala Gly Ala Thr Gly Cys Gly Ala Cys Cys
            820                 825                 830
Gly Cys Thr Gly Cys Cys Ala Gly Ala Ala Gly Ala Ala Gly Ala Thr
            835                 840                 845
Cys Cys Gly Thr Ala Thr Cys Thr Ala Cys Cys Ala Cys Thr Cys Cys
            850                 855                 860
Cys Thr Gly Ala Cys Cys Gly Gly Ala Cys Thr Gly Cys Ala Cys Thr
865                 870                 875                 880
Gly Cys Gly Thr Cys Thr Gly Gly Thr Gly Cys Cys Ala Cys Cys Thr
            885                 890                 895
Gly Gly Ala Gly Ala Thr Cys Cys Ala Cys Gly Ala Cys Gly Ala Cys
            900                 905                 910
```

Thr Gly Cys Cys Thr Gly Cys Ala Gly Gly Cys Cys Thr Gly Gly
                915                 920                 925

Gly Ala Cys Ala Cys Gly Ala Ala Thr Gly Cys Gly Ala Cys Thr Gly
            930                 935                 940

Cys Gly Gly Thr Cys Thr Gly Cys Thr Gly Cys Gly Thr Gly Ala Cys
945                 950                 955                 960

Cys Ala Cys Ala Thr Cys Cys Thr Gly Cys Cys Thr Cys Cys Cys Thr
                965                 970                 975

Cys Cys Ala Gly Cys Ala Thr Cys Thr Ala Cys Cys Cys Thr Thr Cys
            980                 985                 990

Ala Gly Thr Cys Cys Thr Gly Gly Cys Thr Thr Cys Cys Gly Gly Thr
            995                 1000                1005

Cys Cys Cys Gly Ala Cys Ala Gly Gly Ala Ala Gly Ala Ala Cys
        1010            1015                1020

Ala Gly Cys Ala Ala Gly Ala Cys Cys Thr Cys Thr Cys Ala Gly
        1025            1030                1035

Ala Ala Gly Ala Cys Thr Ala Thr Gly Gly Ala Cys Gly Ala Cys
        1040            1045                1050

Cys Thr Gly Ala Ala Cys Cys Thr Gly Ala Gly Cys Ala Cys Cys
        1055            1060                1065

Thr Cys Thr Gly Ala Gly Gly Cys Cys Cys Thr Gly Cys Gly Cys
        1070            1075                1080

Ala Thr Cys Gly Ala Cys Cys Cys Thr Gly Thr Gly Cys Cys Cys
        1085            1090                1095

Ala Ala Cys Ala Cys Thr Cys Ala Cys Cys Cys Ala Cys Thr Gly
        1100            1105                1110

Cys Thr Gly Gly Thr Gly Thr Thr Cys Gly Thr Cys Ala Ala Cys
        1115            1120                1125

Cys Cys Thr Ala Ala Gly Ala Gly Cys Gly Gly Cys Gly Gly Ala
        1130            1135                1140

Ala Ala Gly Cys Ala Gly Gly Gly Thr Cys Ala Gly Ala Gly Ala
        1145            1150                1155

Gly Thr Cys Cys Thr Gly Thr Gly Gly Ala Ala Gly Thr Thr Cys
        1160            1165                1170

Cys Ala Gly Thr Ala Cys Ala Thr Cys Thr Gly Ala Ala Cys
        1175            1180                1185

Cys Cys Ala Cys Gly Cys Cys Ala Gly Gly Thr Gly Thr Thr Cys
        1190            1195                1200

Ala Ala Cys Cys Thr Gly Cys Thr Gly Ala Ala Gly Gly Ala Cys
        1205            1210                1215

Gly Gly Cys Cys Cys Thr Gly Ala Gly Ala Thr Cys Gly Gly Ala
        1220            1225                1230

Cys Thr Gly Ala Gly Ala Cys Thr Gly Thr Thr Cys Ala Ala Gly
        1235            1240                1245

Gly Ala Cys Gly Thr Gly Cys Cys Cys Gly Ala Cys Thr Cys Thr
        1250            1255                1260

Cys Gly Cys Ala Thr Cys Thr Cys Gly Thr Cys Thr Gly Cys
        1265            1270                1275

Gly Gly Thr Gly Gly Cys Gly Ala Cys Gly Gly Thr Ala Cys Thr
        1280            1285                1290

Gly Thr Gly Gly Gly Ala Thr Gly Gly Ala Thr Cys Cys Thr Gly
        1295            1300                1305

Gly Ala Ala Ala Cys Thr Ala Thr Cys Gly Ala Cys Ala Ala Gly

```
                        1310                    1315                   1320
Gly Cys Thr Ala Ala Cys Cys Thr Gly Cys Cys Ala Gly Thr Gly
    1325                    1330                    1335
Cys Thr Gly Cys Cys Ala Cys Cys Thr Gly Thr Gly Gly Cys Thr
    1340                    1345                    1350
Gly Thr Cys Cys Thr Gly Cys Cys Ala Cys Thr Gly Gly Gly Ala
    1355                    1360                    1365
Ala Cys Cys Gly Gly Thr Ala Ala Cys Gly Ala Cys Cys Thr Gly
    1370                    1375                    1380
Gly Cys Thr Cys Gly Thr Thr Gly Cys Cys Thr Gly Cys Gly Thr
    1385                    1390                    1395
Thr Gly Gly Gly Gly Ala Gly Gly Thr Gly Gly Cys Thr Ala Cys
    1400                    1405                    1410
Gly Ala Gly Gly Gly Ala Cys Ala Gly Ala Ala Cys Cys Thr Gly
    1415                    1420                    1425
Gly Cys Cys Ala Ala Gly Ala Thr Cys Cys Thr Gly Ala Ala Gly
    1430                    1435                    1440
Gly Ala Cys Cys Thr Gly Gly Ala Ala Ala Thr Gly Ala Gly Cys
    1445                    1450                    1455
Ala Ala Gly Gly Thr Gly Gly Thr Cys Cys Ala Cys Ala Thr Gly
    1460                    1465                    1470
Gly Ala Cys Ala Gly Ala Thr Gly Gly Thr Cys Thr Gly Thr Gly
    1475                    1480                    1485
Gly Ala Gly Gly Thr Cys Ala Thr Cys Cys Cys Ala Cys Ala Gly
    1490                    1495                    1500
Cys Ala Gly Ala Cys Thr Gly Ala Gly Gly Ala Ala Ala Ala Gly
    1505                    1510                    1515
Thr Cys Ala Gly Ala Cys Cys Cys Ala Gly Thr Cys Cys Cys Thr
    1520                    1525                    1530
Thr Thr Cys Cys Ala Gly Ala Thr Cys Ala Thr Cys Ala Ala Cys
    1535                    1540                    1545
Ala Ala Cys Thr Ala Cys Thr Cys Ala Gly Cys Ala Thr Cys
    1550                    1555                    1560
Gly Gly Thr Gly Thr Gly Gly Ala Cys Gly Cys Thr Thr Cys Thr
    1565                    1570                    1575
Ala Thr Cys Gly Cys Cys Cys Ala Cys Ala Gly Ala Thr Thr Cys
    1580                    1585                    1590
Cys Ala Cys Ala Thr Cys Ala Thr Gly Cys Gly Cys Gly Ala Gly
    1595                    1600                    1605
Ala Ala Gly Thr Ala Cys Cys Thr Gly Ala Ala Ala Ala Ala Gly
    1610                    1615                    1620
Thr Thr Cys Ala Ala Cys Thr Cys Cys Cys Gly Cys Ala Thr Gly
    1625                    1630                    1635
Ala Ala Gly Ala Ala Cys Ala Ala Gly Cys Thr Gly Thr Gly Gly
    1640                    1645                    1650
Thr Ala Cys Thr Thr Cys Gly Ala Gly Thr Thr Cys Gly Cys Thr
    1655                    1660                    1665
Ala Cys Cys Thr Cys Ala Gly Ala Ala Thr Cys Cys Ala Thr Cys
    1670                    1675                    1680
Thr Thr Cys Thr Cys Ala Ala Cys Thr Thr Gly Cys Ala Ala Gly
    1685                    1690                    1695
Ala Ala Gly Cys Thr Gly Gly Ala Gly Gly Ala Ala Thr Cys Cys
    1700                    1705                    1710
```

Cys Thr Gly Ala Cys Cys Gly Thr Cys Gly Ala Gly Ala Thr Cys
1715 1720 1725

Thr Gly Cys Gly Gly Cys Ala Ala Gly Cys Cys Thr Cys Thr Gly
1730 1735 1740

Gly Ala Cys Cys Thr Gly Thr Cys Ala Ala Ala Cys Cys Thr Gly
1745 1750 1755

Thr Cys Cys Cys Thr Gly Gly Ala Ala Gly Gly Cys Ala Thr Cys
1760 1765 1770

Gly Cys Thr Gly Thr Gly Cys Thr Gly Ala Ala Cys Ala Thr Cys
1775 1780 1785

Cys Cys Ala Ala Gly Cys Ala Thr Gly Cys Ala Cys Gly Gly Ala
1790 1795 1800

Gly Gly Thr Thr Cys Thr Ala Ala Cys Cys Thr Cys Thr Gly Gly
1805 1810 1815

Gly Gly Cys Gly Ala Cys Ala Cys Thr Ala Gly Gly Ala Gly Gly
1820 1825 1830

Cys Cys Thr Cys Ala Cys Gly Gly Thr Gly Ala Cys Ala Thr Cys
1835 1840 1845

Thr Ala Cys Gly Gly Cys Ala Thr Cys Ala Ala Cys Cys Ala Gly
1850 1855 1860

Gly Cys Cys Cys Thr Gly Gly Gly Ala Gly Cys Thr Ala Cys Cys
1865 1870 1875

Gly Cys Cys Ala Ala Gly Gly Thr Cys Ala Thr Cys Ala Cys Thr
1880 1885 1890

Gly Ala Cys Cys Cys Cys Gly Ala Cys Ala Thr Cys Cys Thr Gly
1895 1900 1905

Ala Ala Gly Ala Cys Cys Thr Gly Cys Gly Thr Gly Cys Cys Ala
1910 1915 1920

Gly Ala Cys Cys Thr Gly Ala Gly Cys Gly Ala Cys Ala Ala Gly
1925 1930 1935

Cys Gly Thr Cys Thr Gly Gly Ala Gly Gly Thr Gly Gly Thr Cys
1940 1945 1950

Gly Gly Ala Cys Thr Gly Gly Ala Gly Gly Gly Thr Gly Cys Cys
1955 1960 1965

Ala Thr Cys Gly Ala Ala Ala Thr Gly Gly Gly Cys Cys Ala Gly
1970 1975 1980

Ala Thr Cys Thr Ala Cys Ala Cys Thr Ala Ala Gly Cys Thr Gly
1985 1990 1995

Ala Ala Gly Ala Ala Cys Gly Cys Thr Gly Gly Ala Ala Gly Gly
2000 2005 2010

Ala Gly Ala Cys Thr Gly Gly Cys Cys Ala Ala Gly Thr Gly Cys
2015 2020 2025

Thr Cys Thr Gly Ala Gly Ala Thr Cys Ala Cys Cys Thr Thr Cys
2030 2035 2040

Cys Ala Cys Ala Cys Cys Ala Cys Thr Ala Ala Gly Ala Cys Thr
2045 2050 2055

Cys Thr Gly Cys Cys Thr Ala Thr Gly Cys Ala Gly Ala Thr Cys
2060 2065 2070

Gly Ala Cys Gly Gly Thr Gly Ala Ala Cys Cys Cys Thr Gly Gly
2075 2080 2085

Ala Thr Gly Cys Ala Gly Ala Cys Cys Cys Cys Ala Thr Gly Cys
2090 2095 2100

```
Ala Cys Thr Ala Thr Cys Ala Ala Gly Ala Thr Cys Ala Cys Cys
    2105                2110                2115

Cys Ala Cys Ala Ala Gly Ala Ala Cys Cys Ala Gly Ala Thr Gly
    2120                2125                2130

Cys Cys Cys Ala Thr Gly Cys Thr Gly Ala Thr Gly Gly Gly Thr
    2135                2140                2145

Cys Cys Thr Cys Cys Thr Cys Cys Thr Cys Gly Cys Thr Cys Thr
    2150                2155                2160

Gly Gly Ala Thr Cys Thr Thr Cys Ala Gly Ala Ala Ala Cys Thr
    2165                2170                2175

Gly Thr Gly Ala Gly Gly Thr Thr Cys Cys Ala Gly Gly Gly Cys
    2180                2185                2190

Cys Ala Cys Cys Ala Cys Cys Ala Cys Cys Ala Cys Cys Ala Cys
    2195                2200                2205

Cys Ala Cys Thr Gly Ala
    2210
```

<210> SEQ ID NO 6
<211> LENGTH: 737
<212> TYPE: PRT
<213> ORGANISM: Homo sapiens

<400> SEQUENCE: 6

```
Met Ala Ser Pro Ser Asp Phe Ala Gln Leu Gln Lys Tyr Met Glu Tyr
1               5                   10                  15

Ser Thr Lys Lys Val Ser Asp Val Leu Lys Leu Phe Glu Asp Gly Glu
            20                  25                  30

Met Ala Lys Tyr Val Gln Gly Asp Ala Ile Gly Tyr Glu Gly Phe Gln
        35                  40                  45

Gln Phe Leu Lys Ile Tyr Leu Glu Val Asp Asn Val Pro Arg His Leu
    50                  55                  60

Ser Leu Ala Leu Phe Gln Ser Phe Glu Thr Gly His Cys Leu Asn Glu
65                  70                  75                  80

Thr Asn Val Thr Lys Asp Val Val Cys Leu Asn Asp Val Ser Cys Tyr
                85                  90                  95

Phe Ser Leu Leu Glu Gly Gly Arg Pro Glu Asp Lys Leu Glu Phe Thr
            100                 105                 110

Phe Lys Leu Tyr Asp Thr Asp Arg Asn Gly Ile Leu Asp Ser Ser Glu
        115                 120                 125

Val Asp Lys Ile Ile Leu Gln Met Met Arg Val Ala Glu Tyr Leu Asp
    130                 135                 140

Trp Asp Val Ser Glu Leu Arg Pro Ile Leu Gln Glu Met Met Lys Glu
145                 150                 155                 160

Ile Asp Tyr Asp Gly Ser Gly Ser Val Ser Gln Ala Glu Trp Val Arg
                165                 170                 175

Ala Gly Ala Thr Thr Val Pro Leu Leu Val Leu Leu Gly Leu Glu Met
            180                 185                 190

Thr Leu Lys Asp Asp Gly Gln His Met Trp Arg Pro Lys Arg Phe Pro
        195                 200                 205

Arg Pro Val Tyr Cys Asn Leu Cys Glu Ser Ser Ile Gly Leu Gly Lys
    210                 215                 220

Gln Gly Leu Ser Cys Asn Leu Cys Lys Tyr Thr Val His Asp Gln Cys
225                 230                 235                 240

Ala Met Lys Ala Leu Pro Cys Glu Val Ser Thr Tyr Ala Lys Ser Arg
                245                 250                 255
```

-continued

Lys Asp Ile Gly Val Gln Ser His Val Trp Val Arg Gly Cys Glu
            260                 265                 270

Ser Gly Arg Cys Asp Arg Cys Gln Lys Ile Arg Ile Tyr His Ser
        275                 280                 285

Leu Thr Gly Leu His Cys Val Trp Cys His Leu Glu Ile His Asp Asp
    290                 295                 300

Cys Leu Gln Ala Val Gly His Glu Cys Asp Cys Gly Leu Leu Arg Asp
305                 310                 315                 320

His Ile Leu Pro Pro Ser Ser Ile Tyr Pro Ser Val Leu Ala Ser Gly
                325                 330                 335

Pro Asp Arg Lys Asn Ser Lys Thr Ser Gln Lys Thr Met Asp Asp Leu
            340                 345                 350

Asn Leu Ser Thr Ser Glu Ala Leu Arg Ile Asp Pro Val Pro Asn Thr
        355                 360                 365

His Pro Leu Leu Val Phe Val Asn Pro Lys Ser Gly Gly Lys Gln Gly
    370                 375                 380

Gln Arg Val Leu Trp Lys Phe Gln Tyr Ile Leu Asn Pro Arg Gln Val
385                 390                 395                 400

Phe Asn Leu Leu Lys Asp Gly Pro Glu Ile Gly Leu Arg Leu Phe Lys
                405                 410                 415

Asp Val Pro Asp Ser Arg Ile Leu Val Cys Gly Gly Asp Gly Thr Val
            420                 425                 430

Gly Trp Ile Leu Glu Thr Ile Asp Lys Ala Asn Leu Pro Val Leu Pro
        435                 440                 445

Pro Val Ala Val Leu Pro Leu Gly Thr Gly Asn Asp Leu Ala Arg Cys
    450                 455                 460

Leu Arg Trp Gly Gly Gly Tyr Glu Gly Gln Asn Leu Ala Lys Ile Leu
465                 470                 475                 480

Lys Asp Leu Glu Met Ser Lys Val Val His Met Asp Arg Trp Ser Val
                485                 490                 495

Glu Val Ile Pro Gln Gln Thr Glu Glu Lys Ser Asp Pro Val Pro Phe
            500                 505                 510

Gln Ile Ile Asn Asn Tyr Phe Ser Ile Gly Val Asp Ala Ser Ile Ala
        515                 520                 525

His Arg Phe His Ile Met Arg Glu Lys Tyr Pro Glu Lys Phe Asn Ser
    530                 535                 540

Arg Met Lys Asn Lys Leu Trp Tyr Phe Glu Phe Ala Thr Ser Glu Ser
545                 550                 555                 560

Ile Phe Ser Thr Cys Lys Lys Leu Glu Glu Ser Leu Thr Val Glu Ile
                565                 570                 575

Cys Gly Lys Pro Leu Asp Leu Ser Asn Leu Ser Leu Glu Gly Ile Ala
            580                 585                 590

Val Leu Asn Ile Pro Ser Met His Gly Gly Ser Asn Leu Trp Gly Asp
        595                 600                 605

Thr Arg Arg Pro His Gly Asp Ile Tyr Gly Ile Asn Gln Ala Leu Gly
    610                 615                 620

Ala Thr Ala Lys Val Ile Thr Asp Pro Asp Ile Leu Lys Thr Cys Val
625                 630                 635                 640

Pro Asp Leu Ser Asp Lys Arg Leu Glu Val Val Gly Leu Glu Gly Ala
                645                 650                 655

Ile Glu Met Gly Gln Ile Tyr Thr Lys Leu Lys Asn Ala Gly Arg Arg
            660                 665                 670

```
Leu Ala Lys Cys Ser Glu Ile Thr Phe His Thr Thr Lys Thr Leu Pro
            675                 680                 685

Met Gln Ile Asp Gly Glu Pro Trp Met Gln Thr Pro Cys Thr Ile Lys
            690                 695                 700

Ile Thr His Lys Asn Gln Met Pro Met Leu Met Gly Pro Pro Pro Arg
705                 710                 715                 720

Ser Gly Ser Ser Glu Thr Val Arg Phe Gln Gly His His His His
                725                 730                 735

His
```